US011217077B2

(12) United States Patent
Shakedd et al.

(10) Patent No.: US 11,217,077 B2
(45) Date of Patent: Jan. 4, 2022

(54) APPLIANCES WITH INTEGRATED COMMUNICATION TAGS

(71) Applicant: NEXITE LTD., Tel-Aviv Yafo (IL)

(72) Inventors: Anat Shakedd, Rishon Lezion (IL); Lior Shakedd, Rishon Lezion (IL)

(73) Assignee: NEXITE LTD., Tel-Aviv Yafo (IL)

( * ) Notice: Subject to any disclaimer, the term of this patent is extended or adjusted under 35 U.S.C. 154(b) by 0 days.

(21) Appl. No.: 17/064,056

(22) Filed: Oct. 6, 2020

(65) Prior Publication Data

US 2021/0020011 A1 Jan. 21, 2021

Related U.S. Application Data

(63) Continuation of application No. PCT/IB2020/000254, filed on Apr. 10, 2020.
(Continued)

(51) Int. Cl.
*G08B 13/24* (2006.01)
*G08C 17/02* (2006.01)
(Continued)

(52) U.S. Cl.
CPC ..... *G08B 13/2448* (2013.01); *G06F 16/2379* (2019.01); *G06F 16/9535* (2019.01);
(Continued)

(58) Field of Classification Search
CPC ............ G08B 13/2402; G08B 13/2451; G08B 13/2468; G08B 13/2431; G08B 13/2488;
(Continued)

(56) References Cited

U.S. PATENT DOCUMENTS 3,231,834 A   1/1966  Watanabe
4,688,026 A   8/1987  Scribner
(Continued)

FOREIGN PATENT DOCUMENTS

CN    108471948 A   8/2018
EP      3279836 A1   2/2018
(Continued)

OTHER PUBLICATIONS

International Search Report and Written Opinion of the International Searching Authority from the European Patent Office for corresponding International Application No. PCT/IB2020/000254, dated Aug. 10, 2020 (43 pages).

*Primary Examiner* — Hoi C Lau
(74) *Attorney, Agent, or Firm* — Finnegan, Henderson, Farabow, Garrett & Dunner, LLP

(57) ABSTRACT

Embodiments of the present disclosure generally relate to an appliance for holding electronically tagged products and for recording an association between the tagged products and the appliance, and system and methods for use thereof. In one implementation, the appliance may include a housing defining a cavity for retaining the electronically tagged products. The appliance may also include an exciter integrated with the housing and configured to trigger tags of the products to cause the tag of each product to transmit a unique tag ID. The appliance may also include a receiver for receiving transmission of each unique tag ID. The appliance may also include a communicator for outputting indications of identities of electronically tagged products retained in the cavity.

25 Claims, 33 Drawing Sheets

Related U.S. Application Data

(60) Provisional application No. 62/832,397, filed on Apr. 11, 2019.

(51) Int. Cl.

| | | |
|---|---|---|
| *G06K 19/07* | (2006.01) | |
| *H02J 50/20* | (2016.01) | |
| *H02J 50/50* | (2016.01) | |
| *H02J 7/34* | (2006.01) | |
| *H04B 1/40* | (2015.01) | |
| *G06K 19/077* | (2006.01) | |
| *G06K 7/10* | (2006.01) | |
| *G06F 16/23* | (2019.01) | |
| *G06F 16/9535* | (2019.01) | |
| *G06F 21/60* | (2013.01) | |
| *G06Q 10/08* | (2012.01) | |
| *G06Q 20/38* | (2012.01) | |
| *G06Q 30/00* | (2012.01) | |
| *G06Q 50/26* | (2012.01) | |
| *H04L 9/14* | (2006.01) | |
| *H04L 29/08* | (2006.01) | |
| *H04L 9/06* | (2006.01) | |
| *G06F 3/0484* | (2013.01) | |

(52) U.S. Cl.
CPC ....... *G06F 21/602* (2013.01); *G06K 7/10297* (2013.01); *G06K 7/10366* (2013.01); *G06K 19/0704* (2013.01); *G06K 19/0705* (2013.01); *G06K 19/0707* (2013.01); *G06K 19/0708* (2013.01); *G06K 19/0709* (2013.01); *G06K 19/0723* (2013.01); *G06K 19/0726* (2013.01); *G06K 19/0776* (2013.01); *G06K 19/07773* (2013.01); *G06Q 10/087* (2013.01); *G06Q 20/389* (2013.01); *G06Q 30/0185* (2013.01); *G06Q 50/265* (2013.01); *G08B 13/2402* (2013.01); *G08B 13/2431* (2013.01); *G08B 13/2454* (2013.01); *G08B 13/2457* (2013.01); *G08B 13/2462* (2013.01); *G08B 13/2471* (2013.01); *G08B 13/2482* (2013.01); *G08B 13/2485* (2013.01); *G08B 13/2488* (2013.01); *G08C 17/02* (2013.01); *H02J 7/345* (2013.01); *H02J 50/20* (2016.02); *H02J 50/50* (2016.02); *H04B 1/40* (2013.01); *H04L 9/0668* (2013.01); *H04L 9/14* (2013.01); *H04L 67/12* (2013.01); *G06F 3/0484* (2013.01); *G06Q 2220/10* (2013.01); *H02J 2207/50* (2020.01)

(58) Field of Classification Search
CPC ... G08B 29/185; G07C 9/00571; G07F 9/026; G06K 19/0717
See application file for complete search history.

(56) References Cited

U.S. PATENT DOCUMENTS

| | | | |
|---|---|---|---|
| 6,097,301 A | 8/2000 | Tuttle | |
| 6,476,708 B1* | 11/2002 | Johnson | G06K 7/0008 340/10.34 |
| 6,609,198 B1 | 8/2003 | Wood | |
| 6,617,962 B1* | 9/2003 | Horwitz | G06K 7/0008 340/10.4 |
| 6,693,599 B1 | 2/2004 | Chia | |
| 6,927,637 B1 | 8/2005 | Koh | |
| 6,982,640 B2* | 1/2006 | Lindsay | G06K 19/0717 340/540 |
| 7,034,683 B2 | 4/2006 | Ghazarian | |
| 7,170,201 B2 | 1/2007 | Hamel | |
| 7,187,299 B2 | 3/2007 | Kunerth | |
| 7,233,958 B2 | 6/2007 | Weng | |
| 7,242,306 B2* | 7/2007 | Wildman | G08B 13/2462 340/573.1 |
| 7,400,298 B2 | 7/2008 | Fogg | |
| 7,518,511 B1 | 4/2009 | Panja | |
| 7,521,890 B2 | 4/2009 | Lee | |
| 7,551,137 B2 | 6/2009 | Gagnon | |
| 7,633,378 B2 | 12/2009 | Rodgers | |
| 7,940,224 B2 | 5/2011 | Kato | |
| 8,242,907 B2 | 8/2012 | Butler | |
| 8,457,757 B2 | 6/2013 | Cauller | |
| 8,459,541 B2 | 6/2013 | Yoo | |
| 8,668,139 B2 | 3/2014 | Yoo | |
| 9,087,281 B2 | 7/2015 | Maguire | |
| 9,396,447 B2 | 7/2016 | Dalley, Jr. | |
| 9,436,923 B1 | 9/2016 | Sriram | |
| 9,542,823 B1* | 1/2017 | Russell | G08B 13/2402 |
| 9,680,533 B2 | 6/2017 | Gudan | |
| 9,740,895 B1 | 8/2017 | Liu | |
| 9,767,230 B2 | 9/2017 | Kimchi | |
| 9,934,657 B2* | 4/2018 | Tkachenko | G07F 9/026 |
| 10,127,486 B2 | 11/2018 | Glaser | |
| 10,128,857 B1 | 11/2018 | Elkholy | |
| 10,158,401 B2 | 12/2018 | Hull | |
| 10,681,133 B2 | 6/2020 | Puleston | |
| 10,805,130 B2 | 10/2020 | Shakedd | |
| 2002/0008633 A1 | 1/2002 | Heller | |
| 2002/0017979 A1 | 2/2002 | Krause | |
| 2002/0019761 A1 | 2/2002 | Lidow | |
| 2002/0190845 A1* | 12/2002 | Moore | G08B 13/2462 340/10.3 |
| 2003/0104848 A1 | 6/2003 | Brideglall | |
| 2003/0151511 A1* | 8/2003 | Duncan | G01S 5/0027 340/572.1 |
| 2004/0078662 A1 | 4/2004 | Hamel | |
| 2004/0100359 A1* | 5/2004 | Reade | H04K 3/65 340/5.2 |
| 2004/0100380 A1* | 5/2004 | Lindsay | G06K 19/0717 340/540 |
| 2004/0103033 A1* | 5/2004 | Reade | G07G 1/0045 705/16 |
| 2004/0103043 A1* | 5/2004 | Reade | G06Q 30/0623 705/23 |
| 2004/0155755 A1 | 8/2004 | Bui | |
| 2004/0188531 A1 | 9/2004 | Gengel | |
| 2004/0242201 A1 | 12/2004 | Sasakura | |
| 2004/0266481 A1* | 12/2004 | Patel | G01S 5/12 455/558 |
| 2005/0017602 A1 | 1/2005 | Arms | |
| 2005/0040961 A1 | 2/2005 | Tuttle | |
| 2005/0052281 A1 | 3/2005 | Bann | |
| 2005/0110641 A1* | 5/2005 | Mendolia | G06K 7/10079 340/572.7 |
| 2005/0110674 A1* | 5/2005 | Mendolia | G01S 5/12 342/81 |
| 2005/0113138 A1* | 5/2005 | Mendolia | G01S 5/04 455/558 |
| 2005/0159187 A1* | 7/2005 | Mendolia | G06K 7/10079 455/562.1 |
| 2005/0179551 A1 | 8/2005 | Lian | |
| 2005/0207848 A1 | 9/2005 | Kunerth | |
| 2005/0253686 A1 | 11/2005 | Shafer | |
| 2005/0263591 A1 | 12/2005 | Smith | |
| 2006/0028392 A1* | 2/2006 | Coveley | G07F 9/026 343/893 |
| 2006/0038658 A1 | 2/2006 | Jarvis | |
| 2006/0049947 A1 | 3/2006 | Forster | |
| 2006/0109109 A1 | 5/2006 | Rajapakse | |
| 2006/0114109 A1 | 6/2006 | Geissler | |
| 2006/0145814 A1 | 7/2006 | Son | |
| 2006/0158316 A1 | 7/2006 | Eckstein | |
| 2006/0229113 A1* | 10/2006 | Rowse | H04B 5/0056 455/574 |
| 2006/0230232 A1* | 10/2006 | Yokomizo | G06F 16/252 711/118 |
| 2006/0255917 A1 | 11/2006 | Park | |
| 2006/0276206 A1 | 12/2006 | Shiatsu | |
| 2007/0001812 A1 | 1/2007 | Powell | |

(56) References Cited

U.S. PATENT DOCUMENTS

| | | |
|---|---|---|
| 2007/0024423 A1 | 2/2007 | Nikitin |
| 2007/0046470 A1 | 3/2007 | Pempsell |
| 2007/0090185 A1 | 4/2007 | Lewkowitz |
| 2007/0103303 A1 | 5/2007 | Shoarinejad |
| 2007/0159338 A1 | 7/2007 | Beber |
| 2007/0179978 A1 | 8/2007 | Lee |
| 2007/0188342 A1 | 8/2007 | Valeriano |
| 2007/0229268 A1 | 10/2007 | Swan |
| 2008/0048863 A1* | 2/2008 | Copeland ............ G08B 13/2431 340/572.1 |
| 2008/0048867 A1* | 2/2008 | Oliver ..................... H01Q 7/00 340/572.7 |
| 2008/0100423 A1 | 5/2008 | Geissler |
| 2008/0100446 A1 | 5/2008 | Shintani |
| 2008/0122584 A1 | 5/2008 | Ltasaki |
| 2008/0143482 A1 | 6/2008 | Shoarinejad |
| 2008/0169909 A1 | 7/2008 | Park |
| 2008/0237339 A1 | 10/2008 | Stawar |
| 2008/0284600 A1 | 11/2008 | Drzaic |
| 2008/0297324 A1 | 12/2008 | Tuttle |
| 2008/0309490 A1* | 12/2008 | Honkanen ............ G06K 7/0008 340/572.1 |
| 2008/0311861 A1 | 12/2008 | Lepek |
| 2009/0058614 A1 | 3/2009 | Roz |
| 2009/0085745 A1 | 4/2009 | Gupta |
| 2009/0085746 A1 | 4/2009 | Erickson |
| 2009/0115578 A1 | 5/2009 | Geissler |
| 2009/0117872 A1 | 5/2009 | Jorgenson |
| 2009/0121828 A1 | 5/2009 | Suzuki |
| 2009/0146791 A1* | 6/2009 | Jantunen ............. H04B 5/0062 340/10.2 |
| 2009/0146816 A1* | 6/2009 | Patel ..................... H01Q 1/42 340/572.1 |
| 2009/0189739 A1 | 7/2009 | Wang |
| 2009/0192647 A1 | 7/2009 | Nishiyama |
| 2009/0251286 A1* | 10/2009 | Black ..................... H04Q 9/00 340/10.1 |
| 2009/0256680 A1 | 10/2009 | Kilian |
| 2009/0295543 A1 | 12/2009 | Kita |
| 2010/0019035 A1 | 1/2010 | Larson |
| 2010/0026467 A1 | 2/2010 | Van Eeden |
| 2010/0052865 A1 | 3/2010 | Eckstein |
| 2010/0059595 A1 | 3/2010 | Longfu |
| 2010/0121862 A1 | 5/2010 | Twitchell, Jr. |
| 2010/0250305 A1 | 9/2010 | Lee |
| 2010/0271187 A1* | 10/2010 | Uysal ................ G06K 7/10009 340/10.4 |
| 2011/0029997 A1* | 2/2011 | Wolinsky ........... G06Q 30/0201 725/12 |
| 2011/0181392 A1* | 7/2011 | Cha ..................... G06K 7/0008 340/8.1 |
| 2011/0223874 A1 | 9/2011 | Callaway, Jr. |
| 2011/0285511 A1 | 11/2011 | Maguire |
| 2012/0126945 A1* | 5/2012 | Kim ................... G06K 7/10188 340/10.1 |
| 2012/0161931 A1* | 6/2012 | Karmakar ........ G06K 19/07749 340/10.1 |
| 2012/0217307 A1 | 8/2012 | Martin |
| 2012/0286930 A1* | 11/2012 | Kim ................... G06Q 20/3278 340/5.82 |
| 2013/0105584 A1 | 5/2013 | Forster |
| 2013/0194100 A1 | 8/2013 | Granhed |
| 2013/0231760 A1* | 9/2013 | Rosen ................... A63F 13/816 700/91 |
| 2014/0097254 A1 | 4/2014 | Downie |
| 2014/0111338 A1* | 4/2014 | Bergman ........... G08B 13/2488 340/572.7 |
| 2014/0266727 A1* | 9/2014 | Padula .............. G08B 13/2431 340/572.1 |
| 2014/0279204 A1 | 9/2014 | Roketenetz |
| 2015/0048682 A1 | 2/2015 | Murley |
| 2015/0097716 A1* | 4/2015 | Wisherd ................ G01S 13/878 342/146 |
| 2015/0145680 A1 | 5/2015 | Favier |
| 2015/0186692 A1* | 7/2015 | Stengel ............. G06K 7/10009 340/10.1 |
| 2015/0307245 A1 | 10/2015 | Puccini |
| 2016/0019766 A1* | 1/2016 | Padula .............. G08B 13/2468 340/572.1 |
| 2016/0026837 A1 | 1/2016 | Good |
| 2016/0035197 A1* | 2/2016 | Soto .................... G08B 13/2451 340/572.1 |
| 2016/0049030 A1* | 2/2016 | G ......................... G07C 9/00571 340/5.61 |
| 2016/0049058 A1* | 2/2016 | Allen .................. G08B 13/2468 340/572.4 |
| 2016/0050530 A1 | 2/2016 | Corbalis |
| 2016/0055730 A1* | 2/2016 | Bergman ............. G08B 29/185 340/568.1 |
| 2016/0064946 A1 | 3/2016 | Cho |
| 2016/0098730 A1 | 4/2016 | Feeney |
| 2016/0098907 A1* | 4/2016 | Noone ............... G08B 13/2451 340/551 |
| 2016/0132532 A1* | 5/2016 | German ............... H04N 5/2251 382/103 |
| 2016/0148150 A1 | 5/2016 | Curtat |
| 2016/0180126 A1* | 6/2016 | Saleem .................. H04N 7/185 348/144 |
| 2016/0210483 A1 | 7/2016 | Glaser |
| 2016/0307013 A1* | 10/2016 | Dagdelen Uysal .. G06Q 10/087 |
| 2017/0067983 A1 | 3/2017 | Teicher |
| 2017/0075346 A1 | 3/2017 | Oya |
| 2017/0078851 A1 | 3/2017 | Agrawal |
| 2017/0131222 A1 | 5/2017 | Zalbide Agirrezabalaga |
| 2017/0140330 A1 | 5/2017 | Rinzler |
| 2017/0208545 A1 | 7/2017 | Siann |
| 2017/0228566 A1 | 8/2017 | Sengstaken, Jr. |
| 2017/0330066 A1* | 11/2017 | Gibson ............. G06K 19/0672 |
| 2018/0089475 A1* | 3/2018 | Hattori ............. G06K 19/0723 |
| 2018/0096566 A1 | 4/2018 | Blair, II |
| 2018/0254640 A1 | 9/2018 | Jung |
| 2018/0300671 A1 | 10/2018 | Richardson |
| 2019/0005283 A1 | 1/2019 | Nikitin |
| 2019/0102586 A1* | 4/2019 | Miller ................ G08B 13/2474 |
| 2019/0120471 A1 | 4/2019 | Witty |
| 2019/0165826 A1 | 5/2019 | Goto |
| 2019/0188545 A1 | 6/2019 | Locke |
| 2019/0325503 A1 | 10/2019 | Fein |
| 2020/0004995 A1 | 1/2020 | Kawaguchi |
| 2020/0057885 A1* | 2/2020 | Rao ..................... G06K 9/00771 |
| 2020/0090481 A1* | 3/2020 | Huang .............. G08B 13/2482 |
| 2020/0096599 A1 | 3/2020 | Hewett |
| 2020/0200892 A1* | 6/2020 | Rajab ..................... G01S 7/42 |
| 2020/0226900 A1 | 7/2020 | Ho |
| 2020/0227813 A1 | 7/2020 | Yehezkely |
| 2020/0250958 A1 | 8/2020 | Wilson |
| 2020/0327782 A1 | 10/2020 | Wong |
| 2021/0027608 A1* | 1/2021 | Shakedd ............ G06K 7/10425 |

FOREIGN PATENT DOCUMENTS

| | | |
|---|---|---|
| GB | 2396781 A | 6/2004 |
| JP | 2004-500760 A | 1/2004 |
| JP | 2018-124767 A | 8/2018 |

* cited by examiner

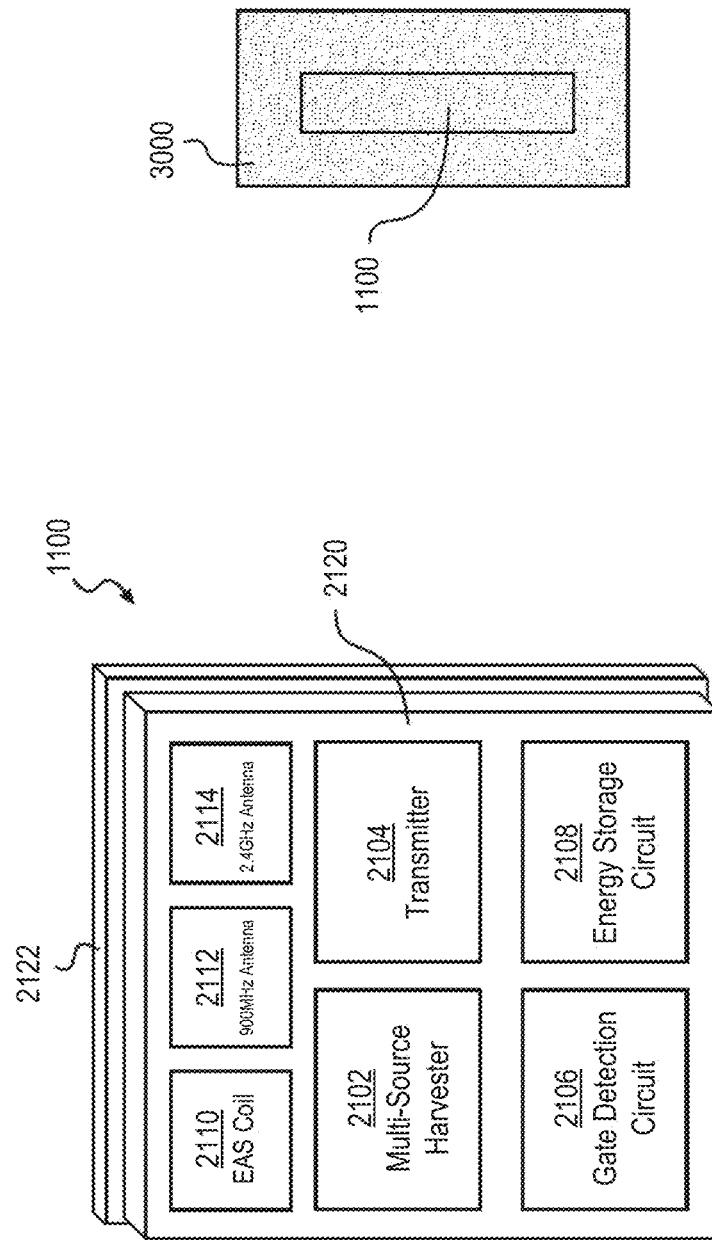

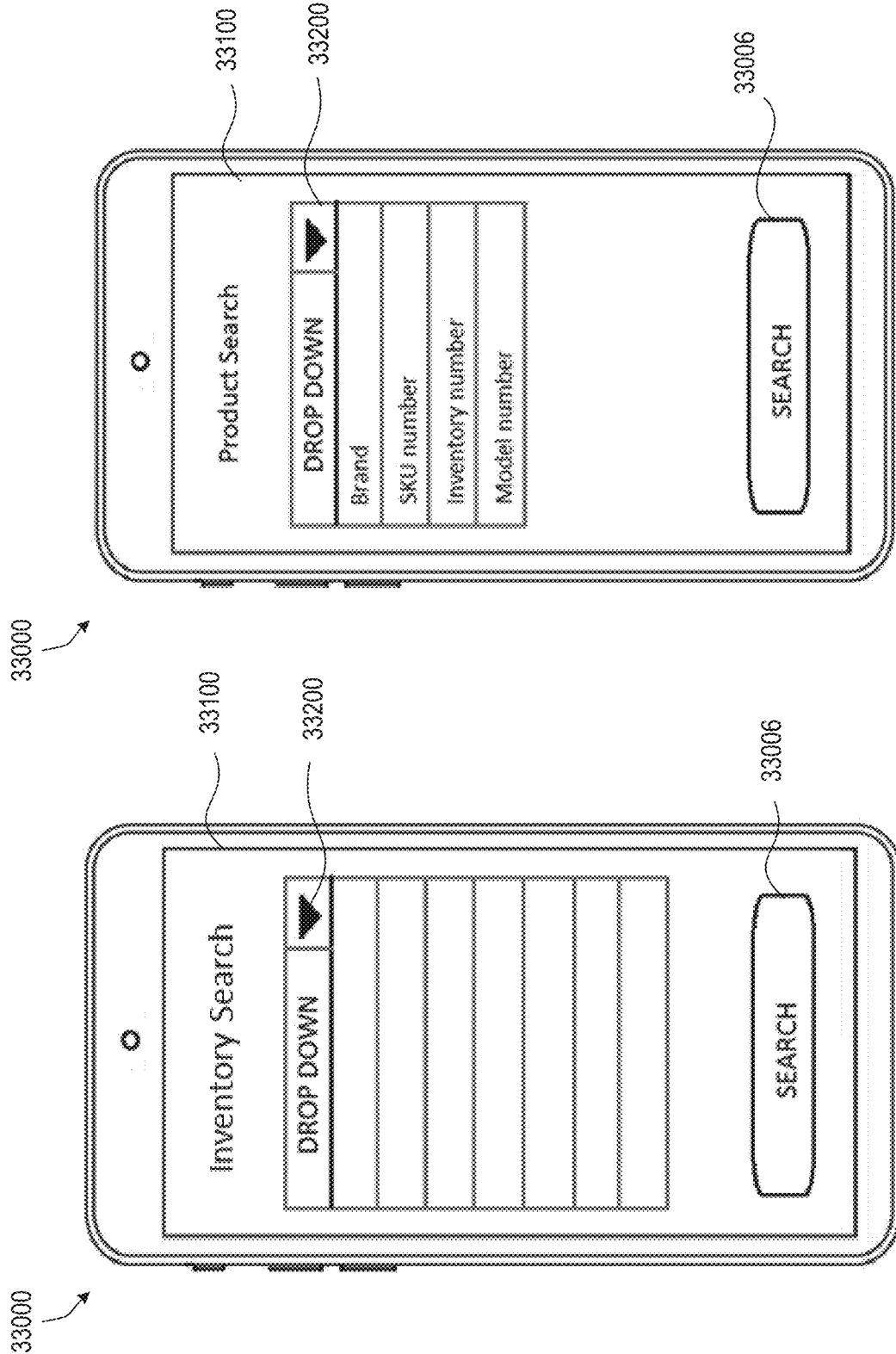

APPLIANCES WITH INTEGRATED COMMUNICATION TAGS

CROSS-REFERENCE TO RELATED APPLICATION

This application is a continuation of International Application No. PCT/IB2020/000254, filed Apr. 10, 2020, which claims the benefit of priority of U.S. Provisional Patent Application No. 62/832,397, filed Apr. 11, 2019, both of which are hereby incorporated by reference in their entirety.

TECHNICAL FIELD

The disclosed embodiments generally relate to systems and methods for wireless identification tags for association with products.

BACKGROUND

The ability to transfer data over a network provides many opportunities to enable various electronic devices to connect with other devices and networks, to perform increasingly autonomous operations, and to provide interactive experiences for users. However, conventional systems and methods for providing digital communication may use a certain amount of hardware, energy consumption, costs, and other technical limitations that may prevent them from being implemented with respect to certain products, systems, and industries. Further, there are a multitude of security and privacy concerns related to the transfer of data that may render the implementation of such technologies impractical with respect to certain fields.

Therefore, there is a need for cost-efficient and unconventional approaches that efficiently, effectively, and safely enable the digital self-representation of a wide range of products as well and/or the management such products.

SUMMARY

Embodiments consistent with the present disclosure provide systems and methods generally relating to wireless identification tags for association with products. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer readable storage media may store program instructions, which are executable by at least one processing device and perform any of the steps and/or methods described herein.

Consistent with disclosed embodiments, systems, methods, and computer readable media relating to a wireless identification tag for association with a product to enable product self-identification are disclosed. The embodiments may include a tag including at least one antenna tuned to receive energy transmitted at a first frequency within a frequency band around 900 MHz and at a second frequency within a frequency band around 2.4 GHz. Some embodiments may further include at least one transmitter, configured to send at least one identification signal, and at least one circuit configured to detect whether energy is received in the first frequency or the second frequency, and to cause the at least one transmitter to operate in a first mode to send a first form of identification signal when the first frequency is detected, and to operate in a second mode to cause the at least one transmitter to send a second form of identification signal when the second frequency is detected.

Consistent with disclosed embodiments, systems, methods, and computer readable media for a wireless identification tag with a response time that varies as a function of incoming signal frequency are disclosed. Some embodiments may include a wireless identification tag including at least one antenna tuned to receive energy transmitted at a first frequency within a frequency band around 900 MHz and at a second frequency within a frequency band around 2.4 GHz; at least one transmitter; and at least one circuit. The at least one circuit may be configured to detect whether energy is received in the first frequency or the second frequency, and cause the at least one transmitter to transmit an immediate response when the second frequency is detected, and to transmit a delayed response, having a longer delay compared to the immediate response, when the first frequency is detected.

Consistent with disclosed embodiments, systems, methods, and computer readable media relating to a wireless identification tag triggerable by an EAS gate while remaining invisible to the EAS gate are disclosed. The embodiments may include a tag having at least one antenna tuned to receive energy transmitted in at least one of a first EAS gate frequency range of about 7-13 MHz or a second EAS gate frequency range of about 58-60 kHz, and configured to be non-detectable by the EAS gate. Some embodiments may further include at least one transmitter configured to send at least one identification signal, and at least one energy storage component, electrically connected to the at least one transmitter, for powering the at least one transmitter. Embodiments may further include at least one circuit connected to the at least one antenna and configured to detect energy transmitted from the EAS gate in at least one of the first EAS gate frequency range or the second EAS gate frequency range, and in response to detecting the energy transmitted from the EAS gate, cause the at least one transmitter to transmit to a receiver other than the EAS gate, the at least one identification signal transmitted in a frequency outside the first EAS gate frequency range and the second EAS gate frequency range.

Consistent with disclosed embodiments, systems, methods, and computer readable media for a wireless identification tag configured to harvest ambient energy and transmit an identification signal intermittently are disclosed. The embodiments may include at least one antenna configured to receive ambient energy, at least one energy storage component, electrically connected to the at least one antenna, configured to aggregate and store the received ambient energy, at least one transmitter electrically connected to the at least one energy storage component, configured to transmit the identification signal, and at least one circuit connected to the at least one transmitter and configured to implement an identification transmission rule, to cause the transmitter to delay sending the identification signal even when sufficient energy for the identification signal is aggregated and stored in the energy storage component.

Consistent with disclosed embodiments, systems, methods, and computer readable media for a wireless identification tag configured to harvest ambient energy and transmit an identification signal intermittently are disclosed. The embodiments may include at least one transmitter, configured to transmit a first signal to a first receiver in a first frequency and to transmit a second signal to a second receiver in the first frequency. Embodiments may further include at least one energy storage component, electrically connected to the at least one transmitter, for collecting and storing ambient energy and for powering transmission of the at least one transmitter. At least one circuit may be connected to the at least one transmitter and to the at least one energy storage component, for monitoring energy stored in the energy storage component, and to prevent the at least one transmitter from transmitting the first signal to the first receiver in the first frequency when the energy stored in the energy storage component is insufficient to transmit the second signal to the second receiver in the first frequency.

Consistent with disclosed embodiments, systems, methods, and computer readable media relating to a wireless identification fraud avoidance system are disclosed. The embodiments may include a system having at least one transmitter configured to transmit a first signal in a first frequency band to a plurality of identification tags, and to thereby cause the plurality of identification tags to transmit second signal in a second frequency band, the second signal indicating whether the first signal was received in the first frequency band. Some embodiments may further include a first receiver configured for location proximate the at least one transmitter to receive transmissions of the second signal from the plurality of identification tags, a second receiver configured to receive a third signal from a tag outside a transmission range of the at least one transmitter, wherein the second receiver is located further from the at least one transmitter than the first receiver, and at least one processor configured to generate a potential fraud alert when the second receiver receives the third signal.

Consistent with disclosed embodiments, systems, methods, and computer readable media relating to a fraud avoidance system for use with a wirelessly tagged inventory are disclosed. The embodiments may include a system having at least one processor configured to detect a signal associated with a transmission in an EAS gate frequency, identify the signal as emanating from a location that does not correspond to an EAS gate location; based on the identified emanation location of the signal, determine that a suspected fraudulent event is in progress; and generate an alert of the suspected fraudulent event.

Consistent with disclosed embodiments, systems, methods, and computer readable media for a wireless identification tag with varying ID transmission timing are disclosed. The tag may include at least one transmitter; at least one energy storage component, electrically connected to the at least one transmitter and configured to collect and store ambient energy to power transmissions. The tag may additionally include at least one circuit configured to cause the transmitter to transmit a sequence of identification signals in non-uniform intervals such that times between identification signal transmission of three consecutive transmissions vary.

Consistent with disclosed embodiments, systems, methods, and computer readable media relating to a wireless identification tag with varying identity are disclosed. A wireless identification tag with varying identity may include at least one transmitter configured to transmit a tag ID. The tag may further include at least one circuit configured to receive a first trigger at a first time, and in response to the first trigger, generate in a quasi-random manner a first decipherable ID uniquely identifying the tag, and cause the at least one transmitter to transmit the first decipherable ID. Additionally, the circuitry may be configured to receive a second trigger at a second time after the first time, and in response to the second trigger, generate in a quasi-random manner a second decipherable ID different from the first decipherable ID and uniquely identifying the tag, and cause the at least one transmitter to transmit the second decipherable ID.

Consistent with disclosed embodiments, systems, methods, and computer readable media relating to providing privacy to downstream owners of electronically tagged goods are disclosed. The embodiments may include at least one processor configured to store IDs for a plurality of tags including at least a first owner ID and a second owner ID for a particular tag. At a time when the first owner of the particular tag is recorded as owning the tag, embodiments may associate first information of the particular tag with the first owner ID. Then, a transaction may be recorded transferring ownership of the particular tag from the first owner to a second owner. After the transfer of ownership, second information of the particular tag may be associated with the second owner ID, and the first owner may be prevented from accessing the second information.

Consistent with disclosed embodiments, systems, methods, and computer readable media relating to simultaneous triggering and sequential reading of a plurality of tags are disclosed. The embodiments may include a non-transitory computer readable medium containing instructions for causing a 2.4 GHz device to simultaneously trigger and sequentially read a plurality of tags. The instructions may include displaying an activatable element on a graphical user interface, the element being configured to activate a 2.4 GHz transmitter. Upon activation of the element, the 2.4 GHz transmitter may be caused to emit one or more signals for causing each of a plurality of tags in a vicinity of the transmitter to send a unique tag ID to a receiver associated with the transmitter. The instructions may further include reading a first group of the plurality of unique tag IDs during a first time interval, wherein the first group excludes a second group of the plurality of unique tag IDs. First information associated with the first group may be read, after which, activation of the 2.4 GHz transmitter may be maintained or may otherwise continue during a second time interval, to cause transmission of at least some of the unique tag IDs of the first group along with the unique tag IDs of the second group. After a receiver reads at least some of the unique tag IDs of the first group along with the unique tag IDs of the second group, information associated with the second group may be recorded.

Consistent with disclosed embodiments, systems, methods, and computer readable media relating to an appliance for holding electronically tagged products and for recording an association between the tagged products and the appliance are disclosed. The appliance may include a housing defining a cavity for retaining the electronically tagged products and an exciter, integrated with the housing, the exciter being configured to trigger tags of the electronically tagged products for the tag of each product to transmit a unique tag ID. The appliance may also include a receiver for receiving transmission of each unique tag ID and a communicator for outputting indications of identities of electronically tagged products retained in the cavity.

Consistent with disclosed embodiments, systems, methods, and computer readable media for a wireless identification tag configured to collect and store ambient energy for use in delayed transmission are disclosed. The tag may include a receiver for receiving ambient energy; a first capacitor for storing the ambient energy; a second capacitor for collecting and storing the ambient energy, the second capacitor having lower capacitance than the first capacitor; and an inductor interconnecting the first capacitor and the second capacitor. The tag may additionally include circuitry interconnecting the receiver, the first capacitor, and the second capacitor in a manner such that ambient energy received by the receiver is initially stored in the second capacitor, and is subsequently transferred to and stored in the first capacitor. The tag may additionally include at least one transmitter electrically connected to first capacitor, to enable the energy stored in the first capacitor to power the at least one transmitter.

Consistent with disclosed embodiments, systems, methods, and computer readable media for providing access to information associated with electronically tagged goods are disclosed. The embodiments may include at least one processor configured to store tag IDs of a plurality of tags and receive a pairing between at least one particular tag ID and a product ID. The embodiments may further receive a pairing between the at least one particular tag ID and at least one authorized entity associated with the at least one particular tag ID. An authorized entity may be associated with at least one of a current owner of a product, a manufacturer of the product, or a user of the product. The at least one processor may further be configured to receive, from a requester, a query to identify at least one of the product ID, the information associated with the at least one particular tag ID, the information associated with the product ID, or the at least one authorized entity, the query including an encrypted tag ID of the particular tag and to decrypt the encrypted tag ID to thereby look up the decrypted tag ID of the particular tag. Embodiments may fulfill the query if the requester is the at least one authorized entity associated with the decrypted tag ID. Otherwise, the query may be denied.

Consistent with disclosed embodiments, systems, methods, and computer readable media relating to protection against distribution of counterfeit products are disclosed. The embodiments may include a system having at least one processor configured to store tag IDs of a plurality of electronic tags, wherein at least one specific electronic tag is associated with a specific product. The system may store at least one identity of a first entity, the first entity being associated with at least one of a seller of the specific product, a manufacturer of the specific product, a current owner of the specific product, or a prior owner of the specific product. On behalf of a prospective subsequent custodian of the specific product, the processor may receive an encrypted tag ID associated with the specific product, and a query associated with the at least one identity. The processor may then decrypt the encrypted tag ID to identify the specific product associated with the specific electronic tag, and use information associated with the specific electronic tag to access an ownership history for the specific product. The processor may further check if the at least one identity identified in the query corresponds to an entity in the ownership history, and cause one of: a transmission of an authenticity indication to the prospective subsequent custodian if the at least one identity identified in the query corresponds to an entity in the ownership history, or a transmission of a non-authentic indication to the prospective subsequent custodian if the at least one identity identified in the query does not correspond to an entity in the ownership history.

Consistent with disclosed embodiments, systems, methods, and computer readable media relating to detecting misplaced items in an establishment are disclosed. The embodiments may include at least one processor configured to receive, from at least one reader in the establishment, identification signals of identification tags read by the at least one reader; determine current locations of the identification tags based on the received identification signals; record in at least one data structure the current locations of the identification tags; access in the at least one data structure a designated location in the establishment for each of the identification tags; determine, by comparing the current locations of the identification tags with the designated locations of the identification tags, a particular identification tag with a current location that differs from the designated location of the particular identification tag; and generate a notification signal when the current location of the particular identification tag does not match the designated location of the particular identification tag.

Consistent with disclosed embodiments, systems, methods, and computer readable media relating to reporting a location of items in an establishment are disclosed. Disclosed embodiments include at least one processor configured to receive, from at least one reader in the establishment, identification signals of identification tags read by the at least one reader; determine current locations of the identification tags based on the received identification signals; record in at least one data structure the current locations of the identification tags; receive a query for a location of a particular item in the establishment; identify the location of the particular item based on an association between the particular item and a particular identification tag and the current location of the particular identification tag; and display, on a graphical user interface, the location of the particular item to a user.

The forgoing summary provides certain examples of disclosed embodiments to provide a flavor for this disclosure and is not intended to summarize all aspects of the disclosed embodiments. Additional features and advantages of the disclosed embodiments will be set forth in part in the description that follows, and in part will be apparent from the description, or may be learned by practice of the disclosed embodiments. The features and advantages of the disclosed embodiments will be realized and attained by the elements and combinations particularly pointed out in the appended claims.

It is to be understood that both the foregoing general description and the following detailed description are examples and explanatory only and are not restrictive of the disclosed embodiments as claimed.

The accompanying drawings constitute a part of this specification. The drawings illustrate several embodiments of the present disclosure and, together with the description, serve to explain the principles of the disclosed embodiments as set forth in the accompanying claims.

BRIEF DESCRIPTION OF THE DRAWINGS

The accompanying drawings, which are incorporated in and constitute a part of this disclosure, illustrate various disclosed embodiments. In the drawings:

FIG. 2 is a block diagram of an exemplary wireless identification tag of the system of FIG. 1, consistent with disclosed embodiments.

FIG. 3 depicts the exemplary wireless identification tag of FIG. 2 encapsulated within a fabric pocket, consistent with disclosed embodiments.

FIG. 33A illustrates a handheld device displaying an inventory search graphical user interface, consistent with disclosed embodiments.

FIG. 33B illustrates a handheld device displaying a product graphical user interface, consistent with disclosed embodiments.

DETAILED DESCRIPTION

Figure 1:
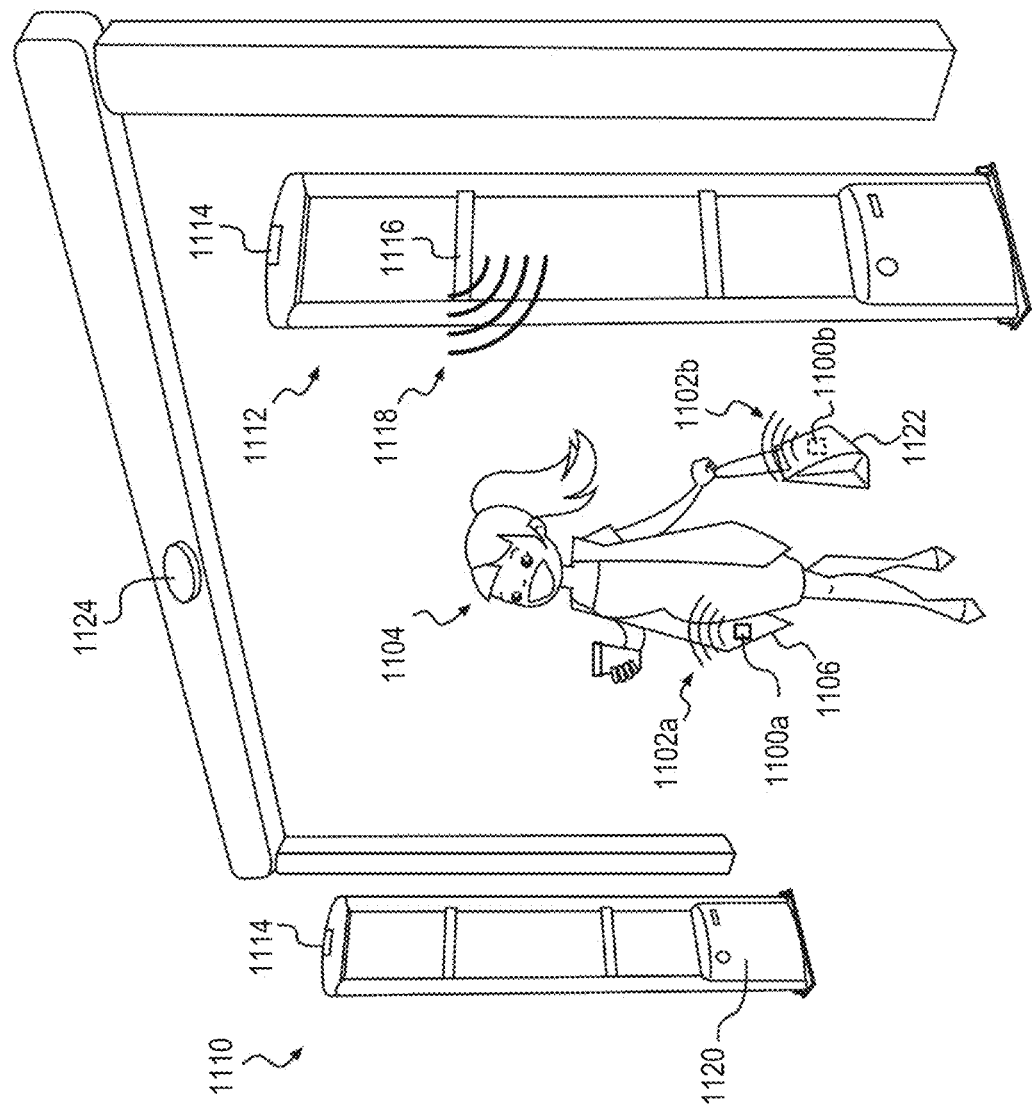
FIG. 1 is a perspective view of an exemplary wireless identification system including gates, a wireless identification tag incorporated into an item worn by a user, and a wireless identification tag incorporated into an item held by the user, consistent with disclosed embodiments.

Exemplary embodiments are described with reference to the accompanying drawings. In the figures, which are not necessarily drawn to scale, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used in the present disclosure and in the appended claims, the singular forms "a," "an," and "the" include plural references unless the context clearly dictates otherwise.

Unless specifically stated otherwise, as apparent from the following description, throughout the specification discussions utilizing terms such as "processing," "calculating," "computing," "determining," "generating," "setting," "configuring," "selecting," "defining," "applying," "obtaining," "monitoring," "providing," "identifying," "segmenting," "classifying," "analyzing," "associating." "extracting," "storing," "receiving," "transmitting," or the like, include actions and/or processes of a computer that manipulate and/or transform data into other data, the data represented as physical quantities, for example such as electronic quantities, and/or the data representing physical objects. The terms "computer," "processor," "controller," "processing unit," "computing unit," and "processing module" should be expansively construed to cover any kind of electronic device, component or unit with data processing capabilities, including, by way of non-limiting example, a personal computer, a wearable computer, smart glasses, a tablet, a smartphone, a server, a computing system, a cloud computing platform, a communication device, a processor (for example, digital signal processor (DSP), an image signal processor (ISR), a microcontroller, a field programmable gate array (FPGA), an application specific integrated circuit (ASIC), a central processing unit (CPA), a graphics processing unit (GPU), a visual processing unit (VPU), and so on), possibly with embedded memory, a single core processor, a multi core processor, a core within a processor, any other electronic computing device, or any combination of the above.

The operations in accordance with the teachings herein may be performed by a computer specially constructed or programmed to perform the described functions.

As used herein, the phrase "for example," "such as", "for instance" and variants thereof describe non-limiting embodiments of the presently disclosed subject matter. Reference in the specification to features of "embodiments," "one case," "some cases," "other cases" or variants thereof means that a particular feature, structure or characteristic described may be included in at least one embodiment of the presently disclosed subject matter. Thus the appearance of such terms does not necessarily refer to the same embodiment(s). As used herein, the term "and/or" includes any and all combinations of one or more of the associated listed items.

Features of the presently disclosed subject matter, are, for brevity, described in the context of particular embodiments. However, it is to be understood that features described in connection with one embodiment are also applicable to other embodiments. Likewise, features described in the context of a specific combination may be considered separate embodiments, either alone or in a context other than the specific combination.

In embodiments of the presently disclosed subject matter, one or more stages illustrated in the figures may be executed in a different order and/or one or more groups of stages may be executed simultaneously and vice versa. The figures illustrate a general schematic of the system architecture in accordance embodiments of the presently disclosed subject matter. Each module in the figures can be made up of any combination of software, hardware and/or firmware that performs the functions as defined and explained herein. The modules in the figures may be centralized in one location or dispersed over more than one location.

Examples of the presently disclosed subject matter are not limited in application to the details of construction and the arrangement of the components set forth in the following description or illustrated in the drawings. The subject matter may be practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing may have the same use and description as in the previous drawings.

The drawings in this document may not be to any scale. Different figures may use different scales and different scales can be used even within the same drawing, for example different scales for different views of the same object or different scales for the two adjacent objects.

Consistent with disclosed embodiments, "at least one processor" may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Disclosed embodiments may include and/or access a data structure. A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

Exemplary embodiments generally relate to wireless communication tags configured to be embedded within, attached to, or otherwise associated with physical items in order to digitally represent each item on an exemplary digital platform. In some embodiments, an exemplary tag may be configured to harvest ambient energy and to use the harvested energy to send an identification signal to a receiver. The identification signal may include various types of data, including product, location, history, status, ownership, and/or characteristic data. Such data may be conveyed to a receiver associated with various types of platforms, depending on intended use. The platform may be, for example, a software program, running on one or more servers, for accomplishing one or more types of product tracking and/or authentication. Examples of platforms with which disclosed embodiments may be employed include, but are not limited to, inventory management systems in business establishments such as stores and warehouses; kitchen management systems, for tracking supplies and/or tools; appliance management systems for tracking tagged materials used within or in connection with appliances; manufacturing systems for tracking components used during the manufacture of products; transportation and distribution systems for tracking parcels and other deliverables through transit and delivery; other supply chain management; wardrobe management systems for tracking clothing items stored in wardrobes and closets; clothing laundering systems for tracking the cleaning of clothing items and/or receipt of clothing to be laundered and the return of clothing to either a customer or a designated location such as a closet or wardrobe; food delivery systems; systems for managing ownership of goods transferred to differing owners; systems for authenticating goods to prevent counterfeiting; vehicle tracking systems; systems for tracking materials and or persons in vehicles and/or in public and private domains; waste management systems; and all other systems where it may be beneficial to track and/or authenticate people, animals, or objects.

In some embodiments, the exemplary tag may be configured to harvest energy without a designated battery and to operate, in both an active transmission state and an idle state, while consuming minimum amounts of power. Advantageously, the configuration of the exemplary tag may enable radio performance comparable to commercial battery-powered devices, at a power envelope comparable to a passive RFID device.

FIG. 1 illustrates a non-limiting embodiment of exemplary wireless tags 1100a and 1100b in an environment of a security gate, such as an Electronic Article Surveillance (EAS) gate 1110, 1112. In some embodiments, one or both of tags 1100a and 1100b may be wireless identification tags. Tag 1100a may be embedded, sewn, clipped, attached, or otherwise incorporated into an object, such as clothing item 1106. Tag 1100b may be attached to, or otherwise incorporated with, an item purchased or otherwise procured by user 1104 and held within bag 1122. Tags 1100a and 1100b may be configured to receive wireless signals, such as signal 1118. Signal 1118 may be produced by an external system or device, such as EAS transmitter 1116, which may form a part of EAS gate 1110, 1112. In some embodiments, one or both of tags 1100a and 1100b may be configured to receive gate signal 1118 and, in response, to generate and output a signal having a frequency different from the frequency of gate signal 1118. For example, tag 1100a may output signal 1102a upon receiving gate signal 1118, and tag 1000b may output signal 1102b upon receiving gate signal 1118. In some embodiments, one or both of signals 1102a and 1102b may have a frequency within a frequency band around 2.4 GHz such that signals 1102a and 1102b are not detected by EAS sensor 1120 and therefore do not trigger alarm 1114 of EAS gate 1110, 1112.

In some embodiments, the exemplary system of FIG. 1 may include at least one receiver/exciter device 1124 configured to receive broadcasts of signals from a plurality of wireless tags (such as signals 1102a and 1102b) and also configured to deliver energy to be collected and stored by the wireless tags in order to power the wireless tags, as discussed in detail below. For example, device 1124 may include a transceiver, a router, a duplexer, or any other device configured to both transmit and receive signals. In some alternative embodiments, such as the exemplary clothing retail establishment depicted in FIG. 11, the system may include a plurality of receivers 11300a-h configured to receive broadcasts of signals from the wireless tags, as well as exciters 11400 configured to deliver energy to be collected and stored by the wireless tags. However, persons of ordinary skill will understand that exemplary systems described herein may include only receiver/exciter devices (such as device 1124), only receiver devices and exciter devices (such as receivers 11300 and exciters 11400), or any desired combination thereof. Additionally, persons of ordinary skill will understand that exemplary exciters and receivers described herein (such as receivers 11300 and exciters 11400) may be implemented as separate devices and/or as combination receiver/exciter devices (such as receiver/exciter device 1124), and vice versa.

In some embodiments, the exemplary wireless tag may include at least one antenna, at least one transmitter, and at least one circuit. The at least one antenna, the at least one transmitter, and the at least one circuit may be provided on a flexible substrate. A substrate may be a structure on or in which components such as the at least one antenna, the at least one transmitter, and the at least one circuit may be disposed. The substrate may be flexible, such that when encountering a force, the substrate may be configured to be deformable in one or more directions. For example, a flexible substrate may be one that allows the components affixed thereto to conform to a desired shape, or to flex during its use. Materials suitable for the flexible substrate may include, but are not limited to, polyester (PET), polyimide (PI), polyethylene naphthalate (PEN), polyetherimide (PEI), polyether ether ketone (PEEK), along with various fluoropolymers (FEP) and copolymers and/or any other substrate capable of at least in part conforming to a desired shape or flexing during use.

FIG. 2 is a block diagram of an exemplary wireless communication tag 1100, which may include an EAS coil 2110, a 900 MHz antenna 2112, a 2.4 GHz antenna 2114, a multi-source harvester 2102, a transmitter 2104, a gate detection circuit 2106, and an energy storage circuit 2108, some or all of which may be formed on a substrate 2120. Substrate 2120 may be flexible such that the tag may function despite flexing or movement that might occur, for example, when the tag is affixed and/or embedded into a piece of clothing, such as the various products illustrated in FIGS. 4-8, which are discussed below.

Various embodiments of the wireless tag may include an adhesive layer for affixation to a product. The wireless tag, in some embodiments, may be affixed, or otherwise disposed on products or packings of products. This affixation may be aided by one or more adhesive layers. Embodiments of adhesive layer may include glue of various types, tape, cement, wax, mucilage, paste, epoxy, sealants, elastomer, and other suitable materials that may promote cohesion between surfaces. By way of example with reference to FIG. 2, tag 1100 may include a substrate 2120 that supports its electronic components and may also include an adhesive layer 2122 that may be positioned on a side of the substrate layer opposite the electronic components, or in cases where the electronic components are encapsulated between two or more layers of the substrate, the adhesive layer may be positioned on either side of the multi-layer substrate. Adhesive layer 2120 may enable the tag to be bound to certain items, such as hanging tag 6100 in FIG. 6 or product 8000 in FIG. 8.

Disclosed embodiments may also include at least one material layer, such as a fabric layer, that at least partially encapsulates the wireless tag, the material layer configured for affixation by sewing. Alternatively, the tag may be connectable to the fabric by bonding or by incorporation into a pocket. The fabric may include any material that can be used in a garment, accessory, or any other object that employs fabric. The fabric may be woven, non-woven, fibrous, or non-fibrous. It may include any suitable material, including but not limited to silk, wool, linen, cotton, rayon, nylon, polyester, or inorganic material and rubber, plastic, manmade or natural, spunbound/spunlace, airlaid, drylaid, wetlaid, vinyl, sheet material or any other layer. In some embodiments, fabric may be flexible or deformable.

Figure 5:
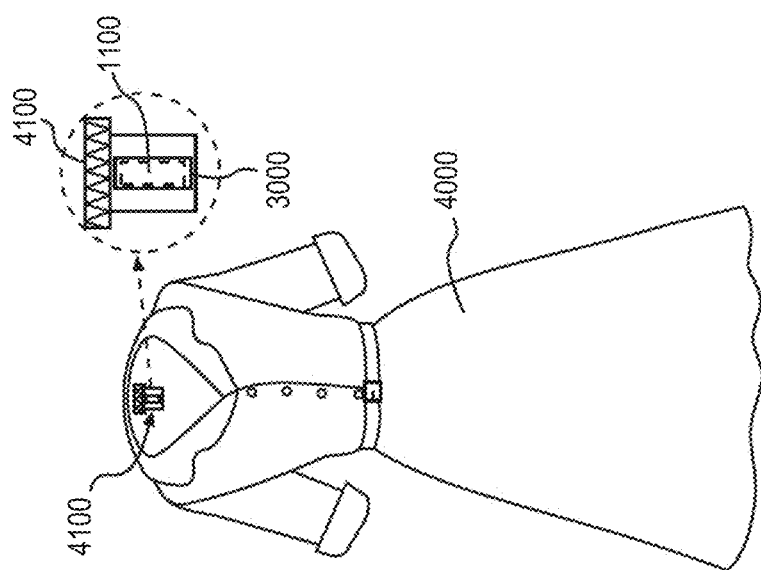
FIG. 5 depicts the exemplary wireless identification tag of FIG. 2 sewn into an item, consistent with disclosed embodiments.

In some embodiments, the wireless tag may be incorporated into layers of the material. The wireless tag may be partially incorporated, where a portion of the wireless tag may be exposed or uncovered. Alternatively, the wireless tag may be completely incorporated, where the wireless tag may be completely surrounded by the fabric. In some embodiments, the wireless tag may be partially or completely incorporated into the fabric by sewing. FIG. 3 illustrates a non-limiting embodiment of an encapsulated wireless tag in fabric. For example, tag 1100, as depicted, is encapsulated in fabric pocket 3000. FIG. 5 further illustrates a placement of fabric pocket 3000, containing tag 1100 on product 5000, such as a garment.

As used herein, partially encapsulating the wireless tag may include positioning at least one material layer around the wireless tag such that the wireless tag is fixed with a certain point or area, relative to the material layer. The material layer may include fabric, other textiles, or any other material that may suitably be affixed to another material through sewing, such as leather, rubber, paper materials, and the like. By way of example, FIG. 3 illustrates tag 1100 encapsulated within fabric pocket 3000. Fabric pocket 3000 may then be sewn into jacket 5000 depicted in FIG. 5 so that the wireless tag becomes affixed to jacket 5000.

Figure 4:
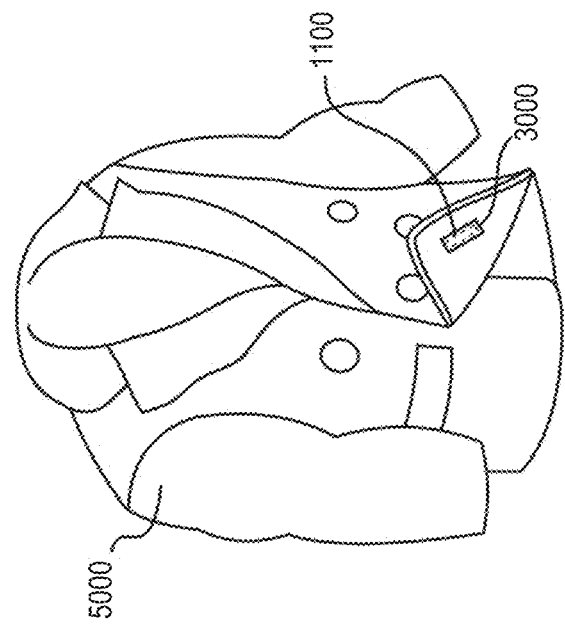
FIG. 4 depicts the exemplary wireless identification tag of FIG. 2 attached to a garment tag, consistent with disclosed embodiments.

FIGS. 4-8 illustrate non-limiting embodiments of products incorporating tags 1100. For example, FIG. 4 depicts a garment, such as a dress 4000 with a garment tag 4100; garment tag 4100 may be a care tag (for example, with instructions for cleaning dress 4000) and/or a tag specifying the size and brand of the dress 4000. In the example of FIG. 4, tag 1100 may be sewn or otherwise affixed to the garment tag 4100. For example, tag 1100 may be encapsulated within fabric pocket 3000, which may be sewn to the garment tag 4100.

Figure 8:
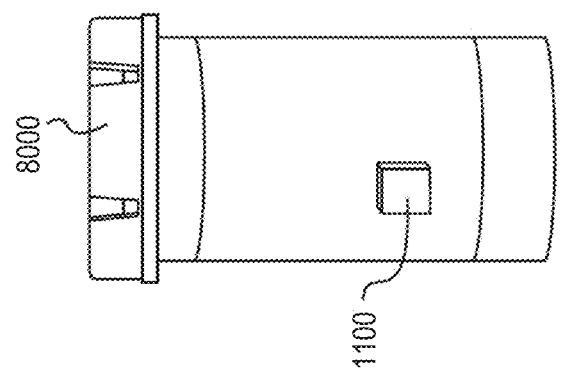
FIG. 8 depicts the exemplary wireless identification tag of FIG. 2 adhered to a container, consistent with disclosed embodiments.
Figure 7:
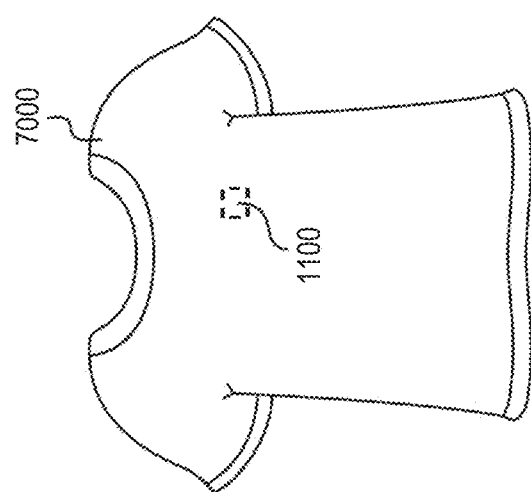
FIG. 7 depicts the exemplary wireless identification tag of FIG. 2 embedded into a clothing item, consistent with disclosed embodiments.
Figure 6:
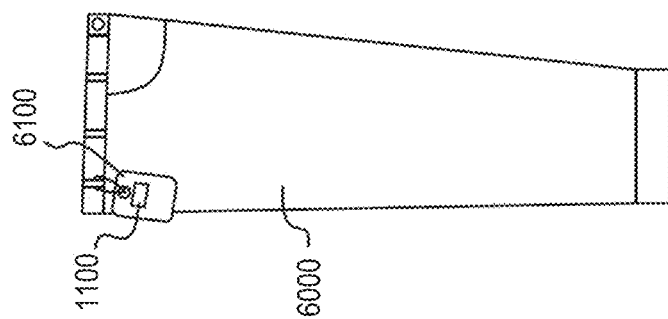
FIG. 6 depicts the exemplary wireless identification tag of FIG. 2 mounted onto a hanging tag, consistent with disclosed embodiments.

FIG. 5 depicts an embodiment of an exemplary tag 1100 encapsulated within the fabric pocket 3000, which is sewn into a clothing item 5000 (e.g., a jacket). FIG. 6 depicts an exemplary tag 1100 on a hanging label 6100, which may be attached to product such as a pair of pants 6000. In another non-limiting embodiment as depicted in FIG. 7, tag 1100 may be affixed to a product such as a t-shirt 7000 by being placed between layers of the t-shirt, such that tag 1100 may be hidden from view. By way of another example, as depicted in FIG. 8, tag 1100 may be adhered to product packaging, such as a container 8000. Garments and a container are illustrated for illustrative purposes only. As previously described, the tag can be associated in virtually any way with virtually any item.

Figure 9:
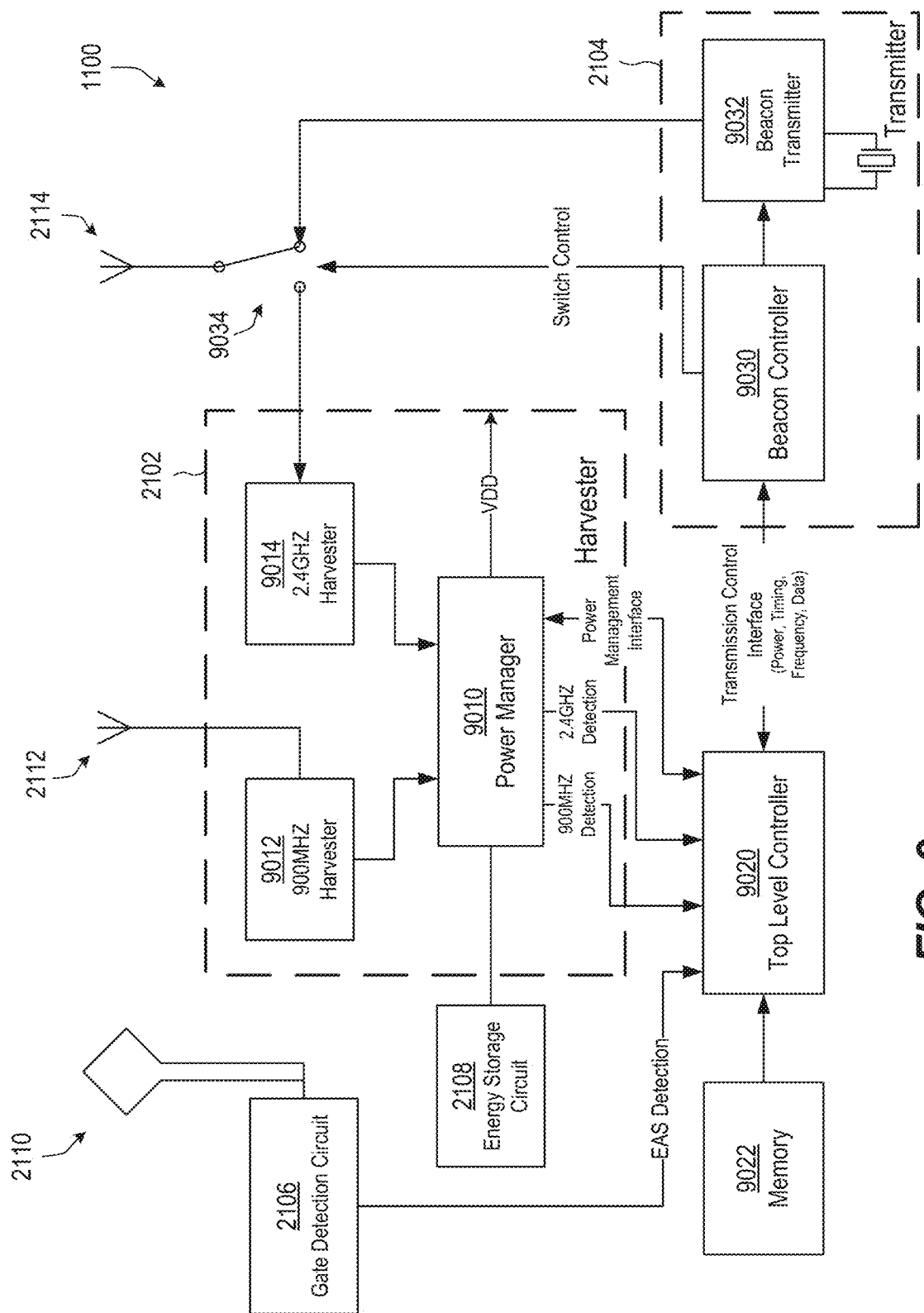
FIG. 9 is a block diagram of exemplary system architecture for a wireless identification tag, consistent with disclosed embodiments.

In some embodiments, the exemplary tag 1100 may be configured to harvest energy in multiple frequency bands, and to power operation thereof using the harvested energy. For example, tag 1100 may include one antenna for harvesting energy, two antennae for harvesting energy, three antenna for harvesting energy, or any other number of antennae to harvest energy in a desired number of frequency bands. In some embodiments, tag 1100 may be configured to harvest energy in a frequency band around 900 MHz WW ISM (e.g., an ultra-high frequency RFID band between 860 MHz and 960 MHz). For example, FIG. 9 illustrates an embodiment of the tag architecture of tag 1100 with an antenna 2112 tuned to receive energy in a frequency below 1 GHz (e.g., energy in a frequency band around 900 MHz) and to convey received energy to a 900 MHz harvester 9012. Additionally, or alternatively, the exemplary tag may be configured to harvest energy in a frequency band around 2.4 GHz WW ISM (e.g., ambient and intentional energy sources around 2.45 GHz, such as Bluetooth and Wi-Fi). For example, the exemplary tag architecture depicted in FIG. 9 may additionally include an antenna 2114 tuned to receive energy in a frequency band around 2.4 GHz, and to convey received energy to a 2.4 GHz harvester 9014. In some embodiments, harvested energy may be conveyed to a power manager 9010, which may store energy in an energy storage circuit 2108 or provide the harvested energy to power transmission of signals from the tag to one or more receivers.

In some embodiments, an exemplary wireless communication tag 1100 may include at least one transmitter configured to transmit a signal from the tag to one or more receivers. For example, tag 1100 may transmit a unique ID signal (optionally, along with status indicators and/or other data) in a frequency band around 2.4 GHz WW ISM. In some embodiments, an antenna configured to harvest energy may additionally be configured to transmit the tag's signal. For example, transmitter 2104 depicted in FIG. 9 may be configured to transmit signals having a frequency around 2.4 GHz using antenna 2114; thus, antenna 2114 may be configured to both harvest energy and to transmit tag signals. The exemplary tag 1100 may additionally include a switch 9034 configured to control the behavior of antenna 2114 and to cause antenna 2114 to switch between a transmission mode and an energy harvesting mode (e.g., under control of a beacon controller 9030 of transmitter 2104). In some alternative embodiments, the exemplary tag 1100 may include a signal transmitter that is connected to an additional antenna, separate from the energy harvesting antennae.

In some embodiments, the exemplary wireless communication tag 1100 may include at least one antenna configured to detect electromagnetic fields, including fields generated by EAS systems. In some embodiments, the antenna for detecting electromagnetic fields may include at least one coil. For example, as depicted in FIGS. 2 and 9, tag 1100 may include EAS coil 2110. Additionally, or alternatively, other types of antennae for detecting electromagnetic fields may be incorporated in tag 1100. Tag 1100 may include one antenna for detecting electromagnetic fields, two antennae for detecting electromagnetic fields, three antenna for detecting electromagnetic fields, or any other number of antennae to detect a desired number of electromagnetic fields.

Figure 10:
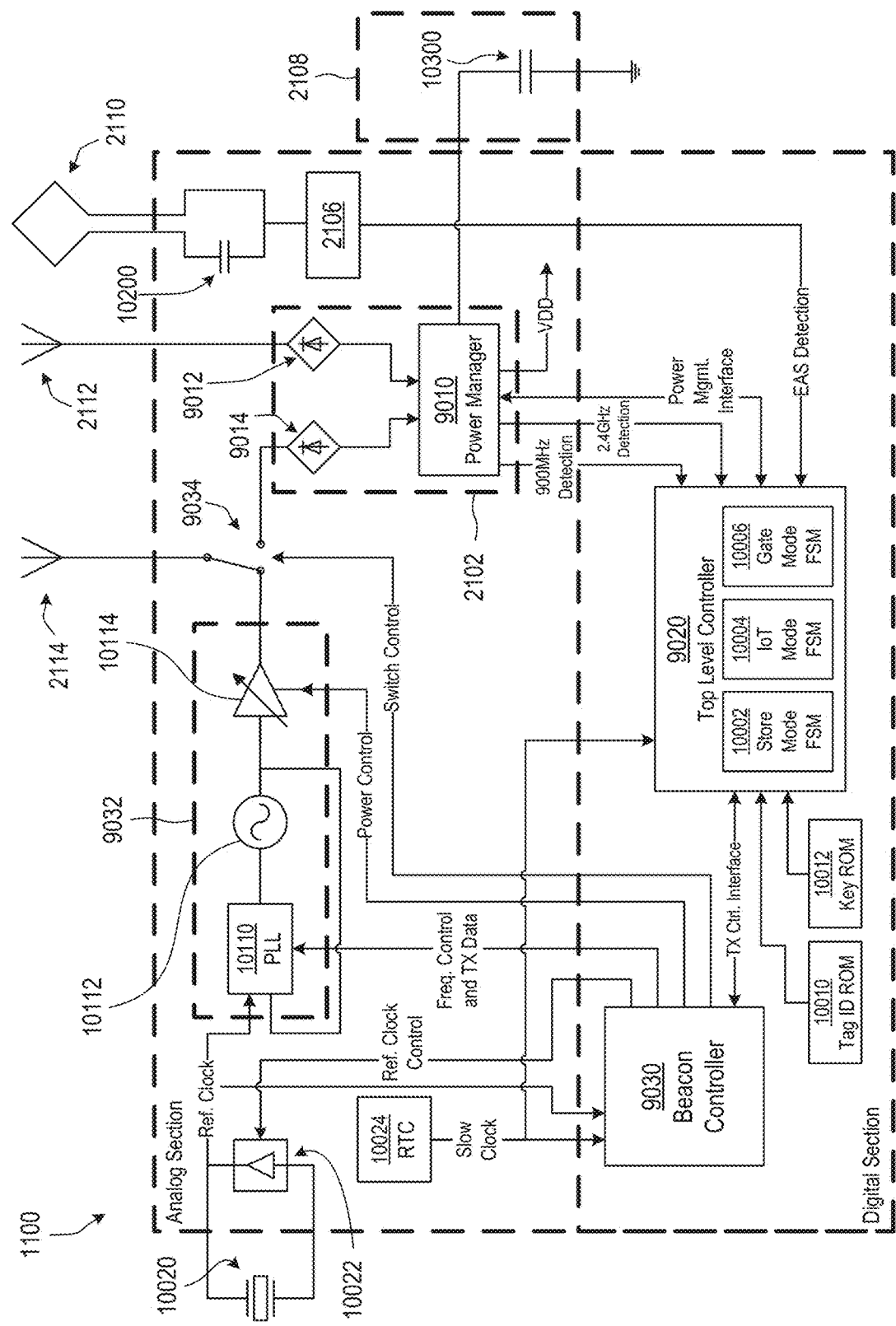
FIG. 10 is another block diagram of the exemplary system architecture of FIG. 9, showing details of exemplary controller architecture, consistent with disclosed embodiments.

In some embodiments, EAS coil 2110 may be configured to detect electromagnetic fields operating in one or more predetermined frequency bands. For example, EAS coil 2110 may be configured to detect fields in a frequency band between 7-13 MHz and fields in a frequency band between 58-60 kHz. As illustrated in FIG. 10, EAS coil 2110 may include a tuning capacitor 10200 controlled by controller 9020 to tune coil 2110 between a mode for detecting fields in a first frequency band (e.g., 7-13 MHz) and a mode for detecting fields in a second frequency band (e.g., 58-60 kHz). In some embodiments, EAS coil 2110 may be configured not to activate a nearby EAS gate, even when coil 2110 detects an incident EAS field. That is, unlike traditional EAS tags that emit a detectable signal (or create a detectable interference) when they receive an incident EAS field, coil 2110 may be configured to detect the EAS field without emitting a signal that will trigger the EAS gate alarm. In some embodiments, EAS coil 2110 may detect an incident electromagnetic field and gate detection circuit 2106 may determine if the field is received from an EAS gate (for example, if the field is in a frequency band between 7-13 MHz or between 58-60 kHz). When an EAS field is detected, circuit 2106 may output an EAS detection signal to controller 9020, which may alter one or more signal transmission parameters of the transmitter 2104 in response to detection of the EAS field, as discussed below.

Harvesting energy from multiple sources, in multiple frequency bands, as described above, may provide several benefits for the exemplary tag. First, different frequency bands may have varying regulatory limits in different jurisdictions, allowing the tag to supplement its energy harvesting in a second band if there is insufficient power to be harvested in a first band.

In addition, harvesting energy from multiple sources may also enable the exemplary tag to adapt its behavior, including the ID signal being transmitted by transmitter 2104, based on a context in which the tag is operating. In some embodiments, the tag's top level controller 9020 may be configured to determine the type of energy being received by the tag and to control the operation of transmitter 2104 based on the type of energy received. For example, controller 9020 may be configured to determine when antenna 2112 receives energy in at least one predetermined frequency band (e.g., energy in a frequency below 1 GHz or energy in a frequency band around 900 MHz) and to control transmitter 2104 to operate in a first transmission mode based on the determination. Additionally, or alternatively, controller 9020 may be configured to determine when antenna 2114 receives energy in at least one predetermined frequency band (e.g., energy in a frequency band around 2.4 GHz) and to control transmitter 2104 to operate in a second transmission mode based on the determination. Additionally, or alternatively, controller 9020 may be configured to determine when EAS coil 2110 receives energy in at least one predetermined frequency band (e.g., energy in a frequency band between 7-13 MHz and/or energy in a frequency band between 58-60 kHz) and to control transmitter 2104 to operate in a third transmission mode based on the determination. Advantageously, the tag may be configured to identify its environment based on the frequency of incident energy and to adjust its behavior, including the control parameters of transmitter 2104, according to the identified environment.

In some embodiments, the exemplary tag may be configured to store energy locally (e.g., in energy storage circuit 2108) and to transmit only its unique ID signal in some embodiments (rather than, for example, a signal with large amounts of data). This may reduce the amount of power required to operate the transmitter, and the digital content of the tag as a whole, to levels much lower than those of prior, battery-driven devices. For example, the exemplary tag may consume around 500 µA or less in an active state (e.g., while transmitter 2104 transmits one or more signals) and may only require an idle current on the order of nanoamperes. Additionally, or alternatively, the exemplary tag may be configured to power transmitter 2104 to actively transmit unsynchronized Bluetooth Low Energy (BLE) signals at around −10 dBm using only harvested energy, without the need for a battery or other power source. The foregoing examples are for non-limiting illustrative purposes only. Devices that use significantly more or less energy are also within the scope of this disclosure.

Advantageously, low levels of required power may enable the tag's transmitter 2104 to achieve a transmission range of 10 meters or more and, in embodiments in which the tag transmits unsynchronized BLE signals, may enable more reliable reception of the tag's transmitted signal than signals transmitted by RFID devices. This is driven mainly by the use of Backscatter reception techniques in RFID protocols, which makes them significantly more sensitive to environmental interference, reflections and blocking, as compared to other communications protocols, such as BLE. For example, in some embodiments a reader receiving the transmissions of the exemplary wireless communication tag may achieve receiver sensitivity levels of between −93 to −96 dBm, which is around 10 dB better than prior RFID reader chips.

Figure 11:
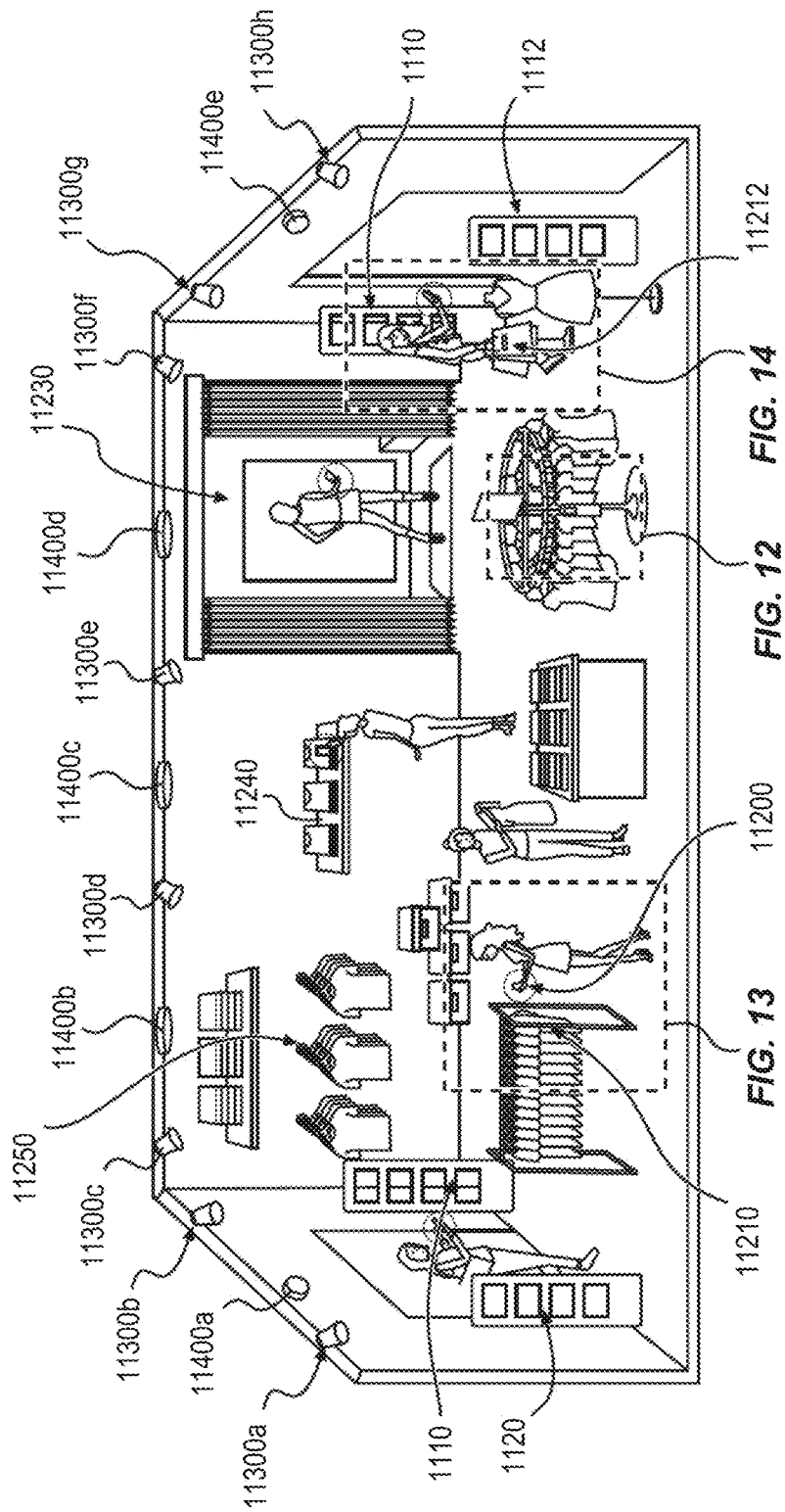
FIG. 11 is a perspective view of a retail establishment incorporating an exemplary wireless identification system, consistent with disclosed embodiments.
Figures 12, 13:
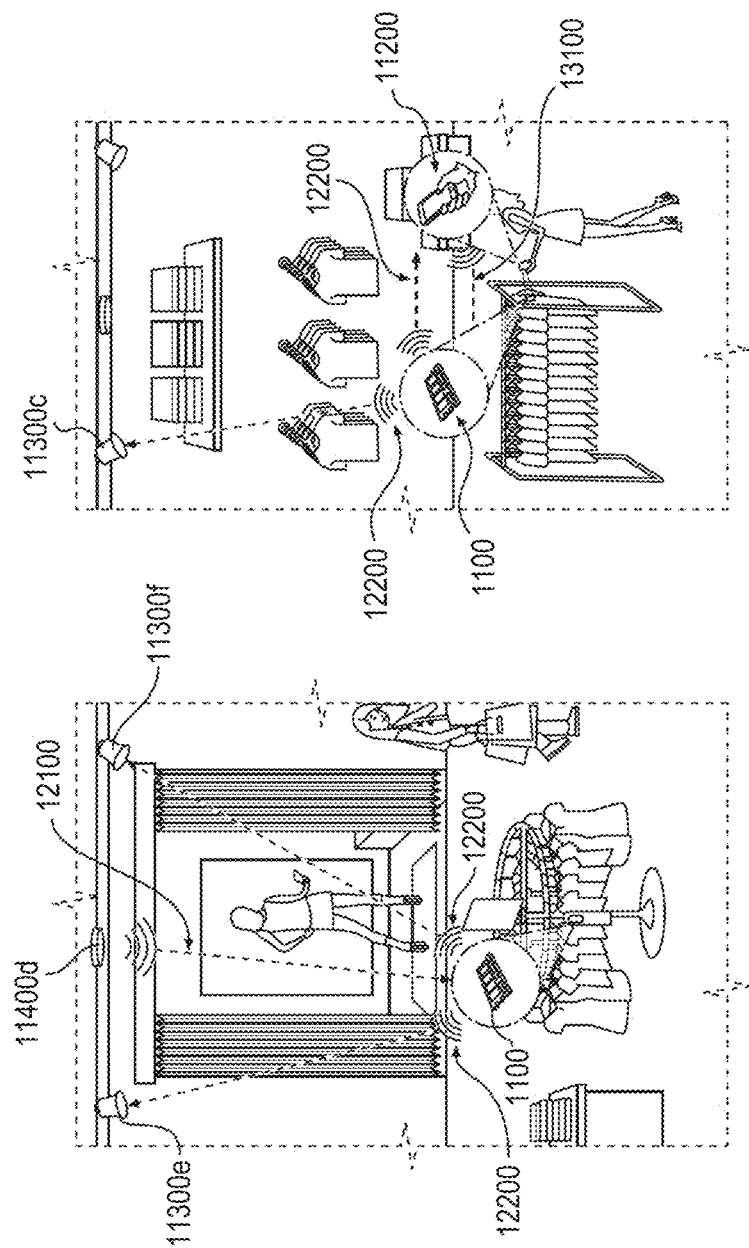
FIG. 12 depicts an example of a wireless identification tag operating in an exemplary infrastructure-excitable mode, consistent with disclosed embodiments.
FIG. 13 depicts an example of a wireless identification tag operating in an exemplary user-excitable mode, consistent with disclosed embodiments.
Figure 14:
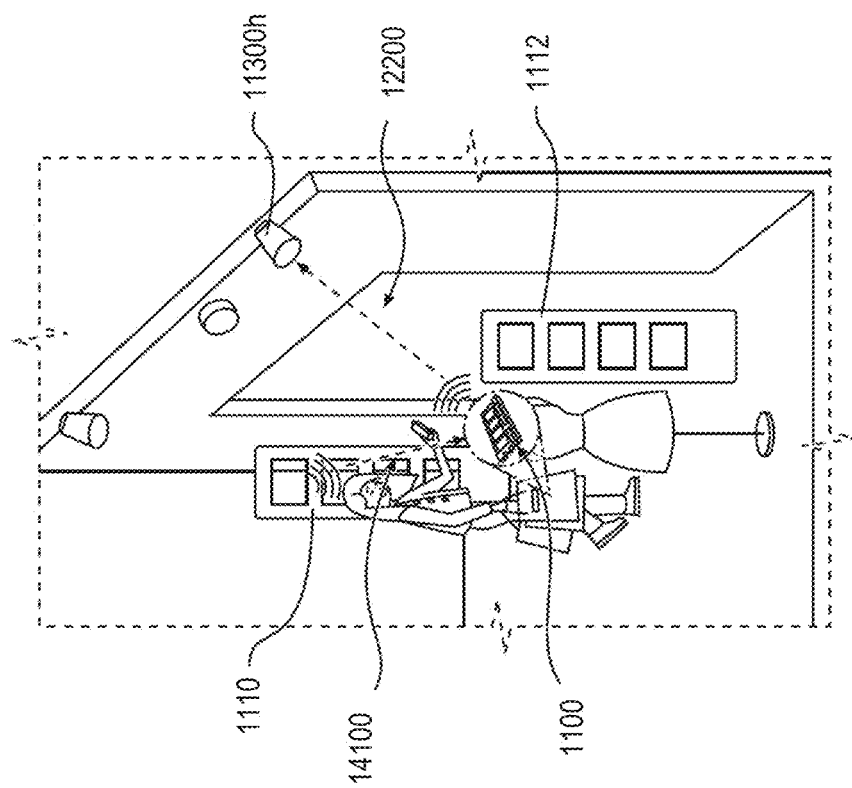
FIG. 14 depicts an example of a wireless identification tag operating in an exemplary gate mode, consistent with disclosed embodiments.

FIGS. 12-14 depict exemplary operation modes of a wireless communication tag within the retail space illustrated in FIG. 11. It is to be understood that the subject matter discussed below is merely exemplary and should not be regarded as limiting. The principles discussed below are applicable to the numerous other platforms listed earlier. FIG. 12 illustrates tag 1100 operating in a first mode referred to herein as "infrastructure-excitable mode" (an example of which may include a store mode). FIG. 13 illustrates tag 1100 operating in a second mode referred to herein as "user-excitable mode" (an example of which may include an Internet of Things (IoT) mode). FIG. 14 illustrates tag 1100 operating in a third mode referred to herein as "gate mode."

Tag 1100 may be configured to operate in the infrastructure-excitable mode of FIG. 12 when the tag is powered by environmental exciters, such as exciters 11400 arranged throughout the establishment. In this mode, for example, a location where goods are stored or presented for sale can keep track of its inventory. Each tag on each item can broadcast an ID, letting the system know it is still present in the establishment. Location tracking might also augment such a system so that not only is the presence of the item tracked, but also its location. For example, the strength of the ID signal received might indicate an approximate location of the item relative to a particular receiver, or multiple receives might be used to identify a more precise location, based on, for example, triangulation. Additional information stored in a system database might provide added value to a user. For example, the history of an item's movement or ownership might be stored in a database, along with characteristics of the item. Thus, the transmission of a single ID from a tag, might provide a user with rich information when coupled with prestored data about the item. In some embodiments, additional characterizing data may be stored on the tag for transmission.

Although FIG. 12 only illustrates a single exciter, tag 1100 may be simultaneously powered by multiple exciters. The exciters 11400 (including, for example, exciter 11400d) may be configured to deliver energy 12100 to the tag in an RFID frequency band between 860-960 MHz. Additionally, or alternatively, tag 1100 may receive energy from other sources having a frequency around 900 MHz. Energy 12100 may be received by antenna 2112 and may be stored in the energy storage circuit 2108 to power operation of the tag.

When infrastructure-excitable mode is triggered, tag 1100 may control the transmitter 2104 to broadcast the tag's ID signal 12200 in a frequency band around 2.4 GHz with a low repetition period. For example, the tag may transmit ID signal 12200 with a minimum repetition period of 10 minutes, with an added randomized period of up to five minutes, resulting in one broadcast every 12.5 minutes on average. Alternatively, the repetition period for a tag may be longer or shorter (e.g., less than five minutes, hours, or days). In some cases, a transmission of the ID signal 12200 may have a duration of around 300 µs; however, the transmission duration may be longer or shorter in alternative embodiments.

In the example illustrated in FIGS. 11-14, a plurality of receivers 11300a-h may be arranged throughout an establishment and configured to receive broadcasts of the ID signals 12200 from all of the wireless communication tags within, or in proximity to, the establishment. Because transmitter 2104 may have a broadcast range of 10 meters or more (e.g., 15 meters in some cases or more), the transmitted ID signal 12200 may be received by multiple receivers 11300e and 11300f in some cases, thus reducing the probability of signal misdetection. In other cases, one receiver may receive the broadcast of ID signal 12200. When a receiver receives an ID signal 12200 from a tag, the signal may be relayed to one or more processors (such as a processor within the establishment and/or a remote platform server) for processing, analysis, and/or storage. As discussed above, the exemplary system may additionally or alternatively include one or more receiver/exciter devices, such as device 1124, which may be configured to deliver energy 12100 to the wireless communication tags (similar to exciters 11400) and to receive broadcasts of the ID signals 12200 from the wireless communication tags (similar to receivers 11300); that is, device 1124 may act both as an exciter and a receiver. In some alternative embodiments, such as the embodiment illustrated in FIG. 11, exciters 11400 and receivers 11300 may be configured as separate devices.

In embodiments in which multiple wireless identification tags are used within the same establishment, three or more channels in the BLE standard (between 2.400-2.4835 GHz WW ISM) may be used for the tags to broadcast their respective ID signals to the receivers. For example, each tag may randomly select one of the three advertisement channels per transmission. This use of multiple channels, combined with the short duration and low repetition period of each signal transmission, may minimize the likelihood of collisions between different tags' transmissions. In addition, each tag may conserve harvested energy while in the infrastructure-excitable mode due to the infrequency of signal transmission and the small amount of power required for each transmission.

Tag 1100 may be configured to operate in the user-excitable mode of FIG. 13 when the tag receives energy from ambient and intentional 2.4 GHz sources, such as Bluetooth and Wi-Fi devices. In some embodiments, a user may trigger the user-excitable mode in tag 1100 by scanning the tag with a 2.4 GHz device, such as a smartphone, tablet, or any other device configured to transmit a 2.4 GHz trigger signal 13100 to the tag. This may permit a user to receive information about an item based on a scan of its tag. For example, when the scan occurs, an ID may be transmitted to a server (e.g., either via network infrastructure or via a receiver/transmitter in a device controlled by the user.) The server can then perform a look up of information and transmits it to the user's device. The user might be enabled to define the type of information requested to tailor the output to the user's needs. In an alternative embodiment, the relevant data may already be stored on the user's device, and the lookup may occur on the user's device instead of being sent to a server for analysis.

In the example shown in FIG. 13, the user may activate the user-excitable mode in tag 1100 within a retail establishment; however, user-excitable mode may be triggered in other locations and circumstances, such as when a user scans an item (or a shelf of items in their closet) at home using their smartphone, or during manual inventory scanning (e.g., in a warehouse or other storage facility).

When user-excitable mode is triggered, tag 1100 may harvest the incident 2.4 GHz energy to charge the energy storage circuit 2108. Additionally, when tag 1100 determines that 2.4 GHz energy was received by antenna 2114, transmitter 2104 may transmit ID signal 12200 in a frequency band around 2.4 GHz. However, beacon controller 9030 may adjust the repetition period of the ID signal to be much faster than the repetition period of the ID signal in the infrastructure-excitable mode. For example, transmitter 2104 may broadcast the ID signal 12200 less than 10 seconds after the 2.4 GHz signal 13100 is received by antenna 2114, for a signal duration of about 300 µs. Alternatively, longer or shorter repetition periods may be implemented in the user-excitable mode. By implementing a shorter response period in user-excitable mode, the tag may provide a prompt response to the user when the user-excitable mode is triggered; in comparison, such a prompt response may not be needed in the infrastructure-excitable mode. In some embodiments, beacon controller 9030 may also lower the transmission power when the tag enters user-excitable mode from infrastructure-excitable mode, in order to minimize the chances of interference with other devices operating in the 2.4 GHz frequency band at the same time.

In some embodiments, the tag may broadcast ID signal 12200 back to device 11200 in user-excitable mode. Additionally, or alternatively, the tag may broadcast ID signal 12200 to one or more receivers around the establishment (e.g., receiver 11300c in FIG. 13). In some embodiments, tag transmissions in user-excitable mode may be broadcast over one of the three or more BLE channels discussed above, with each tag randomly selecting one of the three channels per transmission.

Tag 1100 may be configured to operate in the gate mode of FIG. 14 when EAS coil 2110 receives an EAS signal 14100 from EAS gate 1112, 1114. In some embodiments, EAS signal 14100 may have a frequency within a band between 7-13 MHz or a band between 58-60 kHz. EAS gate 1112, 1114 may be installed near the exit of the establishment and may emit signals 14100 that are more localized than RFID, Wi-Fi, Bluetooth, or other radio-frequency transmissions, providing an accurate indication of when a tagged item passes through the gate (rather than merely walking near the gate). For example, instead of requiring customers to visit a checkout station or register, the user might be permitted to walk out of the store with tagged items. The gate may then read the tags and an identity of the user, such as through the user's mobile device, and send an inventory of the items to be purchased to a server which looks up the prices of the items and automatically charges the user's credit or debit account, or automatically transfers funds from the user's electronic wallet to the seller.

When gate mode is triggered, beacon controller 9030 may control the transmitter 2104 to transmit a short, powerful burst of the ID signal 12200. For example, transmitter 2104 may transmit the ID signal at its full output power for a period of approximately 200 ms, with a repetition period of between 10-80 ms, such that multiple transmissions occur during a very short time-frame. The ID signal 12200 may be received by a dedicated receiver 11300$h$ in proximity to the EAS gate; however, the EAS gate itself may not be triggered by the tag 1100 due to the configuration of EAS coil 2110 and its associated circuitry. In some embodiments, tag 1100 may be configured to operate in the gate mode for a predetermined length of time or for a predetermined number of transmissions of the ID signal 12200, after which it may revert to the tag's previous operation mode or to a default mode (which may be, for example, infrastructure-excitable mode).

Disclosed embodiments may include a wireless identification tag for association with a product to enable product self-identification. A wireless identification tag may include any wirelessly detectable device, such as, for example, a radio-frequency identification (RFID) device, a Bluetooth Low Energy (BLE) beacon device, a device including a microcontroller powered by radio-frequency energy, or any other structure configured to transmit signals capable of detection. A product may include any item with which a tag may be associated. By way of non-limiting examples, a product may include tools, clothing, electronics, consumer goods, equipment, vehicles, consumables, packaging, accessories, supplies, materials, artistry, animals, persons, instruments, pallets, containers, pharmaceuticals, commodities, articles, devices, machinery, implements, mechanisms, furniture, or any other object. A wireless identification tag may be associated with a product to enable the product, via the tag, to provide self-identification. A wireless identification tag may be associated with a product through adhesive, embedding, sewing, mounting, bonding, friction fit, pocketing, tying, wrapping, fastening, or any other type of physical association. For example, if a product is made of fabric, a tag may be sown into the fabric, embedded between layers of fabric, adhered to the fabric, attached to the fabric via a hanging tag, or connected to the fabric in any other way that enables a physical association. Self-identification may, for example, include communicating or transmitting data containing identification information, such as an identifying inventory number, a barcode, or any other data form containing information enabling product identification, identification of one or more product characteristics, or information related in some way to the product, its operation, or its use. Embodiments of a wireless identification tag may include any device suitable to attach to any object for the purpose of identifying the object visually, tactilely, audibly, or electronically without the use of externally connected cables or wires. Other embodiments may be embedded into an item as part of the manufacturing process or later, for example by a retailer. In some embodiments, the wireless identification tag may not require a battery but may operate on harvested energy (as disclosed herein). In some embodiments the wireless identification tag may include a device small enough to be embedded into an item, for example, clothing, during manufacture. In some embodiments, the embedded tag may not be readily detected by a wearer. Other embodiments may remain embedded or attached to an item for long periods of time, for example, many years. Some embodiments of the wireless identification tag may be resistive to dust and water, such as up to IP67 standards. Other embodiments may be resistive to washing, drying, dry-cleaning, and ironing.

In disclosed embodiments, the tag may include at least one antenna tuned to receive energy. An antenna may include any structure configured to transmit or receive electromagnetic waves. For example, an antenna may include one or more conducting elements and/or non-conducting dielectric elements arranged in a manner enabling the transmission and/or reception of radio signals, or any other component and/or device configured for receiving and/or transmitting energy from the air or from any other medium in which the antenna is placed. The antenna may also be electrically coupled to at least one separate receiver and/or transmitter, directly or wirelessly, and may be configured to transmit and receive energy in all directions equally (omnidirectional antennae) or preferentially in one or more particular directions (directional or "beam" antennae). In some embodiments, an antenna may also be configured to intercept at least a portion of the energy contained in a radio wave or other electromagnetic wave to produce an electric current at one or more of its terminals.

In some embodiments, an antenna may also include a circuit used to transform a signal from a conducted input to a radiated output (in transmission) and/or to transform a signal from a radiated input to a conducted output (in reception). The radiated signal may be electromagnetic radiation, or electric fields or magnetic fields, and the conducted signal may be a time-varying voltage or current signal over a physical connection such as a metal wire or printed circuit (also known as a conductor). In some embodiments, the radiated signal may be acoustic (such as in sonar applications) or optical (such as in laser applications). An antenna may be passive (which means that no external power is needed other than the signal to be transmitted or received) or active (which means that an external power source is needed to power the active circuits). A passive antenna may be implemented as a series of conductors printed on a printed circuit board (PCB), and may be connected to the rest of the circuit either through direct connection, through electrical or magnetic coupling, or any other suitable form of electronic connection.

Figure 15:
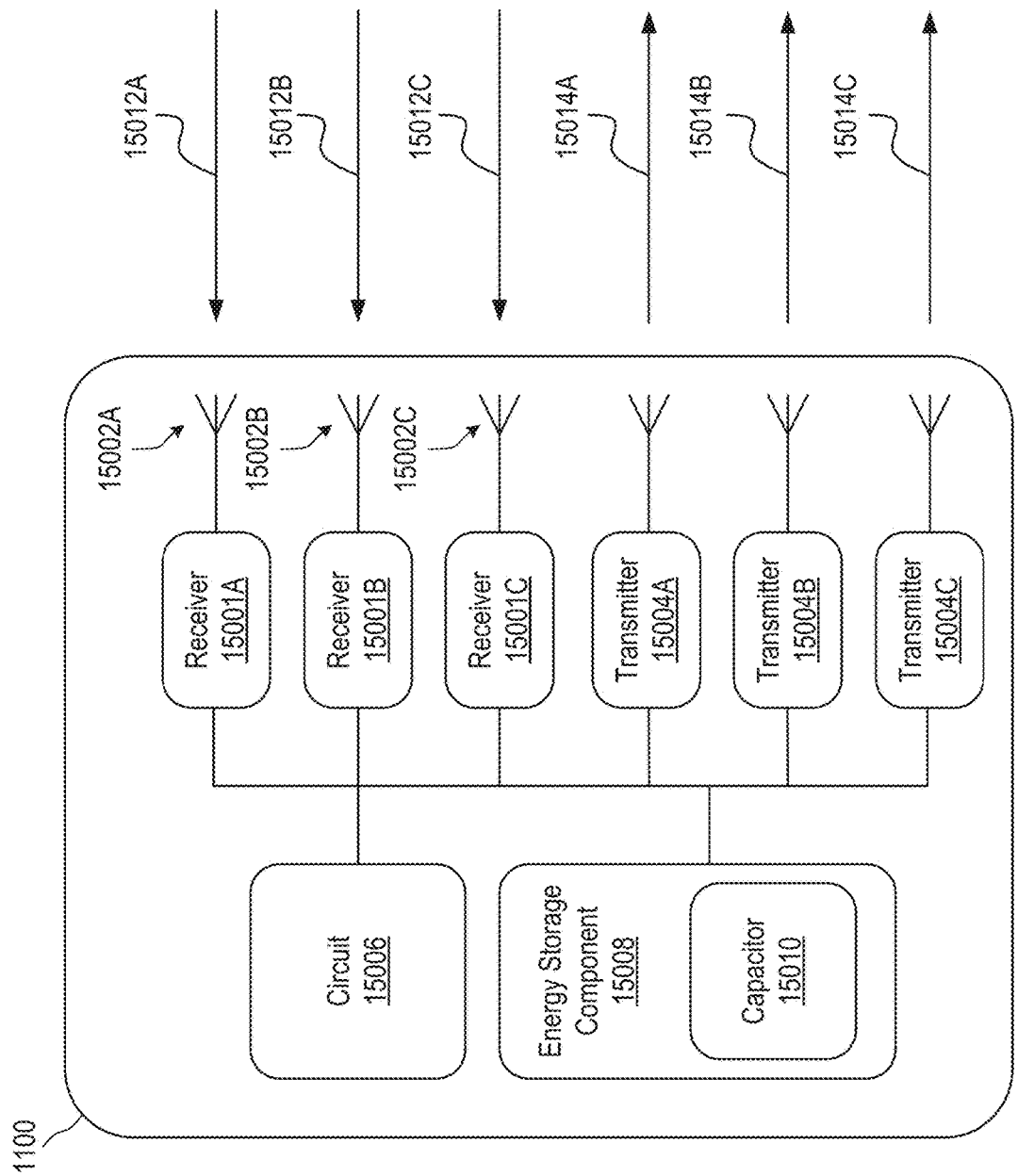
FIG. 15 is a block diagram of a wireless identification tag including antennae, transmitters, a circuit, and an energy storage component, consistent with disclosed embodiments.

By way of example, wireless identification tag 1100 illustrated in FIG. 15 may include antennae 15002A, 15002B, and 15002C. Antennae 15002A, 15002B, and 15002C may be configured to transmit and/or receive different types of electromagnetic signals. In some embodiments, any combination of antennae 15002A, 15002B, and 15002C may be integrated within a single antenna unit.

Disclosed embodiments may include at least one antenna tuned to receive energy transmitted at a first frequency within a frequency band around 900 MHz and at a second frequency within a frequency band around 2.4 GHz. Consistent with the present disclosure, energy may refer to a quantity which measures an ability to perform work, or to exert power for a certain length of time (e.g., the product of the power and the length of time being equal to the energy spent). Energy may be transferred in many forms, such as electrical, magnetic, electromagnetic, kinetic, acoustic, thermal, photonic, or other sources. Energy may also be stored in many forms, such as electrostatic, magnetic, chemical, kinetic, thermal, or other forms. In the context of electrical or electronic circuits, electrical energy may include DC (direct current) or AC (alternating current), although other forms of electric energy may also be used in connection with disclosed embodiments.

Consistent with the present disclosure, a frequency band may refer to a portion of a radio spectrum and/or an electromagnetic spectrum. For example, a frequency band may refer to a portion of a spectrum reserved internationally for particular industrial, scientific, and medical (ISM) purposes. In this context, the term "reserved" may refer to designating a frequency band, or range of frequencies, for a single purpose or application. In many jurisdictions, frequency bands may be reserved and/or designated by law, regulation, or any other applicable standards or protocols. In general, a frequency band may refer to any spectrum portion that may be used in the fields such as broadcasting, radiocommunication, wireless telecommunications (e.g., cell phones), near field communications (NFC), wireless computer networks (e.g., Wi-Fi), or for any other means of wireless communication, as well as other fields and/or uses such as radar, scientific measurements, beacons, guard bands separating between frequency bands dedicated for different uses and kept empty to reduce interference, and other fields and/or uses requiring the transmission or reception of electromagnetic energy.

In general, a frequency band around 900 MHz may refer to any one or more portions of the ultra-high frequency (UHF) band generally reserved for RFID purposes. The specific portion of the UHF band reserved for RFID purposes, however, may vary depending on region and/or jurisdiction. For example, many jurisdictions may reserve one of two standard frequency bands, such as 902-928 MHz (e.g., United States) and 865-868 MHz (e.g., European Union), for UHF RFID technology; however, some jurisdictions may adopt multiple bands and/or other unique bands outside of this standard. One such country (e.g., Japan) previously used two unique frequency bands for UHF RFID purposes (952-956.4 MHz and 952-957.6 MHz), both of which are outside the standard range, but for purposes of this disclosure and in this context, are within a frequency band around 900 MHz. Further, designated frequency bands are subject to change. For example, Japan later changed the designated frequency band for UHF RFID technology to 916.7-920.9 MHz, which for purposes of this disclosure and this context are within a frequency band around 900 MHz. Therefore, reference to a particular frequency band within the context of this disclosure is not necessarily fixed, but rather is subject to changing regulations, standards, protocols and industry norms. Accordingly, it is to be understood that "a frequency band around 900 MHz" may refer to a wide range of potential frequency bands, consistent with the present disclosure.

Consistent with the present disclosure, a frequency band of around 2.4 GHz may refer to any one or more portions of the UHF band designated for the use of radiofrequency energy in a wide variety of scientific, medical, and industrial applications. Some non-limiting examples of devices that may operate within a frequency band of around 2.4 GHz may include cell phones, desktops, laptops, video game consoles, smartphones, tablets, smart TVs, digital audio players, cars, modern printers, and other devices capable of wireless communication. Services and users of a frequency band of around 2.4 GHz may use certain radiocommunication technologies, such as Wi-Fi, Bluetooth Low Energy (BLE), and Classic Bluetooth, for wireless local area networking and personal area networking. Many jurisdictions may reserve one or more of a plurality of frequency bands in the standard 2.4 GHz range for such technologies; however, some jurisdictions may adopt multiple bands and/or other unique bands outside of this standard.

As with frequency bands generally designated for UHD RFID, the frequency bands around 2.4 GHz designated for similar purposes may vary according to region and jurisdiction and may be subject to change. For example, according to the Institute of Electrical and Electronics Engineers (IEEE) 802.11, a set of local area network (LAN) protocols specifies a set of media access control (MAC) and physical layer (PHY) protocols for implementing WLAN Wi-Fi communications in frequencies including frequency bands around 2.4 GHz and is the world's most widely used standard for wireless computer networking. Over time, the IEEE has amended 802.11 to designate frequency bands outside of the 2.4 GHz range for similar purposes, such as 5 GHz and even 60 GHz. Therefore, it may be contemplated that the standard frequency ranges for wireless computer networking may be subject to change in the future. Accordingly, it is to be understood that "bands around 2.4 GHz" may refer to a wide range of potential frequency bands, consistent with the present disclosure.

Disclosed embodiments may include at least one antenna including a first antenna tuned to receive energy transmitted at a frequency within a first frequency range of 900 MHz WW ISM; and a second antenna tuned to receive energy transmitted at a frequency within a second frequency range of 2.4 GHz WW ISM. In general, a frequency range of 900 MHz WW ISM and 2.4 GHz WW ISM may refer to frequency ranges of around 900 MHz and 2.4 GHz, respectively, as previously discussed. The term "WW ISM" may refer generally to frequency ranges that have been designated for various industrial, scientific, and medical (ISM) purposes by international, or world-wide (WW), protocols and/or standards, such as IEEE protocols or ITU guidelines, for example. Although certain frequency bands may be designated for particular purposes by an international authority, organization, and/or regulatory institutions, the particular frequency bands used for such purposes may vary depending on region or jurisdiction, such that some regions and jurisdictions may designate frequency bands that are outside the frequency ranges designated by international standards and/or protocols but are nonetheless used for similar purposes. Accordingly, it is to be understood that a WW ISM frequency range may refer to a wide range of frequency bands that may or may not fall within international standards and/or protocols.

In some embodiments, however, at least one antenna may include one or more antennae tuned to receive energy transmitted in one or more frequency bands or frequency ranges. For example, a single antenna may be tuned to receive energy transmitted in multiple frequency bands of around 900 MHz, multiple frequency bands of around 2.4 GHz, or both. Accordingly, an antenna tuned to receive energy transmitted at a frequency within a frequency range of around 900 MHz WW ISM may also be tuned to receive energy transmitted at a frequency within another frequency range, and an antenna tuned to receive energy transmitted at a frequency within a frequency range of around 2.4 GHz WW ISM may be tuned to receive energy transmitted at a frequency within another frequency range.

By way of example, FIGS. 9 and 10 illustrate exemplary structures of a wireless identification tag. In these figures, antenna 2112 may be tuned to receive energy transmitted at a frequency within a frequency range of around 900 MHz. and antenna 2114 may be tuned to receive energy transmitted in a frequency band of around 2.4 GHz. However, the wireless identification tag may also include any number of these antennae, and each antenna may be tuned to receive energy transmitted in one or more of any frequency bands and may also be configured to transmit signal themselves.

Disclosed embodiments may include at least one transmitter configured to send at least one identification signal. A transmitter may be configured to send a signal over a communication medium. The signal may carry data (as in the case of communication systems such as Wi-Fi, Bluetooth, cellular communication, Ethernet communication or any other standards-based or proprietary protocol) and/or carry energy (as in the case of exciters for some RFID devices, X-ray imaging or radar). In some contexts the term "transmitter" may involve wireless communication, such that the signal is an electric signal, a magnetic signal or an electromagnetic signal, and the medium is over-the-air wireless communication. In general, however, a transmitter may include any component or device capable of sending a signal, consistent with the present disclosure.

In some embodiments, an identification signal may include a collection of data, transmitted over an agreed communication medium using an agreed communication protocol, which includes amongst the transmitted data a unique identifier. The communication medium may include acoustic transmission, visual transmission, wireline communications, wireless communications, fiber-optic communication, or any other suitable medium for carrying transmitted signals. The communication protocol may be a standards-based protocol such as 802.3 Ethernet, ADSL/VDSL/SDSL wired protocols, Wi-Fi, Bluetooth, GSM, 3G, LTE, 5G, ZigBee, Z-wave wireless protocols, a proprietary protocol agreed on by the transmitter and receiver, or any other set of rules with reference to communication between various electronic devices. Regardless of the underlying communication protocol, however, the data may be encrypted, scrambled or otherwise disguised by the transmitter in a manner which is decipherable by the receiver, as long as such encryption, scrambling or disguise were agreed upon between the transmitter and receiver at a previous point in time as part of the communication protocol. The data may include the unique identifier alone, or it may include other fields such as preambles, midambles, and postambles, addresses and other identifiers, status fields and/or any other data which may be transmitted from the transmitter to the receiver. In general, however, an identification signal may be any signal containing information associated with the transmitter and/or transmitting device. By way of example, signals 15104A, 15104B, and 15104C depicted in FIG. 15 may include or otherwise constitute an identification signal.

Disclosed embodiments may include at least one circuit. A circuit may include two or more interconnected components. Some non-limiting examples may include a combination of components and/or devices, implemented as part of a silicon chip, as part of a printed-circuit board, as part of a connectorized system or as a combination of any of the above, connected in a manner enabling the performance of a desired function or reaction. The function or reaction may as a response to one or more inputs, stimuli and/or triggers, generated internally inside the circuit or external to it. The function or reaction may include control of other circuits, generating visual, audible, or otherwise communicable alerts or signals, performing predefined coded operations, or any other electronic-based function. For example, the components and/or devices may include resistors, capacitors, inductors, conductors, transistors, diodes, transmission lines, inverters, buffers, logic gates, latches, flip-flops, amplifiers, comparators, voltage sources, current sources, switches, or any other components and/or devices configured to control electronics. The inputs, stimuli, and/or triggers may include a voltage level change, a current level change, a frequency, amplitude or phase change of a received signal, a digital input, a digital pulse, a control word, or any other form of input configured to generate a response from the circuit. In general, however, a circuit may include any components, devices, or combinations thereof configured to perform any one or more of the electronic functions consistent with the present disclosure.

By way of example, in FIG. 2, tag 1100 may include at least one circuit, such as gate detection circuit 2106 and energy storage circuit 2108. As illustrated in FIG. 15, wireless identification tag 1100 may include circuit 15006. Further, FIGS. 9 and 10 illustrate an exemplary configuration of circuits that may be used to perform certain functions consistent with the present disclosure.

Disclosed embodiments may also include at least one circuit configured to detect whether energy is received in the first frequency or the second frequency. Detecting whether the energy is received in the first frequency or the second frequency may include discovering, identifying, or otherwise discerning the presence of a signal and/or energy in the first and/or second frequency in the environment of the wireless identification tag. For example, the circuit may be electrically connected to the at least one antenna, such that the at least one antenna may cause at least one form of input, stimulus, or trigger associated with received energy in the first and/or second frequency to be received by the at least one circuit. The circuit may be configured, upon receipt of at least one form of input, stimulus, or trigger, to determine whether the input, stimulus, or trigger includes energy in the first and/or second frequency. By way of example with respect to FIG. 15, antennae 15002A, 15002B, and 15002C may be tuned to differing frequencies, and circuit 15006 may be configured to detect the presence of energy 15102A, energy 15102B, and/or energy 15102C associated with a first, second, and/or third frequency, respectively, by detecting the antenna through which the signal was received. In addition, or alternatively, the tag may include circuitry to detect a characteristic, such as a frequency, of the incoming signal. In such instances, a single multifrequency antenna may be employed instead of the multiple antennae illustrated in FIG. 15.

Disclosed embodiments may also include at least one circuit configured to cause the at least one transmitter to operate in a first mode to send a first form of identification signal when the first frequency is detected, and to operate in a second mode to cause the at least one transmitter to send a second form of identification signal when the second frequency is detected. For example, a first mode may refer to a step where a first signal is sent, and a second mode may refer to a step where a second signal sent. The first and second modes, may also refer to differing operating characteristics. These characteristics may include communication medium, communication protocols, frequencies, frequency ranges, frequency bands, types of encryption, scrambling, and/or disguising, data content, timing of transmission, and/or any other distinguishable characteristic that may be associated with the identification signal to be transmitted. For example, the at least one circuit, upon detecting that energy received in the first frequency from the at least one antenna, may cause the at least one transmitter to operate in a first mode, wherein the first mode is associated with an identification signal having any one or more characteristics or combinations of characteristics as described above. In some embodiments, however, the first mode may also be associated with non-transmission, or the prevention of transmission, of an identification signal. Similarly, the at least one circuit may cause the at least one transmitter to operate in a second mode upon detecting that energy in the second frequency has been received by the at least one antenna.

By way of example, circuit 15006 in FIG. 15 may detect energy 15102A received by one or more of antennae 15002A-C. In response to this detection, circuit 15006 may cause any one or more of transmitters 15004A-C to operate in a first mode. Operating in the first mode, for example, may include transmitting one or more of signals 15104A-C, wherein signals 15104A-C may have different characteristics such that each signal is distinguishable from one another in at least one aspect. Circuit 15006 may also detect receipt of energy 15102B by one or more of antennae 15002A-C. In response to this detection, circuit 15006 may cause any one or more of transmitters 15004A-C to operate in a second mode. Operating in the second mode, for example, may include transmitting one or more of signals 15104A-C, wherein one or more of signals 15104A-C may be different, either alone or in combination, from the signals 15104 A-C transmitted in the first mode.

Consistent with some disclosed embodiments, at least one of a first form of identification signal or a second form of identification signal may include a unique identifier of the wireless identification tag. A unique identifier may include a number, string, or other form of data which is singularly associated with an identified entity, such that no single entity is associated with the same unique identifier as any other entity, and any single entity may have only a single unique identifier associated with it. Unique identifiers may include serial numbers, unique EPC codes, database entries (as long as each database entry represents a single entity, and all relevant entities are represented by exactly one entry in the database), or any other form of data singularly associated with an identified entity. By way of example, wireless identification tag 1100 depicted in FIG. 15 may transmit at least one form of identification signal, such as signals 15104A-C, depending on a triggering input signal, such as 15102A-C.

In disclosed embodiments, at least one transmitter may be configured to send the first form of identification signal and the second form of identification signal at a same transmission frequency. In other words, the at least one transmitter, while operating in the first mode, may transmit a first form of identification signal that has the same or substantially similar frequency (e.g., 2.4 GHz) to that of the second form of identification signal transmitted when the transmitter operates in the second mode. Thus, the frequencies associated with the first form of identification signal and the second form of identification signal may not necessarily be different. However, the first form of identification signal may nonetheless be associated with any number of characteristics that are distinguishable from the characteristics of the second form of identification signal (e.g., content of information transmitted, communication medium, communication protocols, types of encryption, scrambling, and/or disguising, data content, timing of transmission). By way of example, at least one of transmitters 15004A-C may transmit a first form of identification signal 15104A while operating in a first mode and may transmit a second form of identification signal 15104B while operating in a second mode. Although signal 15104A and signal 15104B may be associated with distinguishable characteristics, the transmitters may nonetheless be configured to transmit them at the same frequency.

In some embodiments, the transmission frequency of the first and second form of identification signals is the second frequency. For example, regardless of the information transmitted, transmission of the first and second forms of identification signal may occur in a common frequency, such as the second frequency. Thus, for example, the at least one transmitter, while operating in the first mode, may transmit a first form of identification signal that has the same or substantially similar frequency to the transmission of the second form of identification. The common frequency, for example, may be within a frequency band of around 2.4 GHz. With reference to the example of FIG. 15, at least one of transmitters 15004A-C may transmit a first form of identification signal 15104A while operating in a first mode and may transmit a second form of identification signal 15104B while operating in a second mode. Although signal 15104A and signal 15104B may be associated with distinguishable characteristics, the transmitters may nonetheless be configured to transmit them at the same frequency of the second energy 15102B received by at least one of antennae 15002A-C.

Disclosed embodiments may include at least one transmitter configured to send the first form of identification signal and the second form of identification signal at different power levels. A transmitter may be designed to send its signals over the communication medium at a certain magnitude. This magnitude may be used to calculate certain properties of the propagation of the signal over the communication medium, establishing such parameters as the range a signal may be detected at, the signal-to-noise ratio, interference properties etc. In the context of wireless communication, this magnitude may be measured in units of power, usually either Watts or dBW (decibel-Watts or dB-Watts) which is a logarithmic unit related to Watts (or sometimes in units of dBm, which is related to milliwatts in the same manner dBW is related to Watts). In that sense, a "power level" may refer, for example, to a power measurement immediately at the output of the transmitter, while the transmitter is actively transmitting. A transmitter may be designed to have a configurable power level, such that in response to certain inputs it may transmit a signal at one of two or more different power levels.

By way of example, at least one of transmitters 15004A-C may transmit a first form of identification signal 15104A while operating in a first mode and may transmit a second form of identification signal 15104B while operating in a second mode. Although signal 15104A and signal 15104B may be transmitted at the same frequency, the power level of signal 15104A may be different than the power level of signal 15104B.

In some disclosed embodiments, at least one transmitter may be configured to send the second form of identification signal less than ten seconds after the second frequency is detected. For example, the transmitter may be configured to send the second form of identification signal immediately upon detecting the second frequency. In some embodiments, however, the transmitter may be configured to send the second form of identification signal after a delay period, which may be under ten seconds, following the detection of the second frequency. By way of example, transmitter 15004B may be configured to transmit a second form of identification signal 15104B five seconds after (or any other time period after) energy 15102B in a second frequency is detected by circuit 15006. This time period may include inherent delays in the system (such as response times of the detector used to detect energy 15102B received by antenna 15002B, or the processing time required by the circuit 15006 to receive the indication from the detector, process the input, arrive at the conclusion that transmitter 15004B is required to transmit the second form of identification signal 15104B, and relay such a command, control, or signal to transmitter 15004B to perform this operation). Additionally. or alternatively, this time period may include intentional delays, such as pauses, wait-times, swallowed clock-cycles, timers and watch-dog mechanisms, which may be configured to cause an action to occur at a later time and not immediately.

In some disclosed embodiments at least one transmitter may, in a first mode, be configured to send the first form of identification signal with a first repetition period. A repetition period may refer to a time interval between pulses of an identification signal sent by the transmitter. For example, in some embodiments, transmitting an identification signal may not necessarily include continuously transmitting the signal without interruption, and may instead include transmitting short bursts of the signal with a fixed or variable time interval in between bursts. In this respect, a repetition period may refer to the temporal periodicity of the signal bursts. By way of example, transmitter 15004A may be configured to send a first form of identification signal 15104A with a first repetition period, wherein the repetition period refers to the fixed amount of time between the start of a burst and the start of the next burst. In some disclosed embodiments, at least one transmitter may, in a second mode, be configured to send the second form of identification signal with a second repetition period, shorter than the first repetition period. By way of example, transmitter 15004B may be configured to send a second form of identification signal 15104B with a second repetition period, where the second repetition period is shorter than the repetition period of the first form of identification signal 15104A.

In some embodiments, the first form of identification signal may differ from the second form of identification signal in at least one of a repetition period, a frequency channel, a transmission power, or transmitted data associated with the identification signal sent. As discussed previously, a repetition period may refer to the periodicity of bursts of the given identification signal. A frequency channel may refer to a single frequency, frequency range, or frequency band that may be used for a particular purpose. The different forms of identification signals may also differ in their transmission power, which may refer to the power levels previously discussed and/or the magnitude of the transmission. The transmitted data may include a unique identifier but may also contain any other type of information. By way of example, a first form of identification signal 15104A and a second form of identification signal 15104B may have any number of the different characteristics listed above. For example, they may have different a repetition period, a frequency channel, a transmission power, and/or transmitted data associated with the identification signals sent.

Disclosed embodiments may also include at least one energy storage component electrically connected to the at least one antenna. The energy storage component may include any element or circuit enabled to accumulate energy. Non-limiting examples include capacitors, supercapacitors, and batteries. By way of example, the at least one energy storage component may include an electrical element or a circuit designed to receive energy from a source in one form (e.g., a waveform), store it locally in a second form (e.g., a voltage), and make it available for usage by other circuits, components, and/or devices electrically connected to it, either immediately or at a later time after receiving the energy. This may be accomplished, for example, with rectifying circuitry, or a rectenna. The antenna portion of a rectenna can be almost any form of antenna suitable for the frequency band of interest. Options include a monopole, dipole, or microstrip patch fabricated on printed-circuit board (PCB) inverted-F structures, arrays of such or other antenna elements, as well as many other antenna types, along with rectifying circuitry based on nonlinear rectifying devices (such as Schottky or IMPATT diodes, or diode-connected transistors). The antenna may be joined to the rectifying circuitry by means of impedance-matching circuitry and filters, such as lowpass filters, to block any harmonics generated by the diodes. In the context of electronic circuits, energy storage components may include capacitors, supercapacitors, batteries, or any other circuits, components, or devices capable of receiving energy, storing energy, and making energy available. By way of example, an energy storage component may include one or more of components depicted in FIGS. 2, 9, 10, and 15, such as energy storage circuit 2108, storage capacitor 10300, and/or energy storage component 15008. Any one or more of the components, for example, may be configured to receive energy from antennae 2112, 2114, and/or 15002A-C, store the received energy, and make the energy available to other components in tag 1100. In one example, energy received in one form may be stored in a second form and may be provided to components in a third form.

Disclosed embodiments may further include at least one energy storage component configured to store the energy received by the at least one antenna. For example, once any one or more of the antennae of a wireless identification tag receive energy in any frequency, the wireless identification tag may be configured such that the received energy is transferred to and received by the at least one energy storage component. By way of example, antenna 15002A may receive energy 15102A. The components of the wireless identification tag may be configured such that this energy is transferred to energy storage component 15008. Energy storage component may, for example, receive this energy and store the energy in another form in response thereto.

In some embodiments, at least one energy storage component may be configured to store energy received in the first frequency and the second frequency. For example, regardless of the incoming frequency of an input signal, the energy storage component, through association with appropriate circuitry or intermediate components, may receive and store associated energy. By way of example, antennae 15002A and 15002B may receive energy 15102A and 15102B in a first frequency and in a second frequency, respectively. The components of the wireless identification tag may be configured such that both energy 15102A and 15102B may be transferred to energy storage component 15008. Energy 15102A and 15102B may be received by the antennae in RF form and may be stored in the energy storage component 15008 as electrostatic charge, or as chemical bonds in a medium residing between two battery electrodes; both of these mechanisms may result in a voltage output of the energy storage component that can be used by other circuit and components in the wireless identification tag. The energy 15102A and 15102B may alternatively be stored in the energy storage component 15008 in other forms suitable for later use of the stored energy for powering various components of the wireless identification tag.

According to some disclosed embodiments an energy storage component may be configured to utilize the energy received by the at least one antenna to power the wireless identification tag. For example, the at least one energy storage component may be configured in such a manner that any component that requires power to operate may have access to the stored energy. The at least one energy storage component may, for example, be electrically connected to several of the components of the wireless identification tag in order to power the components by providing them with the stored energy. By way of example, energy storage component 15008 may be configured to power wireless identification tag 1100 by providing its stored energy to any one or more of the components of wireless identification tag 1100 (e.g., transmitters 15004A-C, circuit 15006), as necessary.

In some embodiments, the at least one energy storage component may include at least one capacitor. A capacitor may refer to ceramic capacitors, film capacitors, power film capacitors, electrolytic capacitors, supercapacitors, class X and class Y capacitors, other miscellaneous or variable capacitors, or any other device suitable for storing electrical energy in an electric field using two terminals. By way of example, energy storage circuit 2108 may contain at least one storage capacitor 10300.

Disclosed embodiments may also include at least one circuit configured to power the at least one transmitter using energy from the at least one capacitor in order to send the at least one identification signal. In some embodiments, powering the at least one transmitter may include receiving the energy stored in the capacitor and forwarding the energy to the transmitter, or any other suitable method for controlling the flow of energy in wireless identification tag 1100 so that the energy may be provided to at least one of transmitters 15004A-C. By way of example, capacitor 15100, which may be part of energy storage component 15008, may store energy received from any one of antennae 15002A-C. Capacitor 15100 may be used to power circuit 15006 as well as transmitters 15004A-C. Circuit 15006, for example, may include logic for determining an appropriate signal for transmission. Thus, in one example, the circuit 15006 may be both powered by capacitor 15100 and may regulate energy from the capacitor to an appropriate transmitter. While energy storage component 15008 is illustrated schematically with a single box designating capacitor 15100, it is to be appreciated that such a designation is intended to refer to one or more capacitors. For example, as is described in other portions of this disclosure, multiple capacitors having the same or differing capacitance may be employed.

According to disclosed embodiments, at least one circuit may be configured to cause the at least one transmitter to transmit in the second mode using energy received in at least one of the first frequency or the second frequency. For example, the at least one circuit may be configured to cause the at least one transmitter to transmit in the second mode using either or both of energy received in the first frequency and energy received in the second frequency. As illustrated in the example of FIG. 15, circuit 15006 may be configured to cause transmitter 15004B to transmit in a second mode, which may include transmitting signal 15104B. Circuit 15006 may be configured use energy stored in energy storage component 15008 that has accumulated energy 15102A received in a first frequency and/or energy 15102B received in the second frequency to power the transmission in the second mode. However, circuit 15006 may also cause transmitter 15004B to transmit in the second mode using just the energy 15102A received in the first frequency or just the energy 15102B received in the second frequency using, for example, multiple energy storage components (e.g., energy storage component 15008).

According to some disclosed embodiments, at least one antenna may be tuned to receive energy transmitted in a third frequency range. By way of example, wireless identification tag 1100 may include at least one antenna (e.g., antenna 15002C) that may be tuned to receive energy (e.g., energy 15102C) from a third energy range. The third frequency range may be lower than the first frequency range and the second frequency range. By way of example, if energy 15102A is in a first frequency band of around 900 MHz and if energy 15102B is in a second frequency band of about 2.4 GHz, then energy 15102C may be in a lower frequency band than that of 15102A and 15102B (i.e., energy 15102C will be in a lower frequency band than the frequency band of around 900 MHz of energy 15102A). In instances where a third frequency range is employed, at least one circuit may be configured to detect whether energy is received in the third frequency range. Detecting whether the energy is received in the third frequency may include discovering, identifying, or otherwise discerning the presence of a signal and/or energy in the third frequency in the environment of the wireless identification tag. For example, the circuit may be electrically connected to the at least one antenna, such that the at least one antenna may cause at least one form of input, stimulus, or trigger associated with received energy in the third frequency to be received by the at least one circuit. The circuit may be configured, upon receipt of at least one form of input, stimulus, or trigger, to determine whether the input, stimulus, or trigger is associated with energy associated with the third frequency. By way of example, circuit 15006 may be configured to detect the presence of energy 15102C associated with a third frequency, respectively, by detecting whether antenna 15002C has received the respective energy associated with the respective frequencies, based on at least on input, stimulus, or trigger received from said antennae. While three frequency ranges are illustrated by way of example, more than three frequency ranges may be employed consistent with this disclosure.

In some disclosed embodiments, at least one circuit may be configured to cause the at least one transmitter to operate in a third mode to send a third form of identification signal when the third frequency range is detected. A third mode may refer to a step where a third signal is sent, or may refer to differing operating characteristics. These characteristics may include communication medium, communication protocols, frequencies, frequency ranges, frequency bands, types of encryption, scrambling, and/or disguising, data content, timing of transmission, and/or any other distinguishable characteristic that may be associated with the identification signal to be transmitted. For example, the at least one circuit, upon detecting that energy has been received in the third frequency from the at least one antenna, may cause the at least one transmitter to operate in a third mode, wherein the third mode is associated with an identification signal having any one or more characteristics or combinations of characteristics as described above. In some embodiments, however, the third mode may also be associated with non-transmission, or the prevention of transmission, of an identification signal.

By way of example, circuit 15006 may detect energy 15102C received by one or more of antennae 15002A-C. In response to this detection, circuit 15006 may cause any one or more of transmitters 15004A-C to operate in a third mode. Operating in the third mode, for example, may include transmitting one or more of signals 15104A-C, wherein signals 15104A-C may have different characteristics such that each signal is distinguishable from one another in at least one aspect, and wherein one or more of signals 15104A-C may be different, either alone or in combination, from the signals 15104 A-C transmitted in the first mode and second modes.

Embodiments of the present disclosure may relate to methods, systems, devices, and computer readable media for a wireless identification tag with a response time that varies as a function of incoming signal frequency. For ease of discussion, a method is described below, with the understanding that aspects of the method apply equally to systems, devices, and computer readable media. For example, some aspects of such a method may occur electronically over a network that is either wired, wireless, or both. Other aspects of such a method may occur using non-electronic means. In the broadest sense, the method is not limited to particular physical and/or electronic instrumentalities, but rather may be accomplished using many differing instrumentalities.

Disclosed embodiments may include a wireless identification tag. Such a wireless identification tag may include any device, object, system, component or circuitry, that may wirelessly transmit identifying information. The identifying information may include, as described herein, any form of identification or characterizing information. For example, the tag may have a unique serial number or other identifying code that may be transmitted. Such identifying information may later be used to look up information about an object with which the tag is associated. Alternatively or additionally, the identifying information may include one or more characteristics of the object, such as the object's location, status, power reserve, history or any other information unique to the object or the tag.

According to some embodiments, the wireless identification tag may have a response time that varies as a function of incoming signal frequency. By way of non-limiting example, an incoming signal may propagate through Wi-Fi, cellular, mobile, RF and other forms of electromagnetic communication platforms, or other types of signals, such as acoustic, photonic, mechanical, magnetic, whether used for communication or for other purposes.

An incoming signal may be characterized by various parameters, including energy, power, phase, amplitude, modulation, waveform, frequency, and/or other signal characteristic that may be detected or measured. The frequency of the incoming signal may refer to a carrier frequency, one or more signal component frequencies, and/or a bit rate of an encoded signal contained therein.

A response time may be an elapsed duration between events, measured in seconds, milliseconds, microseconds, or other unit of time. For example, the response time may be a duration (or delay) between an event A and an event B. In some instances, the response time may be influenced by a processing time of the circuit architecture tag, which may introduce delays and propagation time. Consistent with some disclosed embodiments the response time may be part of the tag design. In such instances, a specific response time between two events may be programmed, configured, or otherwise implemented. For example, event B may be implemented to occur after a predetermined time (or delay) following an occurrence of event A. In various embodiments, the response time may be a function of the incoming signal frequency, i.e., the response time may be longer or shorter, depending on the incoming signal frequency. For example, different incoming frequencies may signal different levels of response urgency. In some embodiments, if a handheld device (e.g., a tablet or smartphone) is used to request information relating to a wireless identification tag, an immediate response may be required from the wireless communication system. On the other hand, an inventory management system operating in a different frequency to maintain an up-to-date inventory might be less urgent (i.e., the system may operate within design parameters if a response to a trigger is received within minutes rather than immediately.) Therefore, a system may be configured to operate such that the EAS gateway frequency (or any other frequency employed at an exit) triggers an immediate response from tags, while an inventory management signal (e.g., such as from a 90 MHz transmitter) might trigger a delayed response. This may occur as the result of the tag's software or hardware, that distinguishes incoming signals, and prioritizes responses. The tag, for example, may be designed to ignore all but one incoming inventory-management signals in a prescribed time period (or all but a few such signals) to prevent wasting tag energy and to prevent unnecessary return traffic.

FIG. 1 illustrates an exemplary embodiment of wireless identification tags 1100*a* and 1100*b* in an environment of an EAS gate 1110, 1112. One or both of tags 1100*a* and 1100*b* may be a wireless identification tag. As discussed above, tags 1100*a* and 1100*b* may be configured to receive wireless signals, such as signal 1118, and to produce or transmit signals in response, such as signals 1102*a* and 1102*b*. An external system or device, such as device 1124 may be configured to receive the signals transmitted by the tags.

In various embodiments, the wireless tag includes at least one antenna. An antenna may include at least one conductor, such as a wire. An antenna may also be a circuit used to transform a signal from a conducted input to a radiated output for transmission, and/or to transform a signal from a radiated input to a conducted output for reception. The radiated output or input may take the form of electromagnetic radiation, electric fields, or magnetic fields, and the conducted input or output may take the form of a time-varying voltage or current signal over a physical connection such as a metal wire, a printed circuit, or other conductors. In some embodiments, the radiated form may be acoustic, such as sound energy. In some embodiments, the radiated form may be optical, such as visible light.

The at least one antenna may be passive, requiring no external energy for operation, other than the energy in signal to be transmitted or received. Alternatively, the at least one antenna may be active, which may require a power source such as a battery. When functioning in a transmission mode, the at least one antenna may be powered by electronics within the tag itself, such as one or more capacitors as described herein. In some embodiments, a passive antenna may be implemented as a series of conductors, which may be coupled to other portions of circuits which may be present. Passive antennae may be printed on a PCB (printed circuit board), with printed wires or other conductive paths coupling the antenna to the other portion of the circuit. In some embodiments, a passive antenna may be coupled to the other portion of the circuit wirelessly, such as through electrical or magnetic coupling.

Some embodiments of the at least one antenna may include an isotropic type antenna, dipole type antenna, monopole type antenna, antenna array, loop type antenna, aperture type antenna, traveling-wave type antenna, and other device capable of receiving or transmitting signals or energy.

As discussed above, the at least one antenna may be tuned to energy transmitted at a first frequency within a frequency band around 900 MHz and at a second frequency within a frequency band around 2.4 GHz. For example, the frequency band around 900 MHz (i.e., the first frequency band) may be 900 MHz WW ISM. Similarly, the frequency and around 2.4 GHz (i.e., the second frequency band) may be 2.4 GHz WW ISM. The first antenna and the second antenna may be separate structures, or they may be combined in a single antenna structure. In a non-limiting example illustrated in FIG. 9 and FIG. 10, the first antenna may be 900 MHz antenna 2112, and the second antenna may be 2.4 GHz antenna 2114.

Various embodiments of the present disclosure may include at least one transmitter. A transmitter may be any component, group of components, or circuitry capable of sending a signal over a communication medium. The communication may take the form, for example, of Wi-Fi, Bluetooth, cellular communication, Ethernet communication or any other standards-based or proprietary protocol. In some embodiments, a transmitter may encompass one or more of an oscillator, modulator, amplifier and/or frequency tuner.

The transmitter may be designed to send signals over the communication medium at a certain magnitude, which may define parameters such as signal range, signal-to-noise ratio (SNR), interference properties, and/or other signal properties. In the context of wireless communication, the magnitude may be measured in units of power, such as Watts or dBW (decibel-Watts or dB-Watts). The power level at which the transmitter transmits may be a measurement of power immediately at the output of the transmitter during active transmission. In some embodiments, the transmitter may be designed to have an adjustable power level, such that in response to certain inputs, the transmitter may transmit a signal at one or more different power levels.

In a non-limiting example illustrated in FIG. 9, the transmitter may include beacon 2104, which may include beacon controller 9030 and beacon transmitter 9032. Beacon 2104 may be commanded by top level controller 9020, which may output to transmission control interface parameters such as power, timing, frequency and/or transmission data, which may be received by beacon controller 9030. Based on the transmission control parameters, beacon controller 9030 may instruct beacon transmitter 9032 to transmit as commanded. In some embodiments, there may be further provided switch 9034 controlled by beacon controller 9030. Through switch control generated by beacon controller 9030, switch 9034 may alternate between a transmission mode, during which 2.4 GHz antenna 2114 is coupled to beacon transmitter 9032, and a receiving mode, during which 2.4 GHz antenna 2114 is coupled to 2.4 GHz harvester 9014.

In yet another non-limiting example illustrated in FIG. 10, beacon transmitter 9032 may include a PLL 10110, which may be coupled to crystal oscillator 10022 having crystal 10020, and beacon controller 9030; VCO 10112 coupled to PLL 10110; and VGA 10114 coupled to receive inputs from VCO 10112 and beacon controller 9030, and to provide output to 2.4 GHz antenna 2114 through switch 9034. In some embodiments, VCO 10112 may provide modulation of signals to variable gain amplifier (VGA) 10114 based on the output of phase-locked loop (PLL) 10110. In some embodiments, PLL 10110 may provide phase-locking for reference clock from oscillator 10022 to the rest of beacon transmitter 9032 (as illustrated in FIG. 9). In some embodiments, beacon controller 9030 receives a reference clock input from oscillator 10022, and slow clock from real time clock 10022. In turn, beacon controller 9030 may provide a reference clock control to oscillator 10022. In some embodiments, beacon controller 9030 provides frequency control and transmission data to PLL 10110, and provides power control to VGA 10114.

Various embodiments of the present disclosure may include at least one circuit configured to detect whether energy is received in the first frequency or the second frequency. A circuit, as used in the present disclosure, may refer to a component, or a combination of components, elements, and/or devices, which may be electronically coupled by wired or wireless connections. In some embodiments, a circuit may be implemented as part of a silicon chip, as part of a printed-circuit board, as part of a connectorized system or as a combination of any of the above, connected in a manner enabling the performance of a desired function or reaction as a response to some inputs, stimuli and/or triggers, generated either internally or externally. A desired function or reaction includes, but not limited to, control of other circuits, generating visual, audible, or otherwise communicable alerts or signals, causing a transmission, and/or performing any other operation. For example, the components, elements, and/or devices may include, but are not limited to, resistors, capacitors, inductors, conductors, transistors, diodes, transmission lines, inverters, buffers, logic gates, latches, flip-flops, amplifiers, comparators, voltage sources, current sources, switches, and/or other electrical devices. Inputs, stimuli and/or triggers may include, but are not limited to, a voltage level, a voltage level change, a current level, a current level change, a frequency, amplitude or phase change of a received signal, a digital input, a digital pulse, a control word, and/or other signals in various forms of energy.

In a non-limiting example illustrated in FIG. 9, the at least one circuit may include multi-source harvester 2102, gate detection circuit 2106, and memory 9022 (or a portion of the foregoing), which may also be coupled to top level controller 9020, which may also constitute the at least one circuit. In some embodiments, multi-source harvester 2102 may include 2.4 GHz harvester 9014, which may be coupled to 2.4 GHz antenna 2114 through switch 9034; 900 MHz harvester 9012, which may be coupled to 900 MHz antenna 2112; and power manager 9010, which may be coupled to top level controller 9020. It should be noted that each of the forgoing components may be made up of multiple circuits, and therefore reference to a circuit may relate to a single component or portion thereof.

In some embodiments, the at least one circuit may detect whether energy is received in the first frequency or the second frequency based on whether the energy is received by the first antenna or the second antenna. The first frequency and the second frequency may be spaced apart with sufficient separation in the frequency spectrum, such that an antenna configured to receive energy at the first frequency is unlikely to be excited by an energy at the second frequency, and that an antenna configured to receive energy at the second frequency is unlikely to be excited by an energy at the first frequency. For example, when the first antenna is tuned to receive energy transmitted at a frequency within a first frequency range of 900 MHz WW ISM, and the second antenna is tuned to receive energy transmitted at a frequency within a second frequency range of 2.4 GHz WW ISM, there is unlikely to be cross-interference between energies at these different frequencies. The at least one circuit may determine that the energy received by the first antenna is in the first frequency range, and the energy received by the second antenna is at the second frequency range.

In some embodiments, the at least one circuit may perform signal processing on the received energy. Signal processing may be carried out by analog components, such as a combination of amplifiers, filters, and signal detectors. In some other embodiments, digital signal processors of various design may perform signal processing on the received energy. The received energy may be decomposed into its different frequency components by various signal processing methods, and the at least one circuit may determine whether the received energy is at the first frequency or the second frequency based on analyzing the different frequency components of the received energy. Signal processing methods such Fourier's transforms, and/or fast Fourier transforms (FFT), may be employed with some embodiments to decompose the received energy into frequency components. Other methods, such as filters, matched filters, and frequency discriminators may additionally or alternatively be used, either individually or in combination. The at least one circuit may determine that when the received energy has frequency components with higher strength around the first frequency than around the second frequency, the energy may be at the first frequency. Similarly, the at least one circuit may determine that when the received energy has frequency components with higher strength around the second frequency than around the first frequency, the energy may be at the second frequency.

In some embodiments, the received energy may be modulated to contain information, such as a codes, such as one code to indicate that the energy is at the first frequency, and a different code to indicate that the energy is at the second frequency. The at least one circuit may determine whether the energy is at the first frequency or the second frequency based on the codes.

In a non-limiting example illustrated in FIG. 9, power manager 9010 may determine whether received energy is at 900 MHz or 2.4 GHz. Power manager 9010 may receive inputs from 2.4 GHz harvester 9014, 900 MHz harvester 9012, or both, and provide one of 900 MHz detection and 2.4 GHz detection to top level controller 9020.

Consistent with some embodiments the at least one circuit may be configured to cause the at least one transmitter to transmit an immediate response when the second frequency is detected. An immediate response may be an action performed or directed by the at least one circuit, and may include the generation of an input or trigger. Due to design parameters or inherent delay in circuitry, the immediate response may not be instantaneous. There may be a time interval between detection of the second frequency and the response. A time interval may be a period of time that may be measured between the occurrence of two events in the system. The two events may be, for example, an input, stimulus or trigger into a circuit and the output or action performed by the circuit, or two occurrences of an input, stimulus, or trigger, or two occurrences of an output or action of the same circuit or of different circuits. In some embodiments, when measuring time intervals between repeating occurrences of the same event, whether such events may be inputs or outputs, an average time interval may be referred to as the periodicity of the events and to the deviation from the average time interval as the variance in the periodicity. For example, in such cases where periodicity occurs, the frequency of the events may be calculated as the inverse of the average time interval between events, and the duty cycle of the events as the ratio between the average time length of each event and the average time interval between events.

The time interval between the input or trigger and the action may be a minimum time interval, may result from the internal structure of the at least one circuit and inherent delays, and not result from added delays, pauses, and/or functional wait periods. Such inherent delays may be the result of finite rise-time or fall-time of internal functions, processing time limited by clock speeds, delays caused by the speed of communication between different parts of the circuit, and other time lagging present not by design. In some embodiments, for example, an immediate response may be an output of an inverter changing from logic '1' to logic '0' in response to its input changing from logic '0' to logic '1', or a comparator changing its output in response to a change in the direction of its inputs.

In various embodiments, at least one circuit may be configured to cause the at least one transmitter to transmit the immediate response when the received energy has been determined to have been received in the second frequency. If, for example, the second frequency is in the 2.4 GHz range, energy in that range may be received by 2.4 GHz antenna 2114, which in turn may provide the receive energy to 2.4 GHz harvester 9014. 2.4 GHz harvester 9014 may then provide an indication to power manager 10112 that energy is received, which may enable power manager 9010 to determine that a 2.4 GHz frequency signal was received. Top level controller 9020 may determine that the second frequency is detected when it receives a 2.4 GHz detection signal from power manager 9010. Then, top level controller 9020 may configure beacon controller 9030 through transmission control interface to transmit an immediate response.

In some embodiments, as illustrated in FIG. 10, beacon controller 9030 may provide frequency control and transmission data to PLL 10110 to cause transmission of the immediate response.

In some embodiments of the present disclosure, the at least one circuit is configured to transmit a delayed response, having a longer delay compared to the immediate response, when the first frequency is detected. A delayed response occurs when a more than a minimum or inherent time interval is introduced between the trigger and the resulting action. The minimum time interval may be a function of the internal structure of the circuit and its inherent delay, as previously described. The delayed time interval between the trigger and the action may be due to delays, pauses, and/or wait periods incorporated into the functionality of the design to achieve a desired purpose. For example, the logic built into a tag may recognize that certain frequencies require a more immediate response than others. For example, when employed in a retail setting, the frequency of a signal at either a checkout counter or a scan by a customer might require an immediate response, because there is urgency in completing a financial transaction or responding to customer requests. In contrast, when product is sitting idly on a shelf and the system listens for transmissions from tags for inventory purposes, an immediate response may not be particularly urgent. Because differing frequencies are employed in these differing scenarios, the detection of the incoming frequency may determine the immediacy of the need for response, and hence the response time.

The first frequency for triggering the delayed response may, for example, be in 900 MHz range, received by 900

MHz antenna 2112, which in turn provides the received energy to 900 MHz harvester 9012. 900 MHz harvester 9012 may then provide an indication to power manager 10112 that energy is received, thereby enabling power manager 9010 to determine that 900 MHz frequency is received. Top level controller 9020 may determine that the first frequency is detected when it receives a 900 MHz detection signal from power manager 9010. Top level controller 9020 may then direct beacon controller 9030 through transmission control interface signals to transmit the delayed response.

In some embodiments, as illustrated in FIG. 10, beacon controller 9030 may provide frequency control and data transmission to PLL 10110 to transmit the delayed response.

In some embodiments, as described earlier, the immediate response and the delayed response may correspond to different modes of operation of the wireless tag. For example, the wireless tag may carry out different functions, or carry same functions with different levels of intensity depending on the frequency of the received signal. In some embodiments, the different functions may include, but are not limited to, employing different processing protocols or different algorithms; transmitting different signals; transmitting signals with introduced periods of delay; selecting from differing types or quantities of data transmitted; selecting between different power intensities or processing speeds; or any other difference depending on the particular implementation.

In a non-limiting example, the immediate response may correspond to a user-excitable mode (e.g., an IoT mode), and the delayed response may correspond to an infrastructure-excitable mode (e.g., a store mode). The user-excitable mode may include instances when the tag is intentionally scanned by individuals using devices such as mobile phones, tablets, wearables, scanners or other mobile devices, and where a long response time may be undesirable. In the context of an establishment that maintains an inventory of goods such as a warehouse or retail establishment, in user-excitable mode, employees of the establishment may scan a tag when an item is being processed, such as when the item is received, unpacked, placed on a rack, shelves, or display, or checked out at a payment station or register. Alternatively or additionally, the user-excitable mode may also include instances when the tag is scanned by customers at the establishment. For example, customers (or other individuals) using mobile devices, may scan the tag in order to access information about the tagged item. The information may include, by way of non-limiting examples, a link to a web portal associated with the item (e.g., a website associated with the brand, store, manufacturer, or current owner), information regarding the specific item (e.g., laundry instructions for cloths, manuals for electronic devices, usage instructions for medications, recommended recipes for food items, etc.), or advertisements for related products or services. The information might also enable actions through the individual's social media accounts. In some embodiments, the user-excitable mode may be associated with applications installable on mobile devices, such that a scan of the tag causes access to an installed application that either provides information directly, or provides information through access to an associated website.

The infrastructure-excitable mode may include instances when the tag is scanned by devices that may form a part of an establishment's infrastructure, such as RFD. Wi-Fi, or Bluetooth exciters located about the establishment. In the infrastructure-excitable mode, inventory information may be automatically updated based on the responses from the tag. Additionally, the location of the item within the store may be determined based the responses from the tag. Since there may not be time urgency in receiving these responses, the tag may transmit the delayed response in the infrastructure-excitable mode.

In an egress mode (e.g., gate mode), the tag may respond immediately when excited by infrastructure near an egress such as a store exit, where it may be important to immediately identify objects leaving an establishment or other defined space.

While the forgoing tri-mode example is provided in the context of establishments such as stores and warehouses, the differing modes of operation may similarly apply in differing applications. By way of other non-limiting examples, in a home or in an appliance, inventories of items such as food, supplies, or clothing might occur in infrastructure-excitable mode, user scans of such items might occur in user-excitable mode, and removal of items from an appliance, pantry, closet, or other defined space may be detected in egress mode. In addition, depending on implementation, additional or fewer modes may be employed.

As illustrated in FIG. 10, top level controller 9020 may further include one or modules to perform operations of the user-excitable mode and the infrastructure-excitable mode, respectively. For example, top level controller 9020 may include user-excitable mode FSM 10004 to command or control the immediate response, and infrastructure-excitable mode FSM 10002 to command or control the delayed response.

At least one energy storage component may be electrically connected to the at least one antenna, the at least one energy storage component being configured to store the energy received by the at least one antenna. This connection may occur through wiring or wirelessly, through electric, magnetic, or electromagnetic coupling. In some embodiments, the energy received by the antenna may be converted into voltages and currents, may also be stored as electric energy.

In a non-limiting embodiment illustrated in FIG. 10, energy storage circuit 2108 may be coupled to power manager 9010, which may be in turn coupled to 900 MHz antenna 2112 and 2.4 GHz antenna 2114. Power manager 9010 may provide energy harvested by multi-source harvester 2102 to energy storage circuit 2108, to be stored in storage capacitor 9126.

In some embodiments, at least one energy storage component may be configured to utilize the energy received by the at least one antenna to power the wireless identification tag. For example, the at least one energy storage component may be connected, either directly, or indirectly, to different components of the at least one circuit. An indirect connection may be a connection, such as a wired connection, between two point, with other components disposed in between the two points. In some embodiments, in absence a chemical energy source such as a battery or a fuel cell, and with no external connection, the at least one circuit may be powered by the energy stored in the at least one energy storage device.

As illustrated in FIG. 10, power manager 9010 may receive energy from storage capacitor 9126. Power manager 9010 may in turn be connected to a voltage supply signal (VDD), and may provide energy to rest of the circuit components.

In some embodiments the at least one energy storage component may include at least one capacitor configured to power the wireless identification tag independently of received power. For example, at least one capacitor may be connected either directly or indirectly to the various other circuit components. In some embodiments, the at least one capacitor may store energy that can be supplied to the wireless identification tag in absence of received power. For example, even when energy received from an antenna is unable to provide the immediate power needed for a specific function, on board energy stored in one or more capacitors may be used to power the tag.

In some embodiments, storage capacitor 10300 may provide energy to power manager 9010, which in turn may be coupled to the VDD supply voltage of tag 1100. When, for example, storage capacitor 10300 has stored energy, tag 1100 may be powered by storage capacitor 10300 even in absence of any received energy from 900 MHz antenna 2112 or 2.4 GHz antenna 2114.

By way of a few non-limiting examples, the immediate response may be set to occur less than 10 seconds after the second frequency is detected, or may be set to occur at a time greater than the inherent circuit delay, but less than or equal to a predetermined value. The predetermined value may be, for example, 10 seconds. In some embodiments, the delayed response may be set to occur seconds, minutes, hours, or even days after the first frequency is detected.

In some embodiments, the at least one circuit may be configured to implement a transmission rule. The transmission rule, may be a procedure, implemented as part of the at least one circuit used to control the transmitter to determine, based on triggers, inputs and/or stimuli received by the at least one circuit, properties of the transmitter's operation. The properties may include data content of a transmitted signal, a power level, a communication protocol used for transmission, frequency bands used for transmission, the timing of the transmission, a determination of whether to transmit or not to transmit, or any other characteristic or decision regarding a transmission. Examples of such procedures include a decision to send a data packet over Wi-Fi protocol if an indication was received that Wi-Fi communication was detected by the at least one circuit, and to send the same data packet over Bluetooth protocol if an indication was received that Bluetooth communication was detected by the at least one circuit. In some embodiments, other such procedures may dictate the power level used in transmission based on a desired range for the packet, or the data content of the packet based on intended recipients or on the set of inputs, triggers or stimuli that serve as the basis for the transmission.

In some embodiments, the transmission rule may be implemented by beacon controller 9030 and provided to PLL 10110, as illustrated in FIG. 10. Alternatively or additionally, the transmission rule may be implemented by top level controller 9020 and provided to beacon controller 9030.

The transmission rule may command the at least one circuit to cause the transmitter to delay sending at least one of the immediate response or the delayed response, even when sufficient energy for transmission of the at least one response is aggregated and stored in an energy storage component. This may occur for example, as the result of proactivity built into the design, to enable the tag to preserve energy for other activities that may occur in the future. For example, to prevent theft or to otherwise manage inventory in a retail or other establishment it may be beneficial for a tag to retain enough energy so that in the future, if an individual leaves the establishment with an item containing the tag, the tag will retain enough energy to transmit its identity to a receiver at the establishment's exit. Depending on particular design parameters, the tag may be configured to retain even more energy for additional eventualities. Thus, if inventory management infrastructure in the establishment sends a signal to the tag to transmit its identity, and a response would otherwise cause the tag to retain energy below a threshold, the tag may be configured either not to respond or to wait to respond until after sufficient energy is collected and stored. Of course, this feature has value in many use cases. In a system associated with an appliance, storage facility, or other monitored space, tags may be designed to ensure that they have enough energy on board at all times to transmit their identity when they leave a monitored space, area, or region. A predetermined time interval for a delay in transmission or other energy usage may be determined at the time of design, manufacture, installation, initialization, or any time prior to implementing the transmission rule.

Power consumed by the at least one circuit may be integrated over the duration of the performance of a particular action, resulting in a total amount of energy measured in Joules. This total amount of energy may be the energy required by the circuit to perform the action. For example, a circuit consuming 10 mW (ten milli-watts) of power for a duration of 1 ms (one milli-second) may be required have 10 µJ (ten micro-Joules) of energy to transmit a data packet. In some cases, the energy sufficient to perform a certain action may depend on the characteristics of the action, such characteristics may be controlled by inputs, triggers, and/or stimuli received by the at least one circuit. For example, a transmitter transmitting a longer or shorter signal at a fixed power consumption may require more or less energy, respectively, due to the multiplication of power and time. In another example, to avoid surpassing particular power usage limits, a tag's internal logic may regulate operating parameters, such as transmitter modulation, data content, signal transmission duration, signal strength, or other parameters influencing energy consumption.

In order to ensure proper power management, energy stored in in the at least one circuit may be monitored. For example, when energy is stored in the form of an electrostatic charge in a capacitor and is provided to other components or circuits (see above) in the form of DC voltage, voltage measurement may provide an accurate estimation of the energy stored in the capacitor. When energy is stored in the form of chemical bonds in a battery, a voltage measurement at several load conditions may determine a level of available stored energy.

In some embodiments, the transmission rule may define a time interval between at least one of two consecutive immediate responses, or two consecutive delayed responses. Thus, a delay may be interposed between any two consecutive responses, and the delay may beset based on the particular use case or on particular design parameters.

In some embodiments, the transmission rule may be configured to randomly select a time interval between two consecutive responses. By selecting a random delay, many tags in an area that receive the same trigger signal will transmit a response at different times. This can help ensure that a receiver configured to receive tag transmissions is not overwhelmed with simultaneous responses.

In some embodiments, an antenna may be tuned to receive energy at a third frequency, which may be different from first and second frequencies that the antenna is also tuned to receive. Additional frequencies may permit the tag to harvest energy from more sources. And each additional frequency may enable an additional level of logic. For example, the tag may be configured to provide differing responses to each differing frequency received. Thus, for example, in some embodiments, the at least one circuit may be further configured to detect whether energy is received in the third frequency. The method of determining whether energy is received in the third frequency may be similar to the method previously described for determining whether energy is received in the first or second frequency. Detecting the incoming frequency of energy may permit the tag to provide a response unique to the frequency of the incoming energy.

In a non-limiting embodiment illustrated in FIG. 10, EAS coil 2110 may be configured to receive energy at the third frequency, gate detection circuit 2106 may be coupled to EAS coil 2110, and may determine that EAS coil 2110 receives energy in the third frequency. Gate detection circuit 2106 may provide EAS detection to top level controller 9020, enabling beacon controller 9030 to generate the third response (in this instance, through TX Ctrl. I/F, as depicted by the transmission arrow between top level controller 9020 and beacon controller 9030.

In some embodiments, the third response may correspond to a mode of operation of the wireless tag different from the previously described immediate and delayed response modes. In a non-limiting example, the third response may correspond to a gate mode. The gate mode may include instances the tag interacts with certain infrastructures of the establishment, such as an EAS gate. For example, when the tag detects that it is being removed from a monitored area based on an incoming signal frequency associated with a gate. Such a signal my trigger the highest priority response of the tag, overriding any other priorities of the tag. This may be accomplished, for example, through a structure such as illustrated in FIG. 10, where top level controller 9020 may include one or modules to perform gate mode operations such as gate mode FSM 10006 to command or control the gate response.

In some embodiments, the at least one circuit may be further configured to cause the at least one transmitter to transmit a third response, different from the immediate response and the delayed response, when the third frequency is detected. In some embodiments, the third response may be delayed by a time interval different from the time interval of the immediate response and the delayed response. Alternatively, or in addition, the third response may have a different transmission power, phase, amplitude, frequency or may be encoded with a different signal, or it may be repeated a different number of times than the first and second response. As discussed previously, the ability of the tag to detect additional frequencies, like the third frequency, may add additional logic to the tag and/or may permit the tag to harvest energy from additional sources. In a non-limiting embodiment illustrated in FIG. 10, beacon controller 9030 may provide frequency control signals and transmission data to PLL 10110 to transmit the third response.

In some embodiments, a signal associated with the third response differs from signals associated with the immediate response and delayed response. For example, a signal associated with the third response may differ from the other signals in at least one of repetition period and a time interval between two consecutive responses. In some embodiments, the third frequency may be lower than the first frequency and the second frequency. For example, the third frequency may be part of a frequency band beneath the other frequencies.

In some embodiments, the at least one circuit may be configured to monitor energy stored in the energy storage component. When energy is stored in an energy storage component, it may be desirable to determine an amount of stored energy in the energy storage component.

Various parameters of the energy storage component may provide indication as to the amount of energy being stored. For example, in a capacitive element such as a capacitor, the amount of energy stored is proportional to a number charges stored. A voltage level of a capacitive element may provide indication of the number of charges stored, and hence provide indication of an amount of energy stored. In some embodiments, a voltage detector may be provided to monitor a voltage level of the energy storage device. In some embodiments, when the energy stored in the form of chemical bonds in a battery, a voltage measurement at several load conditions may determine the amount of energy stored. In yet some other embodiments, when energy may be stored as other forms of energy, monitoring may include measuring a speed of a flywheel to determine the amount of kinetic energy stored, measuring the temperature of a thermal storage device to determine the amount of thermal energy stored, or measuring a length of a loaded spring to determine the amount of potential energy stored.

In a non-limiting embodiment illustrated in FIG. 10, power manager 9010 may monitor an energy level of storage capacitor 10300. For example, power manager 9010 may measure a voltage level of storage capacitor 10300.

In some embodiments, the at least one circuit is configured to prevent the at least one transmitter from transmitting the delayed response when the energy stored in the energy storage component is determined to be insufficient to transmit the immediate response when the second frequency is detected. As discussed previously, since signals triggering immediate responses may take priority over those triggering delayed responses, before a delayed response occurs, the tag may first check whether sufficient energy is in storage to complete an immediate response that may subsequently be triggered. If insufficient energy is maintained in storage, despite a call for a delayed response, the delayed response may be prevented. Whether the energy stored in the energy storage component is insufficient may be determined by a comparison of an amount of energy obtained from the monitoring, and a stored or calculated indicator of an amount of energy that might be needed to transmit a future call for an immediate response. In a non-limiting embodiment illustrated in FIG. 10, power manager 9010 may monitor an energy level of storage capacitor 10300. The result of the monitoring may be provided to top level controller 9020, where a it may be determined whether sufficient energy is present for beacon controller 9030 to transmit an immediate signal.

In some embodiments, the at least one circuit is configured to monitor energy stored in the energy storage component, and cause, in response to detection of the second frequency, the at least one transmitter to transmit a signal requiring less energy to transmit than an amount of energy required for the immediate response, when the energy stored in the energy storage component is determined to be insufficient to transmit a normal immediate response. For example, if the tag ends up in a state requiring an immediate response and yet insufficient power is required to send the typical immediate response, the tag may transmit a truncated or alternative version of the typical immediate response in order to avoid a situation where no response is sent. A truncated version may contain just key information, or may occur at a power level or duration lower than the typical immediate response. An alternative signal may be a form of distress signal indicating that the tag is running out of power, requiring, for example, manual intervention. In such a situation, the alternative signal may trigger an alert to prompt an attendant to perform a manual inspection. Such a manual inspection may involve using a hand-held exciter adjacent a suspect parcel or item to power the tag and obtain a normal tag reading. Thus, the tag may be configured to transmit a normal immediate response when sufficient on-board power exists, and a low-power immediate response, when the power is depleted beneath a threshold. The low-power immediate response may require less energy for transmission than the normal immediate response. For related reasons, the at least one circuit may monitor energy stored in the energy storage component, and prevent the at least one transmitter from transmitting the immediate response when the energy stored in the energy storage component is determined to be below a predetermined energy level.

In some embodiments, a signal associated with the delayed response differs from a signal associated with the immediate response in at least one of a repetition period, a frequency channel, a transmission power, or transmitted data associated with the response sent. A repetition period may be a time between two actions or responses. For repeated occurrence of a same event, whether such events are inputs or outputs, an average time interval, or periodicity of the events may be considered the repetition period. The frequency channel may be a carrier frequency or frequency band, and transmission power may be the power consumed by the at least one transmitter, or a power contained in a transmission of the immediate response. The power contained in the transmission of the immediate response may be characterized by its energy density, magnitude, or amplitude of the transmission.

The at least one of the delayed response or the immediate response may include unique identifier data of the wireless identification tag. The unique identifier data may be a number, string, code or other form of information capable of uniquely identifying a tag. In some embodiments, no single tag may be associated with the same unique identifier as any other tag, such that any single tag has only one unique identifier that is not associated with any other tag. This architecture permits tagged objects to be traced not only through common physical characteristics, but also through identification of non-physical characteristics such as the specific data of manufacture, date of receipt, manufacturer, transporter, or any other characterizing information that my otherwise not be discernable simply by viewing the tagged product. Unique identifiers may include serial numbers, unique EPC codes, and database entries (where each database entry represents a single entity, and all relevant entities are represented by exactly one entry in the database). In some embodiments, a specific wireless identification tag may have its own unique identifier data.

As illustrated in FIG. 10, unique identifier data may be stored in tag ID ROM 10010, which may be coupled to, and retrievable by top level controller 9020, top level controller 9020 may provide the unique identifier data to beacon controller 9030 for transmission either directly or in a modified form.

Figure 16:
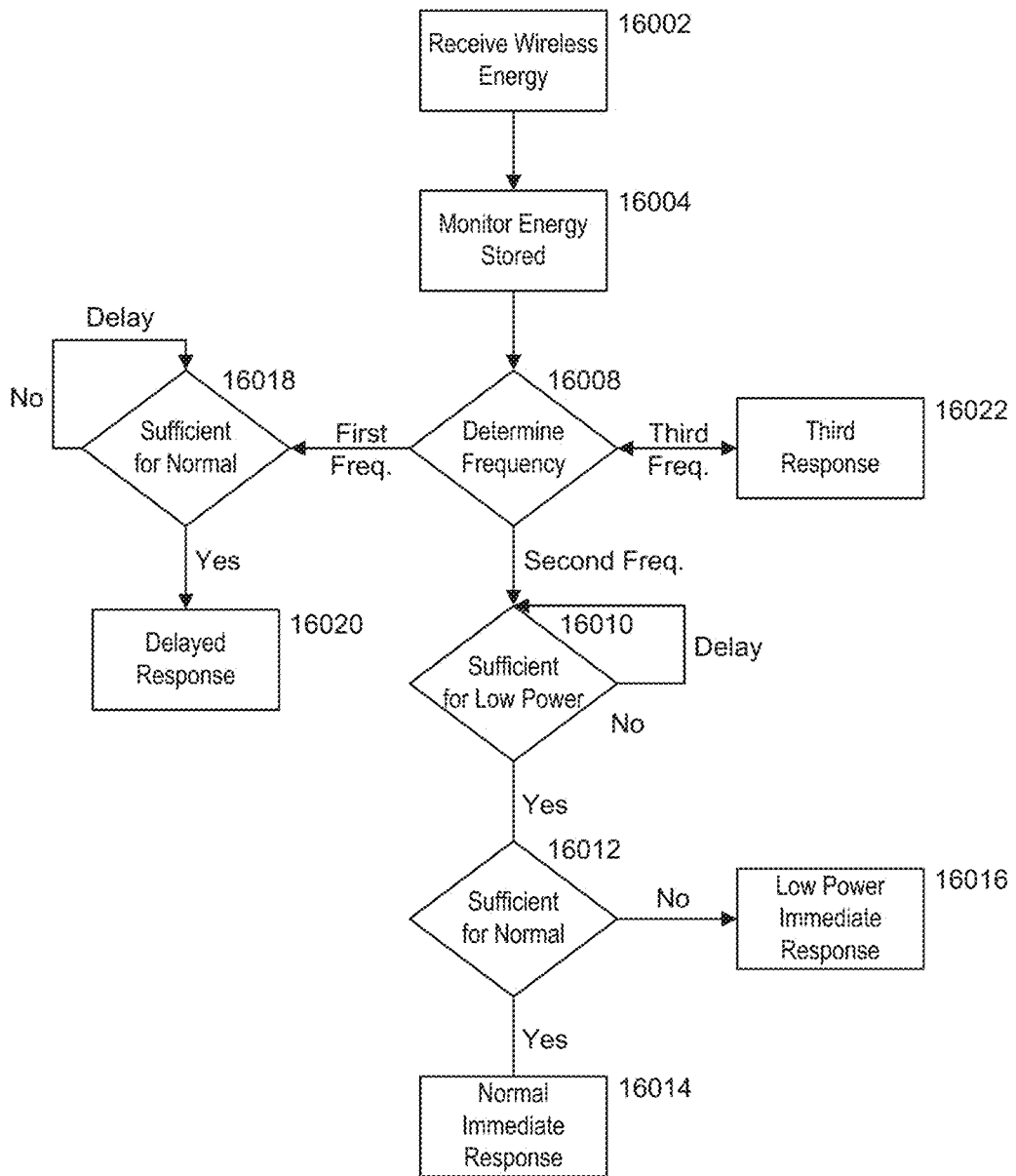
FIG. 16 is a flow chart illustrating an exemplary embodiment of an aspect of the operations of a wireless identification tag, consistent with some disclosed embodiments.

FIG. 16 is a flow chart illustrating an example of operations, which may be carried out by at least one circuit, including a transmission rule of the wireless identification tag. In step 16002, the wireless tag may receive energy. In some embodiments, the received energy may be wireless energy received by the at least one antenna. In step 16004, stored energy may be monitored. In some embodiments, the stored energy may be stored in the energy storage component, which may include a capacitor. The stored energy may be re-charged as energy is received. In step 16006, a frequency of the received energy may be determined. In some embodiments, the at least one circuit may determine whether the received energy is at the first, second or third frequency.

In step 16008, in response to a determination at step 16006 that the received energy is at the second frequency, the at least one circuit, based on monitoring of the stored energy, determines whether sufficient energy is present to the energy storage component. If the determination is No, i.e., the stored energy is below a predetermined energy level, hence not sufficient, further action is not taken. In some embodiments, a delay results. If the determination is Yes, i.e., the stored energy is above a predetermined energy level, hence sufficient, the process may proceed to Step 16010. In some embodiments, energy may be considered sufficient if a sufficient amount exists to output a low-power immediate response.

In step 16008, the at least one circuit may determine if the energy stored in the energy storage component is sufficient to transmit a normal immediate response. If the determination is No in step 16008, a signal requiring less energy, i.e., the low-power immediate response is transmitted by the at least one transmitter in step 16014. If the determination is Yes, a Normal Immediate response is transmitted by the at least one transmitter in step 16012.

In some embodiments, in connection with step 16012, the at least one circuit may be configured to cause the transmitter to send the immediate response in a predetermined time interval. In some embodiments, the predetermined time interval may be less than 10 seconds (as one example) after the second frequency is detected in step 16006.

In step 16016, in response to a determination at step 16006 that the received energy is at the first frequency, the at least one circuit, based on monitoring of the stored energy, may determine whether sufficient energy is present in the energy storage component. If the determination is No, i.e., the stored energy is below a predetermined energy level, hence not sufficient, further action is not taken. In some embodiments, a delay results. If the determination is Yes, i.e., the stored energy is above a predetermined energy level, hence sufficient, the process proceeds to step 16018. In some embodiments, the sufficient energy may be a quantity of energy required to transmit the Normal Immediate Response.

In step 16018, a delayed response may be transmitted by the at least one transmitter, provided sufficient energy is available for transmission. In some embodiments, the at least one circuit is configured to cause the transmitter to send the delayed response in a predetermined time interval. Such a predetermined time interval may be within a range of milliseconds, seconds, minutes, hours, or even days, depending on design parameters.

In step 16020, in response to a determination at step 16006 that the received energy is at the third frequency, the third response may be transmitted by the at least one transmitter, provided sufficient energy is available for transmission.

Embodiments of the present disclosure may relate to methods, systems, devices, and computer readable media associated with a wireless identification tag triggerable by an Electronic Article Surveillance (EAS) gate while remaining invisible to the EAS gate. For ease of discussion, in some instances related embodiments are described below in connection with a system or method with the understanding that the disclosed aspects of the system and method apply equally to each other as well as devices, and computer readable media. Some aspects of a related method may occur electronically over a network that is either wired, wireless, or both. Other aspects of such a method may occur using non-electronic means. In the broadest sense, the methods and computer readable media are not limited to particular physical and/or electronic instrumentalities, but rather may be accomplished using many differing instrumentalities.

Disclosed embodiments may involve an EAS gate. EAS gates are often incorporated in surveillance or theft-deterrent systems used to detect an article as the article passes through a detection system in, for example, a retail store, a library, a museum, a warehouse, an entertainment facility, confidential and proprietary file storing facilities, a sports arena, or any other space where it may be desired to monitor the passage of objects. The detection may be used to alert staff members that an unauthorized removal of items is being attempted. In some embodiments, an EAS gate may include one pedestal, two pedestals, three pedestals, or any number of pedestals, based on factors including, but not limited to, a distance range, space availability, or customer traffic. If an EAS gate includes more than one pedestal, the pedestals may be spaced a distance apart to allow patrons to enter and exit the facility with minimum hindrance, while the pedestals are within a close enough range of each other to be triggered by a passing tagged object.

In some embodiments, EAS systems may include concealed EAS gates, electro-magnetic EAS components, acousto-magnetic (AM) components, radio-frequency (RF) components, or microwave (MW) components, among other detection components. Concealed EAS gates may include one or more pedestals installed such that they are not visible and cause minimal hindrance to the patrons. For example, a pedestal may be installed below the floor, above the ceiling, or behind the walls. Concealed EAS systems may be used, for example, to enhance the effectiveness of surveillance, enhance the shopping experience for customers, or enhance any other facility where the monitoring of objects is desired.

By way of example, FIG. 1 illustrates an exemplary embodiment of a wireless identification tag in an environment of an EAS gate 1110, 1112. In some embodiments, as illustrated, tag 1100 may be a wireless identification tag. Tag 1100 may be embedded, sewn, clipped, bonded, attached, or otherwise incorporated into an object, such as clothing item 1106. In some embodiments, tag 1100 may be configured to receive a wireless signal, such as signal 1118. Signal 1118 may be produced by an external system or device, such as EAS transmitter 1116, which may form a part of EAS gate 1110, 1112. Signal 1118 may include electromagnetic energy, or an electric field or magnetic field or electromagnetic field caused by electric, magnetic or electromagnetic waves having a frequency, for example, in the range of 58-60 kHz (AM-EAS waves) or 7-13 MHz (RF-EAS waves). As an example, the electromagnetic energy of the wireless signal transmitted from the EAS gate may be received by an antenna of the wireless identification tag, thereby activating or triggering the wireless identification tag. Upon activation, in conventional EAS detection systems, a security tag would transmit an EAS detection signal when triggered by EAS signal 1118, which is conventionally received by an EAS receiver, such as EAS receiver 1120. Upon identifying the characteristics of the transmitted or reflected signal from the conventional security tag, the EAS receiver would trigger an alarm indicating the presence of an active security tag, rendering the tag "visible" to the EAS gate. In such a scenario, the security tag is triggerable and visible to the EAS gate.

In contrast to these conventional security tags, in some embodiments the exemplary wireless identification tag may be triggerable by an EAS gate while remaining invisible to the EAS gate. An identification tag may be triggerable when it receives a signal from the EAS gate, and takes some form of responsive action, such as transmitting an identification signal. A tag may remain invisible to an EAS gate if a signal transmitted by the tag does not trigger a response by the EAS gate. For example and as discussed above, in a retail environment, when a product with a traditional EAS security tag passes an EAS gate, an alarm typically sounds, alerting the proprietor of possible theft. With disclosed embodiments, in contrast, the tag itself may be triggered by the EAS gate, but the tag's response may not trigger a warning by the gate. In some disclosed embodiments, the tag may trigger a warning from components other than an EAS gate, if for example, a receiver in the vicinity of the EAS gate receives a signal from the tag, and that signal is associated with an object that is not authorized to be removed from the establishment.

However, in some embodiments of the present disclosure, the wireless identification tag may be configured to be triggered by the EAS gate signal 1118, but in response, not to transmit a signal to the EAS receiver 1120. In such a scenario, the wireless identification tag is triggered by the EAS transmitter of EAS gate while remaining invisible to the EAS gate because the tag does not transmit an acknowledgment signal to the EAS receiver of the EAS gate. Instead, the tag that is invisible to the EAS gate may transmit a signal recognized via a receiver other than an EAS receiver. This occurs, for example, when the tag transmits in frequency outside a range recognized by the EAS receiver.

In some embodiments, the tag may comprise at least one antenna tuned to receive energy, such as the antenna described above. In some disclosed embodiments, the antenna may be tuned to receive energy transmitted in a desirable frequency range. A tuned antenna may include an antenna where the impedance of the antenna varies over frequency such that it is matched to the impedance of the communications medium (e.g., the air between the gate and the tag) at its radiated port, and matched to the receiver or transmitter at its conducted port, only over a given frequency band. In electronic circuits, the impedance of an antenna may vary based on characteristics of inductive, capacitive, or transmission-line elements of the antenna. In some embodiments, a transmitter or receiver may include an antenna tuning unit (not illustrated) or a matching network. By way of example, as illustrated in FIG. 10, EAS coil 2110 may include a tuning capacitor 10200 controlled by controller 9020 to tune coil 2110 between a mode for detecting fields in a first frequency band (e.g., 7-13 MHz) and a mode for detecting fields in a second frequency band (e.g., 58-60 kHz).

Figure 17:
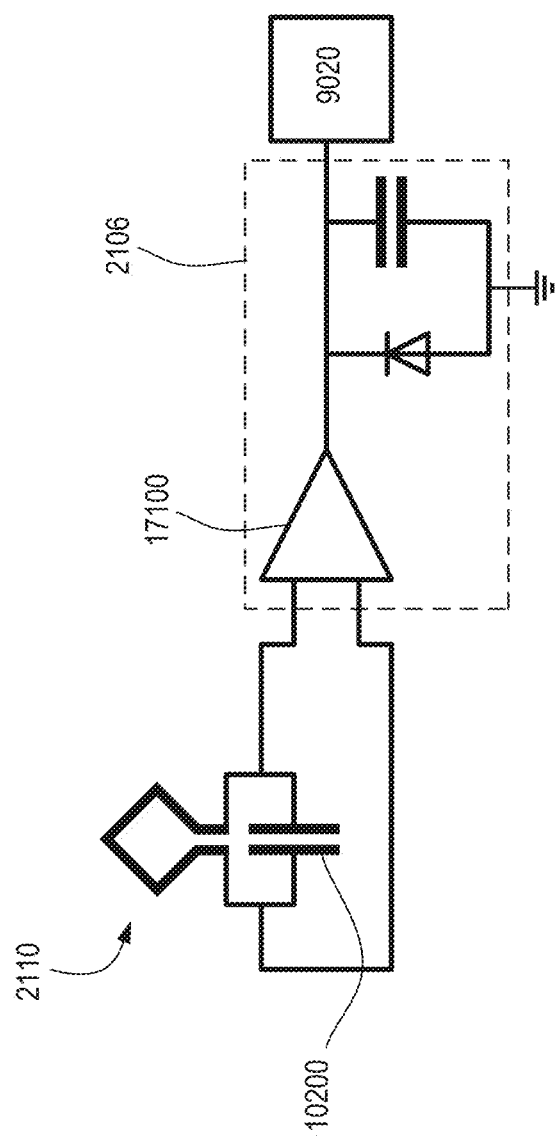
FIG. 17 is a circuit diagram of an exemplary circuit for a wireless identification tag, consistent with some disclosed embodiments.

FIG. 17 illustrates a circuit diagram of an exemplary circuit architecture for a wireless identification tag. As illustrated, EAS coil 2110 may include a tuning capacitor 10200 to tune the antenna or the EAS coil 2110 to match the impedance with the impedance of the EAS transmitter configured to transmit the signal. Gate detection circuit 2106, analogous to gate detection circuit 2106 of FIG. 10, may be configured to detect the incident EAS signal from the EAS transmitter and feed it to controller 9020. In some embodiments, gate detection circuit 2106 may include operational amplifier 17100, which is configured to amplify the differential input from the tuned circuit of the EAS coil 2110 and tuning capacitor 10200. As discussed herein, an operational amplifier includes a circuit having two inputs, and a voltage output that is proportional to the voltage difference between the two inputs. Because the EAS signal received in EAS coil 2110 may be of very low magnitude, operational amplifier 17100 may amplify the received signal such that it can be better detected by the gate detection circuit 2106. In order to further improve the sensitivity of detection, gate detection circuit 2106 may also include an integrator which may be implemented using a diode and a capacitor, in order to convert the amplified signal at the output of operational amplifier 17100 to a digital signal that may be detectable and usable by controller 9020. Controller 9020 may then, for example, alter one or more signal transmission parameters of the transmitter 2104 in response to detection of the EAS field, determine the type of energy being received by the tag, and control operation of transmitter 2104 based on the type of energy received, among other functions.

In some embodiments, the at least one antenna includes a first antenna tuned to receive energy transmitted within a frequency range of 900 MHz WW ISM; a second antenna tuned to receive energy transmitted within a frequency range of 2.4 GHz WW ISM. As discussed above, at least one antenna may additionally or alternatively include one or more antennae tuned to receive energy transmitted in one or more frequency bands or frequency ranges. In some embodiments, the tag may include at least one antenna tuned to receive energy transmitted in at least one of a first EAS gate frequency range of about 7-13 MHz or a second EAS gate frequency range of about 58-60 kHz. A non-limiting example includes the 58 kHz AM-EAS (Acousto-Magnetic Electronic Article Surveillance) frequency band, ranging from about 58 kHz to about 60 kHz, which is used by various theft-prevention systems around the world.

In some embodiments, an AM-EAS system may operate in a frequency range of 58-60 kHz. In an AM-EAS system, a signal transmitter such as EAS transmitter 1116 in FIG. 1 may be configured to emit magnetic energy or a time-variable magnetic field having a frequency in the range of 58 kHz to 60 kHz, or wavelength in the range of 5000 m to 5168 m, approximately. The emitted energy may create a magnetic field, for example, around the exit area of a store, configured to trigger a wireless identification tag associated with an item influenced by the magnetic field. In some embodiments, the energy emitted from the EAS transmitter of the EAS gate may be pulsed. In the context of this disclosure, a pulse may refer to a short burst of energy. The pulse may assume a rectangular waveform, a double exponential waveform, a sinewave waveform, other short-duration patterns of waveform, or any waveform capable of detection by a wireless identification tag. The wireless identification tag may be configured to receive the magnetic energy transmitted by the EAS transmitter of the EAS gate having a frequency in the acousto-magnetic range. In some embodiments, the AM-EAS may operate in a frequency range of 58 kHz to 132 kHz.

In some embodiments, an RF-EAS system may operate in a frequency range of 7-13 MHz. In an RF-EAS system, a signal transmitter such as EAS transmitter 1116 may be configured to emit electromagnetic energy or electromagnetic waves having a frequency in the range of 7 MHz to 13 MHz, or wavelength in the range of 23 m to 43 m, approximately. In some embodiments, the operating frequency of a RF-EAS transmitter may be 8.2 MHz.

When used in RF-EAS systems, some wireless identification tags (e.g., RF tags) may include an electric oscillation circuit with a capacitor and a coil (e.g., antenna) that may be set to oscillation at a resonance frequency. The electromagnetic field of an EAS gate may vary harmonically about 10-20% around the resonance frequency of the RF tag, and the oscillation circuit may be powered by the electromagnetic energy of the electromagnetic fields. When the identification tag is exposed to the electromagnetic field of the EAS gate, a weakening of the electromagnetic field in the EAS gate detector is measured, and detection of the RF wireless identification tag may trigger an alarm.

In some embodiments, the tag may include at least one antenna tuned to receive energy transmitted in at least one of a first EAS gate frequency range of about 7-13 MHz or a second EAS gate frequency range of about 58-60 kHz, and configured to be non-detectable by the EAS gate. Consistent with the disclosed embodiments, non-detectability may refer to a property of an element (e.g., antenna) which prevents the element from being detected at predefined locations and/or areas at a predefined time or time interval. An EAS gate includes a receiver coupled to a controller which may trigger a warning if the frequency of an incoming signal is within a predefined EAS gate range. A tag may be invisible to an EAS gate if the tag's transmission is either non-detectable by the receiver of the EAS gate, or, if detectable, is not recognized by the associated EAS gate controller as a signal that triggers a response (e.g., a warning or other form of notice). In some embodiments, the non-detectability of the at least one antenna enables the tag to avoid triggering the EAS gate, and therefore, the wireless identification tag may be non-detectable by virtue of comprising a non-detectable antenna.

In some embodiments, the at least one antenna may include at least one EAS antenna configured to receive the energy transmitted in the at least one EAS gate frequency range. For example, an EAS antenna in the tag may be tuned to the transmission frequency of an EAS gate. In this way, the tag may receive energy from the EAS gate's transmitter. The EAS antenna may take on any suitable form. With reference to FIG. 10, for example, EAS antenna may be a coil 2110 configured to receive electric, magnetic, or electromagnetic energy transmitted in one or more predetermined frequency ranges of the EAS gate. For example, EAS coil 2110 may be configured to receive energy in a frequency range between 7-13 MHz and energy in a frequency range between 58-60 kHz. In some embodiments, EAS coil 2110 may detect an incident electric, magnetic, or electromagnetic field and gate detection circuit 2106 may determine if the energy is received from an EAS gate (for example, if the energy is in a frequency band between 7-13 MHz or between 58-60 kHz).

In some embodiments, the tag may include at least one transmitter configured to send at least one identification signal. For example, the at least one transmitter may be configured to send the identification signal via at least one of a Bluetooth protocol, Bluetooth Low Energy, Wi-Fi, ZigBee, Z-wave, or radio-frequency identification (RFID) protocol. As discussed above, the communication protocol may, for example, be a standards-based protocol such as 802.3 Ethernet, Asymmetric Digital Subscriber Line (ADSL), Very high speed Digital Subscriber Line (VDSL), Symmetric Digital Subscriber Line (SDSL) wired protocols, Wi-Fi. Bluetooth. GSM, 3F, LTE, 5G, ZigBee, or Z-wave wireless protocols, a proprietary protocol agreed on by the transmitter and receiver only, or any other set of rules with reference to communication between various electronic devices.

In some embodiments, the at least one transmitter may be further configured to transmit at least one alert signal for causing at least one of an audible alert, a visual alert, or a digital message. An alert signal or a notification signal may refer to a signal generated by a component of one system, used to alert another component of the system, or a different system, or a person, or any combination thereof. The notification signal may be an audible signal, a visual signal, or another sensory signal such as a haptic signal, or a digital signal (such as a notification signal to an app on a mobile device, an interrupt signal to a CPU in an electric circuit board, or an entry in a system alert log) among other forms of notification.

In some embodiments, the at least one alert signal may be a component of the at least one identification signal. In this instance, the identification signal may not only include identifying information associated with the tag, but it also might include an alert component as well. As discussed above, an alert signal may be information that causes, following receipt, an audible alert, a visual alert, an audiovisual alert, a sensory alert such as a haptic alert, or a digital message, among other notification techniques. In some embodiments, the at least one alert signal is separate from the at least one identification signal. So, for example, the tag's transmitter may send an identification signal in one transmission, and an alert signal in a separate transmission.

In some embodiments, the tag may include at least one energy storage component that is electrically connected to the at least one transmitter, for powering the at least one transmitter. Such electrical connection may occur when a conductive path exists between an energy storage component and a transmitter. Electrical components may or may not be interposed in the conductive path. Thus, components that are indirectly connected through other components are considered to be electrically connected. As illustrated in FIGS. 9 and 10, for example, various components indirectly connect transmitter 9032 with storage capacitor 10300, which are nevertheless considered electrically connected to each other. As the result of an electrical connection, energy may be transferred from energy storage component (e.g., storage capacitor 10300) to a transmitter (e.g., transmitter 9032).

In some embodiments, the energy transferred from the energy storage component to the transmitter may be used to power the transmitter. Powering the transmitter may include, but is not limited to, activating the transmitter, operating the transmitter, charging the transmitter, or providing any form of energy necessary for the transmitter to perform relevant functions.

In some embodiments, the at least one energy storage component may be configured to store the energy received by the first antenna and the second antenna, and power the at least one transmitter with the stored energy. In some disclosed embodiments, the at least one energy storage component may include at least one capacitor. A capacitor may refer to ceramic capacitors, film capacitors, power film capacitors, electrolytic capacitors, supercapacitors, class X and class Y capacitors, MOM capacitors (Metal-Oxide-Metal capacitors) implemented inside a semiconductor device, M-I-M capacitors (Metal-Insulator-Metal capacitors) implemented inside a semiconductor device, MOS capacitors (Metal-Oxide-Semiconductor capacitors) implemented inside a semiconductor device, other miscellaneous or variable capacitors, or any other device suitable for storing electrical energy in an electric field using two terminals. By way of example, energy storage circuit 2108 in FIG. 10 may contain at least one storage capacitor 10300. Further, in some embodiments, the energy storage component may be configured to store the energy received by the first antenna, such as 2112, and the second antenna such as 2114. The stored energy in capacitor 10300, for example, may be used to power the transmitter 9032 (or transmitter 2104 in FIG. 18).

Figure 18:
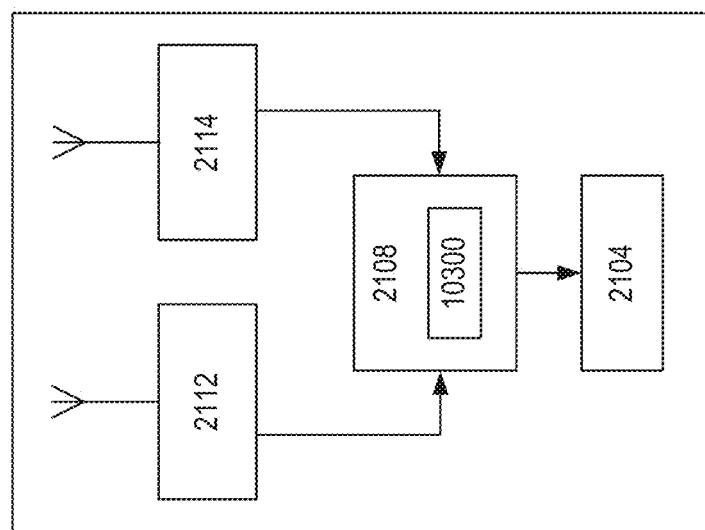
FIG. 18 is a block diagram of an exemplary system architecture for a wireless identification tag, consistent with some disclosed embodiments.

As an example, FIG. 18 illustrates a block diagram of an exemplary wireless identification tag 1100 including a first antenna 2112 and a second antenna 2114, at least one of which is configured to receive electric, magnetic, or electromagnetic radio frequency energy transmitted from the EAS gate or from other intentional or ambient sources in the tag's environment. The received energy may be stored in at least one capacitor 10300 of energy storage circuit 2108. The energy storage circuit may include more than one capacitor, as appropriate. The capacitor may be configured to discharge a portion of the stored energy or substantially all of the stored energy to power a transmitter 2104, for example.

As discussed above, the tag may include at least one circuit that is connected to at least one antenna. The connection may be direct or indirect, as discussed earlier. By way of example, exemplary multi-source harvester circuit 2102 may be directly connected to antenna 2112, and exemplary energy storage circuit 2108 may be indirectly connected to antenna 2112 through multi-source harvester circuit 2102, as illustrated in FIGS. 9 and 10, for example. In some embodiments, a circuit may be connected to one or more antennae, or more than one circuits may be connected to one antenna. In the context of this disclosure, connection between a circuit and an antenna may refer to an electrical connection such that the circuit and the antenna form components of a circuit.

In some embodiments, the tag may be configured to detect energy transmitted from the EAS gate in at least one of the first EAS gate frequency range or the second EAS gate frequency range. Differing EAS gates may operate in differing frequency ranges. A tag may be configured to detect energy in the differing ranges through incorporation of multiple antennae tuned to the differing frequency ranges, or through the incorporation of a single antenna tuned to the differing frequency ranges. A tag may be configured to detect only one of the two EAS frequencies, or it may be configured to detect both EAS frequencies but only one of the two frequencies at any given time, or to detect both frequencies simultaneously.

For example, in some embodiments, the EAS transmitter 1116 of EAS gate 1110 in FIG. 1, may be configured to transmit electromagnetic energy in the form of a signal 1118. The frequency range of the transmitted electromagnetic signal 1118 may be in a range of 58-60 kHz (e.g., AM range) or in a range of 7-13 MHz (e.g., RF range). In some disclosed embodiments, the circuit may be configured to detect the electric, magnetic, or electromagnetic energy having a frequency in both the AM range and the RF range. Detecting the transmitted energy may include receiving the electric, magnetic, or electromagnetic energy using one or more antennae, and identifying the presence of an electric, magnetic, or electromagnetic signal and/or electric, magnetic, or electromagnetic energy in the first EAS gate frequency range or the second EAS gate frequency range. For example, in FIG. 15, antenna 15002A might be tuned to the first frequency range, and antenna 15002B might be tuned to the second frequency range. Both antennae may be electrically connected to circuit 15006, which may determine in which of the first and second frequency ranges the incoming signal falls. Alternatively, antenna 15002A might be tuned to both the first and second frequency ranges, and circuit 15006 might be configured to differentiate the signals.

In some embodiments, the at least one circuit may be connected to the at least one antenna and configured to, in response to detecting the energy transmitted from the EAS gate, cause the at least one transmitter to transmit to a receiver other than the EAS gate, the at least one identification signal transmitted in a frequency outside the first EAS gate frequency range and the second EAS gate frequency range.

Although the circuit may receive energy transmitted from the EAS gate, the circuit may respond by transmitting a signal outside the typical detection range of an EAS gate. For example, circuit 15006 in FIG. 15, may receive an EAS gate signal via antenna 15002 tuned to an EAS gate frequency. In response, circuit 15006 may cause transmitter 15004C to transmit an identification signal in a frequency other than an EAS gate frequency. In this way, the identification signal may be received and interpreted via a wireless receive other than that of an EAS gate. In this way, the tag is identified without triggering the EAS gate.

By way of another example, a circuit of the wireless identification tag, such as gate detection circuit 2106 in FIG. 2 may be configured to cause a transmitter, such as transmitter 2104 of the wireless identification tag 1100 to transmit the identification signal to a receiver different from the receiver of the EAS gate (e.g., 1124). In some embodiments, the identification signal frequency range may be outside the first EAS gate frequency range and the second EAS gate frequency range, rendering the wireless identification tag non-detectable and invisible to the EAS gate. In some embodiments, the frequency outside the first and second EAS gate frequency ranges may be within a frequency range of 2.4 GHz WW ISM.

In some embodiments, the at least one circuit may be configured to cause the at least one transmitter to transmit the at least one identification signal less than ten seconds after the energy transmitted from the EAS gate is detected. The circuit may be so configured through circuit design that prevents a delay of more than 10 seconds following receipt of an EAS signal. Particularly with EAS gates which tend to be located near egresses of establishments to detect tags leaving the establishment, a shorter delay may correspond to design specifications. Of course EAS gates can be used to detect incoming tagged objects, and can be used for other purposes where up to a 10 second delay may be within design specifications.

Thus, the transmitter of the wireless identification tag may be configured to send the identification signal immediately, or after a short delay period, which may be under ten seconds, following the detection of the energy transmitted from the EAS gate. In some embodiments, the delay period may be set to a maximum of ten seconds after the energy transmitted from the EAS gate is detected by the circuit such as the gate detection circuit 2106. The delay period may be nine seconds or less, eight seconds or less, seven seconds or less, six seconds or less, five seconds or less, four seconds or less, three seconds or less, two seconds or less, one second or less, a less than 500 milliseconds, or any other appropriate delay time less than ten seconds.

In some embodiments, the at least one energy storage component may be configured to store radio frequency energy received by the at least one antenna. For example, once any one or more of the antennae of a wireless identification tag receive energy in any frequency, the wireless identification tag may be configured such that the received energy is transferred to and received by the at least one energy storage component. Energy storage component may, for example, receive this energy and store the energy in another form in response thereto. For example, regardless of the incoming frequency of an input radio frequency signal, the energy storage component, through association with appropriate circuitry or intermediate components, may receive and store associated radio frequency energy.

As illustrated by way of example in FIG. 15, energy 15102A-C received by one or more of antennae 15002A-C, may be stored in capacitor 1500 of energy storage component 15008. In some embodiments, the received radio frequency energy may be characterized by a frequency outside of the first EAS gate frequency range and outside the second EAS gate frequency range. As disclosed herein, a frequency outside of the first EAS gate frequency range and outside the second EAS gate frequency range may refer to frequency ranges of 900 MHz WW ISM or 2.4 GHz WW ISM, for example. In general, a frequency range of 900 MHz WW ISM and 2.4 GHz WW ISM may refer to frequency ranges of around 900 MHz and 2.4 GHz, respectively. In some embodiments, a single antenna may be tuned to receive energy transmitted in multiple frequency bands of around 900 MHz, multiple frequency bands of around 2.4 GHz, or both. Accordingly, an antenna tuned to receive energy transmitted at a frequency within a frequency range of around 900 MHz WW ISM may also be tuned to receive energy transmitted at a frequency within another frequency range, and an antenna tuned to receive energy transmitted at a frequency within a frequency range of around 2.4 GHz WW ISM may be tuned to receive energy transmitted at a frequency within another frequency range.

In some embodiments, the at least one transmitter may be configured to sequentially send a plurality of repetitions of the identification signal in response to detecting the energy transmitted from the EAS gate. Identification signals may be sent in multiple times in response to detecting the transmitted energy from the EAS gate. For example, the identification signal may not be sent as a single continuous signal or may not be sent continuously without interruption, and may instead include short bursts or repetitions of the identification signal with a fixed or a variable time interval in between two consecutive bursts. The short periodic bursts are referred to as pulses, and the identification signal sent may be a pulsed identification signal. The transmitter of the wireless identification tag, such as transmitter 15004A in FIG. 15, may be configured to send multiple bursts of the identification signal 15104A in a repetitive pattern. In some embodiments, the multiple bursts may not follow a specific pattern. The redundancy may ensure that a wireless receiver does not miss the transmission.

In some embodiments, the at least one transmitter may be configured to dynamically delay each of the plurality of repetitions of the identification signal, to thereby avoid signal collision. Dynamic delay may refer to a time interval between consecutive repetitions of the identification signal, which is not necessarily fixed but rather may be controlled by, and changes in accordance with, a predefined rule. In this way, a delay between a first and a second identification signal may be different from a delay between the second and the following third identification signal. Signal collision may refer to an overlap in time of identification signals resulting in misreads of a tag, or entirely missing a tag, among other problems. Using dynamic delay between each of the plurality of repetitions of identification signals may substantially minimize problems associated with signal collision. This may conform with design parameters in a system that expects to receive many tag readings in a short time span. For example, if multiple items for purchase are carried past an EAS gate 11108 in FIG. 11, all the tags in one bag 11212 may be triggered simultaneously. Brief dynamic delays may ensure that the various tags transmit at different times, such that each tag is detected by one or more of wireless infrastructure receivers 11106.

In some embodiments, the at least one transmitter may be configured to randomly delay at least one of the repetitions of the identification signal, to thereby avoid signal collision. Random delay refers to a time interval between consecutive repetitions of the identification signal, which varies randomly. For example, the time interval between a first and a second identification signal may be different from the delay between the second and the following third identification signal, and may not be based on a predefined rule, a relationship, or a pattern.

The wireless identification tag may be configured for association with a specific product to thereby transmit a unique identification signal that differs from identification signals from tags associated with other instances of a same product. The tag may be configured for such use by including within memory of the tag a unique identification code that differs from other identification codes of other tags. Therefore, for example, when establishments stock multiple instances of the same product (e.g., multiple instances of the same food item, clothing item, or any other goods or objects), each instance will have its own unique code. This may enable precise tracking of when each instance of product was received, placed on shelves, purchased, returned, where and precisely when each instance was manufactured, as well as instances of counterfeiting and fraud.

In some embodiments, the at least one circuit may be configured to implement an identification transmission rule for regulating the at least one circuit in a manner causing the at least one transmitter to delay sending the identification signal. As discussed elsewhere in the present application, a transmission rule in the context of this disclosure may refer to a procedure implemented as part of a circuit which is used to control a transmitter. In some embodiments, the transmission rule may cause the transmitter to delay sending an identification signal. The delay in sending the identification signal may be random or dynamic.

In some embodiments, the at least one circuit may be configured to implement an identification transmission rule for regulating the at least one circuit in a manner causing the at least one transmitter to delay sending the identification signal, even when sufficient transmission power for transmitting the identification signal is aggregated and stored in the energy storage component.

In some embodiments, the delay in sending the identification signal by the transmitter of the wireless identification tag may be caused regardless whether the energy storage component has adequate transmission power stored. The delay period in sending the identification signals may be fixed or variable. The delay may be introduced to substantially minimize signal collisions.

In some embodiments, the at least one circuit may be configured to implement the identification transmission rule to cause the transmitter to send the identification signal in a predetermined time interval. A time interval may include a period of time between signal transmissions. The time interval may also key-off other system events such as, for example, an input, stimulus, or trigger into a circuit, the output or action performed by the circuit, multiple occurrences of an input, stimulus or trigger, or two occurrences of an output or action of the same circuit or of different circuits. When measuring time intervals between repeating occurrences of the same event, a periodicity may be defined as an average time interval between the events and may include a deviation from the average time interval as the variance in the periodicity. When a time intervals is defined by periodicity, the time interval may include a frequency of the events as the inverse of the average time interval between events, a duty cycle of the events as the ratio between the average time length of each event (from the start of the event to its finish time), and the average time interval between events (as measured from the start of one event to the start of the succeeding event). The time interval may be predetermined according to the identification transmission rule. For example, the circuit may be configured to cause the transmitter to send the identification signal in particular second, minute, or hour intervals. The selection of the interval may depend on use requirements.

In some embodiments, the at least one circuit may be configured to implement the identification transmission rule to define a time interval between transmission of two consecutive identification signals. For example, a circuit may be configured to implement a transmission rule which causes the transmitter to wait to send a second identification signal for a predetermined time interval after a first identification signal is sent. By way of non-limiting example, the time interval for some embodiments may be at least ten minutes while in other embodiments the time interval between transmission of two consecutive identification signals may be a number of microseconds.

In some embodiments, the at least one circuit may be configured to implement the identification transmission rule to randomly select a time interval between two consecutive identification signals. In some embodiments, a set of inputs, triggers, or stimuli received by the circuit, may randomize the timing of transmission of identification signals such that the time interval between two consecutive identification signals is not predetermined, not predefined, or unpredictable. Such random selection typically results in the interval varying from signal transmission to signal transmission. Random transmission, in the context of some embodiments may include pseudorandom transmissions. In some embodiments, the randomly selected time interval may be between ten and fifteen minutes while in other embodiments the randomly selected time interval may be a number of microseconds. In other embodiments, a threshold may be imposed on random transmissions such that no two sequential transmissions may occur prior to a predetermined time lapse from the first transmission to the second transmission, or from a first group of transmissions to a second group of transmissions.

In some embodiments, the at least one circuit may be configured to conserve energy by activating for a first predetermined length of time and deactivating for a second predetermined length of time, in a repeating manner. For example, the circuit may be designed to ensure that enough energy remains on board to carry out prioritized functions. By way of example, a prioritized function may be transmitting a tag identity in response to an EAS gate trigger. If the tag does not retain enough energy to meet that prioritized function, the tag's controller may not permit any other transmissions until reserve energy is sufficiently replenished. By way of another example, after a tag has transmitted its identity to an inventory management system, the tag may conserve energy by not transmitting its identity again within a predetermined period of time, even though the tag may receive a signal prompting transmission. Then, after the time period elapses, the tag may be enabled to transmit its identity, after which it may return, in a repeating manner, to a sleep mode.

Energy conservation may be achieved by programmed or otherwise pre-determined rules. For example, the rules may be based on a number of functions performed, duration of transmission of identification signals, power level, amount of data transmitted, among other functions the circuit is configured to perform. Based on the work load, the circuit may remain activated for a predetermined amount of time (e.g., milliseconds). In some embodiments, the circuit may be configured to be deactivated for a second predetermined length of time, based on the amount of reserve energy available, amount of reserve energy needed, the number of transmissions remaining, and other relevant factors. If the stored energy is below a threshold and nevertheless the transmission of an identification signal is required, the circuit may mediate the situation by causing the additional signal to be transmitted using less energy than the original delayed signal. The lower use of energy may occur as a result of the circuit limiting a magnitude of power and/or a duration of power for the transmission. Alternatively, or additionally, the circuit may also limit the volume of information transmitted in order to conserve power. The limitation on the volume of information may be based, for example, on the content of previous transmissions. For example, if characteristics of a product were previously transmitted and those characteristics have not changed, they may be omitted from the additional transmission. The activation and deactivation of the circuit may be repeated in a pattern to conserve the stored energy and maximize the energy efficiency. In some embodiments, the first and the second predetermined lengths of time may be substantially similar or substantially dissimilar. As an example, the circuit may be configured to stay active for a few seconds to a few minutes, and the circuit may stay inactive or may be deactivated for a few seconds to a few minutes.

Embodiments of the present disclosure may relate to methods, systems, devices, and computer readable media for a wireless identification tag configured to harvest ambient energy and transmit an identification signal intermittently. For ease of discussion, a device is described below, with the understanding that aspects of the device apply equally to systems, methods, and computer readable media. For example, some aspects of such device may include electrical connections over a network that is either wired, wireless, or both. Other aspects of such a method may occur using non-electric means. In the broadest sense, the device is not limited to particular physical and/or electronic instrumentalities, but rather may be accomplished using many differing instrumentalities.

In various embodiments of the present disclosure, a wireless identification tag may include any device associated with an item where the device provides identification information about the item or about the device itself. In one embodiment the wireless identification tag may provide identification information such as a serial number associated with the item or the device. In another embodiment, the wireless identification tag may provide a Bluetooth low energy ("BLE") advertising beacon. The wireless identification tag may further be sensitive to Electronic Article Surveillance ("EAS") magnetic fields and communicate with an EAS gate. Other embodiments may provide a location, product information, a price, matching products, or other information relating to the item. Such information may be stored on the device itself, or may be retrieved from a data structure after the device transmits identifying information to a processor that performs a lookup in the data structure.

In some embodiments, an exemplary wireless identification tag may be configured to harvest ambient energy. Ambient energy may be defined by an ability to perform work, or to exert power for a certain length of time. Such energy may be represented by the product of the power and the length of time being equal to the energy spent. Ambient energy may be transmitted and harvested in many forms, such as electrical, magnetic, electromagnetic, kinetic, acoustic, thermal, photonic or other types of energy. Energy may also be stored in many forms, such as but not limited to electrostatic, magnetic, chemical, kinetic, electrical, thermal or other types of energy. In the context of electrical or electronic circuits, energy will most often be used as electric energy, either as a direct current ("DC") source or as an alternating current ("AC") source. However, the ordinary artisan will understand that other forms of electrical ambient energy may also be harvested. Ambient energy may include energy from ambient sources including at least sunlight, wind, vibration, sound, heat, radio frequency. Additionally, or alternatively, ambient energy may include energy received from one or more exciters, such as an RFID exciter or dedicated exciters configured to use proprietary protocols at the RFID frequency band, the 2.4 GHz ISM band, or any other licensed or unlicensed frequency band that transmits energy in one or more frequencies recognizable by the tag. In some embodiments, exciters may be positioned in an environment to cover any area, such as, for example, a store, warehouse, floor, room, interior of an appliance, outdoor area, road, walkway, conveyor, vehicle, storage facility, or any other location or establishment in which tag identification or tracking may be desirable. Additionally or alternatively, ambient energy may include energy transmitted in Bluetooth or Wi-Fi frequency bands by cell phones, Wi-Fi routers, automobiles, personal computers (such as laptop or desktop computers), smart tablets, wearable electronics such as smartwatches, smart glasses, televisions, speakers and headphones, home security devices or systems, baby monitors, microwave ovens, garage door openers, or any other device capable of wirelessly transmitting energy, such as in a Bluetooth or Wi-Fi frequency band.

In some embodiments, harvesting ambient energy may include capturing and storing energy from an ambient source, such as from one or more exciters or from one or more alternative sources of energy situated within the same environment as the tag. The harvesting may be done via one or more antennae, and may include a circuit, configured to capture energy, such as radio frequency energy, and store the captured energy. Such a circuit may include a combination of components and devices and be implemented as part of a silicon chip, a printed-circuit board, a connected system, or as a combination thereof. The components and devices may be connected in a manner enabling the performance of a desired function or reaction as a response to an input, stimulus, or trigger which may be generated internally or externally. The function or reaction of a circuit may include controlling other circuits; generating visual, audible, or otherwise communicable alerts or signals; and/or performing predefined coded operations. For example, the components and devices may include, but are not limited to, resistors, capacitors, inductors, conductors, transistors, diodes, transmission lines, inverters, buffers, logic gates, latches, flip-flops, amplifiers, comparators, voltage sources, current sources, switches, and any other component or device suitable for use in a circuit to achieve the aforementioned exemplary functions. The input, stimulus, or trigger may include, but is not limited to, a voltage level change; a current level change; a frequency, amplitude, or phase change of a received signal; a digital input; a digital pulse; a control word; or any other signal that may be received by a circuit. As used herein the term "circuit" may include two or more electrically connected components, which may be considered a single circuit or multiple circuits.

In some embodiments, an exemplary wireless identification tag may be configured to transmit an identification signal intermittently. Intermittent transmission may include any non-continuous timing of transmissions. For example, the intermittent transmissions may occur at periodic, random, or regular intervals. Intermittent transmission may enable lower energy consumption by the wireless identification tag by conserving energy in the tag's energy storage component.

As alluded to previously, an exemplary wireless identification tag may be configured to transmit at various intervals or in response to a trigger. In one embodiment, the wireless identification tag may be configured to transmit at an interval for the purpose of conserving energy, even when the tag receives a trigger to transmit outside the predetermined interval. For example, the wireless identification tag may be configured to transmit within a minimum repetition period, such as every ten minutes. The minimum repetition period may require an initial trigger such that in the absence of a trigger signal within a prescribed timeframe, the tag enters sleep mode and does not transmit (or transmits much less frequently). Then, upon receipt of a trigger, the tag might return to its periodic mode of operation, according to a transmission rule. After a prescribed period without any trigger, the tag may then return to sleep mode.

In another example, the wireless identification tag may be configured to transmit a minimum repetition period (e.g., identification transmissions spaced apart by a number of seconds, minutes, or hours) with a randomized delay between transmissions. By way of non-limiting example, a minimum repetition period may be ten minutes, and the random delay beyond ten minutes may be each second between ten minutes and fifteen minutes. In this way, the space between transmissions may vary randomly from ten to fifteen minutes. In another embodiment, the wireless identification tag may be configured to make multiple transmissions within a short interval. For example, the wireless identification tag may be configured to make six transmission within an interval of 200 ms, and then sleep for a period of time. In another embodiment, the wireless identification tag may be configured to make multiple transmissions within a short interval with a lower power level as discussed below.

Disclosed embodiments may include, at least one antenna configured to receive ambient energy. In some embodiments, an exemplary wireless identification tag may include one antenna, two antennae, three antennae, or any number of antennae. An antenna may include a conductor configured to receive transmitted or ambient energy. The conductor may include, for example, a metal wire or a printed circuit. The antenna may be connected to or may include a circuit configured to transform a signal from a conducted input to a radiated output (in transmission). In another embodiment the circuit may be configured to transform a signal from a radiated input to a conducted output (in reception). The radiated form may be electromagnetic radiation, electric fields, or magnetic fields. The conducted form may be a time-varying voltage or a current signal over a physical connection. In other cases, the radiated form may be acoustic (such as in sonar applications) or optical (such as in laser applications). An antenna may be passive or active. A passive antenna may require no external power other than the signal received by the antenna. An active antenna may rely on an external source of power. A passive antenna may be implemented as a series of conductors printed on a printed circuit board ("PCB") and connected to the rest of the circuit either through direct connection, electrical or magnetic coupling, or other means for connecting a circuit component to a circuit. As an example, the exemplary tag 1100 illustrated in FIG. 9 may include an antenna 2112 tuned to receive energy in a frequency below 1 GHz (e.g., energy in a frequency band around 900 MHz) and to convey harvested energy to a 900 MHz harvester 9012. Additionally, or alternatively, the exemplary tag may include an antenna 2114 tuned to receive energy in a frequency band around 2.4 GHz, and to convey harvested energy to a 2.4 GHz harvester 9014.

Disclosed embodiments may include at least one energy storage component, electrically connected to the at least one antenna, configured to aggregate and store the received ambient energy. In the context of electric circuits, energy storage components may include capacitors, supercapacitors, batteries (both single-use and rechargeable), any combination thereof, and any other circuit component capable of storing energy. In various embodiments, the energy storage component may include a component configured to aggregate energy collected. In some embodiments a circuit may facilitate ambient energy aggregation. Ambient energy may be aggregated from a single source or from multiple sources. For example, energy from differing transmitters operating at differing frequencies may be aggregated in the energy storage component. The energy from the varying sources may be received on a common antenna or on multiple antennae, and may be received sequentially or simultaneously. The energy storage component may include or be associated with a circuit designed to receive energy in one or more forms or from one or more sources and store received energy within a common energy storage component or a group of energy storage components. That is, a wireless tag may include one energy storage component, two energy storage components, or any number of energy storage components, and those components may store energy from differing sources.

In various embodiments, at least one energy storage component may include a circuit designed to receive energy from a source in one form, store it locally in the circuit in a second form, and make it available for usage by other circuits connected to it, either immediately or at a later time after receiving the energy, in the second form or in a third form of energy.

As illustrated in FIG. 2, wireless tag 1100 may include a multi-source harvester 2102, an energy storage circuit 2108, a 900 MHz antenna 2112, and a 2.4 GHz antenna 2114. Antennae 2122 and 2114 may be configured to receive ambient energy. The multi-source harvester 2102 may be connected to the energy storage circuit 2108 and configured to harvest ambient energy received from its own associated antenna (not shown) or by the 900 MHz antenna 2122 and 2.4 GHz antenna 2114. Regardless of the source, the received ambient energy may be stored in the energy storage circuit 2108. While illustrated with two antennae and a multi-source harvester, not all such components may be needed, depending on application. For example, the tag may be designed to only harvest energy from a single source, or from less than all sources. Similarly, additional antennae may be employed if additional sources of ambient energy are expected to exist in a use environment.

Aspects of disclosed embodiments may further include at least one transmitter electrically connected to the at least one energy storage component, configured to transmit the identification signal. In various embodiments, a transmitter may include a conductor such as a metal wire or a printed circuit. Such a circuit may be designed to perform the action of sending a signal over a communication medium such as Wi-Fi, Bluetooth, cellular, Ethernet or any other standards-based or proprietary protocol Alternatively or additionally, the transmitted signal may carry energy, for example exciters for RFID, X-ray imaging or radar. The transmitted signal may alternatively, or additionally, carry data, such as a unique identifier, information about an associated item, information about tag operating parameters, or any other type of relevant information, depending on use case The signal may take the form of an electric signal, a magnetic signal or an electromagnetic signal, transmitted wirelessly over-the-air. A transmitter may be configured to send signals in a certain magnitude. This magnitude may be used to calculate certain properties of signal propagation to establish parameters such as the signal's detection range, the signal-to-noise ratio, and interference properties. In the context of wireless communication, this magnitude may be measured in units of power, usually either Watts or dBW (decibel-Watts or dB-Watts) which is a logarithmic unit related to Watts (or sometimes in units of dBm, which is related to milliwatts in the same manner dBW is related to Watts). Thus, the power level at which the transmitter transmits may be a measurement of power immediately at the output of the transmitter, while the transmitter is actively transmitting. A transmitter may be designed to have a configurable power level, such that in response to certain inputs it may transmit a signal at one of two or more different power levels. For example, the exemplary tag 1100 illustrated in FIG. 9 may include a transmitter 2104 configured to transmit signals having a frequency around 2.4 GHz using antenna 2114; thus, antenna 2114 may be configured to both harvest energy and to transmit tag signals. The exemplary tag 1100 may additionally include a switch 9034 configured to control the behavior of antenna 2114 and to cause antenna 2114 to switch between a transmission mode and an energy harvesting mode (e.g., under control of a beacon controller 9030 of transmitter 2104). In some alternative embodiments, the exemplary tag 1100 may include a signal transmitter that is separate from the energy harvesting antennae. As illustrated in FIG. 2, beacon 2104 may be electrically connected to the energy storage circuit 2108 to power the beacon's transmission of an identification signal.

Aspects of disclosed embodiments may further include at least one circuit connected to the at least one transmitter and configured to implement an identification transmission rule, to cause the transmitter to delay sending the identification signal even when sufficient energy for transmission of the identification signal is aggregated and stored in the energy storage component. The circuit may include any combination of electrical components interconnected to implement an identification transmission rule. In various embodiments, an identification transmission rule may include any procedure or protocol characterizing a transmission. The rule may be implemented as part of a circuit used to control a transmitter, such that the procedure defines properties of the transmitter operation. Those properties may include the data content of a transmitted signal, its power level, the communication protocol used for transmission, the frequency band used for transmission, the timing of the transmission, and even whether to transmit or not to transmit at all. Examples of such procedures may include instructions to send a data packet over Wi-Fi protocol if an indication was received that Wi-Fi communication was detected by the circuit, and to send the same data packet over Bluetooth protocol if an indication was received that Bluetooth communication was detected by the circuit. Other such exemplary procedures may dictate the power level used in transmission based on the desired range for the packet, or the data content of the packet based on the intended recipient or on the set of inputs, triggers and stimuli associated with the transmission. A transmission rule may be automatically implemented or may be implemented based on a received trigger, input, or other stimulus. Implementation of transmission rules may be hierarchical. For example, a transmission required by one set of inputs may be blocked or prevented by a separate, superseding input with higher priority.

Consistent with disclosed embodiments, the circuit may determine that there is sufficient energy to transmit a given signal when an amount of energy stored in the energy storage component is equal to, or greater than, the sum of the energy required to transmit the signal in question and an amount of reserve energy. The amount of reserve energy may be the sum of one or more of: an amount of energy required to power the tag, not including the transmitter, for a predetermined time period; an amount of energy required to be stored in the energy storage component, below which the energy storage component cannot power the transmitter; and an amount of energy required to power the transmitter for the transmission of a predetermined number of transmissions of an identification signal.

In some embodiments, an exemplary wireless identification tag may be configured to send a transmission signal at regular intervals in response to the wireless identification tag receiving ambient energy in a first frequency band. In another embodiment, an exemplary wireless identification tag may be configured to send a transmission signal after a time delay in response to the wireless identification receiving ambient energy in a second frequency band. In yet another embodiment, an exemplary wireless identification tag may be configured to send multiple transmission signals within a short time interval in response to the wireless identification receiving ambient energy in a third frequency band. Other embodiments may include a wireless identification tag configured to send at regular time intervals, transmission signals in response to ambient energy received within various frequency bands. However, the tag may be configured to send the signals only if sufficient energy is stored in the energy storage component, or the tag may be configured to limit the power of transmission as a function of the amount of energy stored in the tag. These are but a few examples. Transmission protocols may be based on a combination of these factors or any other factors.

As illustrated in FIG. 10, wireless tag 1100 may include a top level controller 9020 and a multi-source harvester 2102. The multi-source harvester 2102 may include a power manager 9010 or other component capable of detecting a frequency or source of received energy. The multi-source harvester 2102 may be further configured to send a signal to the top level controller 9020 indicating the frequency or source of the received energy. The top level controller may include one or more finite state machines ("FSMs"), for implementing various identification transmission rules.

In some embodiments, the at least one circuit is configured to implement the identification transmission rule to cause the transmitter to send the identification signal in a predetermined time interval. A time interval may include a period of time between signal transmissions. The time interval may also key-off other system events such as, for example, an input, stimulus, or trigger into a circuit, the output or action performed by the circuit, multiple occurrences of an input, stimulus or trigger, or two occurrences of an output or action of the same circuit or of different circuits. When measuring time intervals between repeating occurrences of the same event, a periodicity may be defined as an average time interval between the events and may include a deviation from the average time interval as the variance in the periodicity. When a time interval is defined by periodicity, the time interval may include a frequency of the events as the inverse of the average time interval between events, a duty cycle of the events as the ratio between the average time length of each event (from the start of the event to its finish time), and the average time interval between events (as measured from the start of one event to the start of the succeeding event). The time interval may be predetermined according to the identification transmission rule. For example, the circuit may be configured to cause the transmitter to send the identification signal in particular second, minute, or hour intervals. The selection of the interval may depend on use requirements.

In some embodiments, the at least one circuit may be configured to implement identification transmission rule to define a time interval between transmission of two consecutive identification signals. For example, a circuit may be configured to implement a transmission rule to which causes the transmitter to wait to send a second identification signal for a predetermined time interval after a first identification signal is sent. By way of non-limiting example, the time interval for some embodiments may be at least ten minutes while in other embodiments the time interval between transmission of two consecutive identification signals may be a number of milliseconds.

In some embodiments, the at least one circuit may be configured to implement the identification transmission rule to randomly select a time interval between two consecutive identification signal transmissions. Such random selection typically results in the interval varying from signal transmission to signal transmission. Random transmission, in the context of some embodiments may include pseudorandom transmissions. In some embodiments, the randomly selected time interval may be between ten and fifteen minutes while in other embodiments the randomly selected time interval may be a number of milliseconds. In other embodiments, a threshold may be imposed on random transmissions such that no two sequential transmissions may occur prior to a predetermined time lapse from the first transmission to the second transmission, or from a first group of transmissions to a second group of transmissions.

In some embodiments, the at least one antenna may be configured to receive energy transmitted at a frequency within at least of a first frequency band around 900 MHz or second frequency around 2.4 GHz. A frequency band may refer any portion of a radiofrequency or electromagnetic spectrum. For example, a frequency band may refer to a portion of the spectrums reserved internationally for particular industrial, scientific, and medical ("ISM") purposes. In this context, the term "reserved" may refer to designating a frequency band, or range of frequency, for a single purpose or application. In many jurisdictions, frequency bands may be reserved and/or designated by law, regulation, or any other applicable standards or protocols. In general, a frequency band may refer to any portion of the spectrums that may be used in the fields such as broadcasting, radiocommunication, wireless telecommunications (e.g., cell phones), near field communications ("NFC"), wireless computer networks (e.g., Wi-Fi), or for any other means of wireless communication.

In some embodiments, the at least one circuit of the exemplary tag may be configured to cause the transmitter to transmit the identification signal in the second frequency band using energy received in at least one of the first frequency band or the second frequency band. For example, the wireless identification tag may harvest ambient energy using an antenna configured to receive ambient energy in a frequency band around 900 MHz, using an antenna configured to receive ambient energy in a frequency band around 2.4 GHz, or both. The energy harvested from either and all antennae may then be stored in the at least one energy storage component. The energy stored in the energy storage component may then be used by a transmitter to transmit the identification signal in the frequency band around 2.4 GHz by an associated antenna, independent of the frequency of the received ambient energy.

For example, referring to FIG. 2, the multi-source harvester 2102 of wireless identification tag 1100 may harvest energy received by either the 900 MHz antenna 2112, the 2.4 GHz antenna 2114, or by both. Harvested energy may be stored in the energy storage circuit 2108. The energy may then be used either antenna 2114, 2112 to transmit the identification signal as discussed above.

In some embodiments, the at least one energy storage component may be configured to power the wireless identification tag with the stored received ambient energy. For example, the harvested energy stored in the energy storage component may be used to power the wireless identification tag to enable the tag to perform harvesting, transmission, and other functions.

In some embodiments, the at least one energy storage component includes at least one capacitor configured to power the wireless identification tag without a battery. A capacitor may include any capacitive structure used to store an electrical charge through the use of charged plates separated by insulation. Examples of capacitors may include ceramic capacitors, film capacitors, power film capacitors, electrolytic capacitors, supercapacitors, class X and class Y capacitors, MOM capacitors (Metal-Oxide-Metal capacitors) implemented inside a semiconductor device, MIM capacitors (Metal-Insulator-Metal capacitors) implemented inside a semiconductor device, MOS capacitors (Metal-Oxide-Semiconductor capacitors) implemented inside a semiconductor device, other miscellaneous or variable capacitor. By way of example, in FIG. 10, energy storage circuit 2108 may contain at least one storage capacitor 10300. Consistent with disclosed embodiments, a wireless identification tag may include an energy storage which does not include a battery (By way of example, a battery may include one or more electrochemical cells that store electric charges.).

As discussed above, the exemplary tag may be configured to harvest energy without a designated battery and to operate, in both an active transmission state and an idle state, while consuming minimum amounts of power. Advantageously, the configuration of the exemplary tag may enable radio performance comparable to commercial battery-powered devices, at a power envelope comparable to a passive RFID device.

In some embodiments, the at least one circuit may be configured to implement the identification transmission rule when the at least one antenna receives ambient energy of a first predetermined frequency. For example, when ambient energy is received by an antenna configured to receive ambient energy of a first predetermined frequency or ambient energy received from an exciter that transmits energy at first predetermined frequency, the circuit may implement the identification transmission rule as discussed above. In some embodiments, the first predetermined frequency may be a frequency of about 900 MHz, as discussed above.

In some embodiments, the at least one circuit may be further configured to cause the transmitter to send the identification signal less than ten seconds after the at least one antenna receives ambient energy in a second predetermined frequency. For example, when ambient energy is received by an antenna configured to receive ambient energy of a second predetermined frequency or ambient energy received from an exciter that transmits energy at a second predetermined frequency, the circuit may cause the transmitter to send the identification immediately. In some embodiments, however, the circuit may cause the transmitter to send the identification after a delay period, which may be, for example, a maximum of ten seconds. Other longer or shorter delay periods may also be used, consistent with disclosed embodiments. In some embodiments, the second predetermined frequency may be about 2.4 GHz, as discussed above.

In some embodiments, the at least one circuit may be further configured to determine that sufficient energy is aggregated and stored when an amount of energy stored in the energy storage component is equal to or greater than a sum of a first amount of energy required for identification signal transmission and a second predetermined amount of reserve energy. For example, prior to transmission, the circuit may check to determine that there is both enough energy available to power the transmission, while leaving enough reserve on hand for later functions. Thus, in order to achieve this functionality, it may be desirable for the circuit to have the capability to determine or estimate a current amount of energy in the energy storage component. The stored energy may be determined through measurements or calculations. For example, energy stored in the form of electrostatic charge in a capacitor may need to be converted to DC voltage for supply to other components or circuits. A voltage measurement on the capacitor may provide an accurate estimation of the energy stored in the capacitor. While some embodiments may avoid the use of a battery, with embodiments employing a battery, a voltage measurement at several load conditions may be taken to determine a more precise level of available stored energy.

The required energy may vary based on an associated action or set of actions to be completed. Therefore, it may be desirable to ascertain the needed actions, calculate the energy required to perform those actions, and then compare the required energy with a calculation or measurement of actual stored energy (plus any required reserve). In the context of electrical or electronic circuits, power may be supplied as either direct or alternating current, but other forms are also possible. In most cases, the expected power to be consumed by the circuit may be integrated over the duration of the performed action, resulting in a total energy requirement, which may be calculated in Joules. For example, a circuit consuming 10 mW (ten milli-watts) of power for a duration of 1 ms (one milli-second) in order to process a single packet of data may require 10 µJ (ten micro-Joules) of energy in order to process the packet. In some cases, the energy required to perform a certain action may depend on the characteristics of the action, such as controlled by the inputs, triggers and stimuli received by the circuit. For example, a transmitter transmitting a longer or shorter signal at a fixed power consumption may require more or less energy, respectively, due to the multiplication of power and time. Thus, energy can be saved by adjusting operating parameters (modulation, amount of data transmitted, power levels, duration of transmission etc.) to suit particular use cases.

For example, the at least one circuit may determine that the amount of energy stored in the energy storage device is at least the sum of the amount of energy required to transmit an identification signal and a predetermined amount of required reserve energy. In some embodiments, the predetermined amount of required reserve energy includes energy for powering at least one portion of the wireless identification tag, apart from the at least one transmitter, for a predetermined time period. The required reserve energy may also constitute an amount necessary to transmit one or more identification signals in the future. The system may require such reserve in the event the energy storage component does not receive sufficient replenishment before a next transmission is called for or required. Thus, in some embodiments, the predetermined amount of reserve energy may include a minimum amount of energy for the energy storage component to power the at least one transmitter for a desired period following a current transmission. This may include sufficient energy to send a predetermined number of future transmissions of the identification signal. In other embodiments the predetermined amount of reserve energy may include a minimum amount of energy in order for the wireless identification tag to function without reducing the amount of energy stored below a level of required energy.

In some embodiments, the at least one circuit may be configured to monitor energy stored in the energy storage component, and cause the at least one transmitter to transmit an additional identification signal, the additional identification signal requiring less energy to transmit than the delayed identification signal, when the ambient energy stored in the energy storage component is determined to be below a predetermined threshold level. For example, when stored energy is below a threshold and nevertheless the transmission of an identification signal is required, the circuit may mediate the situation by causing the additional signal to be transmitted using less energy than the original delayed signal. The lower use of energy may occur as a result of the circuit limiting a magnitude of power and/or a duration of power for the transmission. Alternatively, or additionally, the circuit may also limit the volume of information transmitted in order to conserve power. The limitation on the volume of information may be based, for example, on the content of previous transmissions. For example, if characteristics of a product where previously transmitted and those characteristics have not changed, they may be omitted from the additional transmission.

In some embodiments, the identification signal includes unique identifier data of the wireless identification tag. For example, the identification may include a number, string, or other form of data which is singularly associated with the wireless identification tag, such that no single wireless identification tag is associated with the same unique identifier as any other wireless identification tag, and any single wireless identification tag can only have a single unique identifier associated with it. Examples of unique identifiers may include serial numbers, alphanumeric strings, and any other data that may uniquely distinguish one tag from another.

Embodiments of the present disclosure may relate to methods, systems, devices, and computer readable media for a wireless identification tag configured to harvest ambient energy and transmit and identification signal intermittently, instrumentalities. Disclosed embodiments may include at least one transmitter, such as transmitter 2104 illustrated in FIG. 2. In some embodiments, the at least one transmitter may be configured to transmit a first signal to a first receiver in a first frequency, and to transmit a second signal to a second receiver in the first frequency. Additionally or alternatively, some exemplary transmitters may be configured to transmit one or more signals in one or more frequencies to one or more receivers. The one or more signals may be triggered by different frequencies of received ambient energy, as discussed above. The different types of received energy may correspond to different tag operating modes. In one mode, the tag may send one signal to one or more specified receivers. In another mode, the tag may send another signal to different specified receivers. The signals may be sent via different frequencies, or in the same frequency. For example, the first signal may be a wireless tag identification signal sent to a receiver located within an establishment, and may be sent in a frequency band around 2.4 GHz WW ISM. The second frequency may be a wireless tag identification signal sent to a receiver in proximity to an EAS gate of the establishment. The second signal may also be sent in a frequency band around 2.4 GHz WW ISM. A receiver may include a fixed receiver in an environment, a wireless user device, a handheld receiver, or any other circuit or component that receives signals.

For example, as depicted in FIG. 13, tag 1100 may send an ID signal 12200 in a frequency band around 2.4 GHz to receiver 11300c in response to a 2.4 GHz trigger signal 13100 emitted by handheld device 11200. In another example, as depicted in FIG. 14, tag 110 may send, an ID signal 12200 in a frequency band around 2.4 GHz to receiver 11300h in response to an EAS signal 14100 from EAS gate 1112, 1114.

Aspects of the disclosed embodiment may include at least one energy storage component, as described elsewhere in the present application. Various embodiments may also include a circuit designed to make energy received available for usage by a transmitter circuit to transmit a signal over a communication medium, as disclosed above. The exemplary tag may include at least one circuit connected to the at least one transmitter and to the at least one energy storage component, the at least one circuit being configured to monitor energy stored in the energy storage component. For example, FIG. 2 is a block diagram of an exemplary wireless communication tag 1100 which may include at least one transmitter 2104 connected to an energy storage circuit 2108. FIG. 9 depicts an embodiment of the tag architecture of tag 1100 with a power manager 9010. Energy storage circuit 2108 and transmitter 2104 may be connected to power manager 9010. Power manager may be configured to monitor the amount of energy stored in the energy storage circuit 2108.

Aspects of disclosed embodiments may further include at least one circuit configured to prevent the at least one transmitter from transmitting the first signal to the first receiver in the first frequency when the energy stored in the energy storage component is insufficient to transmit the second signal to the second receiver in the first frequency. Consistent with disclosed embodiments, the circuit may determine that there is insufficient energy for the at least one transmitter to transmit the second signal to a second receiver when the amount of energy stored in the energy storage component is equal to, or less than, the sum of the energy required to transmit the first signal to the first receiver and an amount of reserve energy. The amount of reserve energy may be the sum of one or more of: an amount of energy required to transmit the second signal to the second receiver; an amount of energy required to power the tag, not including the transmitter, for a predetermined time period; an amount of energy required to be stored in the energy storage component, below which the energy storage component cannot power the transmitter; and an amount of energy required to power the transmitter for the transmission of a predetermined number of transmissions of an identification signal. If the circuit determines that there is insufficient energy to transmit the first signal, then the circuit may prevent the at least one transmitter from transmitting the first signal.

In some embodiments, the at least one circuit may be configured to determine that insufficient energy is stored in the energy storage component when an amount of energy stored in the energy storage component is less than a sum of a first amount of energy required for transmission of the first signal to the first receiver and a second amount of energy required for transmission of the second signal to the second receiver after the transmission of the first signal to the first receiver. For example, the tag may be configured to ensure that if it completes a first task, the tag will retain sufficient reserve energy to complete an expected second task. If not, the tag may not proceed with the first task. Thus, for example, if a first task involves sending an identification signal to an infrastructure receiver for purposes of inventory management, and a second task involves sending an identification signal to a receiver at an egress in response to an EAS gate trigger in order to ensure that removal of a tagged object from the establishment is recorded, the tag may block the first task to ensure enough energy remains in reserve for the second task.

In some embodiments, the at least one circuit may be configured to determine that insufficient energy is stored in the energy storage component when an amount of energy stored in the energy storage component is less than a sum of a first amount of energy required for transmission of the second signal to the second receiver and a second predetermined amount of reserve energy. For example, a circuit may be configured to determine the insufficiency of energy using a measurement component configured to monitor the amount of energy in reserve and calculates whether it is sufficient to enable continued functioning of the tag. A first amount of energy required for transmission may be determined based on a lookup of one or more predefined threshold values, or may be calculated based on known characteristics of the transmission and/or known information about how much energy may be required to complete the transmission. The second amount of energy may be predetermined in that the tag may always be required to maintain a particular energy reserve. The predetermined amount of energy may correspond, for example to one or more of an amount of energy needed for the tag to perform internal functions for a predetermined period, or for the tag to make a predetermined number of future transmissions, such as a gate mode transmission. If calculated, the first amount of energy may be determined based on variables such as a distance between the tag and one of the receivers, such as the second receiver. Or it may be calculated or determined based on an amount of energy required in the past for a similar transmission. Alternatively, as previously mentioned, the first amount of energy may also be an amount of energy predetermined for such transmissions. If the sum of the first amount of energy and the second amount of energy exceed a threshold, the tag may make a determination that the amount of energy in reserve is insufficient.

Additionally, or alternatively, the circuit may be configured to determine that stored energy is sufficient or insufficient based on a single measurement, calculation, or threshold, without evaluation of two separate amounts of energy. For example, calculation of the sum of the first and second amounts of energy described above may be determined in advance, either by a component of the tag or a processor external to the tag (e.g., by implementing a pre-engineered threshold or measurement that incorporates the first and second amounts).

With reference to FIG. 9, such functionality may be carried out, by way of example, with power manager 9010, which may monitor the state of energy storage module 2108. Data on threshold amounts of required energy (and historical data, if relevant) may be maintained in memory 9022, or within internal memory within power manager 9010. Alternatively, determining the insufficiency of energy may be determined within the energy storage circuit 2108 itself or within or with the aid of top level controller 9020.

In some embodiments, the predetermined amount of reserve energy may include a minimum amount of energy for powering at least one component of the wireless identification tag, apart from the at least one transmitter, for a predetermined amount of time. A tag may have multiple components, as discussed herein, and reserve energy may be needed not just for transmissions, but for other internal functions of the tag. Thus, the minimum amount of energy required may account for any one or more components of the tag. For example, with reference to FIG. 9, the predetermined amount of reserve energy may include an amount of energy required to power, for a predetermined amount of time, the detection circuit 2106, the top level controller 9020, the multi-source harvester 2102, or the memory 9022. The predetermined amount of energy required to power at least one component of the wireless identification tag may also include the amount of energy required to power any other circuit or circuit component included in the wireless tag for a predetermined amount of time. The predetermined amount of time may be pre-programmed, depending on system design constraints. For example, the predetermined amount of time may include a number of seconds, minutes, hours, days, months, or years.

In some embodiments, the predetermined amount of reserve energy may include a minimum amount of energy for powering the at least one transmitter to send a predetermined number of transmissions of the first signal. For example, the predetermined amount of reserve energy may include the amount of energy required for the tag to transmit a predetermined number of transmissions while operating in gate mode, infrastructure-excitable mode (e.g., store mode), or user-excitable mode (e.g., IoT mode). The predetermined number of transmissions may be based on design parameters of the system. For example, if the system design constraint is that tag must always keep in reserve enough energy to be able to transmit six gate mode signals, three gate mode signals, or any other number of gate mode signals, then the predetermined amount of energy reserve will include the amount of energy at least equal to the amount of energy required for six gate mode transmissions, three gate mode transmissions, or any other number of gate mode transmissions according to the system design constraint. The design constraints may also require energy reserve for other internal functions, all of which may be included as part of the minimum amount of energy required.

In some embodiments, the predetermined amount of reserve energy may include at least a minimum amount of energy for the energy storage component to power the at least one transmitter after the transmitter sends the predetermined number of transmissions of the first signal. For example, on top of the energy required to send the predetermined number of transmissions of a first signal, the tag may be designed to store additional reserve energy to transmit other signals. These additional signals may include, for example, transmissions of a second or third signal in the same or different frequency from the first signal. The additional signal(s) may include an identification signal, or a distress signal, alerting the system that the tag contains insufficient energy on reserve. This might prompt the infrastructure to wirelessly transmit energy to replenish the tag's reserve. Thus, for example with reference to FIG. 9, the predetermined amount of reserve energy may include at least a minimum amount of energy for the energy storage circuit 2108 to power the at least one transmitter 2104 after the transmitter 2104 sends a predetermined number of transmissions.

As previously discussed with reference to FIG. 9, the power manager 9010 may determine necessary reserve energy requirements. By way of another example, the power manager 9010 may communicate the amount of energy stored in the energy storage circuit 2108 to the top level controller 9020. The top level controller 9020 may then determine if there is sufficient energy to power the transmitter 2104 to transmit a signal and thereafter permit or prevent the transmitter 2104 from transmitting a signal. The top level controller 9020 may further determine the amount of energy required to send one or more transmissions and determine if there is sufficient energy to power the transmitter for the one or more transmissions based on the amount of energy stored in the energy storage circuit 2108.

As discussed above, the first frequency band may be within a frequency band of 2.4 GHz WW ISM and the second frequency may be within a frequency band of 900 MHz WW ISM. In some embodiments, the at least one energy storage component may be configured to store energy received in the first frequency and energy received in a second frequency that is lower than the first frequency, and to power the at least one transmitter using the stored energy. Regardless of differences in frequencies of energies received, the energy storage component may be configured, through interconnection with differing frequency receivers, through interconnection to differing antennae, or through interconnection to one or more circuits, to receive energy derived from both a higher frequency and a lower frequency. For example, a first, higher frequency may be in a 2.4 GHz range while a second, lower frequency may be in a 900 MHz range.

In various embodiments, at least one energy storage component may include a circuit designed to receive energy from a source in one form, store it locally in the circuit in a second form, and make it available for usage by other circuits connected to it, either immediately or at a later time after receiving the energy, in the second form or in a third form of energy. For example, the at least one energy storage component may make stored energy available to power the at least one transmitter.

As illustrated in FIG. 9, wireless tag 1100 may include a transmitter 2104. Transmitter 2104 may be connected to energy storage circuit 2108 and may be configured to use energy stored in the energy storage circuit 2108 to power the transmitter 2104.

In some embodiments the at least one energy storage component may include at least one capacitor configured to power the wireless identification tag without a battery. This may include, for example, storage capacitor 10300 of energy storage circuit 2108.

In some embodiments, the circuit may configured to determine whether to cause the at least one transmitter to operate in a first mode for transmitting the first signal to the first receiver or to operate in a second mode for transmitting the second signal to the second receiver based on the frequency of a signal received by the wireless identification tag. Based on any number of factors within system design parameters, a circuit in the tag may cause the tag to operate in alternate modes of operation. One factor that may influence the mode of operation is the frequency of the signal received by the tag. One frequency signal may cause the tag to operate in a first mode, while a second frequency signal may cause the tag to operate in a second mode. Thus, as discussed above, the wireless tag may include a circuit capable of determining the frequency of a received signal and to alter the tag's mode of operation as a function thereof.

Figure 19:
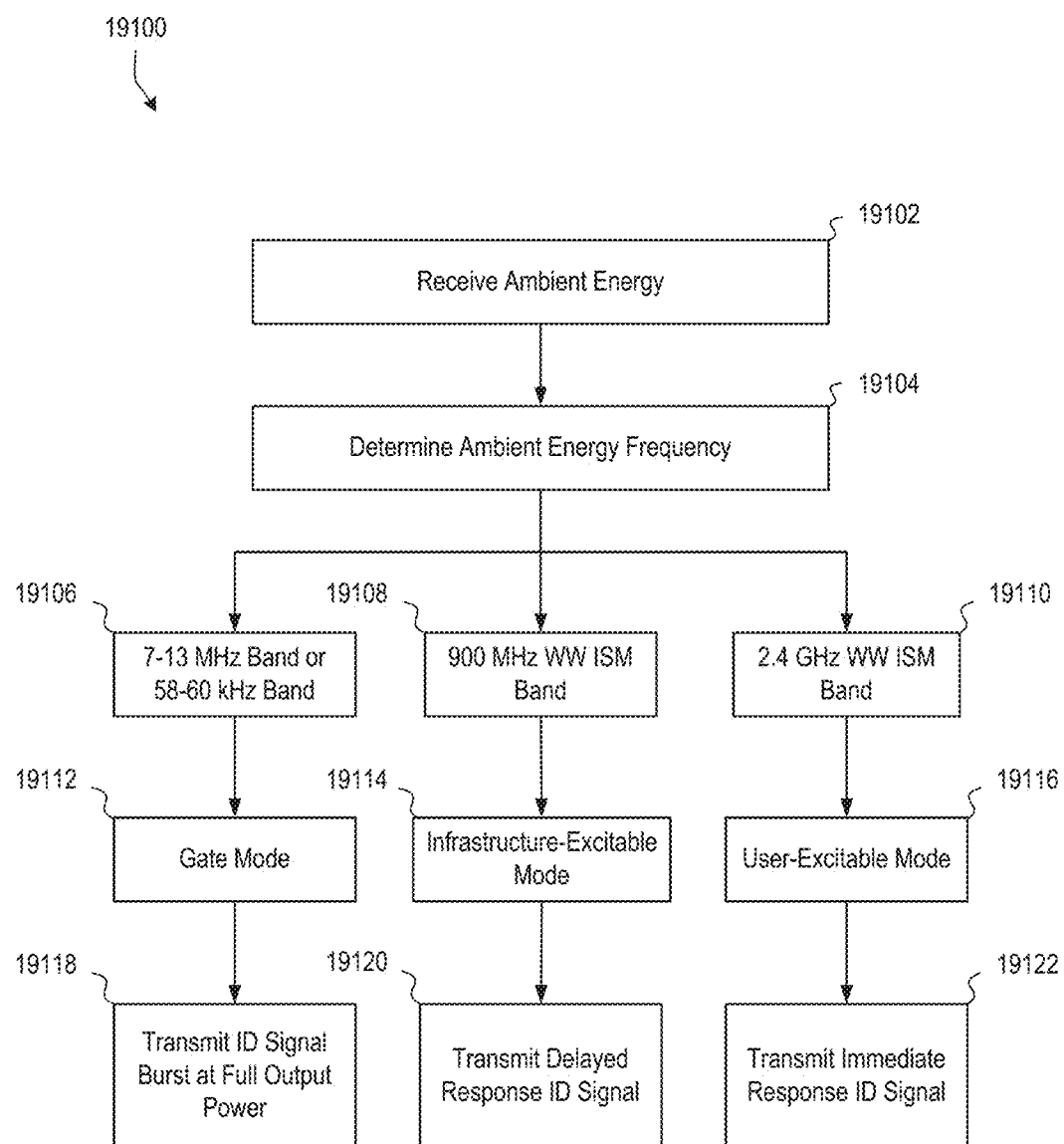
FIG. 19 is a flow diagram of an exemplary operation method, consistent with disclosed embodiments.

FIG. 19 is a flow diagram of an exemplary operation method of a wireless tag. The tag may receive ambient energy as reflected in block 19102 and determine the frequency in which the ambient energy is received as reflected in block 191104. If the tag determines that energy is received in a 7-13 MHz band or 58-60 kHz band as reflected in block 19106, one or more circuits in the tag may cause the tag to operate in gate mode, as reflected in block 19112. This may result in transmissions of bursts of identification signals at full output power, as reflected in block 19118. Alternatively, the tag may determine that energy is received in a 900 MHz WW ISM band as reflected in block 19108 and cause the tag to operate in an infrastructure-excitable mode which, in the case of a retail establishment, may be referred to as store mode, as reflected in block 19114. As a result, transmission of an identification signal may be delayed, as reflected in block 19120. As a further alternative, the tag may determine that energy is received in a 2.4 GHz WW ISM band as reflected in block 19110, and cause the tag to operate in a mode referred to as user-excitable mode, IoT mode, or home mode as reflected in block 19116. This in turn causes transmission of an immediate response identification signal as reflected in block 19122.

In some embodiments, the circuit may be further configured to cause the at least one transmitter to operate in the first mode when the wireless identification tag receives a signal in at least one of a first frequency band of 900 MHz WW ISM or a second frequency band of 2.4 GHz WW ISM. For example, the first, mode may be triggered by one of a 900 MHz WW ISM signal or a 2.4 GHz WW ISM signal. Alternatively, either of the 900 MHz WW ISM signal or a 2.4 GHz WW ISM signal may trigger the first mode of operation. Similarly, the circuit may be further configured to cause the at least one transmitter to operate in the second mode when the wireless identification tag receives a signal in at least one of a first frequency band of about 7-13 MHz or a second frequency band of about 58-60 kHz. One of a 7-13 MHz signal or a 58-60 kHz may trigger the second mode. Alternatively, regardless of which of the two ranges of signals are received, the second mode may be triggered. In these examples, the first mode may be an infrastructure excitable mode and the second mode may be a gate mode. The frequency band of about 7-13 MHz may include any frequency compatible with radio frequency ("RF") EAS systems. Operating frequencies for RF-EAS systems may include any frequency in the range of 1.8 MHz to 13 MHz. The frequency band of about 58-60 kHz may include any frequency compatible with acousto-magnetic ("AM") EAS systems. Operating frequencies for AM-EAS systems may include any frequency in the range of 58-60 kHz.

In some embodiments, the at least one transmitter may be configured to transmit to the first receiver in a first location different from a location of the second receiver, and the at least one transmitter may be further configured to transmit the second signal after a shorter delay than a delay before transmitting the first signal. Depending on design parameters, some signals might be transmitted more quickly than other signals. For example, the first receiver may be located in the interior of an establishment or in any location not associated with an EAS gate while the second receiver may be located near an EAS gate or in proximity to an EAS gate. In this exemplary scenario, since receipt of an identification signal may have greater criticality than receipt of a recurring signal from an inventory management system, a tag may be designed to send an identification signal with lesser delay to a receiver in a vicinity of an EAS gate than to a receiver that is not in a vicinity of an EAS gate.

In the example shown in FIG. 12, the tag 1100 may be configured to transmit to receiver 11300*e* or receiver 11300*f*, located in the interior of a retail store after a delay (depending on design parameters, fractions of a second to minutes or even hours). In the example shown in FIG. 13, the tag 1100 may be configured to transmit to receiver 11300*c* or a receiver located in a device 11200 after a shorter delay of, for example, less than ten seconds. In the example shown in FIG. 14, the tag 1100 may be configured to transmit to receiver 11300*h* or a receiver located near a gate with a minimal delay of, for example, less than 200 ms.

In some embodiments, the at least one circuit may be further configured to detect whether energy is received in a frequency other than the first frequency, and to cause the at least one transmitter to send the second signal to the second receiver less than ten seconds after the energy received in the other frequency is detected. For example, the wireless tag may include a circuit that is able to determine the frequency in which energy is received. When the circuit determines that the received energy is in a frequency hand other than a frequency band associated with infrastructure-excitable mode (e.g., store mode), the circuit will cause a transmitter in the wireless tag to send a signal to a receiver without delay or with a delay on the order of fractions of a second. In one example, the circuit will cause a transmitter in the wireless tag to send a signal to a receiver no longer than ten seconds after the circuit detects that the energy received is in a frequency other than the frequency band associated with store mode.

Referring to FIG. 10, the power manager 9010 may detect the frequency in which energy is received and send a signal to the top level controller 9020 indicating the frequency in which the energy was received. The top level controller 9020 may then implement transmissions according to a user-excitable mode such as IoT mode FSM 10004 or gate mode FSM 10006.

In some embodiments, the first signal differs from the second signal in at least one of repetition period, a time interval between two consecutive responses, a data encryption mechanism, a transmission power, or data content of the transmission. The first and second signals may differ in frequency, as discussed previously, but alternatively, or additionally, may differ in other respects. For example, a signal may repeat periodically to ensure receipt by the receiver. The first or second signals may have a repetition period that differs from the other. Similarly, the tag may not permit a signal to be sent until a predetermined time period elapses from a prior transmission. The first and second signals may differ in these time intervals. Likewise, different signals may be encrypted differently, may differ in their power, or may contain differing information. These are just a few examples. The identification signal may vary in any other signal parameter.

In some embodiments, a transmission sent while the wireless tag is operating in infrastructure-excitable mode (e.g., store mode) may have a repetition period of ten minutes. In other example, a transmission sent while the wireless tag is operating in infrastructure-excitable mode (e.g., store mode) may have a repetition period of ten minutes with an additional randomized delay period between zero and five minutes.

Data encryption mechanisms may include a process of encoding a message or information in such a way that only authorized entities can access it and those who are not authorized cannot. Encryption by itself may not prevent interference with a data transmission, but it may block those without knowledge of the decryption process from interpreting the message or information. An encryption processes may include the use of an encryption key, which may be a piece of data that is shared between the transmitter of the message and the intended recipient at a point in time prior to the transmission of the encrypted message. The use of an encryption key enables multiple parties to use common encryption processes, while still maintaining the secrecy of the messages as long as the keys are unique and kept secret. A message would be considered decipherable or readable by a receiving party if it is transmitted in accordance with a protocol that is agreed upon by both the sending and the receiving party. In the case of an encrypted message, the message may be decipherable or readable if the receiving party also has all the details of the type of encryption used, including the encryption key.

Data content may include a unique identifier associated with the wireless tag, a status of the wireless tag, a location of the wireless tag, a power level of the wireless tag, pricing information, ownership information, styling information, data relating to the trigger that initiated the transmission, or any information conveyed by the signal.

In some embodiments, the first signal may include first identification data and the second signal includes second identification data, and at least one of the first identification data or the second identification data may include a unique identifier of the wireless identification tag. For example, the tag, operating in infrastructure-excitable mode (e.g., store mode), may send a signal. The data content of the signal may include identification data. The identification data may include a unique identifier associated with the wireless tag. Additionally, or alternatively, the tag, operating in user-excitable mode (e.g., IoT mode) or gate mode, may send a signal. The data content of that signal may also contain identification data which may also include the unique identifier associated with the wireless tag.

In some embodiments, when the energy stored in the energy storage component is determined to be below a predetermined threshold level, the at least one circuit may be configured to cause the at least one transmitter to transmit an alternative signal to the first receiver with less energy than is required to transmit the first signal to the first receiver. For example, the wireless tag may include a circuit configured to monitor energy stored in the energy storage component. When the energy stored in the energy storage component is less than a predetermined threshold level, such as an amount of reserve energy, as discussed above, the wireless tag may cause the transmitter to transmit an alternative signal to a receiver using less energy than the transmitter would use if the energy stored in the energy storage component was above a predetermined threshold level. The alternative signal might be a form of the first signal, containing less information, it may be a distress signal, or it may simply be identical to the first signal in all respects other than power level.

Referring to FIG. 10, wireless tag 1100 may include a power manager 9010 which monitors the amount of energy stored in the energy storage circuit 2108. The power manager 9010 may communicate the amount of energy stored in the energy storage circuit 2108 to the top level controller 9020. The top level controller 9020 may determine if the amount of energy stored in the energy storage circuit 2108 is below a predetermined threshold level. If the top level controller determines that the amount of energy stored in the energy storage circuit 2108 is below a predetermined threshold level, then the top level controller 9020 may cause the transmitter 2104 to transmit a signal with less energy than is typically required. This may occur by altering any number of characteristics of the signal, as discussed above.

In some embodiments, the at least one circuit may be configured to implement an identification transmission rule for regulating the at least one circuit in a manner causing the at least one transmitter to delay sending the first signal to the first receiver, even when sufficient energy is stored in the energy storage component for transmitting the second signal to the second receiver. For example, even if sufficient reserve energy exists to permit subsequent transmission, another transmission rule might block a transmission from occurring. The rules may vary based on design parameters of a particular system.

Referring to FIG. 10, power manager 9010 or top level controller 9020 may implement a rule that governs signal transmission. If that rule would be violated, a transmission might not be sent, or might be delayed. In some embodiments, the at least one circuit may be further configured to implement the identification transmission rule to cause the transmitter to send the first signal to the first receiver in a predetermined time interval. For example, the wireless tag may include a circuit designed to implement store mode, as disclosed above. While operating in store mode, the tag may send a signal to a receiver in a predetermined time interval, as discussed above.

In some embodiments, the at least one circuit may be further configured to implement the identification transmission rule to randomly select a time interval between two consecutive transmissions of the first signal to the first receiver. Randomness may prevent signals from overlapping, creating collisions, and overwhelming the receiver. For example, in infrastructure-excitable mode (e.g., store mode), when infrastructure may excite many tags simultaneously, a random response from each tag may space apart the transmissions to prevent the receiver from being overwhelmed.

In some embodiments, the at least one circuit may be configured to conserve energy by activating for a first predetermined length of time and deactivating for a second predetermined length of time, in a repeating manner. For example, after a signal is transmitted, the tag may be deactivated for a period so as not to continue to send the same signal repetitively. This, in turn, conserves energy. For example, in an establishment where the infrastructure repeatedly excites many tags, a tag that has already responded may be configured not to respond to the same signal until a predetermined time period has elapsed. While operating in infrastructure-excitable mode (e.g., store mode), for example, the tag may conserve energy by activating for a first predetermined amount of time and then deactivating for a second predetermined amount of time. The first and second predetermined amount of time may be the same amount of time, different amounts of time, or randomized amounts of time, as discussed above.

Embodiments of the present disclosure may include a system for detecting misplaced items in an establishment. An establishment may include any area, building, or structure in which an inventory of items may be or maintained, such as, for example, a retail establishment, store, warehouse, distribution center, logistics center, fulfillment center, manufacturing area, shipping area, storage area, home, medical facility, eating establishment, kitchen, or any other area where it may be beneficial to track items. An item may include any object that may be stored within an establishment. By way of non-limiting examples, an item may include, food, clothing, electronics, consumer goods, equipment, vehicles, consumables, packaging, accessories, supplies, materials, artistry, animals, persons, instruments, pallets, containers, pharmaceuticals, commodities, articles, devices, machinery, implements, mechanisms, tools, furniture, or any other object that may be present in an establishment.

Consistent with disclosed embodiments, the term "misplaced items" may refer to one or more items that are not located within a designated location associated with the one or more items within an establishment. For example, an establishment may be organized in such a way that certain locations within the establishment may be associated with one or more items, or that one or more items are associated with one or more particular locations. A location within the establishment may include one or more storage areas, such as, for example, a storage unit, shelf, cabinet, rack, room, or any other storage structure or area that may be associated with one or more items. A location may also not be associated with any items whatsoever. For example, a fitting room, checkout lane, restrooms, empty floor space, or any other area location that is not associated with the storage of items may also be a location in the establishment, consistent with disclosed embodiments. In this context, for example, a misplaced item may be an item located on the wrong shelf or rack, in the wrong department, or in any location not designated for the object (e.g., clothes in a fitting room).

By way of example, FIG. 11 is a perspective view of a retail establishment, which may contain a plurality of clothing items. Within this exemplary establishment, there may be one or more locations designated for certain purposes, such as the storage and/or display of a particular item or the facilitation of other activities relating to operation of the establishment. For example, the establishment may contain rack 11250 and shelf 11240 that are designated for the storage and/or display of a certain item, such as a particular article of clothing. The establishment may also contain other locations, such as fitting room 11230, that are not associated with the storage and/or display of items but enable customers to perform certain activities within the establishment, such as trying on different clothing items. Disclosed embodiments may provide systems, such as item location monitoring system 20000 in FIG. 20, and methods that enable, for example, the detection of a misplaced item, such as an item located in fitting room 11230, instead of its designated location on rack 11250.

Disclosed embodiments may also include a system for reporting a location of items in an establishment. A system consistent with disclosed embodiments may, for example, monitor the location of items in the establishment and report the locations to a device, person, or any other entity. Reporting may include generating a signal to be transmitted through a suitable medium indicating the location of an item, displaying, on a graphical user interface, the location of the item to the user, or any other suitable communication indicating the location of an item. By way of example, in FIG. 20, system 20000 may monitor the location of location tags 1110 and may be configured to report the locations, for example, by generating a signal 20204 that causes graphical user interface 20100 on device(s) 20008 to display information indicating the location of the item.

Figure 20:
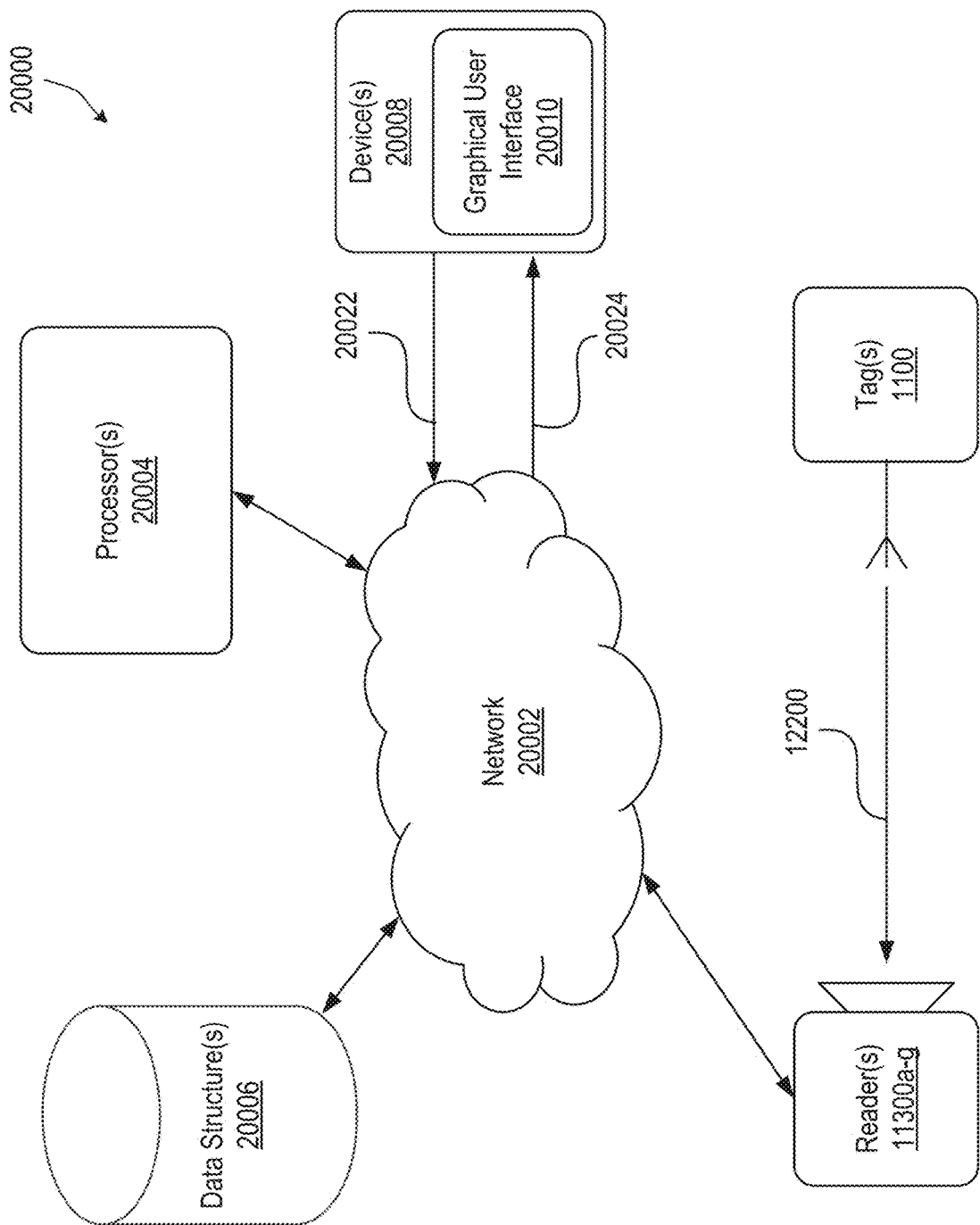
FIG. 20 is a network diagram of an exemplary system for monitoring the location of items within an establishment, consistent with disclosed embodiments.

Disclosed embodiments may include at least one processor. A processor may be any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact. By way of example, as illustrated in FIG. 20, a system 20000 for monitoring the location of items in an establishment may include processors(s) 20004, which may be configured to implement and/or execute one or more of the processes and methods consistent with the present disclosure.

Consistent with the present disclosure, disclosed embodiments may also involve a network. A "network" may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, Bluetooth™, Bluetooth Low Energy™ (BLE), Wi-Fi, near field communications (NFC), or other suitable communication methods that provide a medium for exchanging data and/or information between separate entities. By way of example, as illustrated in FIG. 20, a system 20000 for monitoring the location of items in an establishment may include network 20002, which may enable the exchange of data and/or information of devices in the system (e.g., processor(s) 20004, data structure(s) 20006, device(s) 20008, reader(s) 11300a-g, etc.).

Disclosed embodiments may include receiving, from at least one reader in the establishment, identification signals of identification tags read by the at least one reader. A reader may include one or more devices, circuits, components, or combinations thereof capable of receiving and processing electromagnetic signals. For example, a reader and/or circuit may include two or more interconnected components. As discussed above, non-limiting examples may include a combination of components and/or devices, implemented as part of a silicon chip, as part of a printed-circuit board, as part of a connectorized system or as a combination of any of the above, connected in a manner enabling the performance of a desired function or reaction.

Figure 21:
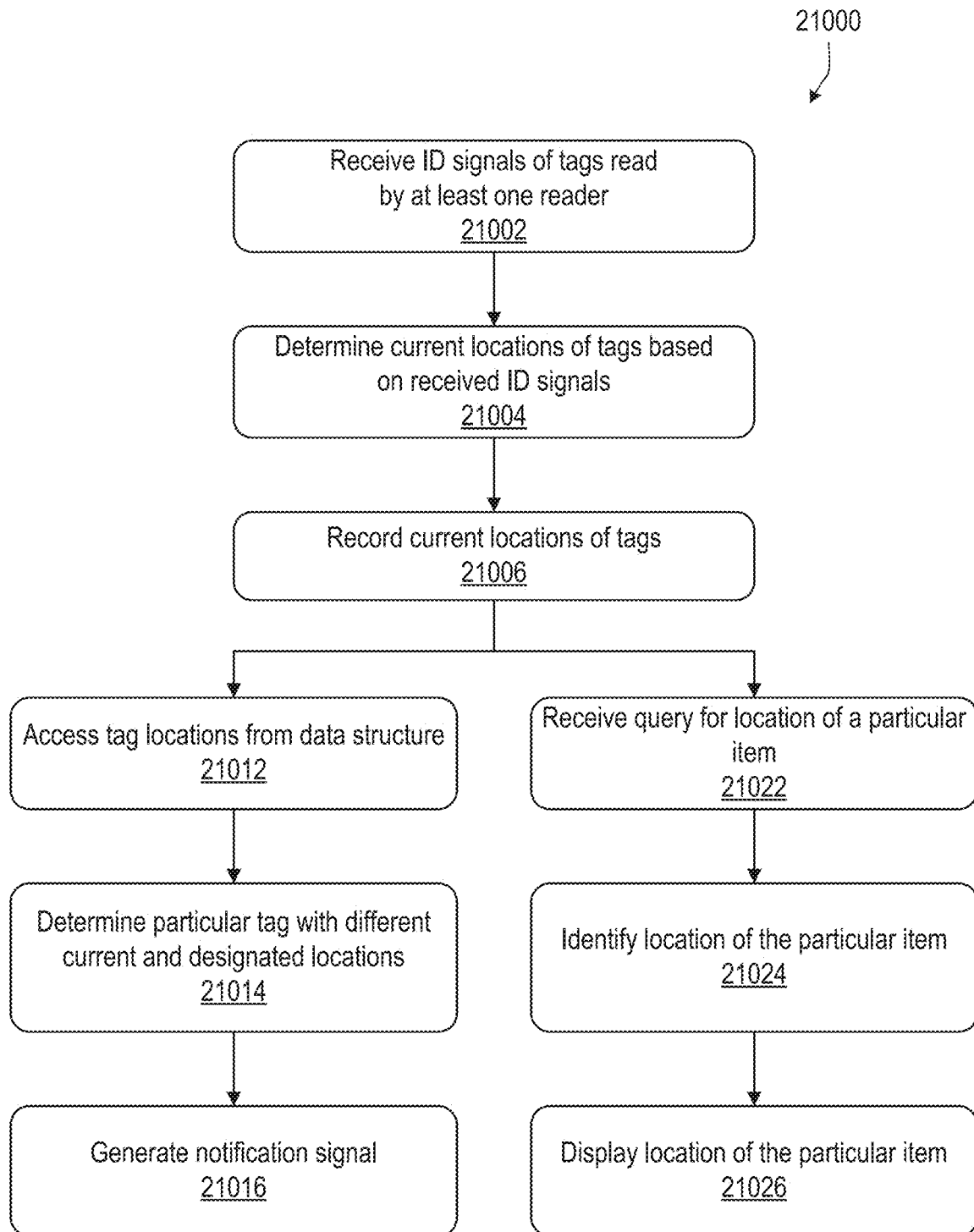
FIG. 21 is a flowchart of an exemplary computerized process for reporting a location of items in an establishment, consistent with disclosed embodiments.

An establishment may be equipped with readers 11300*a-g*, as illustrated in FIGS. 11-13. The retail establishment may house a plurality of items containing identification tags, such as product containing identification tag 11210. The identification tags associated with the products may, for example, be tag 1100 as illustrated in FIGS. 3-8, 15, and 20. Readers 11300*a-g* may be capable of receiving one or more identification signals from the tags, such as signal 12200 as illustrated in FIGS. 12-13 or signals 15102*a-c* as illustrated in FIG. 15. By way of example and as illustrated in FIG. 21, receiving, from at least one reader in the establishment, identification signals of identification tags read by the at least one reader may occur at step 21002 of exemplary computerized process 21000 for reporting a location of items in an establishment, consistent with disclosed embodiments.

According to some disclosed embodiments the at least one reader may include at least one of a handheld scanner or a fixed scanner configured to automatically read signals transmitted by the identification tags. A handheld scanner may be a device provided to an employee or customer by the establishment for use during working routines or in a shopping session, a mobile communications device of such an individual, or any other handheld device capable of performing the functions of a reader, consistent with disclosed embodiments. A fixed scanner may be a device fixed to any wall, ceiling, or any other affixable structure that is capable of performing the functions of a reader. By way of example, in FIG. 11, readers 11300*a-h* may be fixed scanners affixed to certain structures (e.g., walls, ceilings, fixtures) in the establishment. A customer or employee may, for example, use handheld device 11200 as a handheld scanner, which may be a device dedicated to scanning or any other mobile device capable of performing the functions of a reader, consistent with the present disclosure.

In some disclosed embodiments, an identification tag may be configured to receive and store ambient energy, and to power transmission of the identification signals using the stored ambient energy. Ambient energy may refer to energy present in the environment of an identification tag. As discussed above, the energy may be produced by environmental factors, electromagnetic signals transmitted in the environment, or any other energy source. For example, fixed scanners 11300*a-h* may serve as sources of ambient energy, as may Wi-Fi or other electromagnetic infrastructure. Exemplary tag 1100 may include components such as energy storage circuit 2108, storage capacitor 10300, and/or energy storage component 15008. Any one or more of the components, for example, may be configured to receive energy from antennae 2112, 2114, and/or 15002A-C, store the received energy, and make the energy available to other components within the tag. In one example, energy received in one form may be stored in a second form and may be provided to components in a third form. According to some disclosed embodiments, ambient energy may be used to power transmission of the identification signals.

In some disclosed embodiments, an identification tag may be configured to transmit the identification signals according to a predetermined timing sequence. A predetermined timing sequence may, for example, include timing patterns governing when identification signals may be transmitted from the identification tag. The timing sequence may include a constant, random or variable periodicity at which the identification signal is transmitted (e.g., twice an hour, at 1:20 p.m. and 1:45 p.m., etc.). Alternatively, or additionally, the timing sequence may follow an incoming trigger signal (e.g., upon receipt of a trigger signal, the tag transmits a response one or more times, according to a rule; and/or when stored energy reaches a threshold level, the reaching of the threshold may trigger a transmission). Indeed, any programmed condition or rule may drive the transmission of an identification signal. By way of example, in FIG. 20, identification tag 1110 may transmit identification signal 12200 multiple times a day, regardless of any input from the components of system 20000. Or, a transmission may occur as the result of a signal sent from an exciter to tag 1110. Depending on implementation, that signal might emanate from one or more of readers 11300*a-g*, or any other source.

Consistent with the present disclosure, at least one identification tag may be configured to operate in a first transmission mode when the at least one identification tag receives energy in a first frequency, and to operate in a second transmission mode when the at least one identification tag receives energy in a second frequency that is higher than the first frequency, wherein the first transmission mode differs from the second transmission mode in at least one of a repetition period of a transmitted signal, a transmission power level, or data content of the transmission. For example, a first mode may refer to a step where a first signal is sent, and a second mode may refer to a step where a second signal sent. The first and second modes, may also refer to differing operating characteristics. These characteristics may include communication medium, communication protocols, frequencies, frequency ranges, frequency bands, types of encryption, scrambling, and/or disguising, data content, timing of transmission, and/or any other distinguishable characteristic that may be associated with the identification signal to be transmitted.

By way of example, circuit 15006 in FIG. 15 may detect energy 15102A received by one or more of antennae 15002A-C. In response to this detection, circuit 15006 may cause any one or more of transmitters 15004A-C to operate in a first mode. Operating in the first mode, for example, may include transmitting one or more of signals 15104A-C, wherein signals 15104A-C may have different characteristics such that each signal is distinguishable from one another in at least one aspect. Circuit 15006 may also detect receipt of energy 15102B by one or more of antennae 15002A-C, wherein energy 15102B is in a frequency that is higher than the frequency of energy 15102A. In response to this detection, circuit 15006 may cause any one or more of transmitters 15004A-C to operate in a second mode. Operating in the second mode, for example, may include transmitting one or more of signals 15104A-C, wherein one or more of signals 15104A-C may be different, either alone or in combination, from the signals 15104 A-C transmitted in the first mode.

Disclosed embodiments may include determining current locations of the identification tags based on the received identification signals. For example, an identification tag within an establishment may transmit a signal that may be received by one or more readers in the establishment. However, depending on the proximity to the one or more readers, the power level of the signal received by each of the one or more readers may differ in magnitude. This magnitude may be used to calculate certain properties of the propagation of the signal over the communication medium, establishing such parameters as the range a signal may be detected at, a value representative of the relative or actual distance at which the signal has been transmitted, the signal-to-noise ratio, interference properties etc. In the context of wireless communication, this magnitude may be measured in units of power, usually either Watts or dBW (decibel-Watts or dB-Watts) which is a logarithmic unit related to Watts (or sometimes in units of dBm, which is related to milliwatts in the same manner dBW is related to Watts). In that sense, a "power level" may refer, for example, to a power measurement immediately at the input of the signal at the reader, while the reader is actively receiving one or more signals.

In some embodiments, determining the current locations of the identification tags may occur by comparing the power level of the received signals at each reader, and determining the current locations of the identification tags based on the comparison. For example, the power level of an identification signal received from an identification tag and by the reader may be higher than the power level of the identification signal received by other readers in the establishment due to the identification tag being closer to the reader than to the other readers. The reader may be associated with a given location, and therefore, based on the reader receiving the strongest signal and its association with the given location, it may be determined that the identification tag is located at that location. Similarly, multiple signal strengths detected by differing readers may be used to estimate a tag's location. For example, using three signal strengths detected by three readers, the system might triangulate to estimate or determine the tag's location.

By way of example, an item located in fitting room 11230 may contain an identification tag 1100 that transmits an identification signal 12200. Due to the proximity of tag 1100 to reader 11300*f*, which may be associated with fitting room 11230, the power level of the signal 12200 received by reader 11300*f* may be higher than the power level of the signal 12200 received by readers located further away from tag 1100 (e.g., readers 11210*a-e* and *g-h*). Therefore, it may be determined that the item is located in fitting room 11230 due to the association of reader 11300*f* to fitting room 11230. For example, this determination may, in FIG. 21, occur at step 21004 of process 21000. In some embodiments, step 21004 of process 21000 may include determining current locations of the identification tags based on the received identification signals.

Signal strength patterns might be determined in advance for location purposes. For example, measurements taken by different readers from a tag in fitting room 11230 might result in a recognizable pattern that can be matched to determine a tag's location in the future. Upon installation of a system, tag readings may be collected from around the establishment to correlate signal strength with actual location. The correlations may be stored in a data structure. Then, in the future, a look-up may be performed on actual readings to identify a tag's location based on the stored data. Similarly, the system may learn over time, using artificial intelligence.

In some disclosed embodiments, the at least one reader may include a plurality of readers configured to receive the identification signals, and the at least one processor may be configured to access position data of the plurality of readers. For example, as discussed above, a processor may access a common incoming data signal received at multiple readers, for use in identifying a location of the tag from which the common signal emanates. The identified position may be a precise, measurable location within the establishment, or it may be a generalized position, such as a room, appliance, department, region, area, rack, shelf, or any other position, depending on system design and the granularity a particular system affords.

Alternatively, specific readers may be associated with specific locations. For example, a single reader may be associated with a single room, such that a signal from that reader indicates that a tag is within the associated room. Or a single reader (or group of readers) may be associated with a region or area, such that a corresponding reading indicates that a tag is located in that region or area. In FIG. 11, for example, readers 11300*c* and 11300*d* may be associated with racks 11250, reader 11300*e* may be associated with shelf 11240, and reader 11300*f* may be associated with fitting room 11230. In FIG. 20, for example, this positioning data may be stored in data structures 20006 and may be accessible by processor(s) 20004 through network 20002.

According to some disclosed embodiment, the at least one processor may also be configured to identify the locations of the identification tags based on the position data of the plurality of readers and power levels of the identification signals received by the plurality of readers. Determining the location of a certain point (e.g., location of an identification tag) in space may be achieved through the use of distance measurements from the point to at least three other points (e.g., readers) whose location is known in advance (i.e., reference points). The method may involve determining, for each of the reference points, the equation or formula describing the sphere whose center lies at the reference point, and whose radius is equal to the distance measured from the reference point to the measured point. Assuming the distance measurement is accurate, the measured point will be found at some point on the surface of the sphere, for each of said spheres. Given at least three such spheres (and assuming the three reference points are appropriately spaced), there will usually be no more than two points in space in which the three spheres all intersect at a single point. In most realistic systems, determining which of the two solutions is the right location of the measured point can be done using prior knowledge (for example, when the three reference points are at ground level, one of the solutions will be below ground, which can easily be ruled out). Also, learned data about the establishment might be used to rule out improbable solutions. For example, if one of a number of solutions would place shoes in a jewelry department and another solution locates the shoes in the shoe department, the first solution might be discarded by the system as less probable, and the second solution accepted. This may occur as the result of stored initialization data recording expected locations for various items, or it may occur through machine learning, by detecting and recording where items are typically located.

The distance measurement may be performed in multiple ways, such as direct tape or ruler measurement, measuring the time-of-flight for a light signal or radio signal to travel from the reference point to the measured point (or vice versa, based on the fact that the speed of light is constant and finite regardless of the location or movement of the reference points or the measured point), or by measuring the power level at which a signal is received at the reference point (e.g., a reader) when a transmission at a known power level is transmitted from the measured point (basing the measurement on the fact that radio waves are attenuated in free space by a ratio proportional to the square of the distance).

Figure 22:
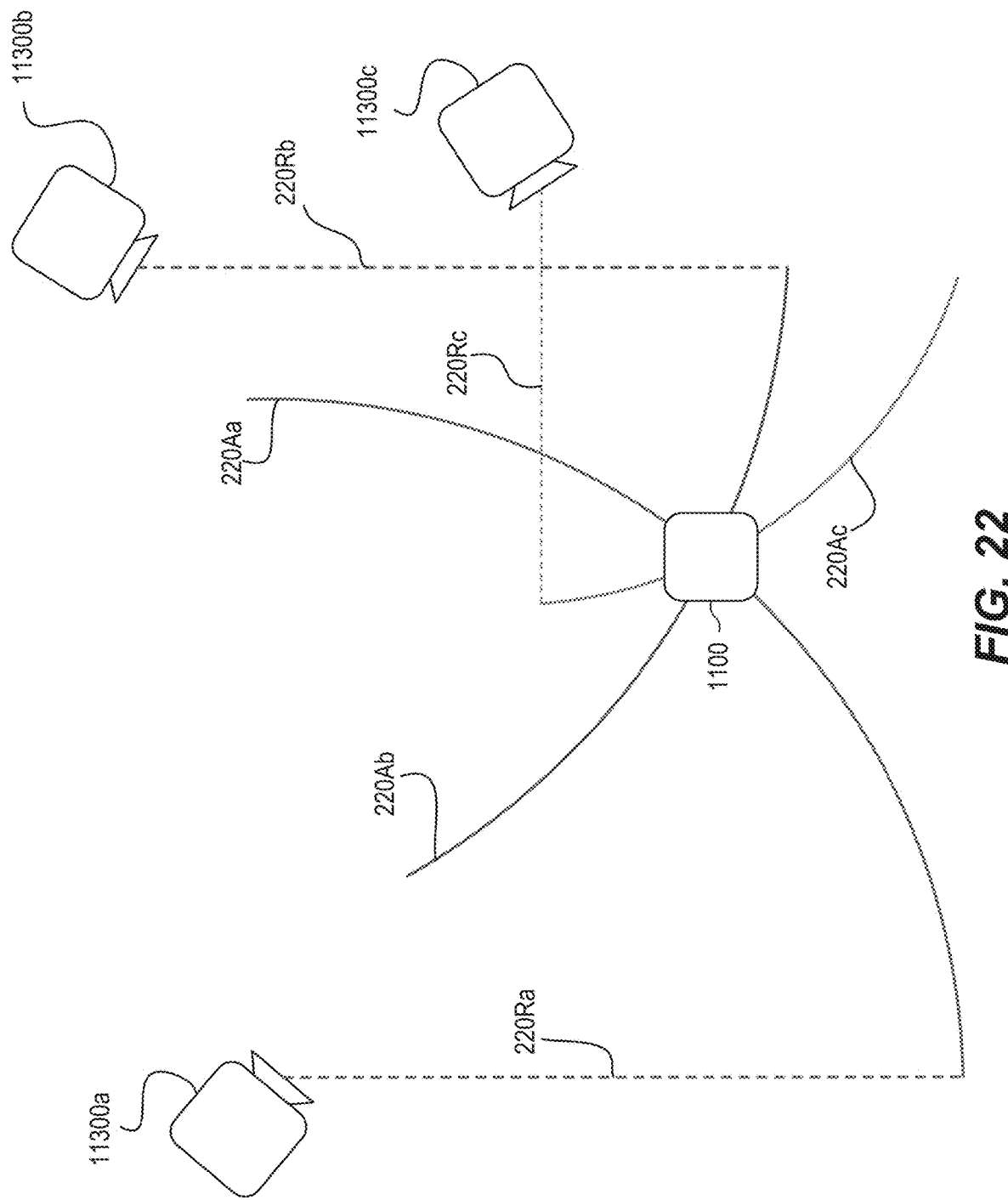
FIG. 22 is an illustration of an identification tag within an infrastructure environment for identifying the particular location of the identification tag, consistent with disclosed embodiments.

For ease of discussion, FIG. 22 illustrates a network in which the locations of an identification tag may be determined based on position data of a plurality of readers and power levels of the identification signals received by the plurality of readers. For example, although identification tag 1110 may transmit an identification signal at a single known power level, the power level of the identification signal received by each one of readers 11300*a-c* are not the same due to variances in distances between identification tag 1110 and each of readers 11300*a-c*. Based on the differences between the known transmitted power level and the received power level, a processor (e.g., processor(s) 20004 in FIG. 20) may determine that the identification tag 1110 is at (1) a distance equal to radius 220Ra from reader 11300*a*; (2) a distance equal to radius 220Rb from reader 11300*b*; and (3) at a distance equal to radius 220Rc from reader 11300. Using the known position data of the plurality of readers and the distances of each reader, a processor may triangulate or otherwise determine the precise location of identification tag 1110 (arcs 220Aa-c intersect at only one point). Although this illustrates a method on a two-dimensional medium, it is to be understood, as described above, that these methods or similar methods may be used to precisely locate identification tags in a three dimensional environment, consistent with the present disclosure.

Disclosed embodiments may include recording, in at least one data structure, the current locations of identification tags. A data structure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

According to disclosed embodiments, recording the current locations of identification tags may include inserting into, updating, or otherwise modifying data values contained in the data structure so that at least one or more data values represents a current location of an identification tag and/or a designated location of an identification tag. The data values may include and/or represent a time stamp associated with the time the identification signal was received or a time the location was determined and/or recorded, a name and/or coordinates of the location, an identity of one or more readers that received the identification signal and associated power levels received, or any other suitable identifier or data values representing the current location of an identification tag. According to disclosed embodiments, the data contained in the data structure may be updated on a periodic basis (e.g., bi-hourly, hourly, daily, etc.), in real-time (i.e., continuously updating data), or upon any sort of trigger or input of data and/or information into the system.

By way of example, as illustrated in FIG. 20, processor(s) 20004 may be configured to record the current locations of identification tag(s) 1110 into data structure(s) 20006. Data structure(s) 20006 may contain a record of current locations of identification tags, and may be configured to insert data into, update, or otherwise modify the data structure, consistent with the present disclosure. For example, in FIG. 21, this action may occur at step 21006 of process 21000. In some embodiments, step 21006 of process 21000 may include recording the determined current locations of the identification tags in at least one data structure.

Disclosed embodiments may also include accessing, in the at least one data structure, a designated location in the establishment for each of the identification tags. As discussed previously, a data structure may maintain a record including items in the establishment, identification tags associated with the items, current locations of the items and/or identification tags, and designated locations for the items and/or identification tags. A designated location may be an assigned location within the establishment associated with the identification tag for storage and/or display and/or use of the associated item within the establishment. A designated location within the establishment may include one or more such areas, such as, for example, a storage unit, shelf, cabinet, rack, room, workbench, enclosure, or any other storage structure or area that may be associated with one or more items for display and/or storage and/or use.

By way of example, in FIG. 11, an item having an identification tag 11210 may be associated with a designated location, such as rack 11250 or shelf 11240. The association between tag 11210 and its designated location may, in FIG. 20, be recorded in data structure(s) 20006, so that other devices in system 20000 may access this information. Accessing this information, as illustrated in FIG. 21, may occur at step 21012 of process 21000. In some embodiments, step 21012 of process 21000 may include accessing the current locations of the identification tags in the at least one data structure.

Disclosed embodiments may also include determining, by comparing the current locations of the identification tags with the designated locations of the identification tags, a particular identification tag with a current location that differs from the designated location of the particular identification tag. As discussed previously, disclosed systems may maintain and monitor a record of designated locations and current locations of identification tags. Comparing the current locations of the identification tags with the designated locations may occur immediately after a tag identifies itself or at some time thereafter, consistent with rules implemented within the system. When an identification tag is located somewhere that is not its designated location, disclosed embodiments may determine a mismatch by comparing the current tag location with the designated tag location.

By way of example, in FIG. 11, a customer may leave a product (e.g., item having an identification tag 11210) in fitting room 11230. Based the identification signal picked up by reader 11300*f*, the system is able to determine that the current location of the item is fitting room 11230; however, the designated location for the item may be rack 11250. In FIG. 20, the current location (i.e., fitting room 11230) and the designated location (i.e., rack 11250) may be recorded and accessible in data structure(s) 20006. Processor(s) 20004 may access this information through network 20002, for example, and determine through a comparison that the current location is different than the designated location. For example, in FIG. 21, this may occur at step 21014 of process 21000. In some embodiments, step 21014 of process 21000 may include determining, by comparing the current locations of the identification tags with the designated locations of the identification tags, a particular identification tag with a current location that differs from the designated location of the particular identification tag.

In some disclosed embodiments, the at least one reader may be configured to receive gate signals from the identification tags when the identification tags are in at least one predetermined location. Gate signals may refer to a particular type of signal or transmissions during certain modes n (e.g., gate mode) that the identification tag may be configured to transmit when the identification tag is located in a predetermined location. The predetermined location may be associated with a point of sale, such as a checkout counter, a security gate area, an entry/exit of the establishment, or any other area in which it may be desirable for a tag to transmit a gate signal, for example, a customer in possession of an item containing an identification tag, may take the item into an area in which the infrastructure transmits a gate trigger, causing the tag to respond with transmission of a gate signal.

In some embodiments, the at least one processor is configured to determine that the specific item is being sold when a specified reader receives the gate signal from the identification tag associated with the specific item. For example, a gate signal may be transmitted by an identification tag when a customer brings an item containing the tag to a predetermined location associated with sales of items. When a reader receives the gate signal, the at least one processor in the system may be configured to determine that a sale has occurred. By way of example, in FIG. 14, a customer may bring a product containing identification tag 1100 into a gate area at the exit of an establishment, such as between gates 1112 and 1114. Signals 14100 transmitted by one or more of gates 1112 and 1114 may, for example, cause tag 1100 to transmit gate signal 12200, which may be received by reader 11300h. Based on receiving the gate signal, at least one processor, such as processor(s) 20004 in FIG. 20, may determine that a sale of the specific item associated with identification tag 1100 is occurring. In this instance, the customer may not be required to visit a cashier, but may automatically check out simply by leaving the establishment. In other embodiments, a customer might have tags read at the time of checkout (e.g., in a checkout line such as with a user-activated exciter or infrastructure in the cashier area), and again at the egress gate, which may provide a notification for items that were not recorded at the cashier (or cause an automatic additional charge to the customer for items not recorded at the cashier).

In some disclosed embodiments, the at least one processor may be further configured to determine that a specific identification tag is associated with a specific item being sold, and update the at least one data structure to remove the specific item from the establishment's inventory. As discussed, at least one processor may be able to determine the occurrence of a sale due to data signals transmitted by an identification tag and received by a reader. In response to determining the existence of a sale, the processor may remove the specific tag from an inventory associated with the establishment. An inventory may, for example, include list of current items and associated identification tags held at an establishment or any other inventory record in the at least one data structure accessible to the at least one processor. An inventory may also include a collection of items, usually in the context of items available for sale which are located at a store, warehouse or distribution center. For example, in a retail store, an inventory may include all items which are currently on the shelves as well as in the back room, and may also include items which are in the hands of customers but have not yet been purchased. In some embodiments, however, an inventory may not include damaged items that were returned by customers or identified by staff, or items that have already been purchased but awaiting delivery or pick up. An inventory may include, other than the list of items (usually as a list of SKU's and possibly serial numbers), other attributes of each item, such as its size and color, associated department, category and style, manufacturing history, item images, laundry instructions etc.

Removing the record of the identification tag from inventory may include deleting a record of the identification tag, flagging the record of the identification tag as being sold, moving the record of the identification tag from an inventory associated with the establishment to a record of sold items, or any other modification of an inventory indicating that the product associated with the specific identification tag was sold. By way of example, in FIG. 20, once processor(s) 20004 determine that a product associated with a particular identification tag 1110 is sold, processor(s) 20004 may modify or update an inventory record in data structure(s) 20006 so that the sold product is removed from the inventory.

According to some embodiments the at least one processor may be further configured to modify the data structure to store a unique tag identifier and at least one item attribute for each of the identification tags in the establishment, the at least one item attribute for each identification tag corresponding to at least one of a size, a color, or a style of the item associated with the identification tag. A unique tag identifier may be a number, string, or other form of data which is singularly associated with an identified entity, such that no single entity is associated with the same unique identifier as any other entity, and any single entity can only have a single unique identifier associated with it. Some non-limiting examples of unique identifiers are serial numbers, unique EPC codes, database entries (as long as each database entry represents a single entity, and all relevant entities are represented by exactly one entry in the database) or any other unique identifier associated with a singular entity.

The at least one processor may store a unique tag identifier, for example, when an item associated with a unique identifier is received by the establishment from a supplier, when an item associated with a unique identifier is returned to the establishment by a customer, or any other situations that cause inventory changes. In addition to storing the unique tag identifier, the processor may be configured to store information regarding attributes of the item, such as a size, color, style, function, price, or any other characteristic of the item. This information may be recorded and stored at the time of manufacture or may be later entered manually or through an automatic process such as automatic scanners, smart shelves, machine vision, sensor fusion, etc. As items pass through the distribution chain from manufacturer, to supplier, to retailer and to customer, some or all of the stored information may be passed downstream electronically. Thus, when a retail establishment receives pallets, cartons or racks of tagged products for sale, the tag data associated with each of the products may be transmitted to the retailer as part of the transaction. Upon receipt, the data may be quickly uploaded to the retailer's inventory system, so that the retailer has a detailed, characterizing record of each product received. The retailer's system can then independently scan all tags associated with received products to ensure that all purchased products were actually received and moved into inventory.

As data is passed up the chain, the data may change. For example, the manufacture might not send to the distributor the name of an individual involved in manufacturing the product, although that data may be retained by the manufacturer for lookup should there ever be a downstream complaint about a product's quality. Similarly, the distributor might choose not to pass downstream the price it paid for the product, although it is likely to retain that data in its system. And, to the extent data is made accessible to the customer, the customer may only be able to access a record of the purchase price, date and time of purchase, and information characterizing the product. Of course, although the customer might not be able to access upstream data, if a question ever arises about a product, a scan of the tag made available to upstream supply chain entities may enable those entities to quickly assess data not accessible by downstream custodians, or such entities may decide to make some or all of that data accessible to said downstream custodians if they so choose.

By way of example, the establishment illustrated in FIG. 11 may have received a shipment of red, button-down shirts of various sizes, each associated with an identification tag with a unique tag identifier. In FIG. 20, system 20000 may receive identification signals 12200 from identification tag(s) 1110 associated with the shirts, each identification signal containing a unique identifier associated with the corresponding shirt. Based on the signals, processor(s) 20004 may modify data in data structure(s) 20006 to store the unique tag identifiers and the attributes (e.g., red color, button-down, medium sized, slim fit, etc.) associated with each shirt. Alternatively, processor(s) 20004 may separately have access to an inventory list sent from a prior custodian of the goods, and confirm that all the goods on the inventory list were received into inventory.

Disclosed embodiments may include generating a notification signal when the current location of the particular identification tag does not match the designated location of the particular identification tag. A notification signal may be a signal indicating that a product is misplaced. It may be generated, for example, by a system component, and used to alert another system component of either the same or a different system. The notification may also be configured to alert a person, or any other entity or component capable of receiving a notification, or any combination of the above. The notification signal might include an audible alert (e.g., beeping), visual alert (e.g., flashing lights), or any other sensory signal (e.g., vibration), or a digital signal (such as a notification signal to an application on a mobile device, an interrupt signal to a CPU in an electric circuit board, or an entry in a system alert log) or any other signal suitable for alerting an entity of the occurrence of one or more misplaced items.

In one embodiment, the notification signal may be configured to cause the generation of a textual misplaced item notice identifying a particular product that is misplaced, including an indication of its current incorrect location and an indication of its designated correct location. The notice may be caused to appear at a terminal that may be capable of generating a report. Alternatively, it may be generated on a handheld device of an employee (such as an employee in an area of the misplaced item) with instructions for locating and returning the product to the correct designated location.

Consistent with disclosed embodiments, the notification signal may be generated once it is determined that the current location of the identification tag does not match the designated location. A current location and a designated location may not "match" when they are not identical or similar to some degree. By way of example, in FIG. 11 the current location of an identification tag may be fitting room 11230 while its designated location may be racks 11250. As illustrated in FIG. 20, because the current and designated locations do not "match," a notification signal (e.g., signal 20204) may be generated. For example, in FIG. 21, generation of the notification signal may occur at step 21016 of process 21000. In some embodiments, step 21016 of process 21000 may include generating a notification signal when the current location of the particular identification tag does not match the designated location of the particular identification tag.

According to some embodiments, generating the notification signal may include sending a signal to cause a user device to output at least one of an audible indicator or a visible indicator of the current location associated with the particular identification tag. For example, generating a notification may cause a user device to emit a sound, such as a ping, ringtone, or any other audible alert. The visible indicator, as discussed above, may include at least an indication of an identity of a misplaced product and an indicator of its current location.

Generating the notification signal may include sending a signal to cause a user device to display, on a graphical user interface, the current location associated with the particular identification tag, and wherein displaying the current location includes at least one of displaying an indication of the current location on a map, displaying directions to the current location, or displaying a name associated with the current location. Additionally, the display may include any form of information indicating the location of the item or directing a user to the location of the item. By way of example, in FIG. 20, system 20000 may be used to generate a notification signal (e.g., signal 20204) to be transmitted to one or more user devices 20008. The signal may cause the device to make an audible noise to capture the user's attention, or audibly direct the user to the misplaced item. User device(s) 20008 may also have a graphical user interface 20100 that may, for example, display a map of the establishment with the location of the particular item highlighted, a visual representation of the establishment (e.g., as illustrated in FIG. 11), or directions to the particular item from the user's location.

According to some disclosed embodiments the at least one processor is further configured to modify the data structure to change the designated location of the particular identification tag to the current location associated with the particular identification tag. For example, an item may be in a current location that is different than the designated location associated with the item. In such an instance, rather than maintain an inventory record of where the item should be, the inventory record may be updated to indicate where the item is actually located. Once the item is returned to its proper designated location, the inventory may be updated yet again to record the correct current location. By way of example, in FIG. 11, the current location of an identification tag may be racks 11250 while its designated location is shelf 11240. Rather than incorrectly maintaining in the inventory system the preferred location as the actual location, when, as is illustrated in FIG. 20, readers 11300*a-g* detect the incorrect location and processor(s) 20004 recognizes the new location, processor 20004 may update data structure 20006 to note the incorrect location as the current location.

Disclosed embodiments may also include receiving a query for a location of a particular item in the establishment. A query may include any request for data or information relating to the location of a particular item in the establishment. For example, a customer seeking to locate a particular size of garment not present on a shelf where that size should be located, may input the item number and the desired size. In response, processor(s) 20004 in FIG. 20 might check the data structure(s) 20006 to determine if such a garment is located in the establishment, and may provide the user with directions to the garment. The user in such an instance may be a customer or may be an employee of the establishment. The device may be a cell phone, wearable technology (e.g., electronic glasses, wearable camera or other portable image sensor), a tablet, a self-service kiosk, a dedicated scanner provided by the establishment, or any other device capable of requesting information related to the location of one or more items in an establishment. By way of example, in FIG. 20, system 20000 may include device(s) 20008 configured to send a query (e.g., signal 20202), which may be received by one or more devices in system 20000 (e.g., processor(s) 20004, reader(s) 11300*a-g*, data structure(s) 20006, etc.). For example, in FIG. 21, receiving the query may occur at step 21022 of process 21000. In some embodiments, step 21022 of process 21000 may include receiving a query for a location of a particular item in the establishment.

Disclosed embodiments may also include identifying the location of the particular item based on an association between the particular item and a particular identification tag and the current location of the particular identification tag. As discussed previously, disclosed systems may maintain a record of tags and the products associated with them. Similarly, disclosed systems also maintain records of where tags (and hence their associated products) are currently located. Using this data, the location of a particular item may be determined. A query about a particular item may cause a look up of one or more tags associated with that item (e.g., there may be multiple tags which match the item description if, for example, the store has duplicates of the same item, though each item would still be associated with a unique tag and a unique identifier.) Then, one or more current locations of those items may be identified. For example, an employee may send a query regarding the location of an item of interest, or a customer may send a query regarding the location of an item they may wish to inspect or purchase. Disclosed systems may, in response to such a query, determine the location of the item by consulting a record containing the current location of the item or an identification tag associated with the item. By way of example, in FIG. 20, processor(s) 20004 may be configured to receive a query regarding the location of a particular item, and upon receiving the query, consult a record accessible in data structure(s) 2006 containing the current location of the particular item. The current location of the identification tag associated with the particular item stored in data structure(s) 20006 may be racks 11250, and thus processor(s) 20004 may identify the location of the particular item as racks 11250. For example, in FIG. 21, identifying the location of the particular item may occur at step 21024 of process 21000. In some embodiments, step 21024 of process 21000 may include identifying the location of the particular item based on an association between the particular item and a particular identification tag, and the location of the particular identification tag.

Disclosed embodiments may include displaying, on a graphical user interface, the location of the particular item to a user. A graphical user interface may include a map or other visual identifier of the location of an item. Such other visual identifiers may include text describing a location, arrows pointing the way to the location, a rack or shelf number, or any other data that might assist an individual in finding the location. The display may be interactive, through features such as windows, icons, menus, gestures, animations, or any other form of user interface that enables user interaction with one or more devices. A "user" in this context may refer to a customer of an establishment or an employee of an establishment. However, a "user" may also refer to any person and/or entity that may utilize a graphical user interface, consistent with the present disclosure. Some non-limiting examples of displaying the location may include at least one of displaying an indication of the current location of the particular identification tag on a map, displaying directions to the current location of the particular identification tag, displaying a name associated with the current location of the particular identification tag, or displaying any form of information indicating the location of the item or directing a user to the location of the item. For example, in FIG. 21, displaying the location of the particular item to a user may occur at step 21026 of process 21000. In some embodiments, step 21026 of process 21000 may include displaying, on a graphical user interface, the location of the particular item to a user; displaying the location may include at least one of displaying an indication of the current location of the particular identification tag on a map, displaying directions to the current location of the particular identification tag, or displaying a name associated with the current location of the particular identification tag.

By way of example, in FIG. 20, device(s) 20008 may have graphical user interface 20100. The user of device(s) 20008 may, through the device, send a query to system 20000 regarding the location of a particular item. In response, system 20000 may determine that the particular item is located, as illustrated in FIG. 11, racks 11250 and display, on graphical user interface 20100, the location of the particular item. For example, graphical user interface 20100 may display a map of the establishment with the location of the particular item highlighted, a visual representation of the establishment (e.g., as illustrated in FIG. 11), or directions to the particular item from the user's location.

Disclosed embodiments may include receiving a query for an inventory of the plurality of items in the establishment, identify the plurality of items in the establishment based on associations between the plurality of items and the identification tags, and the current locations of the identification tags stored in the data structure, and display, on a graphical user interface, an inventory indication of the identified items in the establishment. Thus, for example, disclosed methods and systems for reporting locations of items may be employed to report locations of a plurality of items in an establishment, a portion of an inventory of items in the establish, or an entire inventory of items in the establishment, consistent with the present disclosure. An inventory indication may include one or more responses to the received query, the locations, number, and/or availability of each item in the plurality of the items in the establishment, or any other information relating to the inventory of the plurality of items in the query. By way of example, in FIG. 20, system 20000 may receive a query (e.g., signal 20202 for an inventory of a plurality of items in the establishment, wherein each item in the plurality of items is associated with one or more identification tag(s) 1110. In response to the query processor(s) 20004 may, by associating each item with a corresponding identification tag(s) 1110, identify the locations, quantity, and/or availability of each item and display that information on graphical user interface 20100.

Disclosed embodiments may include a system for providing privacy to downstream owners of electronically tagged goods. Privacy may refer to the concept of keeping one's personal matters and information secret, and deciding which other persons or parties can receive access to said personal matters and information and which such persons or parties are prevented from receiving such access. For example, in most developed countries, a person's privacy is protected, among other means, by the requirement of law enforcement to obtain legal search warrants before entering a person's home or accessing one's electronic correspondence (such as email, text messages, messaging services, etc.). As a counter-example, assuming a personal item owned by a person and present with that person in the public sphere and the item is capable of transmitting a distinct and uniquely identifiable radio signal, a violation of privacy may occur, since this transmission enables other parties capable of receiving and deciphering the radio signal to track the person in the public sphere without that person's explicit consent.

In the context of tagged goods, privacy may be an issue because, for example, a centralized data structure may maintain information about the owners of the goods, pricing of the goods, location of the goods at different times, who may have used tagged goods, and other private information. By way of one example, a manufacture of an exercise bike might embed a tag with a unique ID in the bike. The ID may be stored in a centralized data structure, accessible via the internet, along with information about when the bike was made, who made it, the cost of materials, and when it was sold. A manufacturer may then sell the bike to a distributor at which time the centralized record may be updated with the identity of the distributor as the new owner, the purchase price, and other private information about the distributer. The record may be updated further when the bike is sold to a retail store, yet again when the bike is sold to a customer, and once again when the bike is sold on eBay by the customer to a subsequent purchaser. All along the chain of ownership, private information may be added to the record associated with the tag in the exercise bike. Such private information may include pricing, owner identity, information about when and how the product was used, and/or anything else that an owner might have recorded, or that might have been recorded unbeknownst to an owner. In order to maintain privacy of upstream owner data, various systems, methods and computer readable media innovations are described herein. Some disclosed embodiments may involve an owner. An owner, as the term is used herein, may include any individual or entity that has a right or permission to possess, control, or track some "thing". In the exercise bike example, the owner may be any of the entities described above, or it might even include an employee of any entity a friend of any entity, or any entity provided permission by the then owner. In the case of tagged items, the "thing" possessed, controlled, or tracked may include anything tangible such as an item, an animate or inanimate object, article, equipment, belonging, gear, vehicle, produce, disposable, wearable, person, animal, utensil, device, implement, tool, accessory, machine, or any other of an infinite number of things. As used herein, any such thing may be referred to interchangeably as a "thing," "something," a "product," a "good," an "item" or an "object." In some cases, the thing might be of a type where ownership transfer is typically recorded, such as when vehicle transfers are recorded in commonly-accessible registers, enabling ownership history and transfers to be tracked. In other instances, the thing may be of a type whose ownership is not typically tracked, such as food or clothing items, or any other goods available through a retail establishment.

Some disclosed embodiments may involve a downstream owner. The term "downstream" may refer to a subsequent owner who receives something from another. Downstream owners may include individuals or entities that acquire ownership of something or may acquire ownership of something in the future. Thus, although disclosed embodiments may be discussed with reference to providing privacy for a first owner, a second owner, and transactions between the first owner and second owner, it is to be understood that disclosed embodiments may similarly be employed to provide privacy to a third owner or any subsequent owner of an electronically tagged good. In this sense, a first owner may also be considered the third owner in a situation where ownership passes from the first owner, to a second owner, and then back to the first owner. Thus, any subsequent owner of an electronically tagged good may be considered a downstream owner, even if that owner was previously upstream.

Figure 23:
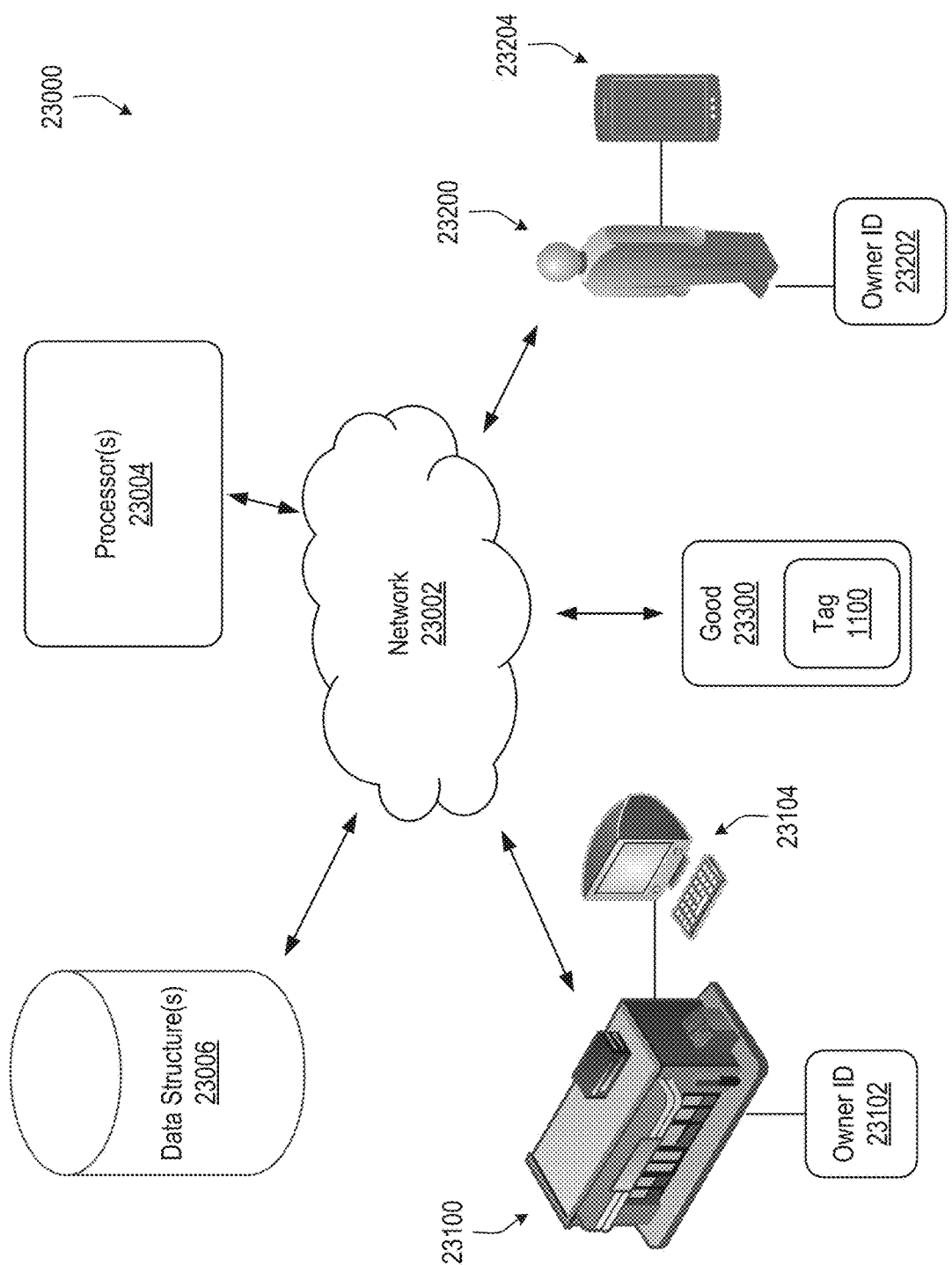
FIG. 23 illustrates a system for providing privacy for downstream owners of electronically tagged goods, consistent with disclosed embodiments.

By way of example, FIG. 23 illustrates a system 23000 for providing privacy for downstream owners of electronically tagged goods. Although disclosed embodiments may be discussed with reference to owner 23100 as a first owner and owner 23200 as a second owner of electronically tagged good 23300, one or each of owners 23100 and 23300 may be a first owner, a second owner, a third owner, or any subsequent owner that may acquire ownership of electronically tagged good 23300, consistent with the present disclosure.

An electronically tagged good may include a good that is associated with a wireless identification tag, as discussed in detail above. By way of example, FIG. 11 is a perspective view of a retail establishment incorporating an exemplary wireless identification system, consistent with disclosed embodiments. In such an establishment, a transfer of ownership of electronically tagged good 11210 may occur, such that ownership transfers from the retail establishment to a customer. Disclosed embodiments may be employed, for example, to ensure the privacy of the customer by preventing access to information transmitted by electronically tagged good 11210 after purchase.

Disclosed embodiments may include at least one processor. By way of example, as illustrated in FIG. 23, system 23000 may include processors(s) 23004, which may be configured to implement and/or execute one or more of the processes and methods consistent with the present disclosure. Additionally, or alternatively, system 23000 may also include a network 23002, which may enable the exchange of data and/or information of devices in the system (e.g., processor(s) 23004, data structure(s) 23006, device(s) 23104 and 23204, etc.).

Disclosed embodiments may involve storing IDs for a plurality of tags including at least a first owner ID and a second owner ID for a particular tag. An owner ID may include a name, number, string, code or any other form of information or data that may enable the owner to be identified. Such identification may be augmented through access to stored ownership information relating to an electronically tagged good. Storing IDs may include recording the IDs in a register, such as a database or any other form of data structure.

A data structure consistent with some embodiments of the present disclosure may include an ordered storage of information, saved in a computer-accessible form on a medium which is both readable and writable. Some non-limiting examples include databases, spreadsheets, directories, tables, and other data types. Data structures may be designed to enable targeted retrieval of portions of the data according to various criteria, and at different levels of aggregation. Such retrievals, or queries, may include searching for a single stored piece of information, searching for specific information associated in the data structure with a known piece of information, searching for multiple pieces of information sharing some characteristic, etc. A data structure designed to allow queries and retrieval of information may define a standard interface, including both a medium, tunnel or protocol through which to receive queries and return responses, as well as a language, format, application or other definition for the structure and content of the queries as well as the structure and content of the responses. Such an interface (e.g., an API) enables person, entity or device with access to the interface, and knowledge of the format of queries and responses, to retrieve information from the data structure. Such a person, entity or device, referred to as a requester, may be required to provide some form of credentials, log-in, certificate or identification, in order to determine whether the requester is authorized to access the information stored in the data structure. Such authorization data may be general for the entire data structure, or it may be specific for each and every piece of stored information.

By way of example, system 23000 may include processor 23004 configured to store IDs for identification tag(s) 1100, such as owner ID 23102 associated with owner 23100 or owner ID 23202 associated with owner 23200. Identification tag 1100 may be physically associated with an electronically tagged good 23300, which may be owned by owner 23100 or owner 23200. Depending on the ownership and/or ownership history of electronically tagged good 23300, processor 23004 may be configured to store owner ID 23102 and/or owner ID 23202 in an accessible register, such as data structure 23006.

Disclosed embodiments may include associating first information of the particular tag with the first owner ID at a time when the first owner of the particular tag is recorded as owning the tag. Information of a particular tag may include an identifying inventory number, serial number, identity code, ID, or any other data form identifying the particular tag or an object associated with the particular tag. In addition to or as an alternative, the information may include data identifying of one or more object characteristics, or information related in some way to the object, its operation, its use, or its ownership. In some embodiments, the first information may also include at least one of a location, a transaction history, owner name, manufacturer name, a unique identifier of the tag, or an encryption key associated with the tag.

Associating information of a particular tag with an owner ID may include pairing the information of the particular tag with the owner ID. Pairing may include any process for assigning a one-to-one relationship between one set of one or more objects, items, numbers or pieces of information, and a second set of one or more objects, items, numbers or pieces of information. Pairing is often used for identification purposes. For example when an ID chip is epidermally implanted in a pet, the chip is paired to the animal (meaning that the unique ID of the chip is assigned to the records of the specific pet), and the pairing is stored in some accessible database (such as a local government's animal registry, or a veterinary hospital patients file) anyone with access to those records who reads the unique ID of the chip can immediately receive all relevant available information about the animal in which it is implanted. Similarly, the same process occurs, and similar capabilities may be gained, when a retailer pairs electronic tags (e.g., tags described herein) with products for sale, when a credit-card company provides a debit card number to a customer and pairs that number with the person's bank account (and credit history), or when a mobile payments processor assigns a QR-code to each customer, pairing that QR-code with the customer's electronic wallet and allowing them to send and receive payments using such a code. The association of information of a particular tag with an owner with the owner ID may occur at the time the owner obtains physical possession of the good associated with the tag, upon the owner's purchase of the good, or at any other time associated with the owner's acquisition or expected acquisition of ownership of the item.

For example, in some embodiments, at least one processor may be configured to store a unique tag ID of each tag and to associate the tag ID of the particular tag with the owner ID of the recorded owner of the particular tag. A unique ID may include a number, string, code or other form of data which is singularly associated with an identified entity, such that no single entity is associated with the same unique identifier as any other entity, and any single entity can only have a single unique identifier associated with it. Some non-limiting examples of unique identifiers are serial numbers, unique EPC codes, database entries (as long as each database entry represents a single entity, and all relevant entities are represented by exactly one entry in the database) etc. Thus, by storing the unique tag ID of a tag and associating the unique tag ID with an owner ID, information of the particular tag is associated with the owner ID.

Some disclosed embodiments may involve encryption. Specific embodiments of encryption techniques implemented in the present disclosure are described elsewhere in the present application.

By way of example with reference to FIG. 23, an owner 23100 may be a retail establishment that acquires ownership of electronically tagged good 23300 by virtue of purchasing electronically tagged good 23300 from a supplier or any other previous owner. At the time owner 23100 acquires ownership of electronically tagged good 23300 (e.g., at the time of purchase or delivery), processor 23004 may be configured to associate information of ID tag 1100 with owner ID 23102 by storing information regarding the ownership of electronically tagged good 23300 in data structure 23006. The processor may be prompted to make the association in any way that enables the goods and the owner to be paired. For example, when a pallet of goods arrives at the establishment of owner 23001, infrastructure in the facility or a handheld device may trigger the tags of the incoming products to provide their tag IDs to a receiver. Upon receipt, processor 23004 associated with such a receiver may initiate a process to cause the ownership records of the tagged items to be updated with the owner ID 23100. Alternatively, at the time of sale or transfer, the manufacturer (or other current owner) may send tag IDs to owner 23100. Upon receipt by processor 23004, processor 23004 may update the ownership records to associate owner ID 23102 with the goods.

According to some disclosed embodiments, the at least one processor may be configured to receive an association between the tag ID of the particular tag and at least one authorized entity associated with the recorded owner of the particular tag. The authorized entity may be any person or device that may be noted as having a connection to the particular tagged good or item associated with the tag. The association may be simply for record keeping purposes or may enable the associated entity to have access to information in a stored record associated with the tag or an object associated with the tag. Receiving the association may include receiving data or information from a device associated with a retail establishment, a customer, owner, or any entity. In some embodiments, the at least one authorized entity may include at least one of a computing device, an application executed on a computing device, person or group provided with permission by the recorded owner, to either access or modify information associated with the electronically tagged good. By way of example, owner 23100 may be the recorded owner of electronically tagged good 23300 containing ID tag 110. Processor 23004 may be configured to associate a unique tag ID of ID tag 1100 with owner device 23104, which owner 23100 has authorized to access and/or modify information associated with the tagged good 23300. In this way, persons using device 23104 may be able to retrieve or modify stored information about good 23300.

Consistent with the present disclosure, the at least one processor may be configured to receive a request to modify a list of the authorized entities associated with the particular tag, to confirm that the request to modify is received from an authorized entity of the particular tag, and to modify the list following confirmation that the request was received from the authorized entity of the particular tag. A request to modify a list may include the transmission of a message or information through a network or any other appropriate medium indicating that the list of authorized entities associated with the particular tag should be modified. The information in the request may include an identifier of the requesting device, a passcode, or any other information that may enable the verification of the requesting entity, or the information may be transmitted using a protocol, mode of encryption, or any other means of transmission that may be associated with an authorized entity and/or the recorded owner. Upon receipt of such a request, the at least one processor may confirm that the request was received from an authorized entity by comparing information received in the request with information contained in the list of authorized entities, by analyzing the mode of transmission of the request, or by any suitable means of verifying the source of the request. The list may be recorded in a data structure or any other information storage medium, and upon confirming that the request was received from an authorized entity, may be modified by deleting one or more authorized entities from the list, adding one or more authorized entities from the list, changing information contained in the list, or otherwise updating any information contained in the list.

By way of example, device 23104 may be an authorized entity associated with first owner 23100, and may send a request to processor 23004 through network 23002 to modify a list of authorized entities contained in data structure 23006. The request may be to add or remove a second device (not shown) associated with first owner 23100 to the list of authorized entities. The request may include a passcode or may be encrypted such that processor 23004 can confirm that the request was sent from an authorized entity associated with first owner 23100. Upon confirmation, processor 23004 may add or remove the second device associated with first owner 23100 to the list of authorized entities contained in data structure 23006. In another example, device 23104 may, upon a sale of electronically tagged good to second owner 23202, send a request to processor 23004 to delete itself from a list of authorized entities and add device 23204 associated with second owner 23200 to the list, consistent with the present disclosure. As an alternative to deletion, the processor 23004 may simply modify the record to indicate a new owner, while masking or limited access by the new owner or any subsequent downstream owner to information about the history of the tagged good. Similarly, the ownership change may prevent the current owner from being able to access the record associated with the good after transfer is made to the new owner.

Disclosed embodiments may include recording a transaction transferring ownership of the particular tag from the first owner to a second owner. A transaction may include the purchase or sale of a good, the conveyance of a good, or any other interaction between two or more entities resulting in the transfer of ownership of a good from one owner to another owner. Recording may refer to the act of saving, writing, tabulating or otherwise storing data. This may occur using a medium which is both writeable and readable. The recorded data may include both the available data itself, as well as other relevant pieces of information associated with the data such as time-stamp, signal strength, the entity performing the recording, or any other information regarding the circumstances of the recording of the data which may be useful at a later time. For example, the location and exact time and date at which data was recorded may be useful, and well as other information gleaned from other sources. For example, if a tag is triggered to send its ID via a mobile phone, information in the phone may also be associated with the record or the transaction. This could include an identity of the phone or of an owner of the phone. An image captured by the phone might also be associated with the record or transaction. Other data associated with a transaction that may be recorded may include the price, time of purchase, the seller/conveyor, the buyer/conveyee, the good purchased/conveyed, or any other information relating to the transaction.

By way of example, second owner 23200 in FIG. 23 may be a customer of first owner 23100—a retail establishment that has ownership of electronically tagged good 23300 having ID tag 1100. A transaction may occur between first owner 23100 and second owner 23200, where second owner 23200 agrees to pay the first owner 23100 in exchange for ownership of good 23300. Upon the occurrence of this transaction, processor 23004 may record the transaction in data structure 23006. The record may include one or more of the ID of the second owner, the time and date of sale, and the purchase price, for example.

In some disclosed embodiments, the particular tag may be attached to a particular item, and recording the transaction transferring ownership of the particular tag enables tracking of a change in ownership of the particular item. Recording the transaction may enable the tracking of a change of ownership of the particular item because the transaction becomes a part of a record that may be accessed in order to determine the ownership status of the particular item.

Upon a sale of any one of these goods by first owner 23100 to second owner 23200, processor 23004 may record the transaction in data structure 23006 as to enable the tracking of a change in ownership of the good.

In some disclosed embodiments, the at least one processor may be configured to control the particular tag to change at least one parameter of a signal transmitted by the particular tag when a transfer of ownership of the particular tag is recorded. Controlling the tag to change at least one parameter may include transmitting or otherwise causing the transmission of, electromagnetic waves that, when received by the particular tag, causes the tag to change at least one parameter of a signal that the tag transmits. The change in parameter may serve as an indication of an ownership change. For example, as part of a change in ownership a processor may send a signal to the tag causing the tag to change its ID, to add additional information to the ID or to change some other parameter of its subsequent communication to thereby indicate in subsequent transmissions that a new owner possesses the tag. Alternatively, the tag transmissions may remain the same across owners, with a data structure on the back end recording the ownership change.

According to some embodiments, at least one parameter may also include at least one of a repetition period of the signal transmitted by the particular tag, a time interval between two consecutive signals transmitted by the particular tag, a data encryption mechanism, an encryption key, a signal transmission power, a packet format, or data content of a transmission from the particular tag. At least one parameter may also include communication media, communication protocols, frequencies, frequency ranges, frequency bands, types of encryption, scrambling, and/or disguising, data content, timing of transmission, and/or any other distinguishable characteristic that may be associated with the signal transmitted by the particular tag. For example, although the tag ID may remain the same after a change in ownership, encryption of the tag ID may change so that a previous owner is no longer able to read the tag, or is permitted to read future private information associated with the subsequent owner. Thus, the purchase of a tagged item at a point of sale may cause the tag to change some but not all of its transmissions characteristics, blocking the prior owner from reading subsequent private information from the tag, while still enabling a receiver in an area of an EAS gate to record that the item purchased at the point of sale was removed from the establishment.

By way of example, in FIG. 20, ID tag 1100 may be configured to transmit signal 12200. In FIG. 23, ID tag 1100 may be associated with electronically tagged good 23300. Upon a transaction transferring ownership of good 23300 from a first owner 23100 to a second owner 23200, processor 23004 may be configured to record the transaction transferring ownership and thereafter cause a transmission of a signal (e.g., in the form of electromagnetic waves) to ID tag 1100 that, when received by ID tag 1100, causes ID tag 100 to change one or more of the above-described parameters of signal 12200.

According to some disclosed embodiments, the at least one processor may be configured to control the particular tag to transmit a first signal using a first encryption key associated with the first owner ID before the transfer of ownership is recorded and control the particular tag to transmit a second signal using a second encryption key associated with the second owner ID after the transfer of ownership is recorded. An encryption key may be associated with an owner ID, for example, in order to protect the owner's privacy by enabling, restricting, or otherwise controlling access to information contained in the signal transmitted by the particular tag.

By way of example, while first owner 23100 owns electronically tagged good 23300 having ID tag 1100, processor 23004 may be configured to control ID tag 1100 to transmit a first signal using a first encryption key associated with first owner ID 23102 which allows first owner 23100, or an authorized device associated with first owner 23100 (e.g., device 23102), to access information contained in the first signal. However, upon the sale of electronically tagged good 23300 to second owner 23200, processor 23004 may control ID tag 100 to transmit a second signal using a second encryption key associated with second owner ID 23200 which allows second owner 23200, or an authorized device associated with second owner 23200 (e.g., device 23202), to access information contained in the second signal or restricts other entities from accessing information contained in the second signal.

According to some disclosed embodiments, recording the transaction transferring ownership of the particular tag may include receiving, from a device associated with the first owner ID, an ownership transfer notification identifying at least the second owner ID and a tag ID of the particular tag. A device associated with the first owner ID may, for example, refer to a device used to facilitate the transaction transferring ownership of the particular tag, such as a cash register, a handheld scanner, a smart phone, or any other device associated with the first owner capable of sending an ownership transfer notification. A notification may include a signal generated by a component of one system used to alert another component of the system, a different system, or a person (or any combination of the above) of the occurrence of a certain event. In this context, an ownership transfer notification may be any notification indicating that a transaction transferring ownership of an ID tag. By way of example, a transaction transferring ownership of ID tag 1100 by virtue of a sale of electronically tagged good 23300 from a first owner 23100 to a second owner 23200 may occur. Upon occurrence of such a transaction, processor 23004 may receive an ownership transfer notification from device 23204 that identifies the second owner ID 23202 for association with ID tag 1100.

Consistent with the present disclosure, recording the transaction transferring ownership of the particular tag may also include receiving, from at least one reader, an identification signal transmitted by the particular tag, accessing a tag ID associated with the particular tag based on the received identification signal, and receiving an association between the second owner ID and the tag ID associated with the particular tag.

Consistent with disclosed embodiments, receiving information between the second owner ID and the tag ID associated with the particular tag may include receiving information from a device associated with the second owner, a device associated with the first owner, or any other device capable of positively identifying the second owner, that indicates or otherwise enables a determination that the second owner has purchased an item associated with the particular tag. For example, in the context of some disclosed self-checkout systems, the at least one processor may be configured to receive an association between the second owner ID and the tag ID when it is determined that a device associated with the second owner exits an establishment at the same time as the particular tag associated with the tag ID exits the establishment, thereby reflecting that a transaction transferring ownership of the particular tag to the second owner has occurred.

A second owner may be positively identified in a number of different ways. For example, when the individual picks up an item, the individual might scan it with a handheld device, which associates that particular tag ID with a shopping cart. The shopping cart might include an identity of the individual. Upon purchase, either at a point of sale or by exiting the establishment, all goods in the shopping cart may transfer ownership to the owner of the shopping cart. If an individual attempts to leave the establishment with an item not scanned into a shopping cart, a receiver associated with a data structure where contents of shopping carts are stored may recognize the item as not being in an active shopping cart, and may trigger an alarm. FIG. 14 provides a perspective view of a customer purchasing an electronically tagged item having ID tag 1100, by means of bringing the electronically tagged item through gates 1112. At the time the customer passes through gate 1112, the ownership record may be updated making the customer the second owner 23200. Reader 11300*h* may receive an identification signal 12200 transmitted by ID tag 1100, and processor 23004 may receive the identification signal 12200 from reader 11300*h*, to thereafter access a tag ID associated with signal 12200 from data structure 23006. Processor 23006 may, at the same time, receive an association between second owner ID 23202 and the tag ID associated with ID tag 1100

In some disclosed embodiments, recording the transaction transferring ownership of the particular tag may include recording, in at least one data structure, at least one of an updated association between the tag ID and the first owner ID, an updated association between the tag ID and the second owner ID, inventory information associated with the first owner ID, or inventory information associated with the second owner ID. Updating may occur when the system records an identity of the new owner in place of the prior owner; when the second owner's identity is included in the data structure; when the first owner's inventory is reduced as the result of the transaction; and/or when the second owner's inventory is updated as the result of the transaction. One or more of these updates may occur in a common data structure accessible, to varying extents by the first and second owners, and/or in differing data structures unique to each owner. In some embodiments, updating inventory information associated with an owner may occur when one or more parties involved in a transaction transfer ownership of a good maintained in an inventory. For example, a first owner may be an establishment or other entity that maintains inventory information relating to electronically tagged goods in at least one data structure. Upon sale of such a good to a second owner, the good is no longer a part of the first owner's inventory. The second owner may also be an establishment or other entity that maintains an inventory, and upon sale of the good to the second owner, the good become a part of the second owner's inventory. In such a situation, or any other situation involving the transfer of ownership of goods, disclosed embodiments may be employed to update inventory information of the first owner and of the second owner stored in at least one data structure.

By way of example, first owner 23100 and second owner 23200 may each maintain an inventory of electronically tagged goods. Upon the transfer of ownership of good 23300 from first owner 23100 to second owner 23200, processor 23004 may record the transaction transferring ownership of good 23300 by updating inventory information stored in at least one data structure 23006 and associated with first owner 23100 so that electronically tagged good 23300 is removed from inventory records associated with first owner 23100. Processor 23004 may also record the transaction by updating inventory information stored in at least one data structure 23006 associated with second owner 23200 so that electronically tagged good 23300 is inserted into inventory records associated with second owner 23200.

Disclosed embodiments may include associating second information of the particular tag with the second owner ID and preventing the first owner from accessing the second information after the transfer of ownership. Second information may be any data associated with the second owner or with the tag after transfer of ownership occurs. For example, after the first owner is divested of ownership, the first owner may no longer be able to access information added to a record associated with the tag. In some embodiments, the second information may also include at least one of a location, a transaction history, owner name, manufacturer name, a unique identifier of the tag, or an encryption key associated with the tag. Preventing the first owner from accessing the second information may include one or more of denying the first owner access to some or all data in the data structure, deleting the information from an area of the data structure with which the first owner has access, encrypting some or all of the data using an encryption key that is unknown to the first owner, denying a request to access the information from the first owner or an associated entity, or otherwise restricting access to the information by the first owner.

In some embodiments, however, the at least one processor may be configured to permit the first owner to access the first information after the ownership transfer. In other words, although the first owner may be prevented from accessing the second information of the particular tag associated with the second owner ID, the first owner may still, in some embodiments, be permitted to access the first information of the particular tag associated with the first owner ID. Permitting access to the first information may include allowing the first owner to use an encryption key to access the first information, accepting a request to access the information from the first owner or an associated entity, or otherwise allowing access to the first information by the first owner.

By way of example, processor 23004 may be configured to, upon a transaction transferring ownership of electronically tagged good 23300 from first owner 23100 to second owner 23200, prevent first owner 23100 from accessing second information associated with second owner ID 23202, for example, by encrypting the second information using an encryption key not known to first owner 23100. Nevertheless, another encryption key may be known by first owner 23100 that may enable processor 23004 to permit access, by first owner 23100 or an associated authorized entity, to first information associated with first owner ID 23102.

According to some disclosed embodiments, the at least one processor may be configured to prevent the first owner from accessing the first information prior to the time when the first owner is recorded as owning the particular tag. In other words, just as a first owner may be prevented from accessing second information associated with a second owner ID after an ownership transfer, the first owner may also be prevented from accessing the first information associated the first owner ID before the first owner acquires ownership of an electronically tagged good, such as, for example, before a prior owner transfers ownership to the first owner. By way of example, processor 23004 may be configured to prevent first owner 23100 from accessing first information associated with first owner ID 23102 prior to first owner 23100 acquiring ownership of electronically tagged good 23300. Similarly, in another example, owner 23200 may be a first owner and owner 23100 may be a prior owner, and processor 23004 may prevent owner 23200 from accessing first information associated with owner ID 23202 before a transfer of ownership of electronically tagged good from owner 23100 to owner 23200.

Consistent with the present disclosure, the least one processor may be further configured to receive an association between a particular owner ID and at least one authorized entity associated with the particular owner ID and permit the authorized entity to access information pertaining to at least one of the particular owner ID, a tag associated with the particular owner ID, or an item associated with the particular owner ID. As previously discussed, an owner of goods may be associated with various entities who may become authorized to access information relating to goods after the owner receives access. This may occur through a manual process by the owner of authenticating entities, or it may occur automatically. For example, the data structure may be updated with a list of entities associated with a new owner such that when the new owner acquires goods, the authorized entities are given access to the records associated with each of the acquired goods. The at least one processor may receive such an association any time prior to, following, or at the time of a transaction transferring ownership of an electronically tagged good, or the association may occur independently regardless of the occurrence of a transaction. By way of example, upon a transaction transferring ownership of electronically tagged good from first owner 23100 to second owner 23200, processor 23004 may receive an association between second owner ID 23202 and device 23204 or any other authorized entity associated with second owner ID 23202. Processor 23004 may then permit device 23204 to access information relating to second owner ID 23202, ID tag 1100, or electronically tagged good 23300.

As discussed previously, disclosed embodiments may be further employed to provide privacy for downstream owners, such as a third owner or any subsequent owner, of an electronically tagged good. For example, disclosed embodiments may include recording a transaction transferring ownership of the particular tag from the second owner to a third owner or a subsequent owner and, after the transfer of ownership to the third owner or subsequent owner, associate third information of the particular tag with an owner ID of the third owner and prevent the second owner from accessing the third information. Furthermore, the third owner or any subsequent owner may be the first owner, and the at least one processor may be configured to associate the third information of the particular tag with the first owner ID. In some embodiments, however, the third owner or subsequent owner may be different from the first owner, and wherein the at least one processor is further configured to prevent the first owner from accessing the third information. Additionally, consistent with disclosed embodiments, the at least one processor may be configured to permit the first owner to access the first information and to permit the second owner to access the second information after the transfer of ownership to the third owner or any subsequent owner.

Disclosed embodiments may include an appliance for holding electronically tagged products and for recording an association between the tagged products and the appliance. Some non-limiting examples of appliances include devices for home use, such as washing machines, dryers, refrigerators, humidifiers, dishwashers, food preparation devices, cabinets, pantries, closets, wardrobes, drawers, storage boxes, toolsheds, garages, etc., devices for commercial use such as lockers, refrigerated storage boxes, shipping containers, delivery trucks, sterilization devices etc., and devices for industrial use such as vaporizers, toolboxes, warehouses, manufacturing devices, hazardous waste disposal devices, etc. In general, however, the term "appliance" may refer to anything capable of retaining electronically tagged products for any amount of time. By way of example, refrigerator 25000A in FIG. 25A, clothes washer or dryer 25000B in FIG. 25B, pantry 25000C in FIG. 25C, wardrobe 25000D in 25D, and delivery truck 25000E in FIG. 25000E are each examples of appliances within the meaning of this disclosure.

Recorded data, in the context of appliances, may include tag IDs of items placed in the appliance, time stamps of when the items were placed in the appliance, expiration dates associated with the items, time stamps of when items were removed from the appliance, information linking items that were removed from the appliance on or about the same time, items that were removed but not returned to the appliance, and any other direct, indirect or derivative data that may relate to an item that was contained within an appliance.

Disclosed embodiments may include a housing defining a cavity for retaining the electronically tagged products. A housing may include any structure defining a cavity or any space or structure capable of retaining electronically tagged products for any amount of time. The cavity may be permanently opened or may include an enclosure such as one or more doors. The housing may be constructed of any suitable material, consistent with the nature of the associated appliance. By way of example, appliance 24000 may include housing 24002 defining cavity 24004. Electronically tagged product(s) 24006 having tag(s) 1100 may be retained within cavity 24004. Housing 24002 may also contain or be otherwise integrated with exciter 24008, receiver 24100, communicator 24102, and processor(s) 24104. However, it is to be understood that the aforementioned components and devices may not necessarily need to be disposed within cavity 24004 and may be configured in any suitable manner, consistent with the present disclosure.

Figure 25B:
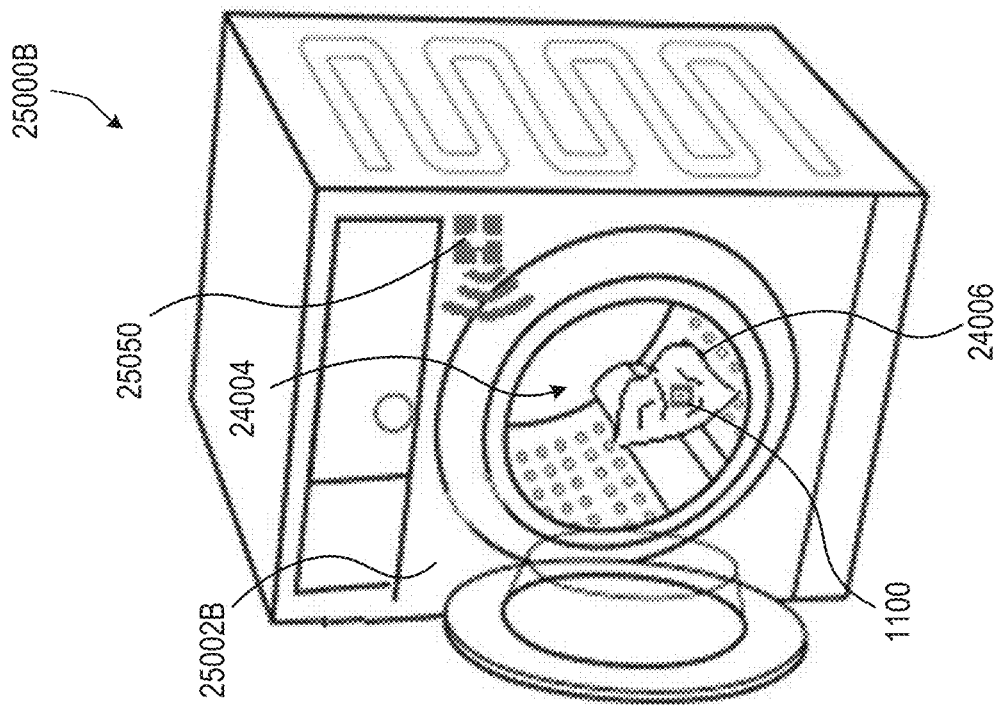
FIG. 25B illustrates an exemplary clothes washing or drying machine for holding electronically tagged products and for recording an association between the tagged products and the appliance, consistent with the present disclosure.
Figure 25A:
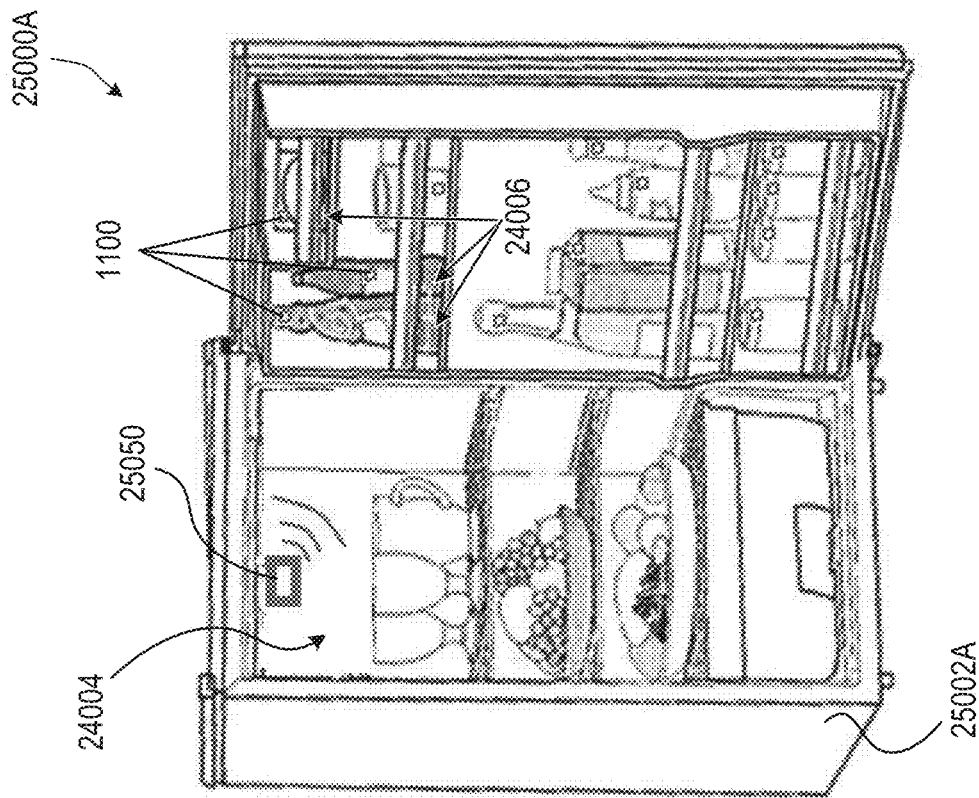
FIG. 25A illustrates an exemplary refrigerator for holding electronically tagged products and for recording an association between the tagged products and the appliance, consistent with the present disclosure.

By way of example, refrigerator 25000A in FIG. 25A includes housing 24002 and cavity 24004. Clothes washer or dryer 25000B in FIG. 25B includes housing 24002 and cavity 24004. Pantry 25000C in FIG. 25C includes housing 24002 and cavity 24004. Wardrobe 25000D in 25D includes housing 24002 and cavity 24004. And delivery truck 25000E in FIG. 25E includes housing 24002 and cavity 24004.

Disclosed embodiments may include an exciter integrated with the housing. The exciter may be configured to trigger tags of the electronically tagged products to cause the tag of each product to transmit a unique tag ID. An "exciter" may refer to a device, such as a transmitter, that emits a constant, intermittent or periodical signal. The signal may have characteristics that match those expected by a second device which is triggered to perform a predefined action once it receives the signal. The signal may be a radio signal, a magnetic or electric field, an audible or ultrasound signal, a light signal, a mechanical vibration etc., and its characteristics may include an amplitude or power level, a frequency, a modulation, a repetition period, a communication protocol, a set of transmitted data etc. By way of non-limiting example, an AM-EAS (Acousto-Magnetic Electronic Article Surveillance) gate acts as an exciter to an AM-EAS tag by periodically emitting a pulse of magnetic field at a frequency of 58 kHz, causing mechanical vibration in the magnetoelastic metal strip inside the tag. This vibration may then be detected by the gate, indicating that a tag has passed through. As another example, a RFID reader acts both as an exciter (charging the RFID tags in its field with the energy required for them to receive and transmit RFID signals) as well as a transceiver (transmitting and receiving data to and from the tags). Consistent with disclosed embodiments, an exciter may emit RF energy at either the 900 MHz band or at the 2.4 GHz band, in either a constant mode or an intermittent mode. This energy may charge the tags, and causes them to transmit in a mode dependent on the frequency received.

An exciter may be integrated with the housing in order to cause tags to transmit and be detected by the appliance, and may be placed either inside the cavity of the appliance in another way that causes tags inside the appliance to sense the exciter's signal. Alternatively, the exciter may be placed at an opening or door of the appliance, affixed to an exterior surface of the appliance or connected in any other way to the appliance. For example, an appliance may be accompanied by a tethered exciter that can be mounted adjacent an appliance. As used herein all of the forgoing examples constitute exciters integrated with an appliance.

A unique tag ID may include a number, string, or other form of data which is singularly associated with an identified entity, such that no single entity may be associated with the same unique identifier as any other entity, and any single entity may only have a single unique identifier associated with it. Examples of unique identifiers are serial numbers, unique EPC codes, database entries (as long as each database entry represents a single entity, and all relevant entities are represented by exactly one entry in the database) etc. A unique tag ID may be transmitted, for example, in an identification signal transmitted by tag; the meaning of identification signal, as used herein, is discussed in detail elsewhere in the present application.

By way of example, appliance 24000 may include exciter 24008 configured to emit a signal that triggers tag(s) 1100 to transmit transmission 24204, which may contain a unique tag ID. Exciter 24008 may be inside of cavity 24004 and may be configured to cause tag(s) 1100 of product(s) 24006 to transmit transmission 24204, or it may by attached on or near to an opening of cavity 24004 (e.g., a door) and may be configured to cause tag(s) 1100 to transmit transmission 24204 upon product(s) 24006 entering or exiting the cavity.

For ease of discussion, disclosed embodiments may include "identification circuitry." In the context of disclosed appliances, "identification circuitry" may refer to any one or more components or devices used to either excite a tag, receive a response from a tag, or interpret a response form a tag. Thus, identification circuitry may include one or more of a receiver, a communicator, an exciter, at least one processor, or any other components or devices capable of performing any one or more functions of identifying tags within appliances.

Figure 24:
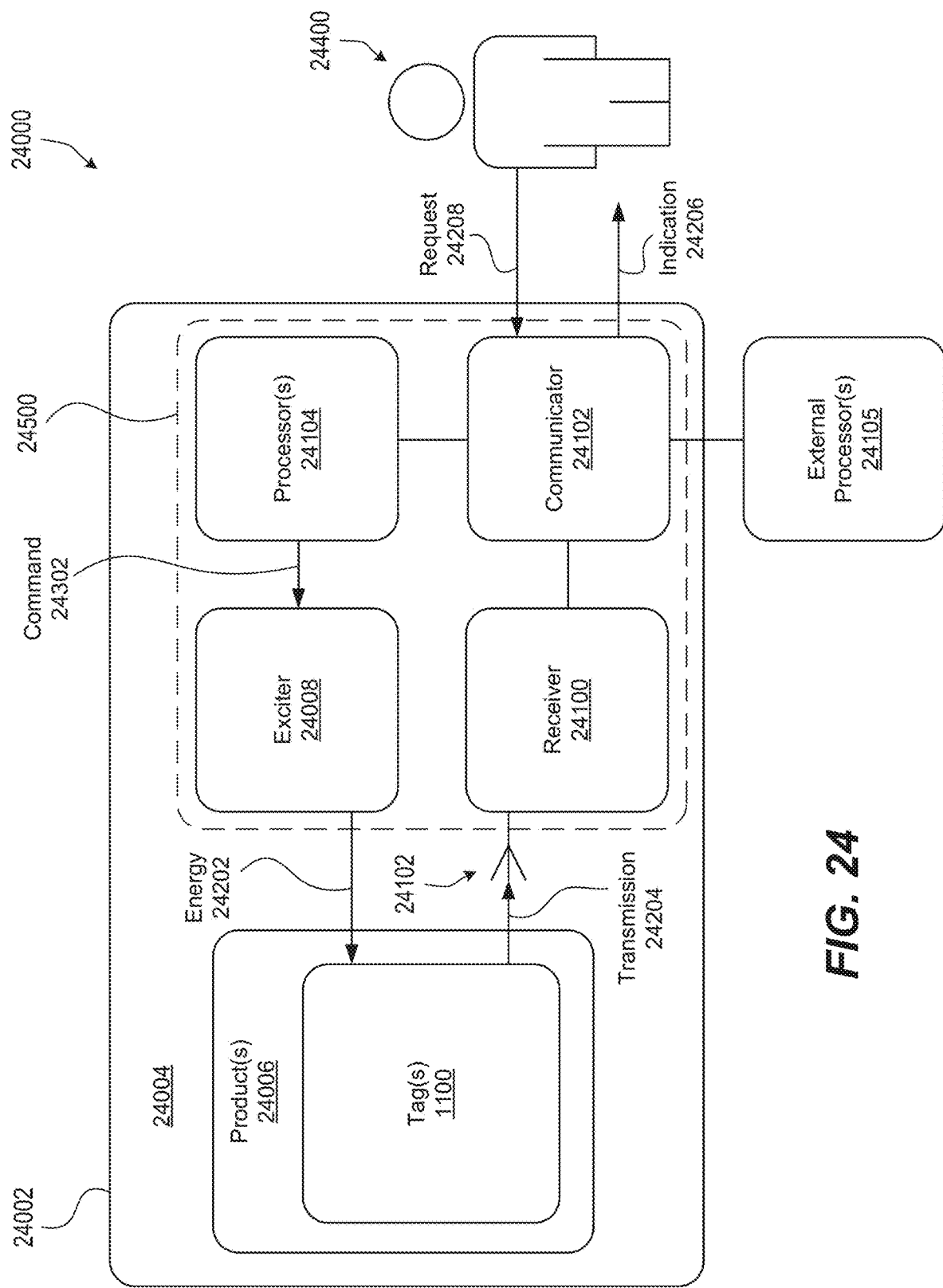
FIG. 24 is a block diagram of an exemplary appliance for holding electronically tagged products and for recording an association between the tagged products and the appliance, consistent with the present disclosure.

By way of example, in FIG. 24, circuit 24500 may include at least receiver 24100, communicator 24102, processor(s) 24104, and/or exciter 24008. In refrigerator 25000A of FIG. 25A, clothes washer or dryer 25000B of FIG. 25B, pantry 25000C of FIG. 25C, wardrobe 25000D of FIG. 25D, and delivery truck 25000E of FIG. 25E, identification circuitry 25500 may include at least an exciter, and may also, but may not necessarily include depending on design specifications, other components illustrated in the identification circuitry of FIG. 24. It should be noted that while, for ease of illustration, identification circuitry 25500 is illustrated with a single icon, that icon may represent multiple components either co-located or disbursed throughout the appliance.

Figure 25D:
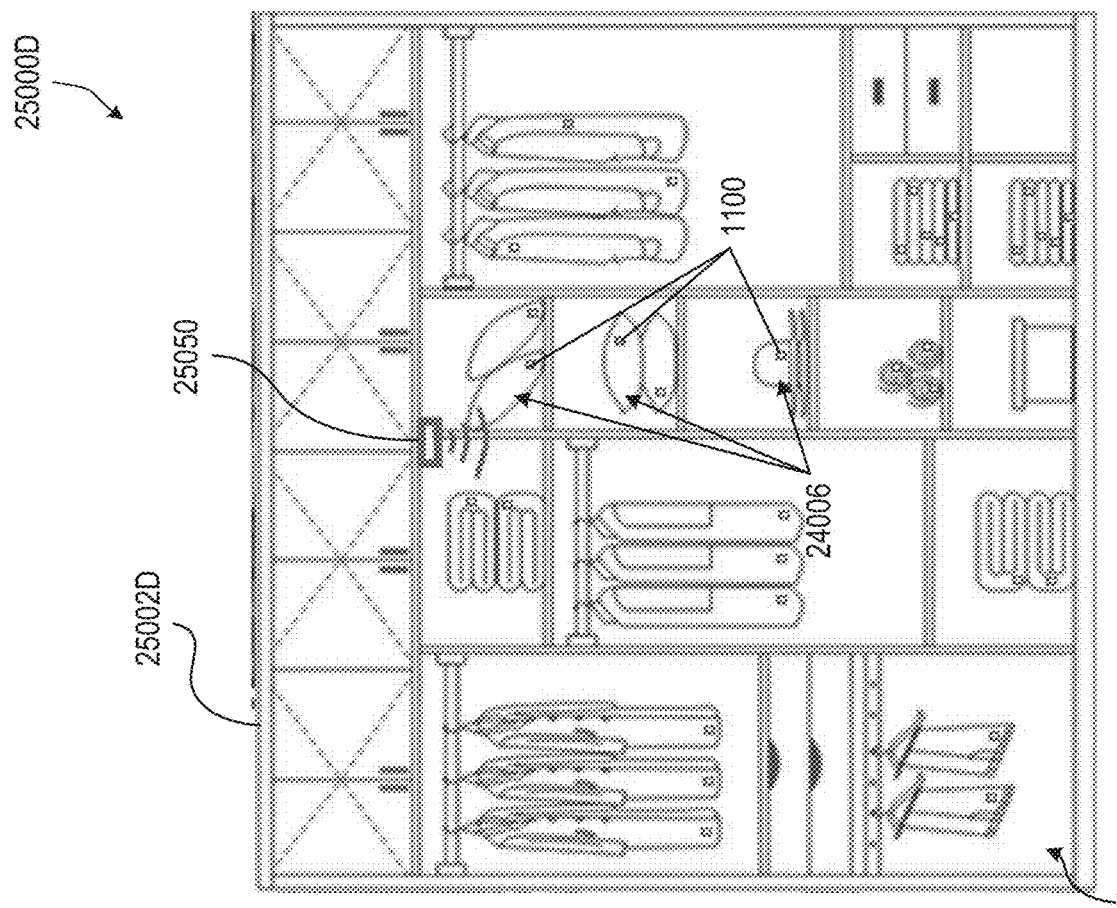
FIG. 25D illustrates an exemplary wardrobe for holding electronically tagged products and for recording an association between the tagged products and the appliance, consistent with the present disclosure.
Figure 25C:
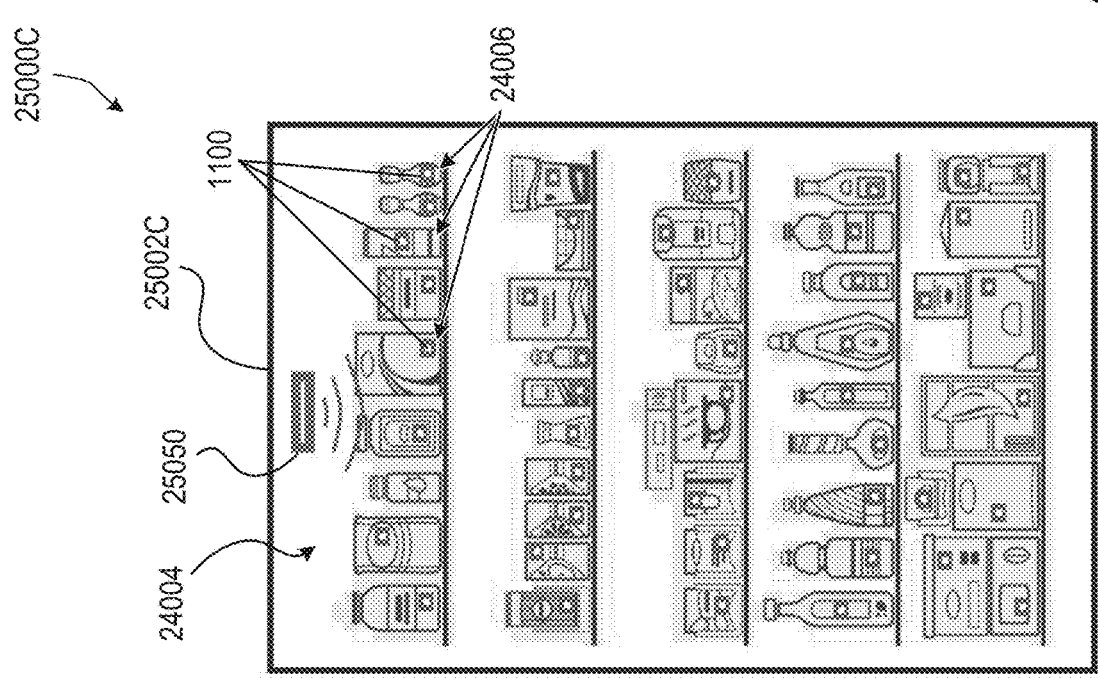
FIG. 25C illustrates an exemplary pantry for holding electronically tagged products and for recording an association between the tagged products and the appliance, consistent with the present disclosure.
Figure 25E:
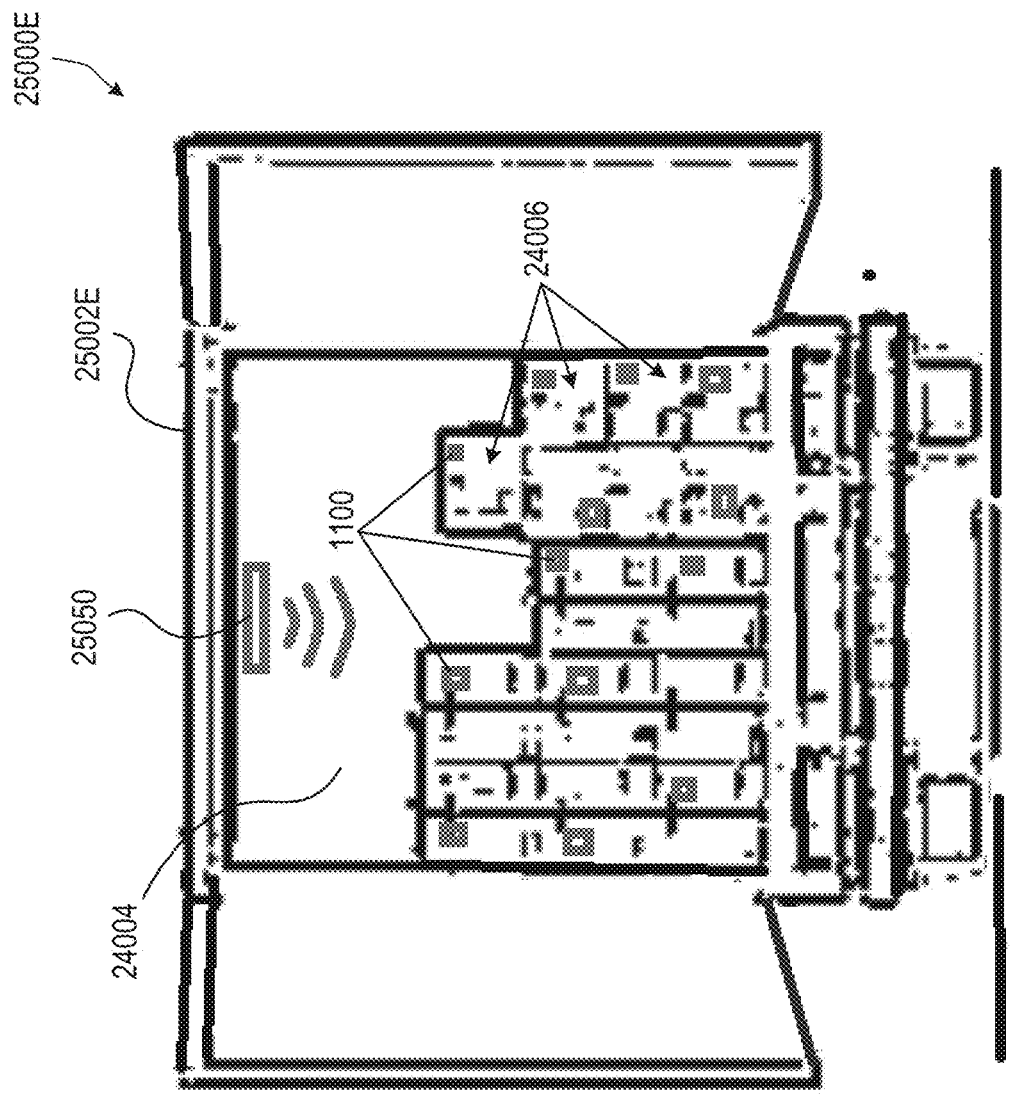
FIG. 25E illustrates an exemplary delivery truck for holding electronically tagged products and for recording an association between the tagged products and the appliance, consistent with the present disclosure.

Other examples of exciters integrated with a housing include identification circuitry 25500 associated with housing 25002A of refrigerator 25000 in FIG. 25A; identification circuitry 25500 associated with housing 25002B of clothes washer or dryer 25000B in FIG. 25B; identification circuitry 25500 associated with housing 25002C of pantry 25000C in FIG. 25C; identification circuitry 25500 associated with housing 25002D of wardrobe 25000D in FIG. 25D; and identification circuitry 25500 associated with housing 25002E of delivery truck 25000E in FIG. 25E.

According to some disclosed embodiments, the exciter may be configured to transmit energy at a frequency within at least one of a first frequency band around 900 MHz or a second frequency band around 2.4 GHz. In general, a frequency range of 900 MHz WW ISM and 2.4 GHz WW ISM may refer to frequency ranges of around 900 MHz and 2.4 GHz, respectively, as previously discussed. By way of example, exciter 24008 may be configured to transmit energy 24202 in a first frequency band around 900 MHz, a second frequency band of 2.4 GHz, or both, consistent with the present disclosure.

Consistent with the present disclosure, the exciter may be configured to transmit energy to the tags of the electronically tagged products to thereby enable each tag of the tagged products to harvest the energy from the exciter and use the harvested energy for powering each tag. The energy may be harvested, for example, by a harvesting circuit and stored by an energy storage component of the tag or any element or circuits enabled to accumulate energy. By way of example, In FIG. 24, exciter 24008 may be configured to transmit energy 24202 in such a manner that tag(s) 1100 may harvest the energy for powering tag(s) 1100. Discussions of disclosed harvesting methods and devices are discussed, for example, with reference to some non-limiting embodiments illustrated in FIGS. 9, 10, and 15. The circuit of FIG. 24 may be incorporated into the appliances illustrated in FIGS. 25A-E.

According to some disclosed embodiments, the exciter may be configured to receive a trigger command and to trigger the tags of the electronically tagged products in response to receiving the trigger command. Receiving a trigger command may include receiving a wireless transmission, a direct digital signal, or any other communication that may cause the exciter to trigger the tags of the electronically tagged products. The trigger command may be received from a device, a component of a device, an individual, or any other entity, either internal or external to the appliance, capable of causing a trigger command to be received by the exciter. In this context, a "trigger" may refer to a stimulus or input that may be received by the tags that causes the tag to perform one or more actions consistent with the present disclosure, such as transmitting a signal or changing a characteristic of a transmitted signal. For example, in some disclosed embodiments, the tags of the electronically tagged products may each be configured to transmit, after receiving the energy transmitted from the exciter, the unique tag ID thereof for receipt by the receiver in the second frequency band. By way of example, exciter 24008 may receive command 24302 from processor(s). Alternatively, exciter 24008 may receive command 24302 from any other source (e.g., communicator 24102, 24400, or any other source not shown in FIG. 24). Upon receiving command 24302, exciter 24008 may trigger tag(s) 1100 by transmitting energy 24202 within a frequency band that causes tag(s) 1100 to transmit transmission 24204.

Disclosed embodiments may include a receiver for receiving transmission of each unique tag ID. A receiver may include a circuit designed to perform the action of receiving signals sent over a communication medium. The signals may carry data (as in the case of communication systems such as Wi-Fi, Bluetooth, cellular communication, Ethernet communication or any other standards-based or proprietary protocol) or just carry energy (as in the case of exciters for RFID, X-ray imaging or radar). The term "receiver" is most often used in the context of wireless communication, such that the signal is an electric signal, a magnetic signal or an electromagnetic signal, the medium is over-the-air wireless communication, and the signal carries data of some form according to an agreed-upon communication protocol.

The action of "receiving" or "reading" may refer to interpreting and converting to legible information a signal sent over a wireless communication medium. In this sense, a receiver may operate in an unpredictable environment in which at any given point in time a new signal might come in and needs to be handled as it is received. This is due to the fact that, absent complicated recording equipment that can save the inputs arriving over the communication medium over extended periods of time, the receiver may need to act immediately upon detection of an incoming signal, process it, interpret it and convert it to a meaningful form usable by the rest of the system without unacceptable delay. A receiver may need to perform this action intermittently, when signals arrive over the communication medium in a sparse manner, or sequentially one after the other, if signals arrive over the communication medium with little to no delay between consecutive signals.

In some disclosed embodiments, the exciter may be configured to trigger the tags of the electronically tagged products according to a predetermined timing sequence. By way of example, in FIG. 24, exciter 24008 may transmit energy 24202 multiple times a day, regardless of any input from the components of appliance 24000. Additionally, during a triggering period, tags may be triggered multiple times in order to ensure that no tag IDs were missed due to signal collision or the receiver having been overwhelmed. This periodic triggering during a triggering interval or period may also be considered a timing sequence within the meaning of this disclosure.

Disclosed embodiments may include a communicator for outputting indications of identities of electronically tagged products retained in the cavity. A communicator may include any circuit or device capable of providing received tag identities to any other circuit or device. The communicator may be configured to communicate the tag identities via a wired or wireless transmitter, a wired connection, a direct digital signal channel, or any other device, circuit, mechanism or channel capable of facilitating communications between the appliance and another device, platform, or any other entity. The communicator may, through disclosed communication methods, output identifications of the electronically tagged products retained in the cavity. A "retained" product may refer to a product that is associated with the cavity, such as a product that is inside of a cavity, a product that is entering/exiting a cavity, or any other product with a determinable association with the cavity and/or appliance.

In some disclosed embodiments, the indications outputted by the communicator may reflect identities of the electronically tagged products derived from received unique tag IDs. An identity of the electronically tagged product may include information relating to the type of product or certain characteristics of the product. An identity may include one or more of a product name, brand, model, SKU, physical attribute, price, owner, or any other information identifying the product. For example, for an electronically tagged t-shirt, the communicator may output one or more of a brand, color, size, price or any other characteristics or features related to the t-shirt. This information may be determined from or may be based on the received unique tag ID, information contained in the received unique tag ID, or information looked up in a data structure based on the unique tag ID.

By way of example, in FIG. 24, appliance 24000 may be a refrigerator, such as refrigerator 25000A in 25A, and product 24006 may be a gallon of milk. Communicator 24102 may be configured to derive the identity of product 24006 from the unique tag ID of tag(s) 1100 received by receiver. Indication 24206 of the identity of product 24006 may include the brand, type, and amount of the milk, and other information that may be associated with the milk, such as an expiration date, the amount of time gallon of milk 24006 has been retained in refrigerator 24000, or the number of times the gallon of milk 24006 was removed from the refrigerator 24000 for a period of more than a half hour.

According to some disclosed embodiments, the indications outputted by the communicator may include at least one of an inventory report, an inventory change, an inventory history, or a log of a particular tagged product. The meaning of inventory, as used herein, is discussed in detail elsewhere in the present application.

An inventory list, in the context of refrigerator 25000A in FIG. 25A may include a list of all products 24006 (i.e., packaged and electronically tagged food items) contained in the refrigerator's cavity 24004. In the context of the clothes washer or dryer 25000B in FIG. 25B, the inventory list may include all garments (products 24006) or other items within the associated cavity 24004. For the pantry 25000C in FIG. 25C, the inventory list may include all packaged and electronically tagged food items in the pantry's cavity 24004. For the wardrobe 25000D in 25D, the inventory list may include all tagged clothing items in wardrobe cavity 24004. And for the delivery truck 25000E in FIG. 25E, the inventory list may include all parcels (products 24004) within cavity 24004 at any given time.

Consistent with disclosed embodiments, an inventory report may include a list, in the form of a table, a database, a spreadsheet etc., including all the items which are part of an inventory, along with relevant attributes or any other information required to inform decisions regarding the management of said inventory. The information may include a recent sales history of each item (e.g., to gauge the rate at which items are being sold, predict when the inventory will run out and need to be replenished, and/or to assess shrinkage as the difference between the starting inventory minus sales and the current inventory), a comparison between the available items in the inventory and the standard size-curve associated with said items (e.g., to determine the size distribution for future orders), or a list price against current price for each item (e.g., to compare the list value of the inventory against the current mark-down value of the inventory in order to plan future pricing). This report may be presented as a set of top-line aggregate figures (e.g., a number of items, total value, total shrinkage, etc.) and/or an interactive report allowing various filtering and sorting options needed to drive business and management decisions regarding the inventory. A log of a particular product may include sales history, ownership history, location history, or any other historical information relating to the particular tagged product.

By way of example, communicator 24102 may be configured to output indication 24206. Indication 24206 may include an inventory report regarding all of the product(s) 24006 previously or currently retained in appliance 24000. The information contained in the inventory report may include a sales history, list price, current price, or other characteristics of each one of product(s) 24006.

Consistent with disclosed the communicator may be configured to output information associated with the electronically tagged products. The information may include at least one of a period of time the products were retained in the cavity, a period of time since the previous time the products were retained in the cavity, or recommendations associated with the products. Recommendations may be based at least in part on information derived from unique tag IDs associated with the products retained within the cavity. For example, the processor may be able to predict additional products that a user (e.g., a requester) may want to purchase and recommend that the user should purchase the additional products by relaying this information via the communicator. In another example, the processor may recommend to a user to restock a particular product in the appliance due to the amount of the particular product retained in the appliance dropping below a threshold amount. In yet another example, the recommendation may be to discard a product because the product has expired. These examples are non-limiting, and it is to be understood that the communicator may be configured to output a wide array of recommendations associated with the products based on the received unique tag IDs of the products retained within the appliance.

By way of example, indication 24206 may include information relating to product(s) 24006, such as the amount of time product(s) 24006 has been retained in cavity 24004. However, if the product(s) 24006 are not retained in cavity 24004 at the time communicator 24102 outputs indication 24206, indication 24206 may contain information relating to the last time product 24206 was retained in cavity 24004. For example, in the context of washer or dryer machine 25000B of FIG. 25B, identification circuitry 25500 may be able to track and record when items were last put through the washer/dryer.

Communicator 24102 may also be configured to include a recommendation in indication 24206 to the user to purchase more of product(s) 24006 or products related to product(s) 24006. For example, in the context of refrigerator 25000A of FIG. 25A and pantry 25000C of FIG. 25C, when identification circuitry 25500 is used to identify products historically present but currently missing from the refrigerator, a recommendation may be provided to replenish such products. Such recommendation may include an automatic entry on a shopping list, or a display or a report to a user. In the context of wardrobe 25000D in FIG. 25D, identification circuitry 25500 may track combinations of clothes that have been worn together (based on time of removal), and output recommendations for clothing combinations on an interface, or advise when an item was last worn.

In some disclosed embodiments, the receiver may include an antenna configured to receive the transmission of each unique tag ID at a frequency within a frequency band around 2.4 GHz. By way of example, appliance 24000 may include receiver 24100 having an antenna 24102. Antenna 24102 may be configured to receive transmissions within a particular frequency band, such as a frequency band of around 2.4 GHz. Antenna 24102 may therefore receive transmission 24204 containing a unique ID of tag 1100 as long as transmission 24204 is transmitted within a frequency band of around 2.4 GHz.

In some disclosed embodiments, the exciter may be configured to simultaneously trigger a plurality of tags of the electronically tagged products. Furthermore, according to some disclosed embodiments, the receiver may be configured to sequentially read transmissions of the unique tag IDs of the simultaneously-triggered tags. In the context of disclosed embodiments, sequential reception may refer to the ability to detect, receive and interpret one signal at a time or one group of signals at a time. In that sense, if, during the reception of a signal, another signal appears, the reception of both signals would be irreversibly compromised in what is called a "collision", and neither signal would be accurately received and interpreted (the exception would be if the second signal is weak enough in comparison to the first signal, that it is within the required signal-to-noise ratio for correctly receiving the first signal, in which case the second signal may be ignored, and the first signal accurately received and interpreted). Such receivers can be said to be sequential receivers, in the sense that at any given time no more than one signal or group of signals can be received and interpreted, and at the output of the receiver the received signals can be listed in an ordered, non-overlapping, sequential list. Some receivers may have the capability to receive more than one signal simultaneously, using methods such as MIMO, SDMA, digital beamforming etc. Such receivers may be referred to as "parallel" or "simultaneous" receivers, as opposed to sequential receivers. In some cases, signals may be sent to the receiver in a random or pseudo-random manner, which means that one cannot guarantee that any particular signal will be accurately received and interpreted due to the fact that it is statistically possible that another signal will be sent in parallel to the particular signal, causing a collision and blocking the reception of both signals. The chance of such an occurrence may depend on the rate of signals over the channel and the length of time if each signal. However, after removing all collision signals (which, assuming the signals are short enough and sparse enough, may constitute a very small portion of all signals), all remaining signals may be accurately received and interpreted by a sequential receiver, and result in a sequential list of received signals. Embodiments relating to the simultaneous triggering of electronic tags are disclosed in greater detail herein.

According to some disclosed embodiments, the communicator may further be configured to receive, from a requester, a request to identify the electronically tagged products retained in the cavity at a specified time, and output to the requester an indication of the identities of the electronically tagged products retained in the cavity at the specified time. For example, the communicator may include a communication channel or an interface (usually called an API) that enables persons with access to the communicator, and knowledge of the format of queries and responses, to retrieve information from the communicator. Consistent with the present disclosure, such a person may be referred to as a requester. In some embodiments, the requester may be required to provide some form of credentials, log-in, certificate or identification, in order to verify whether the requester is authorized to access or receive information through the communicator. Such authorization data may be general for the entire appliance, or it may be specific for each and every piece of stored information. A requester may desire to know what items are contained within the appliance at any given time, and may receive such information in an indication from the communicator in response to a request for such information.

In some embodiments, the communicator may be further configured to receive, from a requester, a request to locate a particular electronically tagged product; and output to the requester an indication of whether the particular electronically tagged product is retained in the cavity. In other words, in contrast to a request to identify items that are contained within the appliance, a requester may desire to locate one or more particular items, and may receive an indication from the communicator indicating that the one or more particular item are or are not contained in the appliance.

For example, in FIG. 24, requester 24400 may desire to know what electronically tagged products are currently stored or contained in appliance 24000. Requester 24400 may send request 24208 to communicator 24102 requesting such information, and in return, communicator 24102 may output indication 24206 to the requester indicating that product(s) 24006 are retained in cavity 24004. In another example, requester may be attempting to determine the location of product(s) 24006 and may send request 24208 to communicator 24102 for an indication as to whether product(s) 24006 are retained in cavity 24004. If product(s) 24006 are not in cavity 24004 at the time of the request, communicator 24102 may output indication 24206 to requester 24400 indicating that product(s) 24006 are not in cavity 24004.

According to some disclosed embodiments, for a particular tag of an electronically tagged product, at least one of the unique tag ID of the particular tag or the indication of the identity of the product associated with the particular tag may be encrypted. In some embodiments the communicator may be configured to send an encrypted tag ID to at least one processor for decryption by the at least one processor. The at least one processor may be external to the appliance and may be communicatively coupled with the communicator of the appliance. For example, the at least one processor may be associated with a cloud-based platform that is in wired and/or wireless communication with the communicator (e.g., via a network). Consistent with disclosed embodiments, any suitable communication channel between the communicator and any external entity may be established. However, alternatively or additionally, the communicator may be configured to locally decrypt the at least one unique tag ID independent of any processing component. Examples of encryption and decryption devices and techniques are described in other locations herein.

By way of example, in FIG. 24, transmission 24204 may include an encrypted unique tag ID of tag(s) 1100. Communicator 24102 may be configured to send the encrypted unique tag ID to external processor(s) 24105, which may apply an encryption key to decrypt the unique tag ID. Communicator 24102 may be configured to send the encrypted unique tag ID to external processor(s) 24105 through a network or any other suitable communication channel. However, communicator 24102 may also be independently capable of decrypting the unique tag ID without processor(s) 24105, consistent with the present disclosure. In some embodiments, communicator 24102 may be configured to output an indication 24206 that is also encrypted.

According to some disclosed embodiments, the appliance may also include at least one processor configured to cause information related to each unique tag ID to be stored in memory. A processor may include a component or circuit configured to perform a logic operation, as disclosed in greater detail herein. The information may be stored, for example, in at least one data structure, either internal or external to the appliance, as also described in greater detail herein. According to disclosed embodiments, storing the information may include inserting into, updating, or otherwise modifying data values contained in the data structure so that at least one or more data values represents the information related to each unique tag ID. According to disclosed embodiments, the data contained in the data structure may be updated on a periodic basis (e.g., bi-hourly, hourly, daily, etc.), in real-time (i.e., continuously updating data), or upon any sort of trigger or input of data and/or information into the system.

In some disclosed embodiments, the stored information may include, for each product associated with each unique tag, an indication of at least one of a time when each product was placed in the cavity, when each product was removed from the cavity, a number of times each product was removed from the cavity, a number of times each product was returned to the cavity, a total amount of elapsed time when the each product was outside the cavity, an amount of elapsed time since each product was within the cavity, an indication of when the each product associated with each tag ID was last in the cavity, or a list of products other than a particular product that were in the cavity at the same time as the particular product.

By way of example, in FIG. 24, appliance 24000 may include processor(s) 24104. The processor(s) 24104 may be communicatively coupled to one or more components of appliance 24000 (e.g., communicator 24102) and may be configured to execute one or more of the disclosed processes. For example, processor 24104 may be configured to store information related to each unique tag ID associated with tag(s) 1100 of product(s) 24006.

Consistent with disclosed embodiments, the at least one processor may be configured to distinguish multiple instances of a same product based on associated unique tag IDs. By way of non-limiting example, there may be two or more identical white t-shirts present in a washing machine. However, each of the electronic tags associated with the white t-shirts may transmit their own unique tag ID, and the at least one processor may be configured to distinguish them despite each white t-shirt being identical to one another. In FIG. 24, product(s) 24006 may include multiple identical products, and processor 24104 may be configured to distinguish between identical products 24006 based on the unique tag IDs of tag(s) 1100 contained in transmissions 24204.

According to some disclosed embodiments, the at least one processor may be configured to recognize products expected to be in the cavity and to cause the communicator to output a notification if an expected product is missing from the cavity. Similarly, the at least one processor may be configured to recognize products in the cavity that are not expected to be in the cavity, and to cause the communicator to output a notification if a product not expected to be in the cavity is within the cavity. A notification may be generated, for example, by a system component, and used to alert another system component of either the same or a different system. The notification may also be configured to alert a person, or any other entity or component capable of receiving a notification, or any combination of the above. The notification signal might include an audible alert (e.g., beeping), visual alert (e.g., flashing lights), or any other sensory signal (e.g., vibration), or a digital signal (such as a notification signal to an application on a mobile device, an interrupt signal to a CPU in an electric circuit board, or an entry in a system alert log) or any other signal suitable for alerting an entity of the occurrence of one or more misplaced items. A notification may appear as text on a display or in a report.

A product may be expected or not expected to be in a cavity based on historical collected data, a predetermined schedule, a relationship between the product and the appliance, a condition being met by the unique tag ID, or any other identifiable association or non-association between the product and the appliance. For example, a washing machine may include at least one processor and may cause the communicator to output a notification when a wool sweater that is placed in the washing machine based on the unique tag ID of the wool sweater if the wool sweater is not machine washable and therefore not expected to be in the washing machine. The notification may similarly be output via the communicator when the chosen washing cycle is inconsistent with laundering instructions on a garment. Similarly, a clothes dryer may output a notification when a garment (e.g., a sock) was recently present in a washer, but never made its way into the dryer. The processor may also be programmed, designed, and/or configured to expect or not expect the presence of a particular product based on user preference or any other set of rules. By way of example, it may be expected that product(s) 24006 are to be retained in cavity 24004 during a particular time period. If, during that time period, product(s) 24006 are not retained in cavity 24004, processor(s) 24104 may recognize the non-presence of product(s) 24006 and cause communicator 24102 to output a notification that product(s) 24006 are not within cavity 24004.

In the context of refrigerator 25000A of FIG. 25A, identification circuitry 25500 may track items that are expected to be inside of the refrigerator and may generate a notification if items are missing from the refrigerator. In yet another example, the food item products 24006 removed from the refrigerator may be tracked, and a potential spoilage alert may be triggered if removal time surpasses a threshold. Similar systems may be employed, for example, in pantry 25000C in FIG. 25C. For example, a notification may be provided of food item products 24006 nearing their expiration dates, to encourage use of the perishables before they expire. In the context of delivery truck 25000E in FIG. 25E, identification circuitry 25500 may expect a parcel to remain in the truck until it arrives at its intended delivery location. If the parcel is removed earlier, identification circuitry may detect premature removal and circuit 24500 may generate an alarm signal.

Embodiments of the present disclosure may relate to methods, systems, devices, and computer readable media for providing access to information associated with electronically tagged goods. For ease of discussion, a device is described below, with the understanding that aspects of the device apply equally to systems, methods, and computer readable media. For example, some aspects of such device may include electrical connections over a network that is either wired, wireless, or both. Other aspects of such a method may occur using non-electric means. In the broadest sense, the device is not limited to particular physical and/or electronic instrumentalities, but rather may be accomplished using many differing instrumentalities.

Disclosed embodiments may include a system for providing access to information associated with electronically tagged goods. Goods may include tangible things that are produced, bought, sold, used and/or consumed. More generally, as described herein, the term "goods" may be synonymous with "things," and may include animate and inanimate objects, including items, people and animals. Goods can take the form of collections of items found in a particular location and/or owned by a particular owner, such as the items of a person's wardrobe including clothes that person owns, regardless of whether they are in a closet, in the laundry, currently worn by the person, or temporarily lent to a friend to use. A collection may also include food items stored in a kitchen, pantry, refrigerator or freezer including items which are currently in use, or unopened. An electronic device or tag may be embedded within, attached to, or otherwise associated with physical items in order to digitally represent each item on an exemplary digital platform. An electronic device may include any combination of electrical circuits or components that is capable of storing information.

Disclosed embodiments may include at least one processor, as previously described herein, which may store a plurality of tag IDs. As previously described, the tag IDs may include data identifying the tag. A processor may store tag Is in differing ways consistent with disclosed embodiments. For example, in some embodiments, storing may include accessing a data structure (as defined herein) in order to insert into, update, or otherwise modifying data values in the data structure. Storing may also include writing data into memory of the processor. Regardless of how the processor records the data, the data may be stored permanently or updated on a periodic basis (e.g., bi-hourly, hourly, daily, etc.), in real-time (i.e., continuously updating data), or upon any sort of trigger or input of data and/or information into the system.

Disclosed embodiments may include storing a paring between each tag ID and at least one owner ID. In some embodiments, a pairing may include a relationship that results from a process of associating two pieces of information. For example, a pairing may be a one-to-one relationship a between a first object, item, number, or piece of information, and a second object, item, number, or piece of information. A pairing may be stored, for example, when two pieces of data are in some way associated with each other. Accordingly, storing a pairing may occur when a logical connection is formed between pieces of data. One or more of the pieces of data may be preexisting in a data structure and the storing of the pairing may occur when the two pieces of data are linked, such as by associating them with a common marker. By way of another example, storing may occur when two pieces of data are associated with each other in a table. Thus, when, in either memory or a data structure, some form of logical connection is made between the ID of a tag and an ID of an owner, it said that a pairing of the two is stored.

In some embodiments, the at least one owner ID of each tag ID is associated with at least one of a current owner of a product associated with the tag ID, a seller of the product, a manufacturer of the product, or a user of the product. A current owner of the product may include any entity that currently has a right or permission to possess, control, or track the product. Similarly, a seller of the product may include any entity offering a product for sale, as well as associated entities such as an employee or authorized agent, or equipment of such individuals or entities. A manufacturer of the product may include any person or entity that makes, builds, fabricates, assembles, designs, or otherwise produces the product. A user of the product may include a potential customer or an actual purchaser of the product, or an entity renting, leasing or otherwise borrowing (for free or for a fee) a product for use. In some instances, the user may be the same as the owner, and in other instances, the user may be a person, entity or equipment authorized by the owner.

In some embodiments, a single tag ID may be paired with more than one owner ID, indicating shared ownership of the electronically tagged good. In some embodiments, a single owner ID may be paired with more than one tag ID, indicating a single entity's ownership of multiple electronically tagged goods.

Disclosed embodiments may involve receiving a pairing between at least one particular tag ID and a product ID. Each tag may have its own unique tag ID which may be provided to the tag at the time it is manufactured or programmed. The tag ID may uniquely identify a tag in a manner distinguishing it from other tags; the meaning of uniquely identify, as used herein, is discussed in detail elsewhere in the present application. For example, uniquely identifying a tag may occur by assigning to the tag a unique serial number, code, or other data string, for example. In some use cases, a tag supplier may provide to a consumer products company volumes of tags to be associated with the products of the consumer products company. The tags may arrive from the supplier preprogrammed with tag IDs, or the IDs might be programmed by the consumer products company. Either way, with at least some embodiments disclosed herein, a correlation is made between a particular tag and a particular product. For example, a custom furniture manufacture may make eight copies of its Legacy table in two different finishes. It might affix a tag to each product before shipment, and associate in a data structure the tag number with information about the product as follows:

| Tag ID | Model | Finish | Mfg Date | Inspected By |
|---|---|---|---|---|
| AABBCC12341 | Legacy Table | Matte Black | Jan. 16, 1930 | GSP |
| AABBCC12342 | Legacy Table | Matte Black | Jan. 16, 1930 | GSP |
| AABBCC12343 | Legacy Table | Matte Black | Jan. 17, 1930 | AXP |
| AABBCC12344 | Legacy Table | Matte Black | Jan. 17, 1930 | SWB |
| AABBCC12345 | Legacy Table | Glossy Black | Jan. 18, 1930 | AXP |
| AABBCC12346 | Legacy Table | Glossy Black | Jan. 18, 1930 | SWB |
| AABBCC12347 | Legacy Table | Glossy Black | Jan. 19, 1930 | GSP |
| AABBCC12348 | Legacy Table | Glossy Black | Jan. 19, 1930 | AXP |

A tag scanner may be used to scan the tag and an employee may input identifying data, such as the exemplary data in the table above. Alternatively, a manufacturer of 24 oz boxes of Crystal Clean dishwashing detergent may order 50,000 tags, preprogrammed from a tag supplier. The preprogramming may include a unique tag ID for each tag. In some embodiments, preprogramming may also include the product name and size, with each tag having a unique tag ID. The tag supplier may then send a data file to the dishwashing detergent manufacturer or an agent of the same. The data file may include an indication that the 50,000 tag IDs are associated with 24 oz boxes of Crystal Clean dishwashing detergent. Alternatively, the data file may simply include the tag IDs. If the file already contains product-identifying data, when the file is received and uploaded into a data structure, a pairing is said to have been received between tag ID and product ID. If the datafile lacks product identifying information, at the time the consumer products company associates the product ID information with the tags, a pairing is said to have been received (in the system) between tag ID and product ID. In another use, the consumer products company may simply receive tag IDs in text accompanying the tags, and the consumer products company might need to input the tag IDs and associate them with product IDs. When that association occurs, the pairing is said to have been received between the tag ID and the product D. In yet another embodiment, the consumer products company may simply receive tags with preprogrammed IDs. The consumer products company might then perform a batch intake procedure where the consumer products company scans the tag IDs to import the tag IDs into the system and associate the batch with a product line so that multiple instances of the same product on that line receive a tag from the batch. During the association, batch product ID information may be entered, and when that batch product ID is entered into the system and associated with a product ID of the product line, a paring of tag ID and product ID is said to have occurred. In some instances, the consumer products company might also have an ability to program the tag with ranges of tag IDs of the company's choosing. In some instances, tags may be shipped with some printed information (either individually on each tag, or in a batch of multiple tags), allowing an optical scanner to optically scan the tags and receive their respective ID's, enabling the pairing to be done by alternative means within the company's systems. These are just a few examples of how a tag ID may be associated with a product ID. It is to be understood that any other way of pairing is within the scope of this disclosure, so long as the result is that a tag ID and a product ID are in some way associated with each other. Moreover, the consumer products example is provided to streamline discussion. Similar approaches may be used with any object or thing.

Regardless of the use case or how the pairing occurs, a processor may receive a pairing between a tag ID and a product tag ID, where the tag ID includes a unique tag identifier and the product ID may include one or more pieces of additional information characterizing the product. Thus, in the table above, columns 2-5 may individually, collectively, or in some combination be considered to contain a product ID, because the information in those columns in one way or another identifies the product. Receiving the pairing may occur when the association between a tag ID and a product ID arrives at or occurs with a processor. In some embodiments, the association may simply bean indicator to join two pieces of previously stored information. For example, a data structure might be preloaded with tag IDs and product IDs, and receiving the pairing might involve receiving an indication that a particular tag ID is associated with a particular product ID.

A paring between a particular tag ID and a product ID may include a relationship that results from the process for assigning a one-to-one relationship between a particular tag ID and a product ID. In some embodiments, a single tag may be associated with a single item. For example, a tag ID may be paired with a product ID. This pairing may be received by the system and stored in memory associated with the system.

Disclosed embodiments may include storing information associated with the at least one particular tag ID and the product ID. Storing of information may occur when data is written to a data structure or memory, or electronically retained in any way. The stored information relating to the at least one particular tag ID and the product ID, may in some instances include the association between the tag ID and the product ID. In other instances, it may include any additional information about the tag ID, the product ID or their pairing. Such additional information may include information on when the tag ID was purchased, when the tag ID was associated with the product ID, characterizing information about the associated product, historical information about the tag's transmission history, product acquisition information, information about changes in location of the tag over time, and/or information about changes in tag/product ownership. Information associated with a tag ID or a product ID, as disclosed above, may be initially stored within the tag itself, or may be stored in a data structure after the tag transmits its ID over a communications channel and the tag ID is received by a processor that causes the data to be stored. Alternatively or additionally, the information may be stored solely in a data structure accessible by a processor, having the processor update, maintain, and otherwise handle the information whenever and wherever a transmission of the tag ID is received over a communication channel along with the associated information about the circumstances of the transmission, the characteristics, identity, and intent of the device receiving the transmission. For example, FIG. 20 includes an identification tag 1100. When the product with which tag 1100 is associated is removed from an area monitored by an EAS gate, the gate may trigger the tag to emit its ID as a signal 12200 to a reader 11300h. The reader 11300h may then forward the incident via network 20002 to processor 20004, which recognizes reader 11300h as being associated with an egress. The processor might then cause an indication that the product associated with tag 1100 passed the egress at a particular time to be stored in memory or data structure 20006. This in turn, may cause processor 20004 to remove the product associated with tag 1100 from inventory.

In some embodiments the information associated with each of the plurality of tags may include a list of authorized entities associated with each tag ID. A list may include a series of words or numerals representing information. For example, a list may contain information representing authorized entities associated with a tag ID. An authorized entity may include a person, or device, such as a smartphone or laptop, associated with an owner of the product or an application executed on a computing device. In some embodiments, the at least one authorized entity is at least one of a computing device or an application executed on a computing device. Computing devices may include cell phones, desktop computers, laptops, video game consoles, smartphones, tablets, smart televisions, digital audio players, automobile communications systems, printers, and other devices capable of performing computations. An application executed on a computing device may include a program or group of programs designed for interaction by a user that performs a function, such as for personal, education, or business use. The computing device or application executed on a computing device may be an authorized entity associated with a tag ID. Once authorized, that entity may be provided with access or rights associated with the tag. For example, authorized entities may be able to perform look ups of data or may be able to change data associated with a tag. In some instances, multiple applications on a single computing device may or may not be authorized entities. For example, a retail establishment may allow personnel in the establishment to install a proprietary application reserved for staff use on personnel's private devices such as smartphones or tablets. In such a case, the staff application may be included in the list of authorized entities allowed to access information regarding the tags in the retail establishment, while other, personal applications installed on the same device (such as calendar applications, mail applications, or even the same retailer's consumer-facing application) may not be included in the list of authorized entities.

In some embodiments, the at least one authorized entity is associated with at least one of a current owner of a product corresponding to the product ID, a seller of the product, a manufacturer of the product, or a user of the product. A seller of the product may include a person or entity, or an employee or authorized agent of the person or entity, offering the product for sale. A manufacturer of the product may include any person or entity that makes, builds, fabricates, assembles, designs, or otherwise produces the product. A user of the product may include an actual or potential customer or a purchaser of the product, or an entity renting, leasing or otherwise borrowing (for free or for a fee) a product for use. A user may also be an authorized entity permitted to use the product by an owner.

Disclosed embodiments may include receiving a pairing between the at least one particular tag ID and at least one authorized entity associated with the at least one particular tag ID. For example, each tag ID may be paired with at least one authorized entity. This pairing may be received by the system and stored in memory associated with the system. Similar to how the term pairing is defined above, a pairing of a particular tag ID and at least one authorized entity may be considered received when an indication is provided indicating the association. For example, when data is received in a processor identifying a new owner of a tag, an association may be said to have been received. Or, for example, when a new tag is associated with an owner and the owner's preexisting list of permissions is associated with the new tag, an association may be said to have been received.

In some embodiments, the at least one processor may be configured to store and access a list of authorized entities associated with each tag. Storing a list may include writing identifying information for one or more entities provided with permission or authorization into memory or a data structure. Or it may include linking a preexisting list with a new tag. Once stored, accessing refers to an ability to look up, read, add to, alter, delete, or share information associated with a tag. For example, in FIG. 20, processor 20004 may cause an authorization list for a particular tag or category of tags (e.g., all tags owned by owner x; or a subgroup of products owned by owner x) to be stored in data structure 20006. If device 20008 is on the list, then it may be able to access data about the tag in data structure 20006 via network 20002. For example, using interface 20010, an authorized user may read, alter, add, remove, or share, via the network 20002, the information related to a tag for which authorization was provided.

In some embodiments, the at least one processor may be configured to receive a query to modify the list of authorized entities of the particular tag, and if the query is received from an authorized entity of the particular tag, perform the requested modification of the list. A query may include any request for data or information associated with the tag ID or product ID. A query may further include any request to read, alter, add, modify, remove, or share items or information on the list. For example, a query may include a request to modify the list of authorized entities associated with a particular tag by altering, adding to, or removing an entity from the list of authorized entities. Advantageously, only an authorized entity may read, alter, add, modify, remove, or share items or information on the list. Thus, the processor will only perform the modification if the query is received from an authorized entity associated with the particular tag.

For example, FIG. 20 depicts a device 20008. Device 20008 may submit a query to modify the list of authorized entities of an identification tag 1100 stored in data structure 20006. Processor 20004 may determine if device 20008 is an authorized entity by accessing the list of authorized entities paired with a particular tag ID. If device 20008 is an authorized entity, then processor 20004 may modify the list of authorized entities of an identification tag 1100 stored in data structure 20006.

In some embodiments, when the list of authorized entities of the particular tag ID is modified, the at least one processor is configured to control the tag associated with the particular tag ID to change at least one parameter of a signal transmitted by the tag. In some embodiments, the at least one signal transmission parameter of the particular tag may include at least one of a repetition period of a signal transmitted by the tag, a time interval between two consecutive signals transmitted by the tag, a data encryption mechanism, an encryption key, a signal transmission power, a packet format, or data content of a transmission from the tag. The wireless identification tag may be configured to transmit within a minimum repetition period, such as every ten minutes. The meaning of repetition period, as used herein, is discussed in detail elsewhere in the present application.

In accordance with the present disclosure, encryption algorithms can be classified into two classes with regards to their use of encryption keys: symmetric algorithms and asymmetric algorithms. Symmetric algorithms use the same encryption key for both encryption and decryption. Asymmetric algorithms have one key used for encryption and a different key used for decryption of the same message. Common types of symmetric encryption algorithms include AES, 3DES, Blowfish, X-TEA and others. Common types of asymmetric algorithms are RSA and ECC and others. The advantage of asymmetric algorithms over symmetric ones is that the key used to encrypt the data (called "public key") does not need to be maintained as a secret because only parties with access to the key used for decryption (called the "private key") can decipher encrypted data. This allows the public key to be shared freely between the parties without having to be kept secret which greatly simplifies the logistics of secure key distribution.

The power level at which the transmitter transmits may be a measurement of power immediately at the output of the transmitter, while the transmitter is actively transmitting. A transmitter may be designed to have a configurable power level, such that in response to certain inputs it may transmit a signal at one of two or more different power levels.

Data content may include a unique identifier associated with the wireless tag, a status of the wireless tag, a location of the wireless tag, a power level of the wireless tag, pricing information, ownership information, styling information, data relating to the trigger that initiated the transmission, or any information conveyed by the signal.

For example, when the processor makes a change to the list of authorized entities, the processor may also instruct the tag to change the signal that it transmits. Referring to FIG. 20, when processor 20004 modifies the list of authorized entities in data structure 20006, processor 20004 may also send a signal (not shown) to identification tag 1100 which changes the signal 12200 transmitted by the identification tag 1100. The identification tag may change at least a repetition period of the signal transmitted by the tag, a time interval between two consecutive signals transmitted by the tag, a data encryption mechanism, an encryption key, a signal transmission power, a packet format, or data content of a transmission from the tag. The change may involve encryption. For example, if an entity is removed from the list of authorized entities associated with a tag, then the way the tag encrypts information may change so that the non-unauthorized entity is unable to read information from the tag.

Disclosed embodiments may include storing tag IDs of a plurality of tags and a pairing between each tag ID and at least one owner ID. As discussed earlier, paring between tag IDs and an owner ID may include a relationship between the two. Storing, as previously discussed, may involve writing into a data structure or memory a link or any other connection between the two pieces of data. The relationship may be a one-to-one relationship between a particular tag ID and an owner ID. In some embodiments, a single owner ID may be paired with a tag ID. In other embodiments a single owner ID may be paired with multiple tag IDs. For example, an owner ID associated with a retailer may be paired with multiple tag IDs associated with goods such as articles of clothing. For example, as depicted in FIG. 20, processor 20004 may store the pairing of a tag ID associated with an identification tag 1100 between an owner ID. The processor 20004 may store the pairing information in data structure 20006.

Disclosed embodiments may include receiving, for each owner ID, a pairing between the owner ID and at least one authorized entity enabled to receive data of the one or more tags associated with the owner ID. As discussed earlier, causing a linkage to be formed between the owner ID and at least one authorized entity may enable the owner to permit more than one device or person to access tag-related data.

Disclosed embodiments may further include receiving, from a requester, a query for information pertaining to a particular tag of the plurality of tags. A requester may include any person, device, program, or application seeking to retrieve information from a data structure. The request may come via an interface or through pre-programed processes. The requester may be required to provide some form of credentials such as, log-in, certificate, or identification, in order to determine whether the requester is an authorized entity with permission to access the information stored in the data structure. Such permission may be general permission and allow access to the entire data structure, classification permissions to access data associated with a particular class or group of objects, or specific permissions to access data associated with a particular tag. Some of the data associated with the particular tag might be restricted only to entities with higher level permissions, while entities with lower level permissions may be able to access the other data. The system may grant/require specific permission for each and every piece of stored information. If the request involves a human interacting with an interface, the requestor may generate a query for information pertaining to the particular tag by scanning it with a computing device. For example, when the scan occurs, an ID associated with the requestor may be transmitted to a server (e.g., either via network infrastructure or via a receiver/transmitter in a device controlled by the user). The server can then perform a look up of information and transmit it to the requestor.

For example, in FIG. 20 a user may create a query via a device 20008 by scanning tag 1100. The query may then be sent to the processor 20004 via network 20002. Processor 20004 may then perform a look up and locate the information pertaining to a particular tag 1100 in the data structure 20006. The information pertaining to a particular tag 1100 may be displayed to the user via network 20002 using a graphical user interface 20100 on a computing device 20008.

Disclosed embodiments may include looking up the at least one owner ID associated with the particular tag. Looking up the at least one owner ID associated with the particular tag may include accessing the stored pairing information between tag IDs and owner IDs. The system may compare the tag ID associated with the particular tag with stored tag IDs. When the particular tag information is located, the pairing information may include an owner ID associated with the particular tag. For example, in FIG. 20, processor 20004 may receive a tag ID from an identification tag 1100 via reader 11300a and network 20002 (or from computing device 20008, as mentioned previously). Processor 20004 may then access data structure 20006 via network 20002 and search for the particular tag ID and the pairing information indicating an owner ID paired with the tag ID.

Disclosed embodiments may include receiving, from a requester, a query to identify at least one of the product ID, the information associated with the at least one particular tag ID, the information associated with the product ID, or the at least one authorized entity, the query including an encrypted tag ID of the particular tag. For example, the query generated by a requestor may include a request to receive the product ID, information associated with the particular tag ID, information associated with the product ID, or the identity of the authorized entity or authorized entities paired with the tag ID. The request or query may include an encrypted tag ID of the particular tag.

In some embodiments the at least one processor may be configured to access at least one encryption key of each tag ID. For example, the encryption key of each tag ID may be stored on the tag itself or may be retrieved from a data structure after the device transmits identifying information to a processor that performs a lookup in the data structure. Referring to FIG. 20, an encryption key associated with each identification tag 1100 may be stored on the individual identification tags 1120 and in data structure 20006. Processor 20004 may access the encryption key stored in data structure 20006 via network 20002.

In some embodiments the at least one processor may be further configured to access the at least one encryption key associated with the particular tag. For example, the encryption key of a particular tag may be stored on the particular tag itself and/or may be retrieved from a data structure after the device transmits identifying information to a processor that performs a lookup in the data structure. Referring to FIG. 20, an encryption key associated with a particular identification tag 1100 may be stored on the particular identification tag 1120 or in data structure 20006. Processor 20004 may access the encryption key stored in data structure 20006 via network 20002.

In some embodiments the particular tag may be configured to transmit the tag ID thereof when the tag ID is encrypted according to at least one encryption key, and wherein the at least one processor is configured to receive the at least one encryption key and decrypt the tag ID transmitted by the particular tag with the at least one encryption key. For example, when a tag ID is encrypted according to an encryption key, the tag may transmit the encrypted tag ID to a processor. The processor may be able to decrypt the encrypted tag ID with the encryption key. Referring to FIG. 20, an encryption key associated with a particular identification tag 1100 may be stored on the particular identification tag 1120 and/or in data structure 20006. Processor 20004 may access the encryption key stored in data structure 20006 via network 20002 and use the encryption key to decrypt the encrypted tag ID.

Disclosed embodiments may also include decrypting the encrypted tag ID, to thereby look up the decrypted tag ID of the particular tag. Decryption may include a process of decoding a message or information that has been encrypted. A decryption processes may include the use of an encryption key, which may be a piece of data that is shared between the transmitter of the message and the intended recipient at a point in time prior to the transmission of the encrypted message. The use of an encryption key may enable multiple parties to use common encryption processes, while still maintaining the secrecy of the messages as long as the keys are unique and kept secret. A message would be considered decipherable or readable by a receiving party if it is transmitted in accordance with a protocol that is agreed upon by both the sending and the receiving party. In the case of an encrypted message, the message may be decipherable or readable if the receiving party also possesses the details of the type of encryption used, including the encryption key. For example, a processor may receive a query which includes an encrypted tag ID. The processor may decrypt the encrypted tag ID in order to access the stored tag IDs and locate the particular tag ID in the memory or a data structure associated with the system.

In some embodiments the at least one processor may be further configured to decrypt, using an encryption algorithm and the at least one encryption key, an encrypted tag ID received with the query from the requester. An algorithm may be any process or set of rules that may be applied for decryption purposes. The algorithm may be accessed by a processor. For example, in FIG. 20, an encryption key associated with a particular identification tag 1100 may be stored on the particular identification tag 1120 or in data structure 20006. Processor 20004 may access the encryption key stored in data structure 20006 via network 20002 and use the encryption key to decrypt the encrypted tag ID. The processor 20004 may then look up via network 20002 the decrypted tag ID and associated information that may be stored in the data structure 20006.

In some embodiments, the encrypted tag ID received from the requester may be encrypted with at least one encryption key associated with the particular tag, and wherein the at least one processor is configured to retrieve at least one encryption algorithm and the at least one encryption key, and to decrypt the encrypted tag ID using the at least one encryption algorithm and the at least one encryption key. For example, the processor may receive a query from a requestor. The query may include a tag ID that has been encrypted with an encryption key that is associated with the particular tag. The processor may further retrieve an encryption algorithm stored on the tag, within an internal memory associated with the processor, or in the memory or data structure associated with the system. The processor may use the encryption key retrieved from the system and the retrieved encryption algorithm to decrypt the encrypted tag ID.

Referring to FIG. 20, processor 20004 may receive a query from a device 20008 via network 20002. The query may include a tag ID associated with an identification tag 1100 that has been encrypted with an encryption key particular to the identification tag 1100. Processor 20004 may retrieve an encryption algorithm and encryption key from data structure 20006 and use the encryption algorithm and the encryption key to decrypt the tag ID associated with the identification tag 1100.

Disclosed embodiments may further include receiving at least one change in an owner ID of the particular tag from first owner ID to a second ID and/or receiving an updated owner ID associated with the particular tag. A change in owner ID or an updated owner ID may include any information indicating that a new owner is associated with a tag, or that there is new information about an existing owner previously associated with a tag. Such a change may be received via a network interface. For example, when a purchase is made at a point of sale or through an electronic shopping cart, an identification of the new owner may be associated with the tag, and the new owner's ID may be stored in a data structure. For example, the processor associated with the system may receive a change in ownership of a tag. The request may include the current owner ID and the new owner ID with an instruction to associate the new owner ID with the indicated tag.

Disclosed embodiments may further include, in response to the at least one change in the owner ID, correspondingly changing the encryption key of the particular tag to an updated encryption key that is associated with the second owner ID. Once a new owner is assigned to a tag, a prior owner's rights to access the tag may be restricted or removed. One way to prevent a prior owner from accessing information related to the tag is to change the encryption method or key used by the tag and not share the new encryption with the prior owner. For example, when the processor associated with the system receives a change in the owner ID of a tag, then the processor may change the encryption key associated with the identified tag to an encryption key that is associated with the new owner ID. The processor may further encrypt the tag ID using the encryption key associated with the new owner ID, and further instruct the tag to use the new encryption key for any subsequent transmissions.

Disclosed embodiments may further include removing the first owner ID (or a previous owner ID) from a list of authorized entities associated with the at least one particular tag ID. When ownership changes, so too may permissions for accessing tag data. This may occur via a processor that receives information associated with an ownership change, and removes the prior owner ID (as well as any entities associated with the prior owner ID) from a list of authorized entities associated with an identified tag ID. The removal may occur when a specific request is made for removal, or it may occur automatically via a process implemented in the system.

Referring to FIG. 20, processor 20004 may update ownership information of an identification tag 1100 when processor 20004 receives information providing an indication that the ownership of the tag changed. The indication may be provided through device 20008 via network 20002. The processor 20002 may then update the encryption key associated with the identification tag 1100 to the encryption key associated with the new owner ID indicated by the device 20008. Additionally, the processor 20002 may remove the first owner ID (as well as any entities associated with the prior owner ID) from a list of authorized entities stored in data structure 20006 associated with the particular identification tag 1100.

Disclosed embodiments may include determining if the requester is the at least one authorized entity associated with the decrypted tag ID of the particular tag or the at least one owner ID associated with the particular tag. When a request for access to tag information is made and before the information is provided, a processor might compare an ID of the requester against a list including IDs of authorized entities. Only if the comparison determines that the requestor is authorized may the processor enable the request to proceed. For example, when a processor associated with a system receives a query by a requestor to access or modify information associated with a tag ID, the processor may determine if the requestor is an authorized entity associated with the particular tag and therefore allowed to access or modify the requested information. The processor may look up the decrypted tag ID to find the list of authorized entities associated with the identified tag.

Referring to FIG. 20, when processor 20004 receives a query from a device 20008, processor 20004 may access data structure 20006 via network 20002 and located the pairings between the particular tag ID and one or more authorized entities in order to determine if the requestor is an authorized entity associated with the particular identification tag 1100.

Disclosed embodiments may include fulfilling the query, if the requester is the at least one authorized entity, and/or permitting the requester to access the requested information pertaining to the particular tag. For example, if the processor associated with the system determines that the requestor is an authorized entity associated with the tag, the processor may enable the query to proceed by, for example, providing requested data or permitting data to be changed. For example, fulfilling the query may include retrieving the requested information from the stored information and responding to the requestor with the retrieved information. In some embodiments fulfilling the query may include retrieving requested information from at least one data structure, the requested information including at least one of the stored information associated with the at least one particular tag ID or the stored information associated with the product ID. In some embodiments fulfilling the query may include outputting the requested information to the requestor.

Disclosed embodiments may include denying the query if the requester is not the at least one authorized entity. For example, if the processor associated with the system determines that the requestor is not an authorized entity associated with the tag, then the processor may deny the query. Denying the query may include taking no action such as not providing requested information or not providing a stored data to be modified or updated. In some embodiments, denying the query may include outputting a notification that the requester is not authorized to access information designated by the query.

Referring to FIG. 20, when processor 20004 receives a query from a device 20008, then processor 20004 will determine if the device 20008 is an authorized entity associated with the particular identification tag 1100. If the device 20008 is not an authorized entity, processor 20004 may deny the query and inform the requestor, by displaying a message on a graphical user interface 20100 on the device 20008 that the requestor is not authorized to receive the requested information or to perform the requested modification of information associated the particular identification tag 1100.

As discussed previously, the plurality of tags may be configured to wirelessly receive and store ambient energy, and to power transmission of signals using the stored ambient energy.

Embodiments of the present disclosure may relate to methods, systems, devices, and computer readable media for a wireless identification tag with varying identity. According to some embodiments, the identity of the wireless tag may vary. For example, the wireless tag may transmit two or more identifiers, or may transmit the same identification information in two or more different forms. A tag ID may include information identifying the wireless tag. The tag ID may include numbers, letters, characters, codes, strings, or other forms of data which may identify the wireless tag to other devices or device components that receive the tag ID. The tag ID may be unique to a specific tag, and that specific tag may have only one tag ID. Alternatively, the same tag may have multiple IDs. In some embodiments, multiple tags may share the same tag ID or groups of IDs. Examples of a tag ID may include a serial number, part number, UUID, EPC, and/or other data.

As discussed above, the wireless tag may include at least one circuit. By way of example, as illustrated in FIG. 9, top level controller 9020, either alone or in combination with other components, may be an example of the at least one circuit. Alternatively, depending on particular design functionality, other components either alone or in combination my constitute at least one circuit.

In various embodiments, the at least on circuit may be configured to receive a first trigger at a first time. A trigger may be inputs, stimuli, and other signals for inducing a reaction. In the context of electrical and electronic circuits, examples of a trigger may include, but are not limited to, an external signal or an internal signal received. In some embodiments, an external signal received may cause a trigger to be sent to the at least one circuit. Whether internally or externally induced, a trigger may include, for example, a voltage level, a voltage level change, a current level, a current level change, a frequency, amplitude or phase change of a received signal, a digital input, a digital pulse, a control word, and/or any other signals in various forms of energy.

In various embodiments, the at least one circuit may, in response to the first trigger, generate in a quasi-random manner a first decipherable ID uniquely identifying the tag. The decipherable ID may be a coded, scrambled, or encrypted piece of data that can be decoded, unscrambled or decrypted. The decipherable ID may be singularly associated with an entity (e.g., the tag or its tag ID), such that no two entities are associated with the same decipherable ID. And the decipherable ID may represent the tag ID after the tag ID has been coded, scrambled, or encrypted.

A decipherable ID may be generated in a quasi-random manner. For example, the at least one circuit may generate decipherable ID with a deterministic process using a combination of fixed inputs and random inputs. The decipherable ID may be considered quasi-random (as the term is used herein) if it conforms to at least some statistical measure of randomness. This may include, for example, fixed numbers or known outcomes randomness, pseudo randomness, non-fully reducible randomness, Martingale randomness, or real randomness. Randomness may exhibit, for example, in random noise, such as auto-correlation conditions, normal distributions, frequency content, and other similar noise characteristics. The quasi-random characteristics of the decipherable ID may allow a party with knowledge of the quasi-random generation process to access the underlying inputs, (i.e., deciphering the ID), while preventing others from differentiating the decipherable ID from a string of random numbers or characters.

In various embodiments, the at least one circuit may cause the at least one transmitter to transmit the first decipherable ID. By way of example, as illustrated in FIG. 9, top level controller 9020 may be programmed to generate the first decipherable ID in a quasi-random manner. In some embodiments, top level controller 9020 may be programmed by computer readable instructions stored in memory 9022. Transmission data provided from top level controller 9020 to beacon controller 9030 may contain the first decipherable ID. Transmitter 2104 may transmit the first decipherable ID as instructed by beacon controller 9030.

In various embodiments, the at least one circuit may receive a second trigger at a second time after the first time, and in response to the second trigger, may generate in a quasi-random manner a second decipherable ID different from the first decipherable ID and uniquely identifying the tag, and may cause the at least one transmitter to transmit the second decipherable ID. The at least one circuit may receive more than one trigger. For example, the at least one circuit may receive the first trigger, and thereafter receive a second trigger. In some embodiments, the second trigger may be identical to the first trigger. Alternatively, the second trigger may differ from the first trigger in one or more aspects, such as magnitude, phase, time duration, frequency, and/or information contained within. In some embodiments, the tag ID may be transmitted as part of the first decipherable ID, the second decipherable ID, or both.

As previously described, quasi-random numbers or strings may be generated by a deterministic process with fixed inputs and random inputs. In some embodiments, the second decipherable ID may be generated by using a different process or a different set of inputs from the ones used to generate the first decipherable ID. By way of example illustrated in FIG. 9, memory 9022 may contain multiple algorithms for generating quasi-random strings, and top level controller 9020 may be programmed to generate the second decipherable ID differently than the first decipherable ID by using different algorithms. Alternatively or additionally, top level controller 9020 may be configured to use the same set of fixed inputs to generate both the first decipherable ID and the second decipherable ID, but may use a first set of random inputs when generating the first decipherable ID, and a second set of random inputs, different from the first set, when generating the second decipherable ID. In some embodiments, top level controller 9020 may be configured to generate decipherable IDs to be different from previously-generated decipherable IDs.

Generating a new decipherable ID each time the tag ID transmits enhances privacy. Even if third parties are unable to decipher the decipherable ID, they may still 'map' an undeciphered ID to a particular wireless tag if the decipherable ID remains unchanged. For example, one may still be able to track the wireless tag using an unreadable code if the wireless tag consistently transmits the same unreadable code.

According to some embodiments, at least one of the first decipherable ID or the second decipherable ID may be encrypted. Encryption may be a process of encoding a message or information in such a way that it enables authorized parties to access the encoded message or information while denying access to those who are not authorized. For example, even if the encoded message or information were obtained by some unauthorized party, encryption may block that unauthorized party from reading the encoded message or information without knowledge of the decryption process. In some embodiments, encryption processes or algorithms may include the use of an encryption key, which may be a piece of data that is shared between a sender of the message or information and the intended recipient, usually at a time prior to transmission. So long as the encryption key remains secret and unique, multiple parties may use a common encryption process while still maintaining the secrecy of the encrypted message or information.

A message or information may be considered "decipherable" or "readable" if it is transmitted in a protocol that is agreed upon by both the sending and the receiving party. For an encrypted message or information, it may be considered decipherable if the receiving party has details regarding the encryption process or algorithm, including the encryption key. The first decipherable ID or the second decipherable ID may be encrypted by symmetric or asymmetric algorithms. Symmetric algorithms use the same key for both encryption and decryption, while asymmetric algorithms have one key used for encryption and a different key used for decryption. Examples of symmetric encryption algorithms may include AES, 3DES, Blowfish, and X-TEA. Examples of asymmetric algorithms may include RSA and ECC.

According to some embodiments, the at least one circuit may be configured receive a unique ID of the tag. The unique ID of the tag may include serial number, part number, UUID, EPC, database entries, and/or any other form of data which is singularly associated with the tag. The tag ID may be unique to the tag, or, in some embodiments, may be shared by multiple tags.

The at least one circuit may be configured to receive a key configured for use with at least one encryption algorithm and may encrypt the unique ID of the tag using the key and the encryption algorithm to generate at least one of the first decipherable ID or the second decipherable ID with the unique ID of the tag and the key. In some embodiments, the encryption algorithm may be the quasi-random process through which the first decipherable ID or the second decipherable ID are generated. For example, the first decipherable ID or the second decipherable ID may be an encrypted message containing the unique ID of the tag.

In some embodiments, the tag may include memory for storing at least one of the unique ID of the tag or the key. By way of example, as illustrated in FIG. 10, tag ID ROM 10010 and key ROM 10012 may be examples of memories for storing the unique ID of the tag and the key, respectively. Top level controller 9020 (e.g., at least one circuit) may retrieve the unique ID of the tag and the key from tag ID ROM 10010 and key ROM 10012.

In some embodiments, the at least one circuit may be configured to generate at least one of a random number or a pseudo-random number. A random number may be a number generated by a process with an apparent lack of pattern or predictability, lacks order, or that does not follow an intelligible pattern or combination. A pseudorandom number may be a number generated by a process with predictable outcomes that are difficult to acquire without knowledge of the underlying process. A sequence of pseudorandom numbers exhibit statistical randomness, but are not truly random. In some embodiments, top level controller 9020 may be programmed to generate random numbers or pseudo-random numbers. In some other embodiments, top level controller 9020 may be programmed to receive random numbers and/or pseudo-random numbers from another circuit of the wireless identification tag.

In some embodiments, the at least one circuit may be configured to generate at least one of the first decipherable ID or the second decipherable ID using the generated number, the unique ID of the tag, and the key. For example, the key may define a scrambling process of to encrypt the unique ID of the tag using the generated number, such that in the first or second decipherable ID, the unique ID of the tag is masked as a series of quasi-random numbers/strings with the generated number.

In some embodiments, at least one of the first trigger or the second trigger may be a request, received from a requester, to identify the tag. A requester may an individual, device, or system desiring a response from the tag to transmit the tag ID. In some embodiments, the requester may be at least one of a computing device or an application executed on a computing device. A computing device may include a personal PC, tabled device, smart phone, PDA, digital camera, home appliance, computer server, cloud platform, processor, and other machines and electronics capable of processing inputs and producing outputs.

In some embodiments, the at least one circuit may be configured to transmit, to the requester, the quasi-randomly generated decipherable ID corresponding to at least one of the first trigger or the second trigger. FIG. 11 illustrates one exemplary embodiment of a wireless identification tag operating in an environment such as a clothing retail establishment. For example, environmental exciters such as exciters 11400, mobile devices such as handheld device 11200, and EAS gate 1112 may all emit wireless signals that may be received by tag 1100 as one of the first or second trigger for transmitting the quasi-randomly generated decipherable ID.

As illustrated in FIG. 12, exciter 11400d may be one example of a requester. Signal 12100, which originates from exciter 11400d, may be an example of a request containing one of the first or second triggers. In response to signal 12100, tag 1100 may transmit, to tag receivers 11300e and 11300f, signal 12200, which may contain one of the first or second decipherable IDs. Exciter 11400d and tag receivers 11300e and 11300f may be part of a larger infrastructure at the retail establishment.

By way of another example, as illustrated in FIG. 13, a handheld user device 11200 may also be a requester. Signal 13100, which originates from handheld user device 11200, may be another example of a request containing one of the first or second triggers. In response to signal 13100, tag 1100 may transmit signal 12200 containing one of the first or second decipherable IDs. Handheld user device 11200 may be a cellular phone, PDA, wearable devices, or other mobile computing device having computer programs (examples of applications) for controlling the device's operations.

By way of yet another example, as illustrated in FIG. 14, EAS gates 1112, 1114 may also be a requester. Signal 14100, which originates from EAS gates 1112,/1114, may be a different example of a request containing one of the first or second triggers. In response to signal 14100, tag 1100 may transmit signal 12200 containing one of the first or second decipherable IDs. EAS gates 1112, 1114 may be part of a larger infrastructure at the retail establishment.

In some embodiments, the request to identify the tag may occur outside of a retail establishment setting. The wireless tag may be embedded in a product for an extended period of time after purchase, and may be configured to allow user interaction by the purchaser during that time. Whereas in a store setting, the wireless tag may allow large numbers of computing devices to access the tag ID, such access may only be allowed for one or a few authorized devices after purchase. In some embodiments, after purchase, the wireless tag's transmissions may be encrypted such that they appear unreadable by nearby receiving devices. In order to decrypt the transmission and access the tag ID, the receiving device may first require authorization.

In some embodiments, the receiving device may be authorized to access the tag ID by sending a request to a cloud platform through a network, such as the internet. The cloud platform may include one or more databases storing IDs of wireless tags, registered owners of each tag, and encryption information for each tag such as keys corresponding to encryption algorithms. In some embodiments, access to the tag ID may be restricted such that every decryption of a tag's transmission passes through the cloud platform.

Figure 26:
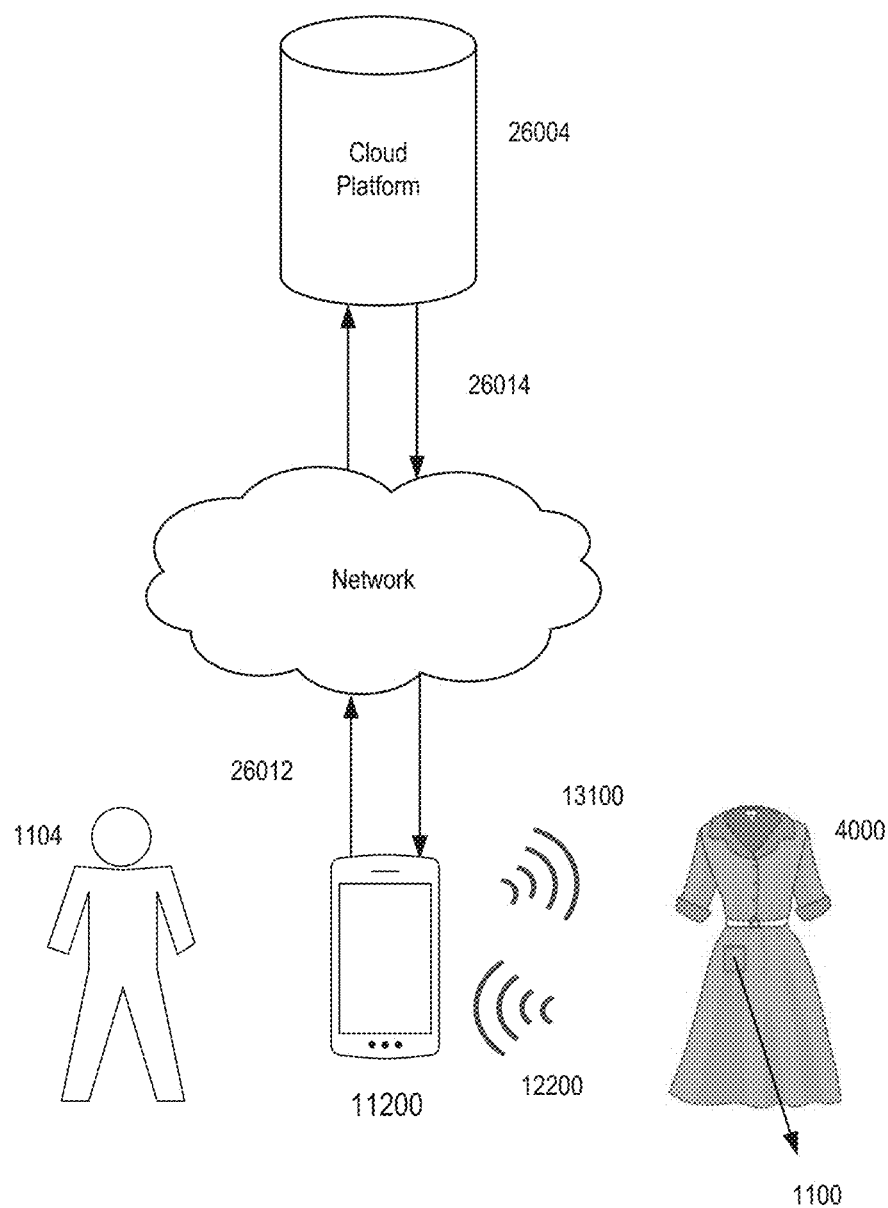
FIG. 26 is a schematic diagram depicting an aspect of the operations of the wireless tag, consistent with disclosed embodiments.

By way of example, as illustrated in FIG. 26, a purchaser 1104 of product 4000, using handheld device 11200, may transmit signal 13100 (example of the request) to request the tag ID of tag 1100. Tag 1100 transmits in response, signal 12200, which may contain the quasi-randomly generated decipherable ID. Handheld device 11200, unable to decrypt signal 12200, may send query 26012 to cloud platform 26004 for decryption. Query 26012 may include a copy of the quasi-randomly generated decipherable ID. Access to cloud platform 26004 may require identity verification such as a password, biometric authentication, multi-factor sign-in, or other authentication processes. Cloud platform 26004 may either grant or deny access based on whether the identify verification is successful. If access is granted, cloud platform 26004 may decrypt the quasi-randomly generated decipherable ID using the key stored within the cloud platform 26004, and provide the decryption result 26014 to handheld device 11200. By restricting the access to the key, the tag ID of tag 1100 may be kept secret, and privacy of the purchaser 1104 may be protected.

In some embodiments, the at least one circuit may be configured to cause the at least one transmitter to transmit the first decipherable ID to a first receiver and to transmit the second decipherable ID to a second receiver different from the first receiver. By way of example, as illustrated in FIG. 13, tag receivers 11300e or 11300f may serve as the first receiver. By way of another example, as illustrated in FIG. 14, handheld device 11200 may serve as the second receiver.

In some embodiments, the wireless tag may include at least one receiver configured to receive triggers transmitted at a frequency within at least one of a predetermined first frequency band or a predetermined second frequency band. As discussed above, the first frequency band may be a band around 900 MHz and the second frequency band may be a band around 2.4 GHz.

By way of example, as illustrated in FIG. 9, multi-source harvester 2102 and gate detection circuit 2106 may serve as the at least one receiver. Multi-source harvester 2102 may include 2.4 GHz harvester 9014, which may be coupled to 2.4 GHz antenna 2114 through switch 9034; 900 MHz harvester 9012, which may be coupled to 900 MHz antenna 2112; and power manager 9010. It should be noted that each of the forgoing components may be made up of multiple circuits, and therefore reference to a circuit may relate to a single component or portion thereof. In some embodiments, the at least one circuit may be configured to determine whether the at least one receiver receives a trigger at a frequency within the first frequency band or within the second frequency band.

In some embodiments, one or more different components may be configured to receive signals of different frequency bands, and at least one circuit may detect whether a signal carrying the trigger is at frequency within the first or the second frequency band based on which component received the signal. In a non-limiting example illustrated in FIG. 9, power manager 9010 may receive inputs from 2.4 GHz harvester 9014, 900 MHz harvester 9012, or both, and provide one of 900 MHz detection and 2.4 GHz detection to top level controller 9020. Top level controller 9022 may determine whether the trigger is at a frequency within the first frequency band or the second frequency band based on one of 900 MHz detection and 2.4 GHz detection.

In some embodiments, the at least one circuit may be configured to cause the at least one transmitter to transmit a first tag ID signal when the trigger is received at a frequency within the first frequency band, and to transmit a second tag ID signal when the trigger is received at a frequency within the second frequency band. The first tag ID signal and the second tag ID signal may be signals transmitted by the wireless tag. The trigger for generation of the first tag ID signal may include a first incoming predicate signal of a first frequency, while the trigger for generation of the second tag ID may include a second predicate incoming signal of a second frequency. The first and second predicate signals may emanate from the same transmitter or from differing transmitters. Regardless, based on the differing frequency inputs, the at least one circuit may cause the transmission of the first tag ID signal and the second tag ID signal. Both the first tag ID signal and the second tag ID may contain one of the first decipherable ID and the second decipherable ID.

In some embodiments, the first tag ID signal differs from the second tag ID signal in at least one of repetition period, a time interval between two consecutive responses, a data encryption mechanism, a transmission power, or data content of the transmission. A repetition period may be a time between two actions or responses. For repeated occurrence of a same event, whether such events are inputs or outputs, an average time interval, or periodicity of the events may be considered the repetition period. A time interval between consecutive response may be a time between two consecutive first tag ID signals, or a time between two consecutive second tag ID signals. In some embodiments, the first tag ID signal may have a different length of repetition period or a time interval between consecutive response than the second tag ID signal. For example, if a trigger is at a frequency within the 900 MHz frequency band, the wireless tag may operate in a "infrastructure-excitable mode." In the infrastructure-excitable mode, the wireless tag may transmit tag ID signals to enable computer systems of the retail establishment to track the wireless tag's location within the establishment, and to update inventory of the establishment. These types of operation may not be time sensitive, permitting longer periods between transmissions of tag ID signals in order to minimize energy usage by the tag. On the other hand, if a trigger is within the 2.4 GHz frequency band, the wireless tag may be operating in a "user-excitable mode." In the user-excitable mode, a user may transmit a trigger via a user device, and expect a response within a short time. Thus, in the user-excitable mode, a shorter time period between transmissions of tag ID signals may be desirable.

Transmission power may be the power emitted by the at least one transmitter, or a power contained in a transmission of the tag ID signals. The power contained in the transmission may be characterized by energy density, magnitude, or amplitude of the transmission. In some embodiments, the first tag ID signal may have a different transmission power than the second tag ID signal. In general, a range of a wireless transmission is related to its power, hence transmissions with higher power can reach a longer range. Tag ID signals may be programmed to have a certain transmission power to ensure a minimum transmission range. However, in certain cases, a tag ID signal having a shorter range is still acceptable and may be advantageous in some cases. For example, when the wireless tag passes an EAS gate, the EAS gate transmits a trigger to the wireless tag requesting a response. This may be referred to as "gate mode." In some instances, when the wireless tag has sufficient power, it may transmit the first tag ID signal in the gate mode at a first transmission power. However, if the wireless tag is underpowered, it may instead transmit the second tag ID signal, which may have a lower transmission power. This may ensure that the wireless tag is always tracked as it leaves the premises of the establishment, even in a low power state.

A data encryption mechanism may include one of an encryption key or an encryption algorithm. In some embodiments, the first tag ID signal may be encrypted using a different data encryption mechanism than the second tag ID signal. For example, multiple receiving devices may be in range of the wireless tag when it transmits a tag ID signal, and it may not be desirable for all these devices to be able to read this transmission. When the wireless tag is in the infrastructure-excitable mode or the gate mode, for example, a nearby user device may not need to read the transmission from the wireless tag. Hence, while in the infrastructure-excitable mode or the gate mode, the wireless tag may transmit the first tag ID signal encrypted using a first data encryption mechanism unrecognizable to the nearby user devices, preventing these devices from reading first tag ID signal. During the user-excitable mode, the wireless tag may transmit the second tag ID signal encrypted using a different data encryption mechanism recognizable by a nearby user device.

In some alternative embodiments, it may be advantageous for one ID signal to be encrypted while a second ID signal is not encrypted. For example, when the decryption is performed on a remote server or a cloud platform, the round-trip-time from sending the encrypted ID signal to receiving the decrypted data may be longer than some design constraints, which may require that some signals not be encrypted. By way of example, when the tag transmits in the infrastructure-excitable mode, the ID signal may be encrypted, since the time-lag between receiving the transmission to the use of the data may be long. On the other hand, as in the example when the tag is operating in the gate mode, it may be desirable for the data to be available as soon as possible, as even a delay of a fraction of a second may impact system performance. In some instances, the ID signals transmitted during the gate mode may be unencrypted.

Data content of the transmission may refer to the data contained in the first and second tag ID signals. In some embodiments, when the wireless tag responds to a trigger, it may include other data in addition to the tag ID in the transmission, depending on the purpose of the individual or device sending the trigger. The first tag ID signal and the second tag ID signal may have different data content in response to triggers received from different devices, or when operating in different modes, or transmitting different types of information regarding the tag status.

By way of an example, as illustrated in FIG. 12, signal 12100, which originates from exciter 11400d, may be an example of a trigger within the first frequency band. In response to signal 12100, tag 1100 may transmit signal 12200, which may be an example of the first tag ID signal or the second tag ID signal.

By way of another example, as illustrated in FIG. 13, signal 13100, which originate from handheld user device 11200, may be an example of a trigger within the second frequency band. In response to signal 13100, tag 1100 may transmit signal 12200, which may be an example of the first tag ID signal or the second tag ID signal.

In some embodiments, the wireless tag may include at least one energy storage component, electrically connected to the at least one transmitter, for collecting and storing ambient energy received by the at least one receiver and for powering transmission of the at least one transmitter. The wireless tag may collect and store ambient energy. Collecting ambient energy may include wirelessly gathering, harvesting, and/or acquiring energy from an external source or environment of the tag. Storing ambient energy may include accumulating, saving, or aggregating the collected ambient energy for use at a future time.

FIG. 11 illustrates a non-limiting embodiment of a wireless identification tag operating in an environment such as a clothing retail establishment. For example, environmental exciters such as exciters 11400, user devices such as handheld device 11200, and EAS gate 1112 may all emit wireless signals carrying energy in electric and magnetic fields, which may contribute to the ambient energy in the environment. Tag 1100 may be configured to collect and store the ambient energy from some or all of these wireless signals present in the establishment.

In some embodiments, the energy storage component may include at least one capacitor. By way of example, as shown in FIG. 10, energy storage circuit 2108 may contain a storage capacitor 10300 (example of an energy storage component). The storage capacitor 10300 may be electrically connected through the circuitry illustrated in FIG. 10 to 900 MHz harvester 9012 and 2.4 GHz harvester 9014 (examples of the at least one receiver) in order to store ambient energy received by those harvesters. While illustrated as a single capacitor, there may be multiple storage capacitors for storing ambient energy.

In some embodiments, the wireless tag may include a timing circuit configured to generate at least one of the first trigger or the second trigger according to a predetermined timing sequence. Depending on a predetermined sequence, the ID transmitted by the tag may change. The predetermined sequence may be coded into the tag to generate differing IDs based on any programmed protocol. The protocols could be infinite. For example, the ID may change after a predetermined elapsed period, after a predetermined sequence of events, after certain signals are processed internally, after certain information is received, based on external signal characteristics, or after an ID has been used a predetermined number of times, to name just a few examples. The timing circuit may be coupled to the at least one circuit to provide the first trigger or the second trigger.

A timing sequence may be a sequence or a signal used for the purpose of time keeping. For example, a sequence of near identical events in which each event repeats at a fixed interval may be a timing sequence. In context of electrical or electronics circuits, a timing sequence may involve any electrical signals with cyclical oscillation, for which the period of oscillation is fixed. In digital electronics, a clock signal may be used in providing a timing sequence. Alternatively or additionally, a timing sequence may be a sequence of events generated from a clock signal by counting a number of clock cycles for each event in the sequence. The number of clock cycles counted for each event in the sequence may be fixed for the entire sequence, or variable between events following some pre-determined rule, or it may be a random number or pseudo-random number. At least one of the first trigger or the second trigger may be generated at fixed times, or at intervals of fixed time, which may be based on the timing sequence. For example, the wireless tag may be programmed to transmit its tag ID at fixed times during the day (such as at a time of store opening or closing). In another example, the wireless tag may be programmed to change its tag ID at a fixed time interval (e.g., every 5 minutes) while it is located in the retail establishment.

By way of example, as illustrated in FIG. 10, crystal oscillator 10022 (an example of timing circuit) may provide a reference clock (an example of the first trigger or the second trigger) to top level controller 9020 (e.g., the at least one circuit). Additionally or alternatively, real time clock 10024 (another example of the timing circuit) may provide a slow clock (another example of the first trigger or the second trigger) to top level controller 9020. Top level controller 9020 may generate the first and the second decipherable ID based on one of the reference clock or the slow clock. In some embodiments, only the slow clock may be one of the first or the second trigger.

In some embodiments, the timing circuit may be configured to generate the first trigger according to a first timing sequence and to generate the second trigger according to a second timing sequence that differs from the first timing sequence in at least one of a repetition period or a time interval between two consecutive generated triggers. In some cases, it may be desirable to randomize the timing of transmission by the wireless tag. The circuit may include one more random number generators to create sets of randomized timing sequences from a cyclical timing sequence such as a clock signal. After randomization, the first timing sequence will differ from the second time sequence in at least one of a repetition period or a time interval between two consecutive generated triggers due to randomness.

By way of example, when the wireless tag is operating in the retail establishment as illustrated in FIG. 11, tag 1100 may transmit its tag ID based on its internal timing sequences, without receiving triggers from external sources. In the establishment setting, if too many tags transmit at once, the infrastructure (receivers and computer systems for processing tag ID signals) may be overwhelmed. With sufficient randomness in the timing of the transmissions, the load of the infrastructure may be lessened even when multiple tags are present at a single location. As illustrated in FIG. 10, real time clock 10024 may generate slow clock (example of first or second trigger) based on a randomized timing sequence. Alternatively or additionally, top level controller 9020 may generate the randomized timing sequence using the fixed timing sequence of the slow clock coming from real time clock 10024 and internally generated random or pseudo-random numbers.

Embodiments of the present disclosure may relate to methods, systems, devices, and computer readable media for protecting against distribution of counterfeit products. For ease of discussion, in some instances related embodiments are described below in connection with a system or method with the understanding that the disclosed aspects of the system and method apply equally to each other as well as devices, and computer readable media. Some aspects of a related method may occur electronically over a network that is either wired, wireless, or both. Other aspects of such a method may occur using non-electronic means. In the broadest sense, the systems, methods and computer readable media disclosed herein are not limited to particular physical and/or electronic instrumentalities, but rather may be accomplished using many differing instrumentalities.

Some disclosed embodiments may include a system for protecting against distribution of counterfeit products. Distribution of counterfeit products may be prevalent at multiple levels throughout a supply chain including at the levels of producers, wholesalers-distributors, retail sellers, internet resellers, returned goods, consignment stores, renting or leasing operations, and second-hand sellers. Counterfeiters and fraudsters generally pass off stolen goods, counterfeits, knock-offs through myriad channels with minimal deterrence and this problem is more pronounced in environments such as the Internet, consignment stores, used luxury items stores, consumer-to-consumer online shopping sites, as well as through other establishments and channels.

Disclosed embodiments may involve a system for protection against distribution of counterfeit products. Such systems may include wireless identification systems and may be installed in, or may be a part of an establishment such as a consignment store, for example. An exemplary system to deter and minimize distribution of counterfeit products may involve the use of one or more processors, data structures, devices, signal receivers, wireless identification tags, and a network through which one or more components of the system may be connected. In some embodiments, portions of the wireless identification system including portions of the network may be located outside the establishment. The wireless identification system may further involve other elements, circuitry, circuit components, and systems that may be beneficial to perform one or more functions related to protecting against distribution of counterfeit products.

By way of an example to provide a high level overview, manufacturers may embed in or otherwise affix to their products tags that electronically retain a unique code or tag ID. A record may be stored on a cloud server, linking the unique code of each product with its original source of origin. An electronic scan of the tag might reveal that the product is an original and not a counterfeit. For example, a scan of the tag might cause a lookup to occur in the record, and return via an electronic display on a handheld device confirmation of the product's source of origin, and perhaps its chain of title. For example, when the manufacturer sells the product to a distributor, the record may be updated to note the ownership transfer. Thus, a downstream retailer who buys the product from the distributor may be able to check the chain of title to confirm not only the authenticity of the goods, but also that the goods were lawfully obtained by the distributor (e.g., if the record of the product does not include the distributor in the chain of title, there may be a likelihood of fraud). Similarly, when a retailer takes possession of a product, the ownership record may also be updated, enabling a downstream customer to confirm both the authenticity of the product and the legality of the transaction.

Such a system might work well for large volume as well as small volume products. For example, a customer who purchases a tagged luxury watch might be able to confirm the entire chain of title with a single scan, to ensure that the watch is authentic and not stolen. Upon theft of a tagged item, the owner of record might be provided with a mechanism to mark the product's record with a theft indication. Then, anyone in the future who scans the product may receive an indication that the product was reported stolen. To this end, owners might retain electronic vaults containing the IDs of all of their tagged products, so that in the event a product goes missing, a secure mechanism exists to report the product as missing or stolen.

From a manufacturers or retailer's perspective, tagged goods have the ability to greatly reduce shrinkage, as stolen goods may no longer remain anonymous. For at any time, the goods can be scanned to confirm their source of origin and their ownership history.

In some embodiments, the system may include at least one processor. The processor, among other functions, may be configured to receive, store, and process information related to wireless identification tags, receive and execute queries and searches, communicate with databases and/or networks, relay information to users, provide notifications, and/or provide alerts, etc. By way of example, as illustrated in FIG. 20, a wireless identification system 20000 in an establishment may include network 20002, which may enable the exchange of data and/or information between elements of the system such as processor(s) 20004, data structure(s) 20006, device(s) 20008, receiver(s) 11300*a*-*g*. The system may further include wireless identification tags 1110, each tag being associated with a separate item in a store such that the identification tag includes information associated with the item. In some disclosed embodiments, the processor may be configured to store tag IDs of a plurality of electronic tags, wherein at least one specific electronic tag is associated with a specific product. The wireless identification tags may be electronic tags configured for wireless communication with one or more elements of the wireless identification system and an external device such as a handheld device used by a customer.

Consistent with disclosed embodiments, each of the plurality of electronic tags may have an assigned unique tag ID. Because the tag ID of each electronic tag may be a unique tag ID, each tag may be individually addressable, enabling better tracking and monitoring capabilities to minimize distribution of counterfeit products. The individual addressability of the electronic tags may be beneficial, in scenarios where items are expensive, valuable, antique, or confidential, for example, and are thus more prone to counterfeiting. For example, luxury watches may have a tag with a unique tag ID incorporated in their cases; designer handbags may have a tag with a unique tag ID sown into their lining or otherwise affixed; sports shoes or any clothing item may have a tag with a unique tag ID incorporated into their linings; and pharmaceuticals, nutraceuticals, cosmetics, and food products may incorporate a tag with a unique tag ID into their packaging. These are just a few non-limiting examples. Any product for which there is a counterfeiting concern may incorporate a tag with a unique tag ID.

In some embodiments, the tag IDs may be assigned by the original manufacturer of the item at the location of origin of the item, or assigned by the store where the item is being sold, for example. A unique tag identifier may be a number, string, or other form of data which is singularly associated with a tag, such that no identification tag is associated with the same unique identifier as any other tag, and any tag of the plurality of tags can only have a single unique identifier associated with it. Some non-limiting examples of unique identifiers are serial numbers, unique EPC codes, database entries, or any other unique identifier associated with an electronic tag. The processor may store the unique tag IDs of each identification tag and the information associated with the tag ID in a database, or in a data structure in communication with the processor, either directly or indirectly through a network. The stored tag IDs and the associated information may be accessible through a user query, initiated by a processor or a system user, for example.

For additional security and tracking purposes, each tag ID of the plurality of electronic tags may be encrypted using an encryption process, thereby resulting in an encrypted tag ID associated with the specific product. The encryption mechanism may be configured to encode a message or information in such a way that it enables authorized parties to access the encoded message or information while denying access to those who are not authorized. For example, even if the encoded message or information were obtained by some unauthorized party, encryption may block that unauthorized party from reading the encoded message or information without knowledge of the decryption process. In some embodiments, encryption processes or algorithms may include the use of an encryption key, which may be a piece of data that is shared between a sender of the message or information and the intended recipient, usually at a time prior to transmission. So long as the encryption key remains secret and unique, multiple parties may use a common encryption process while still maintaining the secrecy of the encrypted message or information.

Consistent with some disclosed embodiments, the processor may be further configured to store at least one identity of a first entity. For example, the processor, upon receiving a request from an entity for information regarding ownership of a product, may generate instructions to request identifying information of the entity. The processor may be configured to receive the identifying information from the entity, from the product, or from another source that can supply reliable identifying information of the entity, and store the received information in a database or a data structure. T e identifying information may include, but is not limited to, login ID, username, password, passcode, name, gender, age, address, tax ID, organization name, contact information, answers to security questions, biometric data, and other personal or professional identification details depending on the entity type or system specifications. The entity may be associated with at least one of a seller of the specific product, a manufacturer of the specific product, a current owner of the specific product, or a prior owner of the specific product. As disclosed herein, an entity may be a person or a party with rights to sell a product. As an example, an entity may include a current owner of the product, a seller contracted by the current owner of the product, a manufacturer of the specific product, a previous owner of the product, or any other party that has obtained rights and/or representation on behalf of the seller. Whether the entity is an owner, a seller, and/or an authorized party, collecting and storing the identifying information of the entity may not be limited to an attempt to sell the product. For example, the entity may be interested in donating, leasing, lending, renting, shipping, transferring, displaying, or providing the product through any other mechanism.

In some aspects of the disclosure, the processor may be configured to receive, on behalf of a prospective subsequent custodian of the specific product, an encrypted tag ID associated with the specific product. In the context of this disclosure, a prospective subsequent custodian refers to an entity that wishes to purchase, rent, borrow, lease, use, or otherwise obtain and/or use the product. In some disclosed embodiments, the prospective subsequent custodian may be associated with a prospective purchaser of the specific product. In an exemplary embodiment, the processor may receive the encrypted tag ID associated with the specific product the prospective purchaser is interested in. The processor may initiate and execute a search query designed to fetch the encrypted tag ID from the database stored in one or more data structures. In some embodiments, in addition to receiving the encrypted tag ID of the specific product, the processor may be further configured to receive, on behalf of the prospective subsequent custodian, a query associated with the at least one identity. A query may be any form of request for information. In one sense, an application running on a handheld device may include a GUI entitled "authenticity lookup." A scan of a product using that GUI may be considered a query. In other instances, a query may require a user to enter more information. For example, a GUT might prompt the user to enter identifying information of a person holding themselves out as a legitimate owner. In another example, a query may have the legitimate owner enter information authorizing revelation to a prospective purchaser to reveal private information about the legitimate owner so that the subsequent purchaser can confirm the legality of a prospective transaction. These are but a few examples of a query. Any time a user interrogates a data structure for information about a tagged product, such an interrogation may be considered a query.

The at least one identity may include identifying information associated with the first entity, for example, a name of the seller of the product, or a tax ID of the entity authorized to represent the seller. In this context, a query may involve searching for a single stored piece of information, searching in the data structure for specific information associated with a known piece of information, searching for multiple pieces of information having at least one common characteristic, etc. A data structure designed to allow queries and retrieval of information may define a standard interface, including both a medium, tunnel or protocol through which to receive queries and return responses, as well as a language, format, application or other definition for the structure and content of the queries as well as the structure and content of the responses. Such an interface (usually called an API) enables the user with access to the interface, and knowledge of the format of queries and responses, to retrieve information from the data structure.

In some disclosed embodiments, the processor may be further configured to decrypt the encrypted tag ID to identify the specific product associated with the specific electronic tag. As disclosed herein, decryption is the process of transforming data that has been rendered unreadable through encryption back to its unencrypted form. In decryption, the system extracts and converts the garbled data and transforms it to text, codes, and/or images that are easily understandable by one or more of the reader and the system. Decryption may be accomplished using a predefined set of keys or passwords. Based on the encryption algorithm, whether it is a symmetric or an asymmetric encryption algorithm, the processor may use an encryption key (as either a "symmetric key" or a "private key") to decrypt the encrypted tag ID. The information associated with the encrypted tag ID may include information related to the specific product or the electronic tag that stores the information related to the specific product. For example, the specific product information may include, but is not limited to, date of manufacture, ownership history, identities of component parts, pricing information, dates and locations of each ownership transaction, product information such as model, brand, serial number, etc., popularity, number of purchase inquiries, type of ownership being granted (e.g., sale, or rental, or lease), and other relevant information about the product that may be useful for the prospective subsequent purchaser. The processor may grant limited access or unrestricted access to specific product information based on the level of authorization. In some embodiments, complete and unrestricted access to all the information stored in the specific electronic tag may require additional verification and authentication.

Upon decryption and obtaining access, the processor may use information associated with the specific electronic tag to access an ownership history for the specific product. As used herein, ownership refers to the possession of rights in the product. It may connote title, as well as permission to possess the product. Therefore, a title holder may be considered an owner, as too may be a person provided with use permission from the title holder. The ownership history may include, for example, a list of previous owners of the specific product, identification information associated with each of the previous owners of the specific product, duration for which each of the previous owners owned the specific product, a reason for resale of the specific product as provided by each of the previous owners, ownership transfer agreements, etc. The listing of past owners in the ownership history may be arranged chronologically, alphabetically, or in any format that is compatible and accessible using a lookup based query for the processor to execute.

In some disclosed embodiments, based on the accessible ownership history, the processor may be configured to check if the at least one identity identified in the query corresponds to an entity in the ownership history. The checking may involve a lookup of an entity in the ownership history within the results from the query. The processor may further verify that the identity identified by the query matches the entity in the ownership history. Based on at least the check and verification of the identity, the processor may determine whether the specific product is a counterfeit or an authentic product. For example, when a tagged Gucci handbag is scanned, the associated tag ID may be received at a processor that causes a lookup to occur in a data structure. At or around the time of manufacture of the handbag, Gucci may have scanned the same tag, or otherwise entered the tag's ID into a data structure. This may have occurred remotely using a scanner in Gucci's factory, to upload via the Internet the tag ID, information identifying the handbag, including, for example, the model number, the model name, a serial number, a product photo, and/or any other identifying information. Later, when the same bag is scanned for a customer in a store, a lookup may occur through the Internet to the data structure, to retrieve some or all of the identifying information and to confirm for the customer that the handbag is authentic. At or around the same time, the current owner of the handbag (i.e., the store) may use its unique credentials to update the record to identify the customer as the subsequent owner. If the customer ever chooses to sell the handbag, a subsequent purchaser may be able to not only confirm the authenticity of the handbag through a scan of the tag, but may be able to confirm that the seller is in fact a legitimate owner of the handbag.

As part of processes like these, the processor may cause a transmission of an authenticity indication to a prospective subsequent custodian if the identity identified in the query corresponds to an entity in the ownership history. An authenticity indication, as used herein, may refer to an indicator of a source of origin, an indicator of genuineness or originality of the product, and/or a validation that the product being sold by the seller or displayed at the store for selling is genuine, as opposed to a counterfeit or a stolen product. As used herein, a counterfeit product may be a product, item or object made to resemble or imitate some other authentic or original product, item or object, in order to deceive or defraud persons other than the maker of the counterfeit, and cause them to confuse the counterfeit and the original. Further, the processor may cause transmission of the authenticity indication to the prospective purchaser if the identity identified by the query is the current owner of the specific product in the ownership history. A current owner in this context, refers to the last person stored in the ownership record in the data structure as having a right to possess the specific product. It may be the last person to have purchased the product, or it may be someone who is authorized by the last person who purchased the product. The processor may contain at least one component or a circuit configured for causing transmission of a notification to the prospective purchaser through an indication on a device (e.g., smartphone, handheld device, computer, a kiosk, or a GUI terminal) that the specific product is authentic. In some embodiments, the processor may cause transmission of a non-authenticity indication to the prospective subsequent custodian if the at least one identity identified in the query does not correspond to an entity in the ownership history. In some embodiments, if the identity identified in the query does not correspond to any entity in the ownership history, the product may be determined as a counterfeit, or stolen, or non-authentic. For example, if authentic goods sold to one store were stolen from the delivery truck and illegally passed off to a second store, a customer in the second store who scans the tag and poses a query, may receive a notification that either the goods are not authorized to be sold by the second store, or simply a notification that the goods belong to another store. If the store that truly owns the goods happened to enter into the data structure an indication that the goods were stolen, the customer in the second store may receive a notification that the product may potentially be stolen goods. Moreover, law enforcement authorities may be able to quickly identify stolen goods with handheld scanners. Before consignment shops accept any tagged goods, they might scan the goods to confirm that they are not receiving stolen merchandise.

Consistent with some disclosed embodiments, the processor may be configured to prevent the prospective subsequent custodian from accessing data about the specific product, the data including at least one of a product location, a transaction history, an owner name, a manufacturer name, the decrypted tag ID of the specific electronic tag, or an encryption key associated with the specific electronic tag. For example, the processor may regulate access to information stored in the database by restricting access to authorized personnel and may require a password, a passcode, or a digital key to access the database containing information related to the specific product. In some disclosed embodiments, the prospective purchaser may not be granted access to the information related to the specific product. The information related to the specific product may include, but is not limited to, data including product location, a transaction history, ownership history, decrypted tag ID, encryption key associated with the specific electronic tag, manufacturer details, owner credentials such as name, address, tax ID, and/or contact information.

In some disclosed embodiments, the processor may be configured to maintain privacy of the first entity (e.g., seller, or a seller agent). Maintaining the privacy may involve preserving the secrecy of all or some information from unauthorized entities. For example, the processor may determine whether a query from the prospective subsequent custodian (e.g., prospective purchaser) is seeking private information about the seller or whether the prospective purchaser has any privileges to access the database containing information related with the specific product, specific electronic tag, or the seller of the specific product. A subsequent purchaser, for example, might receive an indication that the chain of title for tagged product is unbroken, without identifying the various ownership links in the chain. Or, the subsequent purchaser might be able to learn that a product was purchased at a particular chain (e.g., Macy's), without being able to see the identities of subsequent owners. As another example, the subsequent purchaser may only receive information verifying the original maker and/or seller of the product (e.g. Gucci, in the handbag example above), and an indication that the person holding the product has the rights to sell it (regardless of whether that person is a current owner, someone authorized by the current owner, an agent of the current owner, a distributor, or another entity with rights to sell a product).

Some disclosed embodiments relate to a system wherein the processor is configured to store an ownership history for each of the plurality of products in at least one data structure. In some disclosed embodiments, a data structure may include a database configured to store data including, but not limited to, information related with an electronic tag, an encrypted tag ID, corresponding product information, product location, ownership history, a transaction history, an owner name, a manufacturer name, the decrypted tag ID of the specific electronic tag, an encryption key associated with the specific electronic tag, an inventory of the plurality of electronic tags, the tag IDs of the plurality of electronic tags, or a product ID associated with each tag ID. The information stored in the database may be accessible to one or more processors directly or indirectly connected with the database. In some embodiments, the system may include one or more databases. For example, a local database may store local information related with a particular facility or the store, a regional database, or a global database.

In some aspects of the present disclosure, the processor may be configured to record a transaction transferring ownership of the tag ID associated with the specific product from the first entity to the prospective subsequent custodian. When the authenticity of the specific product is verified, and the prospective purchaser decides to proceed with the transaction, the processor may record the transaction of a transfer of ownership rights from the first entity (e.g., seller) to the prospective purchaser (who becomes the new current owner). Upon successfully recording the transaction, the processor may update the ownership history of the product in the at least one data structure. For example, after the transaction, the prospective purchaser may be listed as the current or the most recent owner in the database and the processor may further request relevant personal information and update the database upon receiving it.

In some embodiments, updating the ownership history of the product includes storing an association between at least one identity of the prospective subsequent custodian and the tag ID associated with the product. In addition to updating the information associated with current ownership details, updating the ownership history may also involve storing the information related to an association between the identity of the prospective purchaser and the tag ID containing information associated with the specific product. For example, if Lili Pan purchases tagged Prada shoes, she may use a vault accessible through her cell phone to electronically take ownership of the shoes through an electronic transaction with a terminal in the store from which she purchased the shoes. In this instance, Lili's cell phone may then act as conduit for updating the ownership record stored in a remote data structure. Alternatively, the terminal in the store may receive a secure communication from Lili's cell phone, providing Lili's unique ID which may be then uploaded to the ownership record via the store's point of sale system. In another example, Lili might enter her password or other credentials into a terminal in the store to cause the store's point of sale system to update a central data structure with Lili's ownership information.

Consistent with some disclosed embodiments, the processor may be further configured to store, in the at least one data structure, at least two encryption keys associated with the tag ID of the specific product. As previously alluded to, the process of encryption involves encoding a message or information in such a way that only authorized entities may access it and unauthorized entities may be restricted from access. In some embodiments, the processor may store two or more encryption keys associated with the tag ID of the specific product. The encryption key may allow the possessor of the encryption key to decrypt the encrypted tag ID and/or decrypt the encrypted information associated with the encrypted tag ID. In some embodiments, the at least two encryption keys include a first encryption key associated with the at least one identity and a second encryption key associated with the prospective subsequent custodian. Because a transaction such as selling, renting, leasing, borrowing, etc. necessarily involves at least two entities, each encrypted tag ID may be associated with at least two encryption keys.

In some embodiments, the number of encryption keys associated with an encrypted tag ID of a specific product may be equal to the number of entities directly involved in the transaction. For example, for a product held in a consignment store, there may be three encryption keys associated with an encrypted tag ID of the product, including the store manager or the store owner, the seller, and the prospective purchaser. In some embodiments, all commercial entities involved in a transaction may share one encryption key, and all private entities involved in the transaction may share one encryption key, such that the manufacturer, distributor, and consignment store owner may all have the tag ID decrypted using a first encryption key, while any subsequent private owner of the item (such as a purchaser, a person receiving the item as a gift, or a future second-hand purchaser of the item) may have the tag ID decrypted using a second encryption key that is different from the first encryption key.

After the processor receives the query, the processor may be further configured to determine whether the prospective subsequent custodian is authorized to make the query. A prospective subsequent custodian may be authorized to make the query if, for example, the custodian initiates a query via an authorized terminal. For example, a consignment store may have a terminal from which queries may be made. Anyone using that terminal for goods recorded as being "owned" by the store, may be authorized to make a query. Alternatively, a prospective subsequent custodian may use his/her own cell phone to make the query, if the current owner provides credentials permitting the query. In an even broader sense, an authorization may be electronically provided to any device to which a prospective subsequent custodian may have access, rendering the prospective subsequent custodian authorized. In the case of verification of ownership authenticity, the current owner of the product may not want prospective purchasers to query the ownership of the product, unless allowed by the owner themselves.

In some embodiments, the processor may be configured to receive an association between the first entity and at least one entity authorized to make the query. For example, a current owner may provide preauthorization to a particular individual to obtain ownership information. This may occur when the current owner sends an authorization to a central server. The providing of preauthorization in such an instance may establish an association between the first entity (e.g., a current owner) and an entity (e.g., prospective purchaser), who is authorized to make the query. Alternatively, an authorization record in a database may contain a list of "pre-authorized" entities who may be authorized to make a query related to ownership information of the product. For example, a store might preauthorize a number of terminals and scanners to access ownership data. Or an auction house may preauthorize a list of registered bidders to check ownership information of all products up for bid. Or a brand may preauthorize any device running the brand's own application to access ownership information. The processor may also receive an association between the current owner and the pre-authorized prospective purchaser. For example, in the prior example, the bidders might be considered "pre-authorized prospective purchasers." Or a store's preferred customers list might be included on a list of "pre-authorized" prospective purchasers. The processor may be further configured to determine if the prospective subsequent custodian is the at least one authorized entity. In some disclosed embodiments, the processor may verify the association between the current owner and the authorized prospective purchaser, based on the information received by the processor.

As another example, manufacturers of high-value products may want to limit authenticity checks to be performed via preferred select shopping outlets. By way of example, a prospective purchaser may verify authenticity of a pair of Nike shoes through the Nike smartphone app, or verify authenticity of a Prada purse at a certified Prada store. In both the cases, ownership authenticity and identity authenticity, a non-authorization indication may not be a sign of lack of authenticity, but rather a sign that the query is not allowed in the channel/outlet that it was requested.

In some disclosed embodiments, the processor may be configured to request from the first entity an authorization for the prospective subsequent custodian to make the query. The processor may initiate a request for the current owner/seller to authorize a response to the prospective purchaser's query about the authenticity or chain of title of the product. This may occur by sending an authorization request to a registered mobile device of the current owner, or through an automated phone call to the current owner. In some embodiments, if the prospective subsequent custodian is authorized to make the query, the processor may be configured to proceed with decrypting the encrypted tag ID to access the ownership history, and if the prospective subsequent custodian is not authorized to make the query, cause transmission of a non-authorization indication for the prospective subsequent custodian. Based on the authorization to make the query by the prospective purchaser, the processor may either decrypt the encrypted tag ID, allowing the prospective purchaser to access the ownership history, or the processor may be configured to cause transmission of an indication notifying that the prospective purchaser is not authorized to access the information stored in the encrypted tag ID. In some embodiments, the processor may allow more than one attempt to the prospective purchaser to provide the necessary authorization, before denying access.

In some aspects of the present disclosure, if the at least one identity identified in the query does not correspond to an entity in the ownership history, the at least one processor may be configured to receive, from at least one entity in the ownership history, verification that the at least one identity identified in the query is a second entity in the ownership history. Recognizing that chains of title may not always be accurate, before a query results in a negative response (or a final negative response), a recorded current owner may be given an opportunity to correct the ownership record. For example, the processor may be configured to receive verification from a third entity (e.g., the original seller, or the last verified owner of the product) that the first entity (e.g., the current owner) is an entity in the ownership history, and validation that the first entity is the legal current owner of the product. This situation may arise, for example, when the sale from the original seller to the current seller was improperly registered or improperly recorded without establishing transfer of ownership rights. The verification that the first entity is a current owner of the product may be validated by a third entity (the original seller, or the last confirmed seller, or any confirmed seller of the product) listed in the ownership history. Upon receiving the verification from the third entity, the processor may be configured to update the ownership history to include the at least one identity identified in the query. For example, the information associated with the ownership history may be updated in the database and stored for future access.

In some embodiments, the at least one processor may be further configured to cause transmission of an authenticity indication for the prospective subsequent custodian based on the updated ownership history. Once the ownership history is updated based on the verification from a third entity in response to a query, the processor may determine that the identity identified in the query exists as a valid current owner, and may cause transmission of an authenticity indication to the prospective purchaser.

In some disclosed embodiments, the specific electronic tag may be associated with a unique tag ID and may be configured to encrypt the unique tag ID for transmission to at least one of the at least one processor or a processing device of the prospective subsequent custodian. As alluded to previously, each electronic tag or an identification tag may be associated with an encrypted unique identifier, also referred to herein as a unique tag ID. The encrypted unique tag ID may be configured for transmission to at least the processor of the system, or a device of the prospective purchaser. The processor of the system and/or the device of the prospective purchaser may be any device capable of receiving data and displaying the data through a graphical user interface or a screen of the device.

In some embodiments, the processor may be further configured to send a notification to at least one entity in the ownership history when a query regarding the tag ID associated with the product is received. As disclosed herein, when a prospective purchaser makes a query requesting information associated with the tag ID representing the product, one or more entities in the ownership history of the product may be notified of the received query. For example, a current owner may receive a notification on a mobile device that an inquiry is being made on the ownership of a particular product.

In some embodiments, the processor may be configured to send a notification to at least one entity in the ownership history when a non-authentic indication is sent regarding the tag ID associated with the product. As alluded to earlier, an indication that a product or a tag ID associated with the product is non-authentic may be generated by the processor if, for example, the identity identified in the query does not correspond to any entity in the ownership history of the product. In some instances, the absence of an entity in the ownership history of a product may not necessarily mean that there is or was an attempt of a fraudulent activity. In the event that a non-authentic indication is sent to a prospective purchaser, the processor may also notify one or more entities in the ownership history associated with the product that a non-authentic indication is sent to a prospective subsequent custodian.

Embodiments of the present disclosure may relate to methods, systems, devices, and computer readable media associated with a wireless identification tag with varying ID transmission timing. For ease of discussion, aspects of methods, systems devices and computer readable media are discussed interchangeably herein such that reference to one form is equally applicable to another form and is therefore not necessarily repeated. In addition, some aspects of some embodiments may occur electronically over a network that is either wired, wireless, or both. Other aspects may occur using non-electronic means. In the broadest sense, the disclosed embodiments are not limited to particular physical and/or electronic instrumentalities, but rather may be accomplished using many differing instrumentalities.

Disclosed embodiments may include a wireless identification tag, as described above. According to some embodiments, the ID transmission timing of a wireless tag may vary. As described herein, a wireless tag may periodically transmit its ID for reception by a receiver, typically in response to a trigger signal. The tag ID, may include numbers, letters, characters, codes, strings, or other forms of data which may identify the wireless tag to other devices or device components that receive the tag ID. The tag ID may be unique to a specific tag, and that specific tag may have only one tag ID. Alternatively, the same tag may have multiple IDs or IDs that change over time. In some embodiments, multiple tags may share the same tag ID or groups of IDs. Examples of a tag ID may include a serial number, part number, UUID, EPC, and/or other data. When a tag receives a trigger signal, it may respond by sending its ID within a certain time period. According to some embodiments of this disclosure, the transmission time period or time period that elapses before the tag reacts with a responsive signal may vary. There may be multiple alternative reasons for the variance, as described herein.

Varied transmission timing may refer to situations when one transmission has at least one different timing attribute from another transmission. A timing attribute may include specific times when transmissions occur, time intervals between transmissions, or time durations of transmissions. In some instances, if multiple signals are transmitted in the vicinity of each other and potential receivers, varying the transmission timing of the signals may avoid certain undesirable effects.

Figure 27:
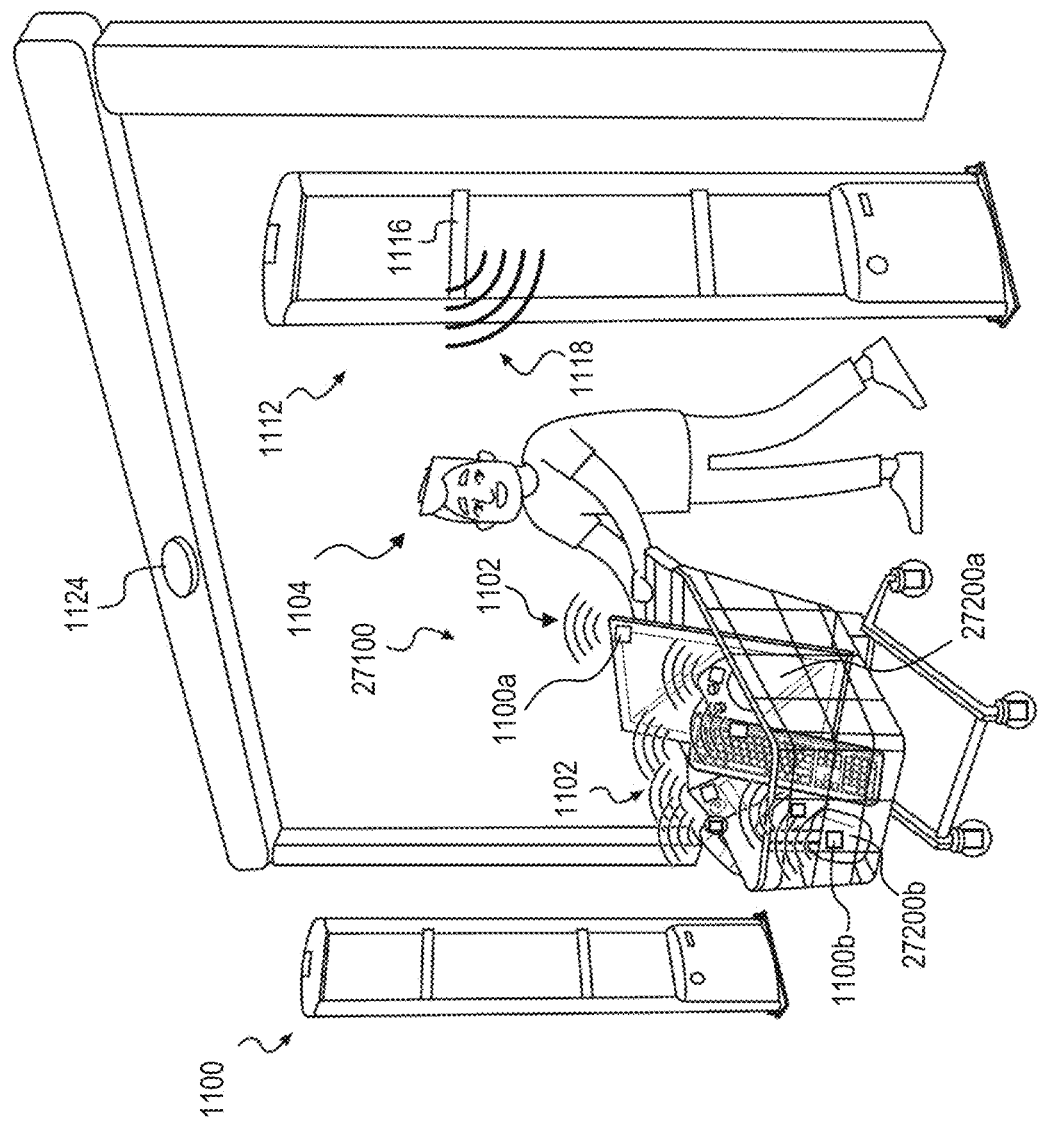
FIG. 27 depicts an exemplary wireless identification system in use as a customer leaves a store with a cart full of goods, raising a risk of signal collision, consistent with disclosed embodiments.

For example, FIG. 27 depicts a situation in which consumer 1104 leaves a store with a variety of products, such as shopping cart 27100 filled with products including products 27200a and 27200b. Wireless identification tags, such as tag 1100a and 1100b may be affixed, embedded in or otherwise attached to the products. As consumer 1104 leaves the retail establishment, EAS gates 1110, 1112 may transit signal 1118 triggering the wireless tags to transmit identification signals. This operation mode of the wireless identification tags may be referred to as a "gate mode." In the example depicted in FIG. 27, if all of the wireless tags transmit their identification signals simultaneously, the signals have risks of collision, or potentially overwhelming receiver 11300. Signal collision may refer to situations in which the presence of two or more signals negatively affects the propagation, reception, or processing of one or more of the signals. In some instances, a receiving device may be unable to receive the particular signal intended reception, or unable to distinguish the intended signal from among many other signals received. By transmitting the signals with non-uniform intervals between consecutive transmissions, the risk of collision or overwhelming the receiver may be diminished.

Figure 28A:
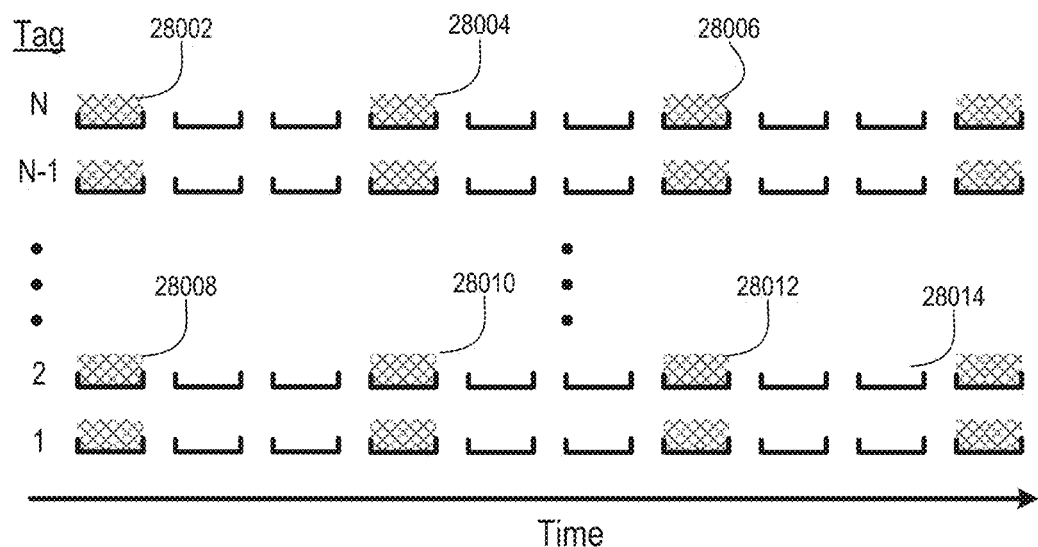
FIGS. 28A and 28B are examples of signal transmission timelines, consistent with disclosed embodiments.
Figure 28B:
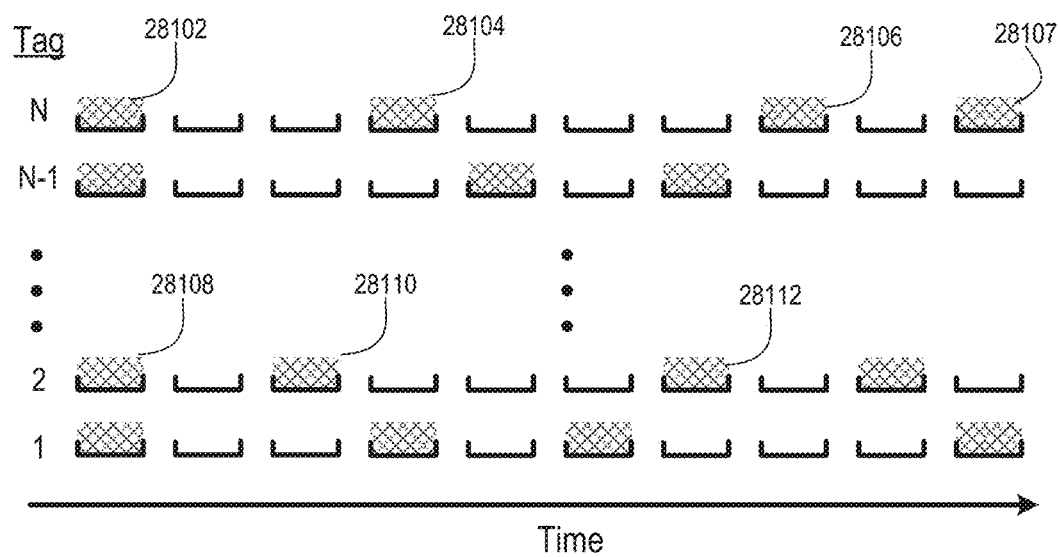

For ease of discussion, exemplary transmission timelines are illustrated in FIGS. 28A and 28B. For example, each bracket in FIGS. 28A and 28B may represent a time interval. The vertical axis represent different wireless identification tags (tag 1, tag 2, . . . , tag N−1, and tag N) in range of each other, and the horizontal axis represents time. Brackets that are filled, for example 28002, 28004, and 28008, represent signal transmissions (e.g., ID transmissions), while brackets that are empty, such as 28014, represent time intervals when no transmission occurs.

In the example illustrated in FIG. 28A, tag N may transmit a signal during 28002, 28004, and 28006, and tag 2 may transmit a signal during time intervals 28008, 28010, and 28012, which may occur at the same times as time intervals 28002, 28004, and 28006, respectively. In this example, there may be a high risk of signal collision, as multiple tags transmit signals simultaneously. This simultaneous transmission of signals may be the result of uniform durations between transmissions, where the times between 28002, 28004, and 28006 are substantially similar to each other, and to the times between intervals 28008, 28010, 28012. With this uniformity in time intervals between consecutive transmissions, many tags may transmit signals at the same time if they are simultaneously triggered.

On the other hand, FIG. 28B depicts a situation with reduced risk of signal collision, as the tags illustrated do not all transmit signals simultaneously. The time between interval 28102 and 28104 is different from the time between 28104 and 28106. Similarly, the time between 28108 and 28110 is different from the time between 28110 and 28112, and from other times between consecutive transmissions. These may be examples of varying ID transmission times. As illustrated in FIG. 28B, even if tags are triggered at the same time, the non-uniformity between transmissions spread out responsive signal transmission so that signals do not collide and the receiver is not overwhelmed.

In various embodiments, the wireless tag may include at least one transmitter, such as transmitter 2104. The wireless tag may also include at least one energy storage component, electrically connected to the at least one transmitter. The at least one energy storage component may be configured to collect and store ambient energy and to power transmission of the at least one transmitter, as discussed above.

FIG. 11 illustrates a non-limiting embodiment of a wireless identification tag operating in an environment such as a clothing retail establishment. For example, environmental exciters such as exciters 11400, user devices such as handheld device 11200, and EAS gate 1112 may all emit wireless signals carrying energy in electric and magnetic fields, which may contribute to the ambient energy in the environment. Tag 1100 may be configured to collect and store the ambient energy from some or all of these wireless signals present in the establishment. In some embodiments, the at least one energy storage component includes at least one capacitor configured to power the wireless identification tag without a battery. By way of example, as shown in FIG. 10, energy storage circuit 2108 may contain a storage capacitor 10300 (example of an energy storage component). The storage capacitor 10300 may be electrically connected through the circuitry illustrated in FIG. 10 to 900 MHz harvester 9012 and 2.4 GHz harvester 9014 in order to store ambient energy received by those harvesters. While illustrated as a single capacitor, there may be multiple storage capacitors for storing ambient energy.

In various embodiments, the wireless tag may include at least one circuit. By way of example, as illustrated in FIG. 10, beacon controller 9030, either alone or in combination with other components (such as top level controller 9020), may be an example of the at least one circuit. Alternatively, depending on particular design functionality, other components either alone or in combination my constitute at least one circuit. In various embodiments, the at least one circuit may be configured to cause the at least one transmitter to transmit a sequence of identification signals in non-uniform intervals such that times between identification signal transmission of three consecutive transmissions vary.

Non-uniformity may refer to a characteristic describing a lack of similarity or consistency in of a series or sequence of events or occurrences. Intervals may refer to a time or a delay between two or more events in a sequence. Non-uniform intervals may be intervals between consecutive events such that any two or more consecutive intervals may be different by a significant portion of each interval. The difference between consecutive intervals may be significant if the difference value is above a threshold proportion of any of intervals in the sequence, or above a threshold of an average value of the intervals in the sequence. By way of example, the interval may be a time between two or more transmissions of identification signals.

Some levels of non-uniformity of intervals may be inherent in the nature of signal transmission, caused by factors such as noise, interference, or some inherent deviations of components or systems. In some embodiments, non-uniformity may be introduced deliberately for various design goals.

The non-uniformity of intervals between transmissions may result from characteristics of circuit design. For example, tags cannot transmit a signal unless they have a minimum level of energy stored in the energy storage component (e.g., storage capacitor 10300). The minimum level of energy may be predetermined and may be based on the amount of energy required by the transmitter to transmit a signal of a certain strength. For this reason, tags may be forced by design to wait for a time duration until the next signal transmission, the duration being dependent on a minimum stored energy level and a rate of ambient energy collection. The rate of ambient energy collection may depend both on the ambient energy level of the environment and the performance of the energy harvester, of which there may be manufacturing deviations. Additionally, the minimum energy level may also depend on the accuracy of energy level measurements, which also may be subject to manufacturing deviations. Thus, even when multiple tags are present in vicinity of one another, they may start counting time to the next transmission at different points in time based on when the respective tag may have detected a minimum energy level for transmission.

Non-uniformity of intervals may be satisfied when a threshold number of intervals between some numbers of consecutive transmissions are made to be non-uniform. For example, it may be sufficient to ensure that the time between identification signal transmission of three consecutive transmissions vary. By way of example, in the timeline of tag ID transmissions illustrated in FIG. 28B, three consecutive tag ID transmissions 28102, 28104, and 28106 are illustrated for tag N, such that the times between the three ID signal transmissions vary. As illustrated, two units of delay are interposed between transmissions 28102 and 28104, while three units of delay are interposed between transmissions 28104, and 28106. Thus, in this example, times between identification signal transmissions of three consecutive transmissions vary. The non-uniformity continues for tag N, where there is non-uniformity between four tag ID transmissions, as the delay from transmission 28106 to 28107 is only one unit. These are only examples. Patterns of delay may repeat or delays may be random. Alternatively, the extent of non-uniformity if at all, may be a matter of design choice.

By way of example, as illustrated in FIGS. 9 and 10, beacon controller 9030 may be an example of the at least one circuit. In some embodiments, beacon controller 9030 may be structured and designed to cause the transmitter to transmit signals having non-uniform intervals. Additionally, or alternatively, beacon controller 9030 may be programmed by computer readable instructions (e.g., instructions stored in memory 9022 or in another memory unit of the tag). Transmission data provided from beacon controller 9030 to beacon transmitter 9032 may contain a sequence of identification signals, including instructions regarding the timing of the transmission of the sequence of identification signals. In some embodiments, such as the example illustrated in FIG. 10, the top level controller 9020 may be configured to transmit a transmission control signal to beacon controller 9030, specifying the timing parameters for the transmission of the sequence of identification signals.

In some embodiments, the at least one circuit may be further configured to select the respective durations of the non-uniform intervals based on a predetermined rule. The predetermined rule may be an algorithm, process, method, logic, or instructions for generating or controlling the timing of the identification signals, determined in advance of the transmission of signals. The rule may be based on an internal state, such as an amount of measured reserve energy, internal operations underway, a state of an internal clock, a random number generator, historical data such as a duration since a prior transmission, etc. The predetermined rule may be manifest in the form of a computer readable code for programming the at least one circuit. Additionally or alternatively, the predetermined rule may be inherent in the design and arrangement of components in a circuit of the at least one circuit.

In some embodiments, the at least one circuit may be further configured to randomly select the respective durations of the non-uniform intervals. Randomness may refer to numbers, sequences or processes that exhibit characteristics of random, pseudo-random, or quasi-random distribution. A random process may be a process with an apparent lack of pattern or predictability, lacks order, or that does not follow an intelligible pattern or combination. A pseudo-random or quasi-random process may be a process with predictable outcomes that are difficult to acquire without knowledge of the underlying process, which may exhibit some statistical distribution of randomness, but are not truly random. By selecting durations of the non-uniform intervals randomly, the chances that different tags will simultaneously transmit signals may be further reduced. The at least one circuit, or circuits connected to it, may include one or more random number generators to create sets of random or pseudo-random numbers or sequences, to cause the at least one circuit to behave in a random or pseudo-random manner. After randomization, a duration of first interval may differ from a duration of a second or third interval due to randomness.

In some embodiments, the at least one circuit may be further configured to cause the at least one transmitter to transmit the sequence of identification signals in varying frequency channels such that transmission frequencies of the three consecutive transmissions vary. A transmission channel may be a medium through which signals are transmitted. Transmission channels may be thought of as completely wireless, but may also include wired portions. A transmission channel may include a selected frequency, or a band of frequencies in which transmissions may occur. The wireless identification tag may transmit the sequence of identification signals in within a single frequency band corresponding to a single channel, or across multiple frequency bands, corresponding to multiple frequency channels. In some instances, the wireless identification tag may be designed to transmit in only a single channel. In other instances the tag may transmit in at least three channels (or more), each having a different frequency from the other channels, such that the no consecutive transmissions are transmitted within the same channel, or that in a series of transmissions at least one transmission varies in frequency from at least one other transmission. By varying the transmission channel, multiple signal transmissions may be distinguished by one or more receiving devices based on the difference in the frequency of the channel. This may help to reduce the chances of signal collision in the situation where multiple tags simultaneously transmit their identification signals. And it may also help to reduce a risk of overwhelming a receiver.

Figure 29:
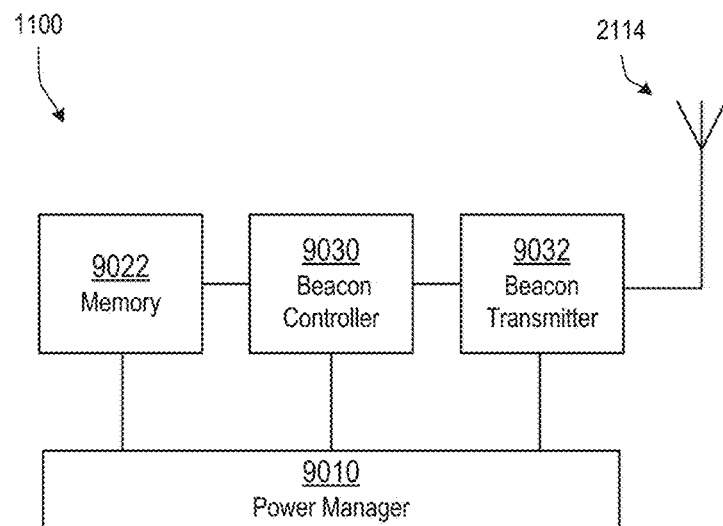
FIG. 29 is a block diagram of a tag circuit, consistent with disclosed embodiments.
Figure 30:
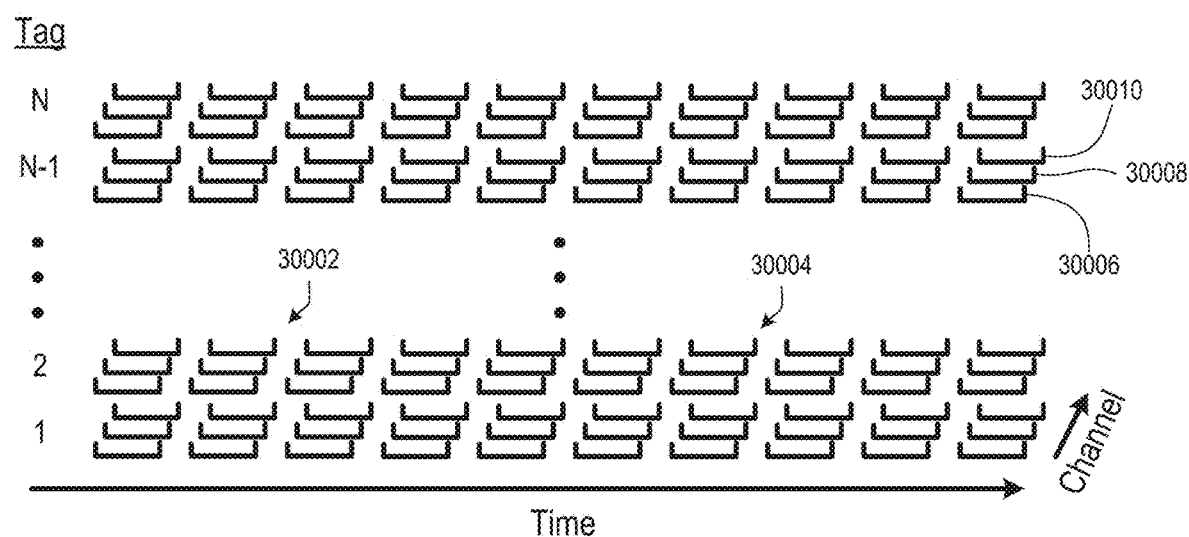
FIG. 30 is a transmission channel timeline consistent with disclosed embodiments.

FIG. 30 illustrates a timeline of multi-channel transmissions by wireless identification tags within range of each other. Each tag (tag 1, tag 2, . . . , tag N–1, tag N) may contain 3 rows of brackets, each row representing a channel. For example, in tag 2, 30002 and 30004 are within the same channel, with 30002 occurring at an earlier point in time than 30004. Each of the tags may include circuitry illustrated in FIG. 29, which may correspond to a simplified representation of circuitry illustrated in FIG. 10. For example, tag N–1 may include tag ID memory 10010, beacon controller 9030, top level controller 9020, and power manager 9010 (the combination of which may be an example of at one circuit). Tag N–1 may also include beacon transmitter 9032 and antenna 2114 (individually or in combination, may be an example of at least one transmitter). At a time of transmission, tag N–1 may transmit its tag IDs in channels 30010, 30008, and 30006, in staggered repetition, the staggering of which differs from channel to channel. In some embodiments, the transmission duration of each successive repetition may be the same or may vary, depending on system specifications. Thus, in some embodiments both the transmission duration of each repetition and the time between successive repetitions may vary. Beacon controller 9030 may control beacon transmitter 9032 to modulate signal transmissions across frequency channels. The beacon controller 9030 may control each channel independently or may select one or more of transmission duration or transmission spacing based on the duration or spacing of signal transmissions in at least one other channel.

In some embodiments, the at least one circuit may be further configured to randomly select one channel of the varying frequency channels for transmission of each identification signal by the at least one transmitter. By of way example, referring to FIG. 30, beacon controller 9030 may select one of 30010, 30008, or 30006 in a random or pseudo-random manner.

In some embodiments, the at least one transmitter may be configured to transmit the identification signals in at least three transmission channels within a predetermined frequency band. The predetermined frequency band may be a frequency band around 2.4 GHz. For example, "Bluetooth Low Energy", or BLE, is defined to have a total of 40 channels (labeled 0 to 39) with center frequencies of these channels ranging from 2.402 GHz to 2.480 GHz, spaced 2 MHz apart. Three of these channel are referred to as "special" advertisement channels, labeled by convention as channel 37 with a frequency at 2.402 GHz, channel 38 at 2.426 GHz, and channel 39 at 2.480 GHz. While all other BLE channels (labeled from 0 to 36) are reserved for transmission within paired BLE networks (pairing between two devices), these three advertisement channels may be used by any BLE device at any time. In some embodiments, BLE may be a communications protocol used for transmission of the identification signals, with the 2.4 GHz WW ISM band used as the predetermined frequency band and channels 37-39 of BLE used as the at least three transmission channels.

In some embodiments, at least one circuit may be configured to receive a trigger and cause at least one transmitter to transmit identification signals in response to the trigger. A trigger may be inputs, stimuli, and other signals for inducing a reaction. In context electrical and electronic circuits, examples of a trigger may include, but are not limited to, an external signal or an internal signal received. In some embodiments, an external signal received may cause a trigger to be sent to the at least one circuit. Whether internally or externally induced, a trigger may include, for example, a voltage level, a voltage level change, a current level, a current level change, a frequency, amplitude or phase change of a received signal, a digital input, a digital pulse, a control word, and/or any other signals in various forms of energy.

In some embodiments the trigger may be a signal received by the wireless identification tag from an external device. By way of example, as illustrated in FIGS. 9 and 10, power manager 9010 may receive inputs from 2.4 GHz harvester 9014, 900 MHz harvester 9012, or both, and provide one of 900 MHz detection and 2.4 GHz detection to top level controller 9020, which may transmit a transmission control signal to beacon controller 9030 based on the received inputs. Thus, beacon controller 9030 (e.g., at least one circuit), based upon control signals from top level controller 9020 (which may also constitute at least one circuit in some embodiments) may cause beacon transmitter 9032 (e.g., at least one transmitter) to transmit one or more signals as the result of detection of an incoming 900 MHz signal or a 2.4 GHz signal (examples of the trigger).

In some embodiments, the wireless tag may include at least one antenna configured to receive the trigger transmitted as energy having a frequency within at least one of a first frequency band around 900 MHz or a second frequency band around 2.4 GHz, and wherein the at least one energy storage component is configured to store the energy received by the at least one antenna.

FIG. 9 illustrates non-limiting embodiments of a wireless identification tag including a receiver for receiving ambient energy. The receiver may include multi-source harvester 2102 and switch 9034 (or a portion of the foregoing), which may also be coupled to top level controller 9020. Multi-source harvester 2102 may include 2.4 GHz harvester 9014, which may be coupled to 2.4 GHz antenna 2114 through switch 9034; 900 MHz harvester 9012, which may be coupled to 900 MHz antenna 2112; and power manager 9010, which may be coupled to top level controller 9020. It should be noted that each of the forgoing components may be made up of multiple circuits, and therefore reference to a circuit may relate to a single component or portion thereof.

In some embodiments, the at least one circuit may be further configured to cause the at least one transmitter to operate in a first transmission mode when the at least one antenna receives energy transmitted in the first frequency band; and operate in a second transmission mode when the at least one antenna receives energy transmitted in the second frequency band transmitted in the second frequency band, wherein the first transmission mode may differ from the second transmission mode in at least one of a repetition period of a transmitted signal, a transmission power level, or data content of the transmission.

A repetition period may be a time between two actions. For repeated occurrence of a same event, whether such events are inputs or outputs, an average time interval, or periodicity of the events may be considered the repetition period. In some embodiments, if an energy at a frequency within the 900 MHz frequency band is received, the wireless tag may operate in a "infrastructure-excitable mode." In the infrastructure-excitable mode, the wireless tag may transmit signals to enable computer systems of the retail establishment to track the wireless tag's location within the establishment, and to update inventory of the establishment. These types of operations may be repetitive. For example, the tag may transmit signals continuously, with some intervals between the transmissions. In the retail establishment setting, with many tags repeatedly transmitting signals from a generally common location, the repetition period may require special consideration to avoid signal collision and/or overwhelming a receiver. For example, the repetition period may be designed so that for each tag, the repetition period is non-uniform. On the other hand, in a "user-excitable mode" where a user triggers a tag for an immediate response as may occur, for example, using a 2.4 GHz handheld device, a shorter response time may be warranted. A tag's response to a trigger in the user-excitable mode may therefore have different characteristics from the tag's response to a trigger in other modes.

Transmission power may be the power emitted by the at least one transmitter, or an amount of power contained in a signal transmission. The power contained in the transmission may be characterized by energy density, magnitude, or amplitude of the transmission. In general, a range of a wireless transmission is related to its power, hence transmissions with higher power can reach a longer range. Signal transmitters may be programmed to have a certain transmission power to ensure a minimum transmission range. For example, when the wireless tag operates in the infrastructure-excitable mode, signals transmitted by the tag should be able to reach a tag receiver located at some distance away from the tag, thus a higher transmission power may be desirable. However, in the user excitable mode, where the user device is expected to be close to the tag, lower power may be acceptable.

Data content of a transmission may refer to the data contained in the signal transmission. In some embodiments, when the tag responds to a request to transmit, it may include other data in addition to the tag ID in the transmission, depending on the purpose of the individual or device sending the trigger.

In some embodiments, one or more different components may be configured to receive signals in different frequency bands, and the at least circuit may detect whether a signal carrying the trigger is at a frequency within the first or the second frequency band based on which component receives the signal. In a non-limiting example illustrated in FIGS. 9 and 10, power manager 9010 may receive inputs from 2.4 GHz harvester 9014, 900 MHz harvester 9012, or both, and provide one or both of 900 MHz detection and 2.4 GHz detection to top level controller 9020. Top level controller 9020 may determine whether the energy received is at a frequency within the first frequency band or the second frequency band based on one of 900 MHz detection and 2.4 GHz detection.

In some embodiments, the wireless identification tag may include at least one second circuit configured to generate the trigger according to a predetermined timing sequence. A timing sequence may be a sequence or a signal used for the purpose of time keeping. For example, in a sequence of events, a timing sequence may constitute the length of time between consecutive events. A predetermined timing sequence may be a sequence of events for which the lengths of time between consecutive events are predetermined. In some embodiments, a predetermined timing sequence may be coded into the tag to generate the triggers based on any programmed protocol. The protocols could be infinite. In the context of electrical or electronics circuits, a timing sequence may involve any electrical signals with cyclical oscillation, such as a clock signal. Events in the timing sequence may be examples the trigger. In some embodiments, the at least one second circuit may be configured to generate a first trigger according to a first timing sequence and to generate a second trigger according to a second timing sequence that differs from the first timing sequence in at least one of a repetition period or a time interval between two consecutive generated triggers. In the case where a number of expected transmissions are unknown, the exact timing of each transmission may not be programmed in advance. Instead, the timing of the transmission may be determined based on a trigger, which may be generated based a timing sequence, such as a clock signal. Non-uniformity of time intervals between consecutive transmissions may be achieved by randomizing the timing sequence, thus ensuring that the first and second time sequences may have a different repetition period or time interval between consecutive triggers.

In some embodiments, top level controller 9020 may constitute an example of a second circuit. As illustrated in FIG. 10, top level controller 9020 may send a transmission control signal to beacon controller 9030, which may specify the parameters of the identification signal to be transmitted by the transmitter. These parameters may include a duration between two consecutively transmitted signals, a duration of each transmission, data transmitted with each transmission, and/or a power level of the transmitted signals. In some embodiments, and as discussed above, top level controller 9020 may specify different timing sequences based upon an operation mode of the wireless identification tag. For example, when the tag is in the infrastructure-excitable mode (i.e., store mode), top level controller 9020 may instruct the beacon controller 9030 to cause transmission of identification signals with a first timing sequence with relatively longer periods of time between signals. However, when the tag is in a user-excitable mode (e.g., IoT mode), top level controller 9020 may instruct the beacon controller 9030 to cause transmission of identification signals with a second timing sequence with shorter periods of time between signals. Thus, top level controller 9020 may determine when transmission of an identification signal is needed and may generate one or more triggers (i.e., transmission control signals) as a result. These triggers may specify a timing sequence of the identification signals to be transmitted by the tag (that is, a desired length of time between two consecutive transmissions of the identification signal). Top level controller 9020 may send the triggers to the beacon controller 9030, which may cause transmission of the identification signals according to the parameters provided by top level controller 9020.

In some embodiments, the wireless identification tag may include a real time clock 10024, which may provide a slow clock signal to top level controller 9020 and/or to beacon controller 9030. In some embodiments, the slow clock signal may enable top level controller 9020 to track the amount of time between consecutive transmissions of the tag's identification signal, and to accordingly instruct the beacon controller 9030 to cause transmission of the identification signals at the desired frequency (e.g., transmit an identification signal approximately every 10 seconds). That is, top level controller 9020 may use the slow clock signal to determine how much time has elapsed since the prior signal was transmitted and may instruct beacon controller 9030 to cause transmission of an identification signal after the desired length of time has passed since the last transmission.

In some embodiments, the time interval between consecutive transmissions of the tag's identification signal may be modified using a randomized variation of the slow clock signal. As stated above, top level controller 9020 may use the slow clock signal to determine when individual transmissions of the identification signal should occur. In some embodiments, the configuration of the real time clock 10024 may vary between individual tags, such that even if two tags start counting at the same point in time, the variation in their respective slow clock signals would be enough to cause their respective transmissions to occur at different points in time. Additionally, or alternatively, the tag may include a random or pseudo-random number generator configured to cause the slow clock signal to vary by some amount, with respect to the slow clock signals of other tags.

In some embodiments, this variation between slow clock signals in different tags may cause randomization of transmission times with a resolution around 0.5 seconds (or between 0.1 and 0.9 seconds). This random variation of the slow clock signal may prevent signal transmission by multiple tags in close proximity from occurring at the same time, thus reducing the likelihood that the tags' signals will collide. In some embodiments, each wireless identification tag may be designed to have a different slow clock signal. For example, one tag may have a slow clock signal that generates a trigger every five seconds, and a different tag have a slow clock signal that generates a trigger every nine seconds, and so on. This may further reduce the likelihood that multiple tags may have overlapping of signal transmissions.

In some embodiments, the wireless identification tag may also include a crystal oscillator 10022. The crystal oscillator 10022 may be configured to provide a reference clock signal to the beacon transmitter 9032. In some embodiments, the time interval between consecutive transmissions of the identification signal may be further modified by using the reference clock signal. The crystal oscillator 10022 may measure time in increments on the order of tens of milliseconds. A time interval measured by the crystal oscillator 10022 may be added to or subtracted from the time intervals generated based on the slow clock signal to create additional variations in the time interval between signal transmissions. Since the reference clock signal may have an increment that is substantially smaller than the increments of either the slow clock signal or the randomized variations of the slow clock signal, the resultant time interval may be varied by smaller time increments. For example, when the top level controller 9020 determines that the identification signal is to be transmitted every 7 seconds, variation from the slow clock signal may result in a duration of, e.g., between 6.3 and 7.7 seconds between consecutive transmissions. With the incorporation of the variation from the reference clock signal, this variation may increase to a duration of, e.g., between 6.21 to 7.79 seconds between consecutive transmissions. Thus, by using the reference clock signal in addition to the slow clock signal, an extra layer of non-uniformity may be added to the time intervals between signal transmissions. Moreover, because the crystal oscillator 10022 measures time in small increments (tens of milliseconds), even more resolution is available for the time windows for signal transmissions, further reducing the risk of signal collision.

In some embodiments, the time interval between consecutive transmissions may be further modified by using a randomized variation of the reference clock signal. For example, the tag may include a random or pseudo-random number generator configured to cause the reference clock signal to vary by some amount, such as on the order of tens of microseconds. Similar to the previous examples, the additional variation may be added to or subtracted from time intervals between transmissions. If, for example, a signal transmission occurs 6.21 to 7.79 seconds after a previous signal transmission, the randomized variation of the reference clock signal may cause a new interval of between 6.209 to 7.799 seconds.

By way of example, as illustrated in FIG. 10, real time clock 10024 may generate a slow clock signal that keeps time on the order of tens of seconds. Real time clock 10024 may generate randomized variations using random or pseudo-random numbers generated by a random number generator. The randomized variation of the slow clock signal may be on the order of around 0.5 seconds, as discussed above. Crystal oscillator 10022 may provide a reference clock signal that keeps track of times on the orders of tens of milliseconds. Crystal oscillator 10022 may generate randomized variations of the reference clock signal using random or pseudo-random numbers generated by a random number generator. The randomized variations of the reference clock signal may be on the order of tens of microseconds. In some embodiments, crystal oscillator 10022 and/or real time clock 10024 may be circuits configured to generate their respective signals based upon their design and structure. Additionally, or alternatively, crystal oscillator 10022 and/or real time clock 10024 may be controlled (e.g., by top level controller 9020 or by another controller) to provide signals having desired characteristics.

In some embodiments, a sequence of identification signals may vary based on a characteristic of a product associated with the tag. For example, heavy products, such as appliances, are less likely to move when compared to a garment or an over the counter pharmaceutical product. This is but one example to illustrate that for some classes of products, historical information about the product's location may be relied upon such that at any given time, detecting a presence of the product's associated tag may be less consequential. In contrast, for products that are more likely to be moved, a more robust sequence of transmissions may be desirable for inventory management purposes. Such determinations may be made based on characteristic of a product identifiable via a tag, such as tag ID, serial number, reference number, category or code type, or other similar information. In some embodiments, a system may be designed to trigger only certain classes of tags at certain intervals. Borrowing from the above example, the tags of immovable items may be triggered by the system less frequently than the tags of movable items.

In some embodiments, while in the infrastructure excitable mode, the sequence of identification signals may further vary based on the characteristics of the product to reduce the risk of signal collision. For example, different classes or categories of product may be associate with tags programmed with different sequences of identification signal. While in the store setting, when the tags transmit signals to the tag receivers in the store, and different sequences of identification signals may cause the different tags to transmit at different times, frequencies, or power levels. In some instances, one class of product may have tags that transmit with one repetition period, and another class of product may have tags that transmit with a different repetition period, thus further reducing the chances of simultaneous transmission.

In some embodiments, a characteristic of a product may include a unique ID of the product. An unique ID of a product may be number, string, or other form of data which is singularly associated with an identified product, and not others. Examples of unique ID may include serial numbers, unique EPC codes, barcodes, or unique database entries. In some embodiments, the unique ID of the product may be associated with a stock keeping unit (SKU) indicative of at least one of a material, size, color, or style associated with the product. A stock keeping unit (SKU) may be a data representation of a distinct product or service for sale. An SKU may be associated with an identifier, such as the unique ID of the product. It may represent an entry in a database, such as one belonging to an inventory management system and may contain any information relevant to the product. The information may include a product's inventory number, price, category, classification, location, history, specification, and/or other information that may be relevant for business purpose. In some embodiments, a products may be categorized by its size, color, style material and other such characteristics. Each of these characteristics may be associated with a different SKU and unique ID, and product items sharing the same characteristics may share the same SKU and unique ID.

By way of example, in the context of a clothing retail store as illustrated in FIG. 11, T-shirts of a specific size, color, material may share a first SKU. T-shirts with the same size, material, but different color may share a second SKU, and so on.

Embodiments of the present disclosure may relate to methods, systems, devices, and computer readable media associated with mechanisms for avoiding spoofing of wireless tags, for fraud avoidance. As discussed herein, a wireless tag may transmit a unique tag ID for various reasons, including for enabling a system to detect the tag ID for inventory purposes and/or for enabling a system to track removal of the tagged item from a controlled area. By way of example only, in a retail establishment, it may be particularly valuable to track tagged items removed from the establishment. This may occur when, for example, a tag receives an EAS gate signal at an egress of the establishment, which triggers the tag to transmit its unique ID to a receiver in the vicinity of the egress. In order to prevent tags from passing undetected through the egress, the tags may require sufficient energy to transmit their unique IDs. Knowing this, a fraudster might be inclined to trigger a tag to repeatedly send its ID, thereby depleting reserve energy in the tag to a point that when the tagged item is removed from the establishment, reserve energy in the tag is insufficient to send an identification signal.

Such a nefarious individual may attempt to deplete stored energy in a tag using a handheld transmitter that sends a spoof signal, in the frequency band of an EAS gate transmitter, to a tag located out of range of receivers in the vicinity of the EAS gate. For example, the fraudster might bring a tagged article of clothing into a dressing room, and using a handheld EAS signal transmitter, attempt to deplete the reserve energy in the item's tag.

To combat this spoofing, the infrastructure in the establishment may be configured to detect the telltale signs of spoofing. For example, an EAS gate frequency transmission is only expected by the system to occur in an immediate vicinity of an EAS gate. Therefore, if the EAS frequency is detected in another part of the establishment, such as a dressing room, an alert may notify administration or security personnel of a suspected spoofing attempt. Additionally. or alternatively, in response to an EAS signal, a tag may be designed to emit a responsive signal indicating that the tag is responding to an EAS signal. For example, a signal pattern transmitted in response to an EAS gate trigger might differ from a signal pattern transmitted in response to any other trigger signal. If such a gate mode response signal is received by the system from a location other than a vicinity of an EAS gate, a similar alert may be transmitted. Since spoof alerts may be received by receivers in known, fixed locations, the alert, in some embodiments, may identify a spoofing location, enabling security personnel to locate the fraudster. For example, if the spoofed EAS signal is detected by a receiver covering an area of a dressing room, that location may be transmitted as part of an alert. If more than one receiver receives the fraudulently caused signals, triangulation or other location techniques may be employed to identify location coordinates or other location-related data associated with the spoofed tag or the spoofing transmitter. In this way, security personnel may receive as part of an alert, location-related information. Moreover, since the transmitted response of a spoofed tag likely includes a unique ID that identifies the product with which the spoofed tag is associated, an alert might also notify personnel of product-identifying information (e.g., an alert may indicate a possible attempt to steal a brown leather Armani jacket by a person in dressing room #6). Such an alert might also include an image of the product at issue, retrieved from a data structure associated with the system. If tied to the establishment's CCTV cameras, the system might automatically perform a look up of video of one or more individuals who were recently in an area where the spoofed signal occurred, and transmit such images as part of an alert.

Similarly, as soon as a spoofed signal is detected, one or more CCTV cameras streaming from the area of the spoof may be transmitted live as part of an alert. Moreover, multiple cameras might be used to track the suspect as the suspect moves through the establishment. Using one or more of these techniques, fraud and shrinkage may be reduced.

Disclosed embodiments may involve a wireless identification system. An exemplary wireless identification system may involve the use of, one or more transmitters configured to transmit electromagnetic energy, such as EAS transmitters, one or more EAS gates, one or more receivers configured to receive transmissions from the plurality of identification tags, and one or more processors configured to store and process information related with, for example, identification tags, alert mechanisms, inventory, or product details. The wireless identification system may further involve other elements, circuitry, circuit components, and systems that may be beneficial to track and/or authenticate objects, people, and/or animals. A wireless identification system may include one or more of the foregoing elements.

In some embodiments, the wireless identification system may include a first receiver. The first receiver may be a handheld device or a fixed device. A handheld device may include a handheld scanner provided to an employee or customer by the establishment for use during working routines or in a shopping session; a mobile communications device of such an individual (e.g., cellphone, tablet, dedicated hardware, etc.); or any other handheld device capable of performing the functions of a receiver. A fixed scanner may be a device affixed or otherwise attached to any wall, ceiling, or any other structural or non-structural element capable of supporting the receiver, that is capable of performing the functions of a receiver. By way of example, in FIG. 11, receivers 11300a-h may be scanners attached to certain structures (e.g., walls, ceilings, racks, displays, or other fixtures or components) in the establishment. A customer or employee may, for example, use handheld device 11200 as a handheld scanner, which may be a device dedicated to scanning or any other mobile device capable of performing the functions of a receiver.

The wireless identification system may further include at least one processor. The processor may be configured to store and process information related to, for example, identification tags, alert mechanisms, inventory status, or product details. The at least one processor may be configured to identify the identification tags, update inventory, provide notifications, and/or provide alerts, among other functions depending on the particular design parameters of the wireless identification system.

The wireless identification system may be used in connection with at least one transmitter configured to transmit a first signal in a first frequency band to a plurality of identification tags. By way of example, the at least one transmitter may be incorporated in or otherwise associated with an EAS gate or an EAS system. Such systems typically transmit in frequency ranges of 58-60 kHz or 7-13 MHz. One or more wireless identification tags receiving such a first signal may be caused to transmit a second signal in a second frequency band. Depending on tag design, the second signal may be in 2.4 GHz WW ISM frequency range. Characteristics of the second signal may identify it as having been triggered by the first signal—in this example by a transmission from an EAS gate or EAS system. Such signal characteristics may include one or more of a power level, repetition rate, data content, or any other information that may be used to identify the triggering source. This may occur because the tag may be programmed to generate the second signal with the particular characteristics in response to having received the first signal. If a plurality of tagged items receive the first signal at the same time, they may each transmit second signals, unique to each tag, simultaneously or within a short time interval. While the at least one transmitter is described by way of example as being associated with an EAS gate or system, the at least one transmitter need not be EAS-related, and the first signal need not be in an EAS frequency range. Similarly, the second signal need not be in the 2.4 GHz range.

Regardless of the frequency ranges, transmission of the second signal may serve as an indication that the first signal was received in the first frequency band. In other words, it may be said that the first signal received by the tag is in some way involved in triggering transmission of the second signal by the tag.

The second signal may be received by a first receiver configured for location proximate the at least one transmitter. The first receiver may be "configured" as the result of its placement near the at least one transmitter, or as the result of an overall system design recognizing that the receiver is expected to receive the second signal as the result of receipt of the first signal by the tag.

As alluded to earlier, the first frequency band may include, for example, at least one of a first EAS frequency band of about 7-13 MHz or a second EAS frequency band of about 58-60 kHz. In one example, the second signal transmitted by a tag may include an identification signal, which may be unique to the tag. For example, the identification signal may include a unique identification code or a sequence permitting the tag to be identified by a processor accessing a data structure.

In some embodiments, the second signal may indicate whether the first signal was received in the first frequency band. Consistent with disclosed embodiments, the second signal in a second frequency band may be generated and transmitted in response to receiving the first signal in a first frequency band. In some embodiments, transmitting the identification signal in a second frequency band may involve receiving the first signal in the first frequency and verifying the frequency of the received first signal. Upon verification, the identification tag may generate and transmit the second signal or the identification signal to be detected by a first receiver, a second receiver, or a plurality of receivers. Because the second signal may be generated upon verification of the receipt of the first signal in the first frequency band, the presence of the second signal may indicate whether the first signal was received in the first frequency band.

In some disclosed embodiments, the at least one transmitter of the wireless identification system may be located in proximity to a first receiver, discussed later in greater detail. The proximity of the components may be such that when the at least one transmitter emits a first signal to thereby trigger transmission of a second signal to the first receiver, the at least one transmitter is close enough to the first receiver so that the second signal is capable of being detected or received by the first receiver. For example, the at least one transmitter may be located near an egress (e.g., entrance/exit) of a facility equipped with an EAS system. The transmitter (e.g., an EAS transmitter) may be an external system or device located inside an EAS pedestal such that it may be concealed within a frame or a support structure of the EAS pedestal, or mounted on a frame or a support structure of an EAS pedestal. Additionally, or alternatively, the transmitter may be located on or above the ceiling, on or under the floor, on or behind the walls, or any other stationary or mobile structure adjacent the entrance/exit of a facility. Wherever located a first receiver may be close enough to the at least one transmitter so that when the at least one transmitter triggers tags with the first signal, the tags are able to transmit their responsive signal to the first receiver.

In some embodiments, one or more transmitters may be located at one or more locations within a facility. For example, one transmitter may be located at the main entrance/exit of a bank, another transmitter located at the entrance of the safety vault, another transmitter located at the automated teller machine (ATM) area, or other sections of a secured facility.

By way of another example, the first receiver may be configured for location proximate the at least one transmitter in that the first receiver's reception range, when in a location proximate the at least one transmitter, enables the first receiver to receive signals from tags in a transmission range of the at least one transmitter. Thus, when the at least one transmitter sends signals to the tags, prompting the tags to transmit identification signals, the first receiver is within a reception range to be able to receive the identification signals. The first receiver may be located, for example, within a transmission range of an identification tag receiving the first signal transmitted by the transmitter of the EAS system. As used herein, a transmission range and a reception range may refer to the maximum distances between a transmitter and a receiver, both operating using the same communication protocol and over the same communication medium, such that transmission and reception is respectively enabled between transmitter and receiver. In some embodiments, if a signal transmitted from the transmitter to the receiver can be accurately received and interpreted by the receiver, correctly identifying the transmitted data (or, in the case of energy transmission, the maximum distance over which the receiver can convert the received energy to a usable from on the receiver's end), the transmitter and the receiver may be "within range" of each other. This distance may be determined, for example, by the power level of the transmitter output, the attenuation of the communication medium which may be fixed, or a formula of the distance, or a statistical formula of both the distance and some parameters of the communication medium, among others, and the receiver sensitivity. Any receiver which is located at a distance from a given transmitter which is shorter than the transmission range is said to be "within range" of the transmitter, or "in the vicinity" of the transmitter, or "proximate" the transmitter. For example, the transmission range of a Wi-Fi access point can range from a few meters when the access point is transmitting data at its maximum data rate, but may extend to dozens of meters (sometimes even 100 meters or more) when transmitting at its lowest data rate. The difference between those two conditions is the receiver sensitivity, which is at a much lower power level for the low data rate compared with the high data rate. In the same manner, walls, people, furniture and other obstacles or reflectors may reduce or extend the transmission range by changing the attenuation of the communication medium, without any change of the transmitted power level or the receiver sensitivity. In some disclosed embodiments, receiver sensitivity may refer to the minimum power level at the input to the receiver at which the receiver can accurately receive, interpret and act upon the received data.

For the first receiver to receive the transmissions from the plurality of identification tags near a transmitter such as an EAS transmitter, the first receiver should be positioned within transmission range of an identification tag which is itself within transmission range of the EAS transmitter. In other words, the first receiver may be located within the transmission range of the identification tag receiving the first signal transmitted by the EAS transmitter. The maximum distance between the first receiver and the EAS transmitter may be equal to or less than the difference between the transmission range of the identification tag to the first receiver and the transmission range of the transmitter to the identification tag.

In some disclosed embodiments, a second receiver may be configured to receive a third signal from a tag outside a transmission range of the at least one transmitter. The second receiver may be so configured, for example, due to its placement relative to the at least one transmitter. For example, if the second receiver may be located far enough from the first receiver such that a second signal triggered by the at least one transmitter's first signal, may not be detected by the second receiver. However, a third signal emanating from a tag within range of the second receiver may be received by the second receiver.

In some embodiments, the wireless identification system may include more than one second receivers, each of which is far enough from the at least one transmitter so as not to be impacted by any second signals triggered by the at least one transmitter. The transmissions from one or more of the plurality of identification tags may include the second signal having a frequency band in the range of 2.4 GHz WW ISM. The second receiver may be configured to receive electromagnetic signals having a frequency in the range of 2.4 GHz transmitted from a transmitter of the wireless identification tag.

A wireless fraud detection system consistent with this disclosure may be configured to expect different signals at different receivers. For example, a receiver in a particular department in a store may expect to receive identification signals from tags prompted by signals sent to the tags by infrastructure that is part of an inventory management system. However, a receiver in the same particular department may not expect to receive signals from tags prompted by an EAS gate. This is because an EAS gate is located at an egress and not within a particular department. Thus, if a receiver far from an EAS gate receives a tag response to an EAS gate signal, such a signal may be unexpected and be indicative of fraud. Such a signal may differ from a typical signal received by infrastructure receivers in that one or more characteristic of the signal may characterize an EAS gate response. Such characteristics may involve the power of the signal, the repetition rate of the signal, information contained in the signal, or any other signal characteristic employed in the system to characterize an EAS gate response.

In some embodiments, a minimum distance between the transmitter and the second receiver may be greater than the sum of the transmission range of the transmitter to the identification tag and the transmission range of the identification tag to the second receiver. For example, the distance d4 between the identification tag and the second receiver (e.g., receiver 11300c) may be larger than the distance d1 between the transmitter and the first receiver (e.g., receiver 11300a), or the distance d2 between the identification tag and the first receiver.

Figure 31:
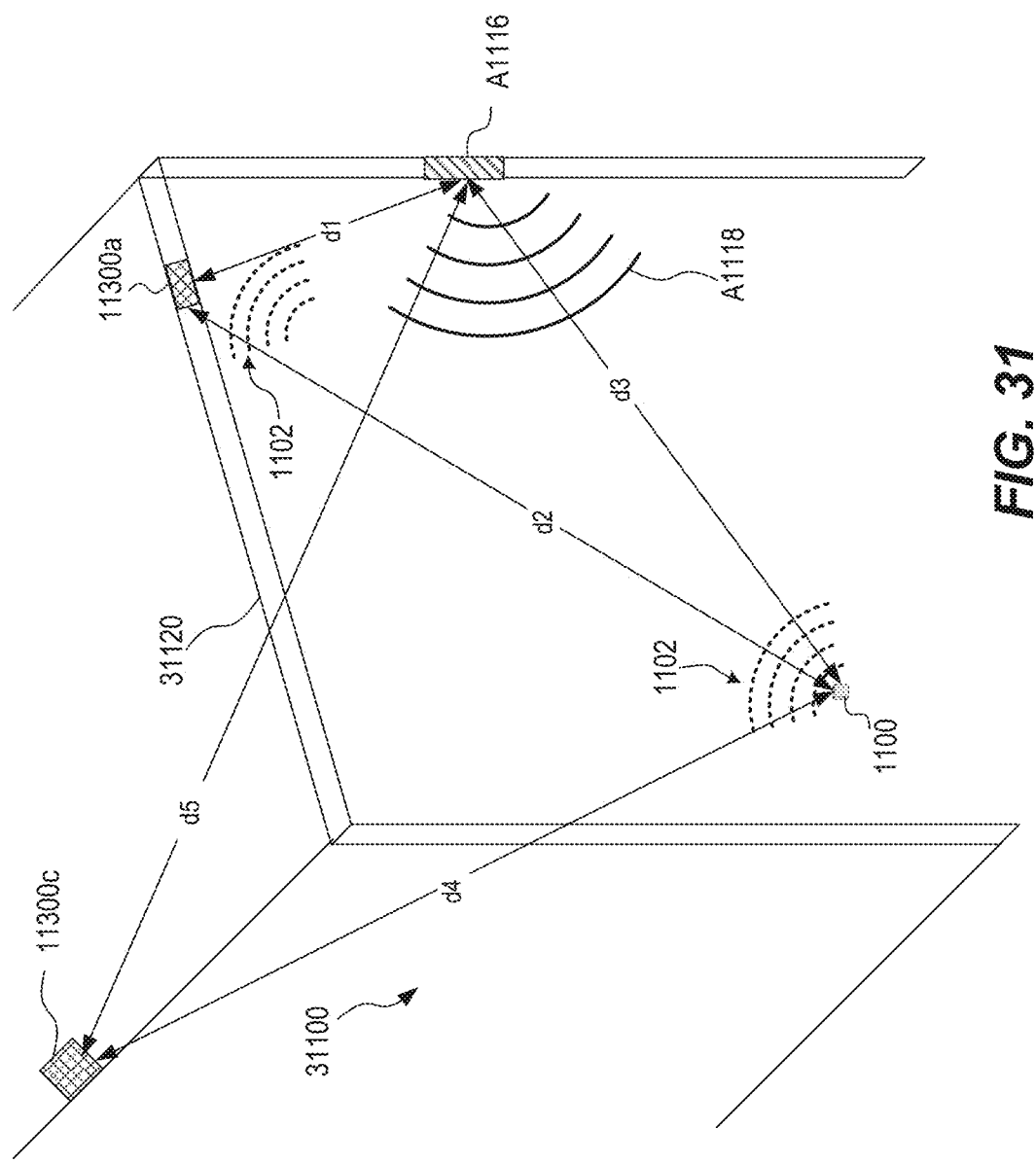
FIG. 31 is a schematic illustration of an exemplary arrangement of a transmitter, a first receiver, and a second receiver in an exemplary wireless identification system, consistent with disclosed embodiments.

By way of example, in FIG. 31, wireless identification system 31100 in an establishment may include a transmitter 1116 configured to transmit a transmission signal 1118 (e.g., EAS transmission signal) in a frequency band of 7-13 MHz or 58-60 kHz. A wireless identification tag 1100 may be configured to receive transmission signal 1118 from transmitter 1116 and transmit an identification signal 1102 in a frequency band of 2.4 GHz upon receiving transmission signal 1118. A first receiver 11300a may be configured to receive the transmitted signal 1102. A second receiver 11300c may not receive signal 1102 because the second receiver 11300c is outside the transmission range of identification tag 1100 (i.e., distance d4 is greater than one or more of the transmission range of identification tag 1100 or the reception range of receiver 11300C). By way of example, transmitter 1116 may be disposed in, mounted on, or attached to structure 31120 at the entrance/exit of the establishment. The EAS transmission signal 1118 and the identification signal 1102 are denoted as waves with solid lines and broken lines, respectively, for illustrative and visual aid purposes only.

As illustrated in FIG. 31, the distance between transmitter 1116 and receiver 1300a may be denoted as d1, the distance between identification tag 1100 and receiver 11300a may be denoted as d2, the distance between transmitter 1116 and identification tag 1100 may be denoted as d3, the distance between identification tag 1100 and receiver 11300c may be denoted as d4, and the distance between receiver 11300c and transmitter 1116 may be denoted as d5. In some disclosed embodiments, the distance d1 may be equal to or less than the difference between the transmission range of the identification tag to the first receiver and the transmission range of the transmitter to the identification tag. In some embodiments, d2 may be equal to or less than the transmission range of the identification tag 1100, d3 may be equal to or less than the transmission range of the EAS transmitter 1116, and d4 may be larger than the transmission range or outside the transmission range of the identification tag 1100 if, for example, distance d5 is greater than the sum of the transmission range of EAS transmitter 1116 and the transmission range of identification tag 1100.

In some disclosed embodiments, the at least one processor may be configured to generate a potential fraud alert when the second receiver receives the third signal. A potential fraud alert or an alert signal, may refer to an indication received by a system, that an event requiring a response has occurred. In the context of anti-theft security systems, such as a wireless identification system, alert signals may indicate either an attempt to steal an item (e.g. remove it from the store without paying for it), an attempt to tamper with a specific item such that it won't trigger the anti-theft alarm (e.g. by triggering the tag to deplete stored energy, leaving the tag with insufficient energy to trigger a notification when the tag passes through an EAS gate), or an attempt to block the entire system from operating (e.g. by transmitting strong radio signals, overwhelming the capability of the system's detectors to operate). Such alert signals may be in the form of a visual alert, an audible alert, a text alert or any other transmission that conveys the desired information. The alerts may be caused to occur via fixed infrastructure (alarms, lights, displays), or via other mechanisms including notifications on a store employee's mobile device, update of a database of attempted thefts, instant messages, and/or automated transmissions to local security.

In some disclosed embodiments, the third signal may emanate from a tag in response to a spoof of the tag. A spoof may occur when an unauthorized signal is sent to the tag to cause abnormal operation of the tag. For example, if a fraudster with a signal generator generates a spoof of an EAS gate signal and sends it to a tag, the tag may operate in an abnormal manner in that it sends an EAS gate response in an area other than an EAS gate area, even though the tag was not triggered by an EAS gate.

In some disclosed embodiments, each of the plurality of identification tags may include an energy storage component configured to store energy transmitted in a frequency outside of the first frequency band. Consistent with disclosed embodiments, the energy storage component may include any element or circuit enabled to store energy. By way of example, an energy storage component may include one or more of components depicted in FIGS. 2, 9, and 10, such as energy storage circuit 2108, which may include storage capacitor 10300. Any one or more of the components, for example, may be configured to receive energy from antennae 2112 or 2114, store the received energy, and make the energy available to other components in tag 1100. In some embodiments, energy received in one form, may be stored in a second form, and may be provided to components in a third form. Further, in some embodiments, the energy storage component may not be configured to store electromagnetic energy in a frequency range of 7-13 MHz or 58-60 kHz. For example, electromagnetic energy having a frequency of 2.4 GHz WW ISM may be stored in the energy storage component, but energy in an EAS gate range may not be stored. As discussed above, the energy storage component may be configured to power a transmitter of the at least one identification tag with the stored energy.

In some disclosed embodiments, the plurality of identification tags may be further configured to receive a fourth signal outside of the first frequency band. For example, the fourth signal may be from another triggering source, such as a handheld device (e.g., scanner, cellphone, etc.) or from fixed transmitting infrastructure in the establishment. The latter may be a frequency range of 900 MHz WW ISM or 2.4 GHz WW ISM, and the former may be in the range of 2.4 GHz WW ISM, for example. In some embodiments, one or more antennae may be tuned to receive energy transmitted in multiple frequency bands of around 900 MHz, multiple frequency bands of around 2.4 GHz, or both, as discussed herein. In response to the received fourth signal, the plurality of identification tags may be configured to transmit a fifth signal. The fifth signal may be intended for receipt by a nearby receiver such as an inventory infrastructure receiver or a receiver in the handheld device.

In some disclosed embodiments, the fourth signal may be in the second frequency band or in a third frequency band of 900 MHz WW ISM. The plurality of wireless identification tags may be configured to transmit the fifth signal in the second frequency band of 2.4 GHz, different from the first frequency band, in response to receiving the third signal in the second frequency band (e.g., 2.4 GHz) or the third frequency band (e.g., 900 MHz). In some embodiments, the identification tag may include a circuit configured to detect the electromagnetic energy having a frequency in both the second frequency band (e.g., 2.4 GHz) or the third frequency band (e.g., 900 MHz).

Figure 32:
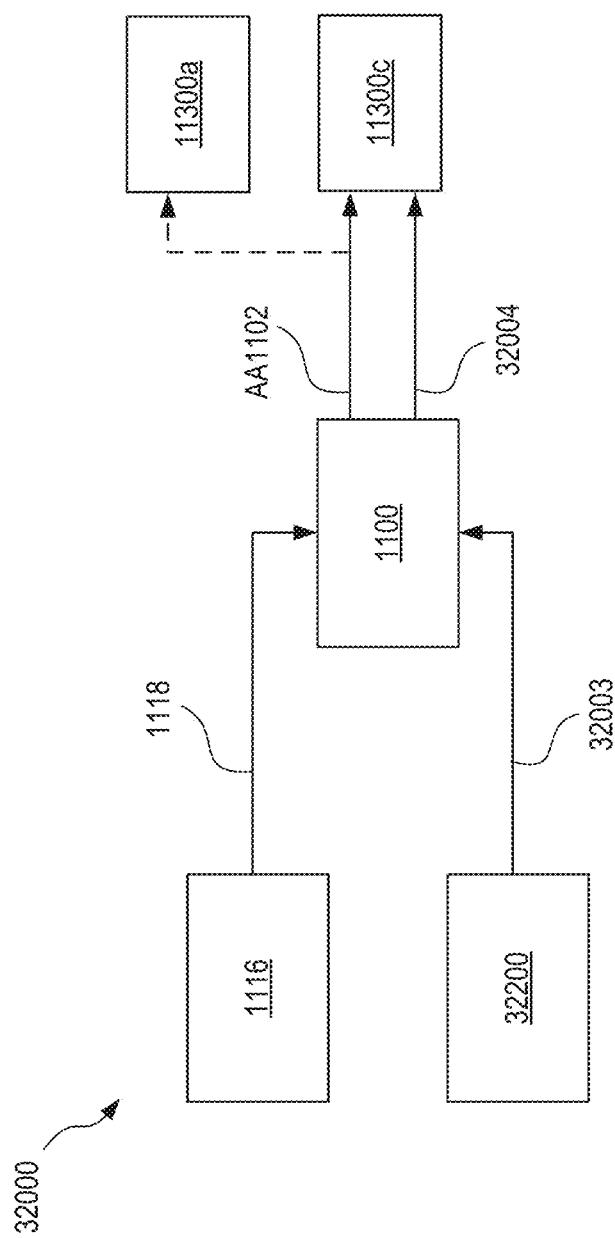
FIG. 32 is a block diagram of an exemplary flow of signals in a wireless identification system, consistent with some disclosed embodiments.

FIG. 32 illustrates a block diagram of an exemplary wireless identification system 32000 including a transmitter 1116, an external source of electromagnetic energy 32200, an identification tag 1100, and a receiver 11300c. As previously discussed, transmitter 1116 or another EAS transmitter may be configured to generate a first signal 1118 in a first frequency band of 58-60 kHz or 7-13 MHz. The identification tag 1100 may be configured to receive the first signal and transmit a second signal 1102 in response to receiving the first signal. One or more receivers 11300a and/or 11300c may be configured to receive second signal 1102. The wireless identification system 32000 may further include an external source (ambient and intentional) of electromagnetic energy 32200, such as wireless mobile communication devices, configured to transmit a third signal 32003 in a frequency range of 2.4 GHz or 900 MHz, for example. The identification tag 1100 may be configured to receive third signal 32003 and transmit a fourth signal 32004 in response to receiving third signal 32003. Second receiver 11300c may be configured to receive fourth signal 32004.

In some embodiments, at least one processor may be configured such that when the fifth signal is received by the second receiver, the at least one processor is configured to identify a specific identification tag that transmitted the fifth signal and to look up an ID of the identified tag in an inventory stored in at least one data structure. For example, when there is an interest in checking information on a product such as a price, size, model number, etc., a handheld device may cause an associated tag to send a signal requesting responsive information. The signal from the tag may initially be received by the handheld device, which may then make the lookup request to a data structure, such as memory or a server.

In some disclosed embodiments, a data structure may include a database configured to store data including, but not limited to, information related with an identification tag, an ID of the identification tag, corresponding product information, inventory status of the corresponding product, location of the product within the establishment, store inventory, among other product relevant information. The information stored in the database may be accessible to one or more processors directly or indirectly connected with the database. In some embodiments, the system may include one or more databases. For example, a local database may store local information related with a particular facility or the store, a regional database, or a global database. The one or more databases may be connected with each other through a network such as a cloud network, for example. In some embodiments, the database may be configured to be updated in real-time, or periodically updated at a predetermined regular interval, or updated in response to a query. Real-time updating may involve updating the database immediately after occurrence of a change in relevant information. As used herein, "immediately" may be referred to as without added intentional delays, or as within a specific amount of time, for example, within 3 seconds or less, or within 2 seconds or less, or within 1 second or less, or within 0.5 seconds or less.

In some disclosed embodiments, the processor may be configured to identify the identification tag that transmitted the fifth signal received by the second receiver. The processor may identify the identification tag by, for example, accessing the incoming fifth signal transmitted by the identification tag and received at one or more second receivers. The identified position may be a precise, measurable location within the establishment, or it may be a generalized position, such as a room, appliance, department, region, area, rack, shelf, or any other position, depending on system design and the granularity a particular system affords.

In some disclosed embodiments, based on the fifth signal received by the second receiver, the at least one processor may be configured to generate the alert when the ID of the identified tag is included in the inventory. Upon determining and verifying that the identification tag is present in the inventory, the processor may generate an alert, indicating that the item was not properly checked out or was not paid for. In some disclosed embodiments, the at least one processor may be configured to forego generating the alert when the second signal is received by the first receiver at the first location. The identification tag may be activated upon receiving the first signal from the transmitter of the EAS system. Upon activation, the identification tag may generate or transmit a second signal in a second frequency band of around 2.4 GHz which may be received by the first receiver at the first location if the first receiver is located within the transmission range of the identification tag. The processor of the wireless identification system may determine that because the identification signal transmitted by the identification tag was received by the first receiver located proximate the EAS transmitter, the customer may be near the entrance/exit of the establishment. The processor, based on verification that the second signal received was received by the first receiver, may determine that it is not a spoof-attempt, and therefore, may not generate the alert signal for a system spoof-attempt.

In some disclosed embodiments, the second signal may differ from the fifth signal in at least one of a repetition period, a power level, a signal encryption mechanism, or data content of the transmitted signal. As previously described, the second signal may refer to the signal transmitted from the identification tag in gate mode and the fifth signal may refer to the signal transmitted from the identification tag operating in user-excitable mode or infrastructure-excitable mode. The second and the fifth signals, may differ in a plurality of characteristics including, but not limited to, communication medium, communication protocols, types of encryption, scrambling, and/or disguising, data content, timing of transmission, and/or any other distinguishable characteristic that may be associated with the identification signal to be transmitted.

In some disclosed embodiments, the identification tags may be further configured to transmit first identification data with the second signal and to transmit second identification data, different from the first identification data, with the fifth signal. As disclosed herein, data content may include the first identification data and the second identification data. The first identification data may be transmitted with the second signal in the gate mode, and may include data related with, but not limited to, payment details, inventory details, among other information relevant to a fair purchase or release of the product. The second identification data may be transmitted with the fifth signal in the user-excitable mode or infrastructure-excitable mode, and may include data related with, but not limited to, a unique identifier associated with the identification tag, a status of the identification tag, a location of the identification tag, a power level of the identification tag, pricing information, ownership information, styling information, data relating to the trigger that initiated the transmission, or any information conveyed by the identification signal.

In some embodiments, the at least one transmitter, the first receiver, and the second receiver may be located within a common establishment, as defined above.

In some disclosed embodiments, when the second signal is received by the first receiver, the at least one processor may be configured to identify the identification tag that transmitted the second signal and to look up an ID of the identified tag in an inventory stored in at least one data structure. As previously described, a data structure may include a database configured to store data including, but not limited to, information related with an identification tag, an ID of the identification tag, corresponding product information, inventory status of the corresponding product, location of the product within the establishment, store inventory, among other product relevant information. The information stored in the database may be accessible to one or more processors directly or indirectly connected with the database. The processor, when the second signal is received by the first receiver at the first location, may be further configured to identify the identification tag by, for example, looking up the ID of the identification tag that transmitted the second signal. The processor may generate a query about the identity of the identification tag that may cause a look up of the identification tag associated with an item. In response to the query, a search may be initiated within the data structure to determine if the identification tag that transmitted the second signal is present in the inventory, based on, for example, the ID of the identification tag.

In some disclosed embodiments, based on the second signal received by the first receiver, the at least one processor may be configured to generate the alert when the ID of the identified tag is included in the inventory. Upon determining and verifying that the identification tag is present in the inventory, the processor may generate an alert, indicating that the item has not been properly checked out, or has not been fairly paid for.

In some disclosed embodiments, when the second signal is received by the first receiver at the first location, the at least one processor may be configured to update an inventory database. For example, a gate signal (identification signal generated in response to receiving the first signal) may be transmitted by an identification tag when a customer brings an item containing the identification tag to a predetermined location associated with sales of items. When the first receiver receives the gate signal, the at least one processor in the system may be configured to determine that a sale has occurred, and update the inventory database accordingly.

In some disclosed embodiments, the at least one transmitter may include an EAS antenna configured to transmit and receive signals within the first frequency band. For example, as discussed earlier, an EAS gate may include an antenna that transmits and/or receives in a frequency band of 7-13 MHz or 58-60 kHz. In disclosed embodiments, although a tag may be triggered by an EAS gate signal, the tag may respond in a frequency such as 2.4 GHz, which may not be recognized by the EAS gate.

In some disclosed embodiments, at least one of the first receiver or the second receiver may include an antenna tuned to receive signals transmitted in the second frequency band. Thus, in the example provided above, a signal sent by a tag in response to an EAS gate trigger signal may be received and understood by the first receiver or the second receiver (e.g., in a frequency range of around 2.4 GHz). In some disclosed embodiments, the processor may be configured to cause an alarm mechanism located in proximity to the second location to produce at least one of a visual notification or an audible notification when the second signal is received by the second receiver. One of several functions of the processor of the wireless identification system may include generating alerts and notification signals in the event that a theft-attempt or a system spoof-attempt is made. In some disclosed embodiments, under normal operation in a theft-deterrent system, the second signal transmitted by the identification tag may be received by the first receiver located proximate to the transmitter of the wireless identification system and within the transmission range of the identification tag. In such a configuration, if the customer in possession of one or more items with an identification tag that has not been deactivated by an authorized personnel of a store, tries to exit the store, the processor may be configured to trigger an alarm indicating an attempt of theft. One of several ways to circumvent the alarm triggering at the exit gate may involve overwhelming the system and "wearing down" or "depleting" the energy of an identification tag to avoid detection of the tag when exiting the store. This could potentially happen if a fraudster uses a mobile EAS transmitter configured to transmit electromagnetic signals in the frequency band of 7-13 MHz or 58-60 kHz to activate the tag. The electromagnetic signals generated from a mobile EAS transmitter (unauthorized by the store) may be referred to as a fraudulent EAS signal.

As an example, the fraudster may use the mobile EAS transmitter in a fitting room to wear down the energy stored in an identification tag by repeatedly activating the tag. However, the second signal generated by the identification tag upon receiving the fraudulent EAS signal, may be received by one or more second receivers located at one or more second locations such as in the proximity of the fitting room. The processor may be configured to determine the second location of the second receiver receiving the fraudulent EAS signal, and generate an alert signal or a notification signal at or close to the determined second location, indicating an attempt to drain the reserve energy of a tag.

In some disclosed embodiments, an alert signal or a notification signal may refer to a signal generated by a component of one system, used to alert another component of the system, or a different system, or a person, or any combination thereof. The notification signal may be an audible signal, a visual signal, or another sensory signal such as a haptic signal, or a digital signal. In some disclosed embodiments, the processor may be configured to transmit the alert to a remote device. Some non-limiting examples of a remote device include, a mobile device, an app on a mobile device, a remote database, a handheld device, a tablet, a computer, or other devices capable of receiving notifications wirelessly over BLUETOOTH™, BLUETOOTH LE™ (BLE), Wi-Fi, near field communications (NFC), WLAN, or other suitable communication methods.

In some disclosed embodiments, when the second signal is received by the first receiver at the first location, the processor may be configured to identify the identification tag that transmitted the second signal, access data associated with the identified tag in a database, and determine whether to generate an alert based upon the accessed data. As previously described, the processor, when the second signal is received by the first receiver at the first location, may be further configured to identify the identification tag by, for example, looking up the ID of the identification tag that transmitted the second signal. The processor may generate a query about the identity of the identification tag that may cause a look up of the identification tag associated with an item. In response to the query, a search may be initiated within the data structure to determine whether an alert is required. If removal of the tagged item would violate an inventory rule, an alert might be triggered. A rule might be violated if, for example, an attempt to remove a tagged item from the establishment occurs without authorization. Authorization may occur if the system includes a record that the item was already paid for, or if an administrator has cleared the item for removal.

Alternatively, if the identified tag is absent in the inventory or the database, indicating that the item is "sold" or successfully paid for (or that the item is not related to the specific establishment), the processor may not generate an alarm or an alert signal, allowing the customer to exit the store without interruption.

In other embodiments, a fraud reduction system for use with wirelessly tagged inventory may include at least one processor configured to detect a signal associated with a transmission in an EAS gate frequency. A detected signal associated with a transmission in an EAS gate frequency may be either a signal in a frequency of an EAS gate (e.g., in frequency band of about 7-13 MHz or about 58-60 kHz), or it may be a signal emanating from a tag triggered by an EAS gate frequency. The signal transmitted by the tag may be in a frequency other than an EAS gate frequency (e.g., 2.4 GHz). The at least one processor may identify the signal as emanating from a location that does not correspond to an EAS gate location. For example, EAS gate locations may be known to correspond specially with specific receivers. Some receivers in an establishment may be located in proximity to an EAS gate and capable of receiving signals from tags passing through the EAS gate. Other receivers may be located sufficiently far from an EAS gate that signals from tags passing through the EAS gate are incapable of being received by those more distant receivers. The at least one processor may be programmed or may have access to data to determine that the signal does not originate from one of the receivers in proximity to the EAS gate.

Alternatively or additionally, the processor may receive, along with the signal associated with a transmission in the EAS gate frequency, an identification of the receiver that physically received the signal. This identification may include the location of the receiver, or the processor may have access to a database holding location indications of various receivers, enabling the processor to definitively determine whether the signal was received in proximity to an EAS gate or whether it was received far enough from an EAS gate so as not to be associated with the transmission of the EAS gate itself.

Based on the identified emanation location of the signal, the at least one processor may determine that a suspected fraudulent event is in progress. The identified emanation location may be a specific location (e.g., dressing room #2) or it may be a negative identification (e.g., not an EAS gate location). When the at least one processor determines that an EAS gate signal is received in a location that is not supposed to receive EAS gate signals, the processor may conclude, based on related programmed logic, that the signal is likely to correspond to fraudulent activity.

When such suspected fraudulent activity is detected, the at least one processor may generate an alert. An alert may indicate a possible attempt to steal a particular product identified in the signal. Such an alert might also include an image of the product at issue, retrieved by the at least one processor from a data structure. If tied to the establishment's CCTV cameras, the at least one processor might automatically perform a look up of a video of one or more individuals who were recently in an area where the signal occurred, and transmit such images as part of an alert. Similarly, as soon as a spoofed signal is detected, one or more CCTV cameras streaming from the area of the attempted spoof may be transmitted live as part of an alert. Moreover, multiple cameras might be used to track the suspect as the suspect moves through the establishment. One or more of the foregoing may be considered an alert. The generated alert may be sent to any entity such as security personnel (either via wired or wireless infrastructure), by triggering an audible or a visual alarm in the vicinity of the detected signal or in any other location, or by sending text or computer readable messages to an individual or a system component.

Embodiments of the present disclosure may relate to methods, systems, devices, and computer readable media for simultaneously triggering and sequentially reading a plurality of tags. Consistent with some disclosed embodiments, non-transitory computer readable storage media may store program instructions executable by at least one processing device and which perform any of the steps and/or methods described herein. As used herein, a non-transitory computer readable storage medium may refer to any type of physical memory on which information or data readable by at least one processor can be stored. Examples may include random access memory (RAM), read-only memory (ROM), volatile memory, non-volatile memory, hard drives, CD ROMs, DVDs, flash drives, disks, and any other known physical storage medium whether some or all portions thereof are physically located in or near an establishment or are located remotely and are accessible via a network. Singular terms, such as "memory" and "computer readable storage medium," may additionally refer to multiple structures, such as a plurality of memories or computer readable storage mediums. As referred to herein, a "memory" may include any type of computer readable storage medium unless otherwise specified. A computer readable storage medium may store instructions for execution by at least one processor, including instructions for causing the processor to perform steps or stages consistent with an embodiment herein. Additionally, one or more computer readable storage media may be utilized in implementing a computer-implemented method. The term "computer readable storage medium" should be understood to include tangible items and exclude carrier waves and transient signals.

Some disclosed embodiments may include a non-transitory computer readable medium containing instructions that, when executed by a processor, cause the processor to execute simultaneous triggering and sequential reading of an identification tag in a wireless identification system. Simultaneous triggering may occur when a processor instructs a transmitter to broadcast a triggering signal to an area that contains more than one tag, each of which is capable of receiving the triggering signal. Upon receipt, the tags might initiate a process to respond to the trigger by either immediately or with some period of delay transmitting a responsive signal. For example, upon receipt of a 900 MHz trigger signal from infrastructure in an establishment, a plurality of tags might be triggered to respond by broadcasting their own individual IDs in a 2.4 GHz frequency range. A processor causing a transmitter to broadcast a trigger signal over an area which contains more than one tag may be referred to as simultaneous triggering, regardless of whether the tags receiving the signal respond simultaneously.

One potential challenge of simultaneous triggering is that it may cause tags to simultaneously send responsive signals in an overall unproductive manner. For example, when a high volume of tags simultaneously respond, the responses can collide and/or the reader (receiver) may be overwhelmed with responses. As discussed in other paragraphs of this disclosure, strategies for dealing with these challenges may include a tag design that either interjects a delayed tag response and/or that causes tags to repeatedly send duplicative responses of varying transmission duration or with non-uniform intervals of delay or pause between successive transmissions. These approaches which stagger transmission signals may increase the chances that a tag ID reaches the receiver without collision, and that the receiver has the capacity at any given instant to read the responses.

Another facet of this strategy for dealing with the challenge of the effects of simultaneous triggering involves the receiver being configured to sequentially read responsive signals, and to correctly associate such sequentially read signals with the simultaneous trigger. For example, rather than attempting to read all responsive signals at once, a system might effectively ignore some returning signals initially, and later (e.g., milliseconds, seconds, minutes or hours later depending on system specifications), sequentially read the initially ignored tags.

The issue of signal collision and overwhelming a receiver may become more pronounced when many tags are triggered by a handheld device. Depending on system design, the permanent infrastructure in an establishment may be sufficiently robust to handle simultaneous transmissions. However, a mobile 2.4 GHz device such as a cell phone, tablet, or handheld scanner may not. Therefore, sequential reading of responsive signals may be particularly helpful in such situations.

Because each tag may have its own unique ID, each tag may be individually traced by the system. From historical data, the system may learn the expected tag IDs associated with a particular area, and may determine when a particular tag previously located in the particular area is no longer triggered by the system. For example, as illustrated in FIG. 11, a department filled with clothing in a retail store may house thousands of tags, such as tags associated with the shirts on rack 11250. Receiver 1114*b* is in close proximity to rack 11250, and may periodically receive tag IDs transmitted from the shirts on rack 11250. Thus, one or more processors 20004 in FIG. 20, may learn expected tag responses by accessing historical data stored in data structure(s) 20006, including data regarding tags that were previously triggered in the region surrounding rack 11250. Also stored in data structure(s) 20006 is sales data, enabling the processor(s) 20004 to know when a particular shirt is sold. As the result, in response to a broadcast trigger in the area of rack 11250, processor(s) 20004 may determine when receiver 1114*b* fails to receive an expected response from a tag that has historically been in that region and may, in some embodiments, query sales data in data structure(s) 20006 to determine if the missing tag is recorded as having been sold. If the tag is not recorded as having been sold, a lack of response might mean that the tag's energy reserve is depleted, that the tag malfunctioned, or that the product associated with the tag was stolen. The associated tag ID may then be recorded on a missing item list in data structure(s) 20006. If, in the future, the missing tag responds to a trigger signal, the missing item may be removed from the missing items list. Otherwise, the system may note the missing item on a shrinkage list. In this way, an establishment may manage its shrinkage in real time. Whenever tags fail to respond for a period of time and they are not recorded in the inventory system as sold, the system may note the items as either missing, lost, or stolen. Depending on how often a system is configured to take inventory, the time of the loss may be isolated and correlated to times other items were lost and/or to video surveillance footage. In this way, lack of tag response may be used for shrinkage monitoring and for security.

Such a system may even be able to detect suspected theft before it occurs. For example, in establishments where the protocol is to self-scan products before placing them in a shopping basket, if an unscanned product is detected in motion (away from is historical location) but has not been scanned into a basket, the detected movement could be an early warning of possible loss. A heightened risk may be signaled when movement of multiple products is detected all of which are not scanned into a basket.

According to some embodiments, computer readable medium may contain instructions for causing a 2.4 GHz device to simultaneously trigger and sequentially read a plurality of identification tags. A 2.4 GHz device, as used herein, refers to any device capable of transmitting and/or receiving an electromagnetic signal having a frequency in the range of 2.4 GHz WW ISM. A frequency range of 2.4 GHz may refer to any one or more portions of the UHF (Ultra High Frequency) band reserved for radiocommunications between fixed points, radiocommunications between mobile and/or land stations, radiolocation services, amateur radio services, and other particular radiocommunication services. Examples of devices that may operate within a frequency hand of around 2.4 GHz include, but are not limited to, cell phones, handheld scanners, desktops, laptops, video game consoles, smartphones, tablets, smart TVs, and other devices capable of wireless communication. Services and users of a frequency band of around 2.4 GHz may use certain radiocommunication technologies, such as Wi-Fi, Bluetooth Low Energy (BLE), and Classic Bluetooth, for wireless local area networking and personal area networking.

A 2.4 GHz device, or a 2.4 GHz transmitter may be an exciter device configured to transmit RF energy in the 2.4 GHz band. The exciter may transmit energy constantly, periodically, or intermittently, based on the design or configuration. The signal generated and transmitted by the exciter may be in the form of a radio signal, a magnetic signal, an electric signal, an electromagnetic signal, an audible or an ultrasound signal, a light signal, or any other form of energy capable of exciting an identification tag. In an establishment such as a retail store, for example, one or more exciters may be located throughout the establishment. An exemplary 2.4 GHz handheld exciter 11200 is illustrated in FIG. 11. Examples of 2.4 GHz handheld devices may include handheld tag scanners, Bluetooth-enabled cellphones, tablets, transmitters, and other devices capable of generating signals in the 2.4 GHz frequency band.

In some embodiments, the 2.4 GHz device may be configured to simultaneously trigger a plurality of identification tags. The identification tags may include wireless identification tags configured to receive energy wirelessly and in response to receiving the energy in a range appropriate for the tag, transmit a signal such as an identification signal. The identification tag is "triggered" or "activated" when it receives an electromagnetic energy or an electromagnetic signal capable of invoking a response signal. In a retail store environment, merchandise may be tagged with identification tags for security, tracking, inventory management, or enhancing shopping experience for customers. A device may be configured to simultaneously trigger a plurality of tags when it is programmed to emit a triggering signal with characteristics (e.g., sufficient power) to read not just a single proximate tag, but a group of tags in a vicinity of the device. The probe or trigger signal may be broadcast to perform an inventory update, an inventory query, a product information query, or other functions requiring retrieval of product-related information.

In some disclosed embodiments, instructions for causing a device to simultaneously trigger and sequentially read a plurality of identification tags may include displaying an activatable element on a graphical user interface, the element being configured to activate a 2.4 GHz transmitter. A graphical user interface (GUI) is an interface through which a user interacts with electronic devices such as computers, hand-held devices, smartphones, tablets, touchscreen devices, and other appliances. The graphical user interface uses icons, menus and/or other visual indicator (graphics) representations to display information and related user controls. Graphical user interface representations may be manipulated by a pointing device such as a mouse, trackball, stylus, or a finger on a touch screen. In some embodiments, the graphical user interface may be associated with the device or a processor performing the disclosed methods. In other embodiments, the graphical user interface may be associated with an external computing device, such as a mobile phone, a tablet, a laptop, a desktop computer, a computer terminal, a wearable device (including smart watches, smart glasses, smart jewelry, head-mounted displays, etc.), or any other electronic device capable of receiving a user input and displaying information.

An activatable element of the graphical user interface may be a portion, an icon, a link, a field, a button, or any other feature, which when selected by a user input such as a touch on a touchscreen, a click on a pointing device, a keystroke on a keyboard or a gesture in front of a camera, for example, is configured to respond to the user input. The active or the activatable element of the graphical user interface may be displayed such that the element is clearly visible on a screen of the graphical user interface as a textual representation, a pictorial instruction, or an audible sound file. Alternatively or additionally, the active or activatable element may be displayed such that the element is not clearly visible on a screen, but rather is hidden (such as, e.g., a "hot area" that responds to touch gestures without being explicitly visible) or hidden part of the time and visible part of the time (such as, e.g., an element that is hidden unless "hovered" over by a pointing device).

In some embodiments, the instructions may cause an activatable element to be displayed on a graphical user interface of an electronic device operated by a store personnel, prompting him/her to provide a user input. Upon receiving an input, the element may be activated to perform a preassigned function. The activatable element may be configured to activate a 2.4 GHz transmitter such that one or more signals of 2.4 GHz may be transmitted.

Figure 33C:
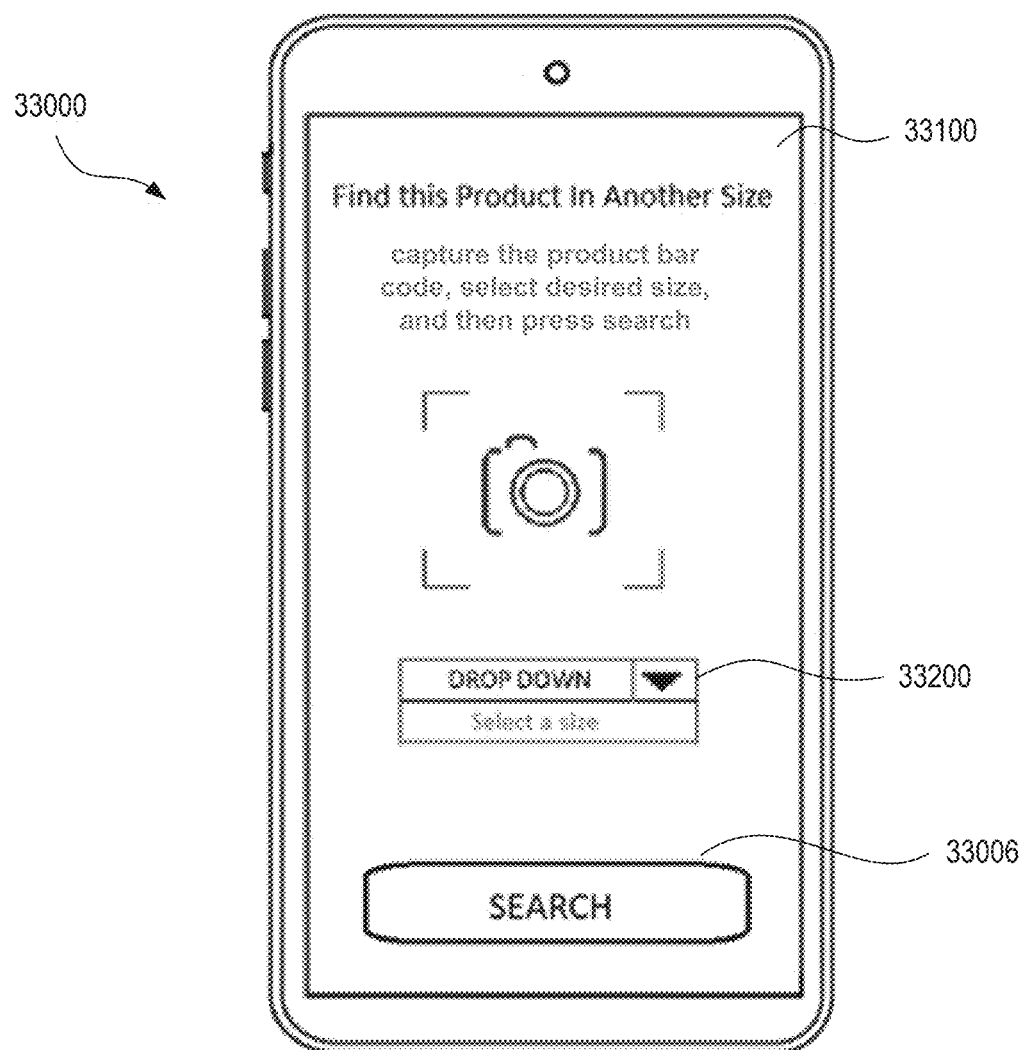
FIG. 33C illustrates a handheld device displaying a product size search graphical user interface, consistent with disclosed embodiments.

FIGS. 33A, 33B, and 33C illustrate a few non-limiting examples of graphical user interfaces displayed on handheld device 33000, which may, for example, be a cell phone. As a generic example, FIG. 33A is provided for discussion purposes and illustrates handheld device 33000 displaying a graphical user interface (GUI) 33100 for conducting an inventory search by enabling a user to enter data into the GUI 33100, and activating an element, such as a search button 33006. A search query may be initiated in many ways, such as by typing search text into a field, by scanning a related product with a scanner in handheld device 33000, or through the use of a drop down menu 33200. The drop down menu may provide the user with selection options in order for the user to define a search. Once the search is defined, search button 33006 may be touched on the touch screen of handheld device 33000 in order to initiate the search through a wireless transmission to a receiver, as will be described later in greater detail.

FIG. 33B illustrates handheld device 33000 displaying a product search GUI 33100. A user searching for a particular product or class of products may be provided with dropdown menu 33200. The drop down menu 33200 may provide the user with various ways to search for a product, by either entering a brand, SKU, inventory number, or model number. Sub-menus might appear following an initial selection. For example, if the brand drop down is selected, successive sub-menus might include category, product, size, color, or any other product distinguishing characteristic. Product images might appear in the GUI, enabling the user to select the product of interest. After the product is identified, search button 33006 may be activated by touch.

FIG. 33C provides yet another example of a GUI with an activatable button for searching. This example addresses the common scenario where a customer physically locates a product of interest, such as a clothing item, however the item is not in the customer's size. Instead of searching endlessly for the product in the correct size, the GUT 33100 may prompt the user to enter information about the product of interest. In this example, the customer (or employee of the establishment) may be prompted to take a picture of the barcode or QR code on the product identified by the customer. The user may next be prompted via dropdown menu 33200 to input a desired size, color or other variation of the product. After the search is defined, search button 33006 may be touched to initiate the search.

Following a look up, handheld device 33000 may return alternative sources of information, depending on the nature of the query, system design and/or user permissions. For example, the GUI may be caused to display that the requested product is either out of stock or in stock. If the product is out of stock, the GUI might identify a location where the product is in stock, or may provide an ability to order the product for shipment to the customer. If the product is in stock, the GUI might indicate the name of another department where the product is located. It may provide a map of the establishment, indicating a general location of the product. The GUI may provide walking directions directing the user to the area of the product. In some instances, as the user approaches the product's location, the tag of the product may transmit a signal either directly to handheld device 33000 or via an infrastructure transmitter in the establishment, to enable the user to hone-in on the product's location.

Depending on the nature of a query and the system design, the protocol for retrieving information may vary in response to activation of the GUI element. In one arrangement, handheld device 33000 may broadcast a signal to tags in the vicinity, and the tags may transmit their responses to handheld device 33000. In other embodiments, handheld device 33000 may initially transmit the query to an inventory management system for initial look up. The inventory management system might return the IDs of products matching the query. Or, if the item is out of stock, the inventory management system might provide that information for display through the GUI. If the product is in stock and a list of matching tag IDs is sent to hand device 33000, a transmitter such as a 2.4 GHz transmitter in device 33000 might send a trigger signal to cause tags in the vicinity to send back their unique tag IDs. A comparison might occur on the handheld device or on a remote system, to identify a match and alert the user. Alternatively, the inventory management system may already have a record of where each product is located, and rather than having the handheld device 33000 trigger responses from tags, might instead alert the handheld device 33000 of the prior known location. If that first step is unsuccessful in locating the physical product, the handheld device 33000 may only then probe tags in a vicinity.

The foregoing are just a few examples of search protocols and of graphical user interfaces with activatable buttons that may be employed with disclosed embodiments. GUI designs and functionality are endless within the scope of this disclosure.

When an element is activated, a transmitter may cause a query to be transmitted wirelessly via a transmitter. The meaning of the term transmitter, as used herein, is provided elsewhere in the present application. In some embodiments, upon activation of the element, the executable instructions may include activating the 2.4 GHz transmitter to cause each of a plurality of tags in a vicinity of the transmitter to send a unique tag ID to a receiver associated with the transmitter. The 2.4 GHz transmitter may be a stand-alone transmitter configured to emit a signal having a frequency around 2.4

GHz, may be part of a device or a circuit, or may be part of a system having multiple devices and circuits. In some embodiments, a transmitter may be capable of emitting a range of frequencies such as 900 MHz, 58-60 kHz, and/or 2.4 GHz. In this context, activating the transmitter may involve selecting the frequency range as a desired frequency to cause one or more identification tags to generate an identification signal, and configuring the transmitter to transmit a desired frequency.

The identification tags, in some embodiments, may include an antenna configured to receive the signal transmitted by the 2.4 GHz transmitter. An antenna may be configured to receive a particular frequency range when the antenna is appropriately tuned for that function. Consistent with disclosed embodiments, a 2.4 GHz transmitter, such as an exciter, may only "excite" or activate identification tags located within the transmission range of the exciter. Alternatively, an identification tag may be excited or activated depending on whether the transmitted signal is in the reception range of the tag. Any tag which is located at a distance from a given transmitter which is shorter than the transmission range is said to be "within range" of the transmitter, or"in the vicinity" of the transmitter, or "proximate" the transmitter. For example, the transmission range of a Wi-Fi access point can range from a few meters when the access point is transmitting data at its maximum data rate, but may extend to dozens of meters (sometimes even 100 meters or more) when transmitting at its lowest data rate. One of the differences between those two conditions is the receiver sensitivity, which may be at a much lower power level for the low data rate compared with the high data rate. In the same manner, walls, people, furniture and other obstacles or reflectors may reduce or extend the transmission range by changing the attenuation of the communication medium, without any change of the transmitted power level or the receiver sensitivity.

The identification tag may further include a transmitter configured to transmit an identification signal in response to receiving a signal from another transmitter such as the 2.4 GHz transmitter in handheld device 11200 illustrated in FIG. 13.). The signal transmitted by a tag may include an identification signal, which may be unique to the tag. For example, the identification signal may include a unique identification code or a sequence permitting the tag to be identified by a processor accessing a data structure.

Consistent with some disclosed embodiments, the signals transmitted by one or more tags may be received by a receiver associated with the transmitter that caused the identification tag to transmit an identification signal in response to the excitation signal. As used herein, an association between two components or devices may refer to being in direct or indirect wired or wireless electronic communication or logical connection with each other, constantly or intermittently, or in response to an activity that may require both the components to cooperate. For example, if a processor causes a transmitter in a system to transmit a signal so that a receiver in the same system receives a response caused by that signal, the transmitter and the receiver may be said to be "associated with" each other. In some embodiments, a receiver may be associated with more than one transmitter, or more than one receiver may be associated with a single transmitter, or multiple receivers may be associated with each of the multiple transmitters. In the case of a handheld transmitter, such as handheld device 11200 in FIG. 11, the transmitter and receiver may be considered associated because they may be contained within the same housing and/or may be connected to the same processor or to other circuits. They may further be considered associated because the transmitter of the device may send a triggering signal to tags in order to cause the tags to respond with signals for receipt by the receiver contained within the same device.

One or more receivers may be associated with the 2.4 GHz transmitter, consistent with some disclosed embodiments. In some embodiments of this disclosure, the 2.4 GHz transmitter and the associated receiver may both be a part of the same device, such as a device that is part of fixed infrastructure or a handheld device, as was described earlier. Other examples of handheld devices include a handheld scanner provided to an employee or a customer by the establishment for use during working routines or in a shopping session; a mobile communications device of such an individual (e.g., cellphone, tablet, dedicated hardware, etc.); or any other handheld device capable of performing the functions of a receiver. A customer or employee may, for example, use handheld device 11200 as a handheld scanner, which may be a device dedicated to scanning or any other mobile device capable of performing the functions of a transmitter and the associated receiver. Such a configuration may be in play, for example, when a customer uses a handheld scanner to scan the identification tag to receive product information such as pricing, expiry, inventory, etc. In some embodiments, the handheld scanner may include one or more transceivers, each of which is configured to deliver energy 12100 to the wireless communication tags (similar to exciters 11400a-e) and to receive broadcasts of ID signals 12200 from the wireless identification tags (similar to receivers 11300a-h); that is, each transceiver may act both as an exciter and a receiver. In some alternative embodiments, such as the embodiment illustrated in FIG. 11, exciters 11400 and receivers 11300 may be configured as separate devices.

In some disclosed embodiments, the executable instructions may further include reading a first group of the plurality of unique tag IDs during a first time interval, wherein the first group excludes a second group of the plurality of unique tag IDs. As alluded to earlier, one of several issues encountered in inventory management using wireless identification systems includes "signal collision" which may limit a receiver's ability to accurately detect, receive, and/or interpret more than one signal at a time. Signal collision may occur when, more than one signal arrives at a receiver while the receiver is actively reading a signal. In some cases, signal collision may cause an irreversible loss of information associated with one or more signals at the receiver.

Some aspects of this disclosure relate to sequentially reading the identification signals generated by a plurality of identification tags in response to an excitation signal (also referred to in this disclosure as a probe or probing signal or as trigger or triggering signal) transmitted by an exciter, such as a 2.4 GHz transmitter. As used herein, sequential reception refers to a phenomenon where at any given time, a limited number of discrete signals (e.g., one signal) may be received and/or interpreted. This may enable, at the output of the receiver, the received signals to be listed in an ordered, non-overlapping, sequential list. In some alternative embodiments, signals may arrive at the receiver in a random or a pseudo-random manner, which means that there is no guarantee that any particular signal will be accurately received and interpreted. Although the risk may be infinitesimal, there is a statistical possibility that multiple signals will arrive simultaneously at a receiver, causing a collision and blocking the reception of both signals. The chance of such an occurrence may depend on traffic volume, the rate of signals over the channel and the length of time of each signal. However, after removing all collision signals (which, assuming the signals are short enough and sparse enough, may constitute a very small portion of all signals), all remaining signals would be accurately received and interpreted by a sequential receiver, thereby resulting in a sequential list of received signals.

Thus, In some embodiments, a receiver might read less than all signals arriving at the receiver. The signals that are read may constitute a first group. The signals that are not read at the same time may constitute a second group.

The instructions may further include recording information associated with the first group of unique tag IDs. The recorded first information may include the tag IDs of the first group, excluding the tag IDs of the second group. Recording data, as used herein, may refer to saving, writing, tabulating or otherwise applying to a medium identifying, from among the at least some of the unique tag IDs of the first group and the unique tag IDs of the second group, unique tag IDs that were read with the first group, information that may be accessed at a later point in time. The recorded data may include both the available data itself, as well as other relevant pieces of information associated with the data such as time-stamp, signal strength, the entity performing the recording, or any other information regarding the circumstances of the recording of the data which may be useful at a later time. The information may be recorded in a database, a data structure, a server, a computer, a memory, a network, or other system capable of storing information. The information may be recorded in a format such that it may be accessed at a later point in time by using a query executed using, for example, a processor or the transmitter device. The information associated with the first group of unique tag IDs may include information related to, but is not limited to, pricing, style, size, quantity, cleaning instructions, or storage instructions of a piece of clothing, for example. The first group of unique tag IDs may represent identification tags associated with a particular product, or a category of the product, or products located in a particular zone/section of the establishment. For example, first group may represent items of the furniture section of the store, or the stationery section, or the pharmacy section of the store. Alternatively or additionally, first group may represent a random collection of tags from among the plurality of tags that responded to the transmitted trigger.

As used herein, a time interval may refer to a period of time that may be measured between the occurrence of two events in the system. The two events may be, for example, an input, stimulus or trigger into a circuit and the output or action performed by the circuit, or two occurrences of an input, stimulus or trigger, or two occurrences of an output or action of the same circuit, or of different circuits. When measuring time intervals between repeating occurrences of the same event (whether such events are inputs or outputs), one may refer to an average time interval as the periodicity of the events and to the deviation from the average time interval as the variance in the periodicity. In such cases where this kind of periodicity occurs, one may calculate the frequency of the events as the inverse of the average time interval between events, and the duty cycle of the events as the ratio between the average time length of each event (from the start of the event to its finish time) and the average time interval between events (as measured from the start of one event to the start of the succeeding event).

A time interval when the first group of unique ID tags is received may be on the order of milliseconds, for example. It may be defined as a period of time in which some signals arriving at a receiver are decipherable by the receiver, while other signals are not, due, for example, to signal collision or receiver overload.

In some embodiments, time intervals may be predetermined. For example, consistent with some disclosed embodiments, sequential reception may involve reading a group of unique tag IDs for a predetermined length of time. That is, a first time interval may end at a preprogrammed time, which could be a fixed number or might be set by algorithm depending on a variety of factors. For example, interval times may be based on the transmission range of the identification tag, power level of the transmission signal, frequency, total detected traffic volume, and/or other factors that may attenuate or enhance signal reception. For example, the interval may be 5 milliseconds (ms) or less, 4 ms or less, 3 ms or less, 2 ms or less, 1 ms or less, or 0.5 ms or less. Following the interval, the receiver may be deactivated for a time interval, or may immediately begin reading in a second interval. For example, in some embodiments, after reading the first group, the 2.4 GHz device may maintain activation of the transmitter during a second time interval, to cause transmission of at least some of the unique tag IDs of the first group along with the unique tag IDs of the second group to the receiver. This may occur as a precautionary measure, as the receiver may not know that it missed some responsive signals. Thus, the transmitter may remain active to cause the tags in the vicinity to respond a second time during a second time interval following the first time interval. The second time interval may have the same or similar characteristics to the first time interval, as discussed above. During the second time interval, at least some of the first group of tag IDs will be received again, along with unique tag IDs of the initially excluded second group. However, all of the tags IDs of the first group may not be read in the second interval. The excitation signal during the second time interval will not only activate the second group of identification tags but will also activate at least some of the identification tags of the first group as well. As a result, signals from tags in the first and second groups will be received during the second time interval.

The 2.4 GHz device may be repeatedly activated or maintained in its activated state through even more than two time intervals until each unique tag intended to be scanned has been read. While described in connection with a 2.4 GHz device, in a broader sense, any frequency device may be employed, including, for example devices that operate in a 900 MHz frequency range or other ranges in which a tag is able to receive energy and be triggered.

In one use case example, a store manager may activate one or more exciters of the establishment or use a handheld device to generate an inventory status report at the end of the work day. Because of the signal collision arising from multiple transmission signals arriving at the receiver simultaneously, there is a potential risk of irreversible loss of information, misreads (data mixing from other tags), missed reads (the tag not being read at all), signal crosstalk, or other defects that may affect the data reliability and accuracy. To minimize the risk that some data might not be received, the transmitter might repeatedly probe tags in a series of time intervals until a confidence level is reached that all tags are accounted for. Thus, the device may be configured to continue transmitting the excitation signal to activate the identification tags repeatedly until the unique tag ID of each tag of the plurality of tags is individually read and recorded.

The second information associated with the second group may be recorded after reading the at least some of the unique tag IDs of the first group along with the unique tag IDs of the second group. Although the first group of signals may have been already recorded in response to information read during the first time interval, they may be received in the second time interval as well, along with the second group that were not recorded initially. After both are read, the second group may then be recorded.

For example, as a 2.4 GHz transmitter continues to transmit the excitation signals during a second interval, each tag within the transmission range of the transmitter may be excited, regardless of whether the tag was excited during a first time interval. Therefore, the group of unique tag IDs received during the second time interval, may include the second group not initially received in addition to one or more of the first group of unique tag IDs received during the first time interval. Since the first group was already recorded, the second information that is recorded may exclude the first group, and only include the second group. Alternatively, the second information may include information relating to at least some of the first group. For example, time stamps associated with the first group might be updated to reflect the last time they were read.

Consistent with some disclosed embodiments, recording the second information may involve identifying the unique tag IDs that were read with the first group, and excluding the information associated with the identified unique tag IDs of the first group. As discussed above, since the first group was already recorded, there may not be a need to record that information again, and therefore it might be excluded from recordation the second time around.

Exclusion may involve comparing tag IDs read during the first and second time intervals, and omitting from recording those from the second time interval that were already recorded in the first time interval. To accomplish this, both tag IDs and timestamps may be accessed. For example, each unique tag ID received by a receiver may be time-stamped and those time stamps may be used as a way of avoiding repeat recording of the same tag. In some embodiments, the non-transitory computer readable medium may contain instructions that when executed cause a device to display at least one of the first information or the second information on the graphical user interface. After receiving the first and the second information associated with the first group and the second group of unique tag IDs, respectively, the device may be configured to display one or both of the first and the second information on a screen of the graphical user interface, or to display part of the first information, part of the second information, or part of each. In some disclosed embodiments, the first and/or the second information may be displayed on the graphical user interface after receiving and recording the information in a database or a data structure. In some other embodiments, the graphical user interface may include an interactive display configured to receive user input. Alternatively or additionally, derivative data may be provided. For example, in connection with the end of the day inventory check discussed above, if tag IDs are not received from tags associated with unsold products in the inventory management system, the display might indicate those products as lost or stolen.

In some aspects of the present disclosure, each tag of the plurality of tags is associated with a unique tag ID and is configured to encrypt the unique tag ID thereof and send the encrypted tag ID to the receiver. A tag may be configured to encrypt its associated unique tag ID and transmit the encrypted tag ID to a receiver, in response to an excitation signal generated by an exciter or a 2.4 GHz device. In some embodiments, the encrypted tag ID may be a part of the identification signal sent to one or more receivers associated with the exciter. In some alternative embodiments, the encrypted tag ID may be sent to the receiver as a separate signal.

In some aspects of the present disclosure, the instructions stored in the non-transitory computer readable medium may include continuously activating a transmitter to cause each of the tags to continuously send to the transmitter the unique tag IDs. As previously alluded to, a device may probe tags in two or more intervals. The probing may be continuous until a confidence level is reached that all responses are received and read. This may occur through continuous activation of the a transmitter (such as a 2.4 GHz transmitter) and a an associated receiver might similarly continuously receive and eliminate duplicates until no new tag IDs are received.

In some disclosed embodiments, the instructions may further include sequentially reading each unique tag ID which may be a part of the identification signal transmitted by a tag in response to an excitation signal. Sequentially reading each unique tag ID may involve receiving one unique tag ID at a time or receiving one unique tag ID during a time interval. As a result, each incoming unique tag ID may be received and interpreted accurately to process the associated information. The processed information may be listed in an output signal format comprising an ordered, non-overlapping, and sequential list of received signals. In some disclosed embodiments, the instructions may further include aggregating data associated with each unique tag ID to construct an inventory of products simultaneously activated and sequentially read. Upon sequentially receiving each unique tag ID, the data associated with each unique tag ID may be compiled, ordered, and stored in the database to form an inventory of products or tags representing the products whose tag IDs were sequentially read.

In some aspects of the present disclosure, the non-transitory computer readable medium may contain instructions to display on the graphical user interface an inventory of information associated with the plurality of tags in the vicinity of the transmitter. Inventory information derived as the result of the processes described herein may be used to display information on the GUI of a device seeking the inventory information, as discussed earlier. For example, consistent with some embodiments, inventory of information may include a list or a collection of information associated with at least one of a tag ID, an ownership history list, an encryption key, an SKU, or a location associated with each of the plurality of tags. The inventory of information may include a wide range of information directly or indirectly associated with the tag or tags or the item or items to which the tags are attached. For example, a directly associated information may include location of the tag within the store, which may correspond to the location of the product in the store. As used herein, an encryption key may refer to a password or a passcode, or any piece of data that enables a user to gain controlled access to confidential or non-public information. The inventory of information may further include information associated with an SKU (Stock Keeping Unit) of an item. A SKU may be a number, code or other form of data which is uniquely associated with a type of product, item, object, material etc. as part of a stock management system, inventory keeping system, or other such data management platform. Examples of SKU's are EPC codes, barcodes, ISBN codes, product numbers, part numbers, catalog numbers, etc.

In some disclosed embodiments, the non-transitory computer readable medium may store instructions to enable a user to identify a missing product, and displaying on the graphical user interface an indication that the missing product is in the vicinity of the transmitter. The instructions may include analyzing data within the inventory of information to identify missing products. The analysis may include executing a query to compare an inventory data of "available items" to the inventory of items physically located in the store. In some embodiments, if the inventory of available items in the database is not updated, the instructions may additionally include comparing a database of "sold items." If the item does not exist in the sold items database and the physical location database, but exists in the inventory data of the available items, the item may be identified as "missing." Upon identification, the instructions may include displaying the indication on the graphical user interface that the product is missing. Additional information relating to location of missing items is described in connection with FIGS. 33A, 33B, and 33C.

In some disclosed embodiments, the instructions may further include displaying a location of the missing product on the graphical user interface. For example, the graphical user interface may not only display the information that the product is missing, but also display the information associated with its original location from which it is missing. This information may be displayed on the graphical user interface to which the user has access. Some mechanism for identifying locations of missing items are described herein in connection with FIGS. 33A, 33B, and 33C.

Some aspects of the present disclosure relate to a device for simultaneously triggering and sequentially reading a plurality of tags. The device may include a 2.4 GHz transmitter, a receiver, and at least one processor. The at least one processor may be configured to, for example, activate the 2.4 GHz transmitter, activate the receiver to sequentially receive the transmitted signals from the plurality of tags, record the information received by the receiver, among other functions depending on the mode of operation.

In some disclosed embodiments, the processor may be configured to periodically activate the 2.4 GHz transmitter to cause each of a plurality of tags in a vicinity of the transmitter to send a unique tag ID to the receiver. The processor may activate the transmitter by, for example, modulating the current supplied to the transmitter or a part of the circuit of the transmitter to cause the transmitter to emit electromagnetic waves having a frequency in the range of 2.4 GHz. The emission of the electromagnetic signals may activate one or more identification tags located within the transmission range or in the vicinity of the transmitter. Upon activation, each of the identification tags may send a unique tag ID to the receiver associated with the transmitter. In some embodiments, the unique tag ID may be a part of the identification signal transmitted from the tag.

Consistent with some disclosed embodiments, the 2.4 GHz transmitter may be periodically activated. Periodically activating the 2.4 GHz transmitter may involve activating the 2.4 GHz transmitter at a predetermined time interval. This means that the transmitter may be in an activated state, actively generating excitation signals for a time interval. The time interval may be followed immediately by a second time interval of activation, or there may be a period of inactivity between two active state intervals. In the latter instance, the periodicity of the activated state and the deactivated state may be predetermined, or adjusted based on the information desired. For example, the transmitter may be activated every 30 seconds followed by a deactivation for 30 seconds, resulting in a duty cycle of 50%, or the transmitter may be activated every 10 seconds followed by a deactivation for 30 seconds, resulting in a duty cycle of 25%. Alternatively, the processor may randomly select a time interval between two consecutive activations of the 2.4 GHz transmitter. In some embodiments, the processor may randomly select a time interval between two consecutive deactivations as well.

The processor may further be configured to read a first group of the plurality of unique tag IDs during a first time interval, wherein the first group excludes a second group of the plurality of unique tag IDs. The signals transmitted from each of the tags may be received by one or more receivers (e.g., a receiver in a handheld device such as in 11200 or receivers 11400*a-h*) for a length of time, defined herein as the first time interval. The signal may include a plurality of unique tag IDs associated with the plurality of identification tags responding to the excitation signal received from the 2.4 GHz transmitter. Upon receipt, the processor may record the information associated with the group of unique tag IDs received during the first time interval.

After reading the first group, the processor may be configured to maintain activation of the 2.4 GHz transmitter during a second time interval, to cause transmission of at least some of the unique tag IDs of the first group along with the unique tag IDs of the second group to the receiver. In some embodiments, the processor may re-activate the 2.4 GHz transmitter, based on the duty cycle, for a second time interval to excite the plurality of identification tags such that each of the identification tag in the transmission range of the transmitter may respond to the excitation signal by transmitting a unique tag ID to the receiver associated with the transmitter. In a periodic activation cycle of the transmitter, the second time interval may be substantially similar to the first time interval. The second group of unique tag IDs may include, in addition to the new group of unique tag IDs, some of the unique tag IDs already sent to the receiver as well.

After reading the at least some of the unique tag IDs of the first group along with the unique tag IDs of the second group in the second time interval, the processor may be configured to record second information associated with the second group. Because the excitation signal activates all the plurality of identification tags in its transmission range, the as-received second group of unique tag IDs may include duplicate unique tag IDs from the first group already sent to the receiver. This may cause the same tag to be read multiple times.

Based on the received first and second group of unique tag IDs, the processor may be configured to identify, from among the at least some of the unique tag IDs of the first group and the unique tag IDs of the second group, unique tag IDs that were read with the first group. The processor may identify from the second group, unique tag IDs that were read with the first group and may label the identified unique tag IDs in the second group that were read with the first group as "duplicate," for example. The processor may use any labeling or tagging technique to differentiate the unique tag IDs that were already read with the first group from the unique tag IDs read in the second time interval. The processor may then record the second information while excluding information associated with the identified tag IDs that were read with the first group. Information may be excluded from being recorded a second time because of its duplicate nature. In some disclosed embodiments, the processor may be configured to update a data structure with at least one of the first information or the second information. For example, when there are new items or replaced items shelved in a store, not existing prior to the last inventory update scan, the processor may determine the new additional items and update a data structure, such as a memory, a server, a cloud based network, or any form of storing data.

Embodiments of the present disclosure may relate to methods, systems, devices, and computer readable media for a wireless identification tag configured to collect and store ambient energy for use in delayed transmission. For ease of discussion, aspects of methods, systems devices and computer readable media are discussed interchangeably herein such that reference to one form is equally applicable to another form and is therefore not necessarily repeated. In addition, some aspects of some embodiments may occur electronically over a network that is either wired, wireless, or both. Other aspects may occur using non-electronic means. In the broadest sense, the disclosed embodiments are not limited to particular physical and/or electronic instrumentalities, but rather may be accomplished using many differing instrumentalities.

According to some embodiments, the wireless identification tag may collect and store ambient energy. Collecting ambient energy may include wirelessly gathering, harvesting, and/or acquiring energy from an external source or environment of the tag. Storing ambient energy may include accumulating, saving, or aggregating the collected ambient energy for use at a future time.

FIG. 11 illustrates a non-limiting embodiment of a plurality of wireless identification tags (e.g., tag 1100a and/or tag 1100b) operating in an environment such as a clothing retail establishment. For example, environmental exciters such as exciters 11400 and mobile devices such as device 11200 may emit wireless signals carrying energy in electromagnetic fields, which may contribute to the ambient energy in the environment. The tags may be configured to collect and store the ambient energy from some or all of these wireless signals present in the establishment.

In some embodiments, the exemplary wireless identification tag may be configured to use stored ambient energy for delayed transmissions. In context of electrical or electronic circuits, the act of transmitting may involve transforming a signal or energy from a conducted input to a radiated output, often by a transmitter through an antenna. A delayed transmission may be an action of transmitting a signal or energy after a prior event (such as a trigger or investigating event), with a time delay occurring between the prior event and the transmission. Here, a time delay may be a time interval between two events; the time delay may have a predetermined duration, a duration selected randomly or pseudo-randomly, or a duration otherwise selected by user input and/or by a controller of the wireless identification tag. In some embodiments, the prior event occurring before the time delay may include, but is not limited to, receiving and/or storing energy (e.g., ambient energy), receiving a request or a command to transmit a signal or energy, an initiation or completion of a task, or meeting or failing to meet a criteria.

According to some embodiments, a prior event occurring before the time delay may be the reception of ambient energy by the wireless identification tag and the storage of the ambient energy for later use by the wireless identification tag. For example, instead of immediately expending the received ambient energy in a transmission, the wireless identification tag may store the received ambient energy for a transmission at a later time. The transmission at the later time may be an example of the delayed transmission. Additionally or alternatively, a prior event may be a determination that the amount of ambient energy stored in the wireless identification tag is equal to or greater than a first threshold value, and the wireless identification tag may delay transmission of a signal until the level of stored ambient energy is equal to or greater than a second threshold value, higher than the first threshold value.

In various embodiments, the wireless identification tag may include a receiver for receiving ambient energy. A receiver may be any component, group of components, or circuitry capable of receiving a signal over a communication medium. The communication may take the forms of Wi-Fi. Bluetooth, cellular communication, Ethernet communication or any other standards-based or proprietary protocol. In some embodiments, a receiver may include an antenna and one or more of an oscillator, demodulator, filter, amplifier, frequency tuner and/or other circuit elements.

In some embodiments, the receiver may be tuned to ambient energy transmitted at specific frequencies. For example, a receiver may be configured such that its antenna and associated components are tuned to electric and/or magnetic fields of a specific frequency, or a specific set of frequencies. In some embodiments, the wireless identification tag may include multiple receivers, each tuned to receive ambient energy transmitted at a different frequency.

For example, the wireless identification tag may include a first receiver for receiving ambient energy transmitted at a first frequency within a frequency band around 2.4 GHz. Additionally or alternatively, the wireless identification tag may include a second receiver for receiving ambient energy transmitted at a second frequency within a frequency band around 900 MHz. Or, a single receiver may be capable of receiving both a first frequency within a frequency band (e.g., around 2.4 GHz), and a second frequency in a frequency band (e.g., around 900 MHz.)

FIG. 9 illustrates non-limiting embodiments of a wireless identification tag including a receiver for receiving ambient energy. The receiver may include multi-source harvester 2102, gate detection circuit 2106, and memory 9022 (or a portion of the foregoing), which may also be coupled to top level controller 9020. Multi-source harvester 2102 may include 2.4 GHz harvester 9014, which may be coupled to 2.4 GHz antenna 2114 through switch 9034; 900 MHz harvester 9012, which may be coupled to 900 MHz antenna 2112; and power manager 9010, which may be coupled to top level controller 9020. By way of example, 2.4 GHz harvester 9014 and 2.4 GHz antenna 2114 may constitute the first receiver, and 900 MHz harvester 9012 and 900 MHz antenna 2112 may constitute the second receiver. It should be noted that each of the forgoing components may be made up of multiple circuits, and therefore reference to a circuit may relate to a single component or portion thereof.

Figure 34:
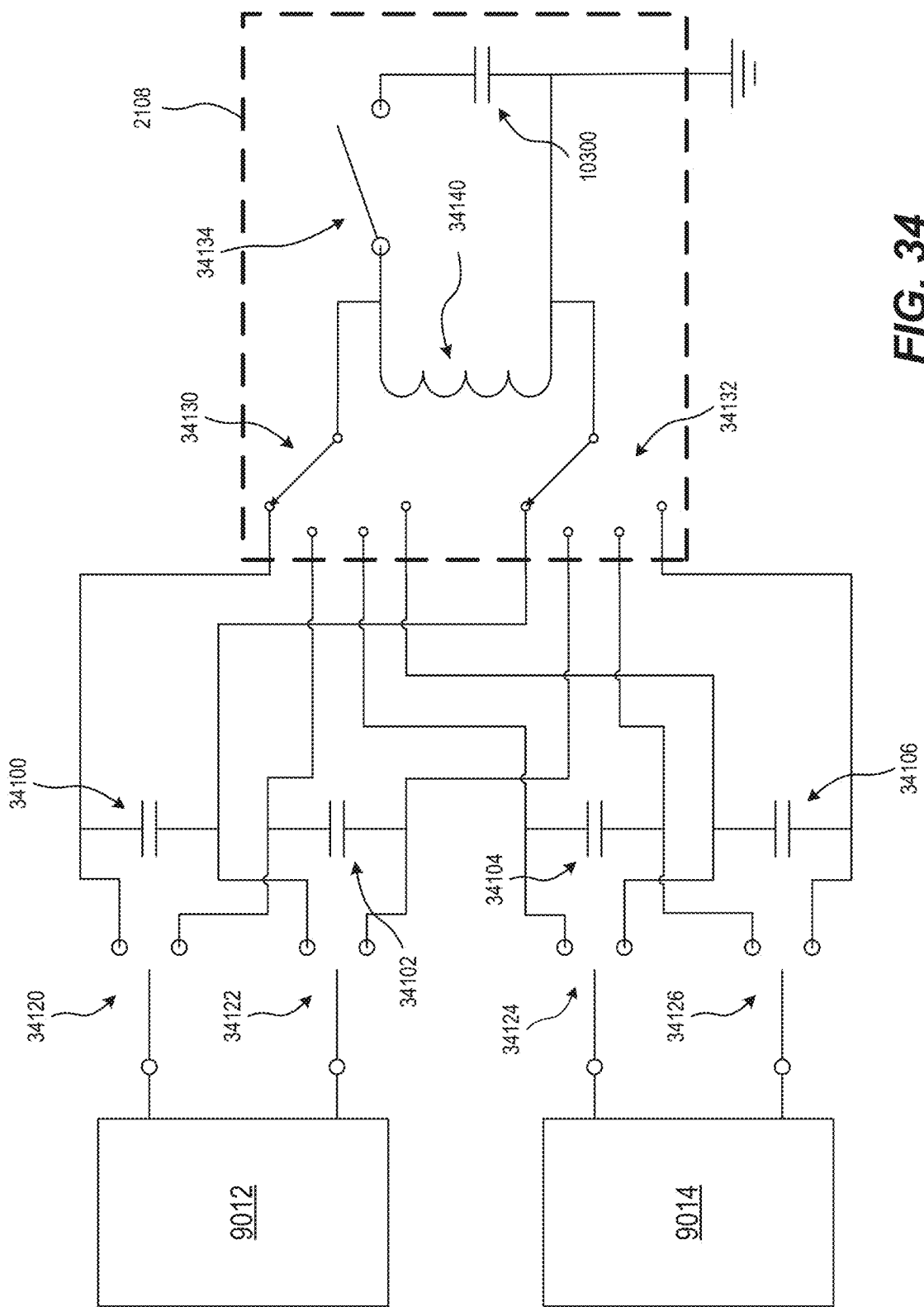
FIG. 34 is a block diagram of exemplary system for harvesting and storing ambient energy, consistent with disclosed embodiments.

In various embodiments, the wireless identification tag may include a first capacitor for storing the ambient energy. A capacitor may include any capacitive structure used to store an electrical charge through the use of charged plates separated by insulation. Examples of capacitors may include ceramic capacitors, film capacitors, power film capacitors, electrolytic capacitors, supercapacitors, class X and class Y capacitors, MOM capacitors (Metal-Oxide-Metal capacitors) implemented inside a semiconductor device, MIM capacitors (Metal-Insulator-Metal capacitors) implemented inside a semiconductor device, MOS capacitors (Metal-Oxide-Semiconductor capacitors) implemented inside a semiconductor device, other miscellaneous or variable capacitor. As shown in FIG. 10 and FIG. 34, energy storage circuit 2108 may contain a first capacitor, illustrated by way of example only as storage capacitor 10300. The storage capacitor 10300 may be electrically connected through the circuitry illustrated in FIG. 10 and FIG. 34 to 900 MHz harvester 9012 and 2.4 GHz harvester 9014 in order to store ambient energy received by those harvesters. While illustrated as a single capacitor, there may be multiple storage capacitors for storing ambient energy.

Figure 35:
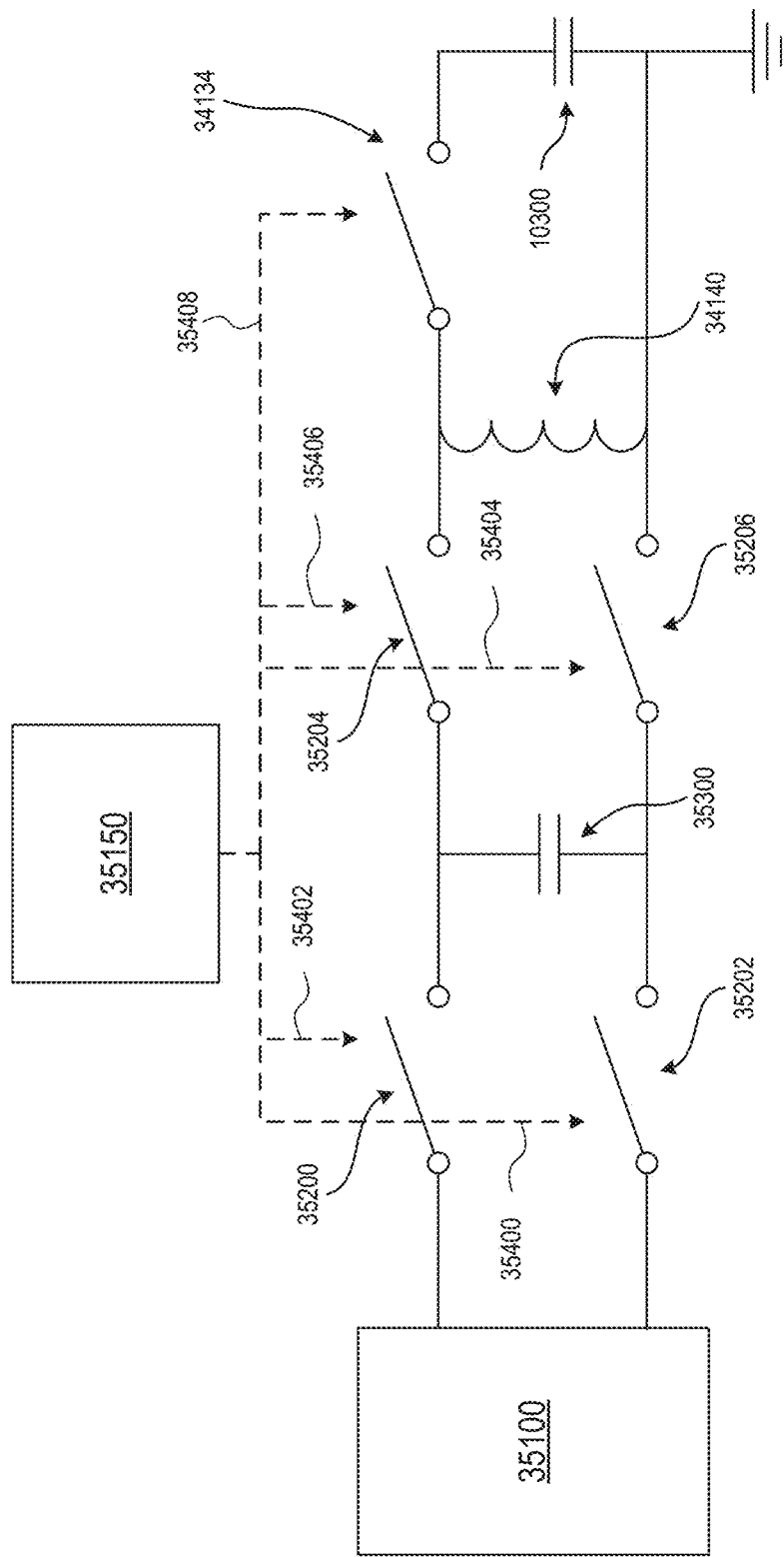
FIG. 35 is a block diagram of another exemplary system for harvesting and storing ambient energy, consistent with disclosed embodiments.

In various embodiments, the wireless identification tag may include a second capacitor for collecting and storing the ambient energy, the second capacitor having lower capacitance than the first capacitor. Additionally or alternatively, the wireless identification tag may include a plurality of second capacitors for collecting and storing ambient energy, and each of the plurality of second capacitors may each have lower capacitance than the first capacitor. A capacitance of a capacitor describes the ability of a capacitor to store electrical charges at a given electric potential (i.e., voltage). Capacitance may be measure in units of farad (F), milli-farad (mF), micro-farad (µF), nano-farad (nF), or pico-farad (pF). By way of example, as illustrated in FIG. 35, a second capacitor may include transfer capacitor 35300 disposed between energy harvester 35100 and storage capacitor 10300. In some embodiments, energy harvester 35100 may correspond to one of 2.4 GHz harvester 9014 and 900 MHz harvester 9012. In yet another embodiment illustrated in FIG. 34, a second capacitor may include one of transfer capacitors 34100 and 34102 disposed between storage capacitor 10300 and 900 MHz harvester 9012. A second capacitor may also include, by way of example, one of capacitors 34104 and 34106 disposed between storage capacitor and 2.4 GHz harvester 9014.

In some embodiments, the capacitance of the second capacitor may be less than 1 nF. Alternatively, the capacitance of the second capacitor may be less than 100 pF. In other embodiments, the capacitance of the first capacitor may be at least 10 nF or at least 100 nF.

In various embodiments, the wireless identification tag may include an inductor interconnecting the first capacitor and the second capacitor. An inductor may include any electronic component that stores energy in the form of a magnetic field. For example, it may include a reactive structure used to store energy in a surrounding magnetic field through the use of conducting pieces, which may be wounded around a core. Examples of inductor structures may include air core inductors, RF inductors, litz wire, ferromagnetic inductors, film inductors, multi-layered inductors, variable inductors, choke, and other miscellaneous inductors. By way of example, as illustrated in FIG. 35, inductor 34140 may be disposed in between storage capacitor 10300 and transfer capacitor 35300. In another example illustrated in FIG. 34, inductor 34140 may be disposed in between storage capacitor 10300 and transfer capacitors 34100, 34102, 34104, and 34106.

In various embodiments, the wireless identification tag may include circuitry interconnecting the receiver, the first capacitor, and the second capacitor. A circuit or a circuitry, as used in the present disclosure, may refer to a component, or a combination of components, elements, and/or devices, which may be electronically coupled by wired or wireless connections. In some embodiments, a circuit may be implemented as part of a silicon chip, as part of a printed-circuit board, as part of a connectorized system or as a combination of any of the above, connected in a manner enabling the performance of a desired function or reaction as a response to some inputs, stimuli and/or triggers, generated either internally or externally. A desired function or reaction includes, but not limited to, control of other circuits, generating visual, audible, or otherwise communicable alerts or signals, causing a transmission, and/or performing any other operation. For example, the components, elements, and/or devices may include, but are not limited to, resistors, capacitors, inductors, conductors, transistors, diodes, transmission lines, inverters, buffers, logic gates, latches, flip-flops, amplifiers, comparators, voltage sources, current sources, switches, and/or other electrical devices. Inputs, stimuli and/or triggers may include, but are not limited to, a voltage level, a voltage level change, a current level, a current level change, a frequency, amplitude or phase change of a received signal, a digital input, a digital pulse, a control word, and/or other signals in various form of energy. As used herein the term "circuit" or "circuitry" may include two or more electrically connected components, which may be considered a single circuit or multiple circuits.

By way of example, as illustrated in FIG. 35, circuitry may include some or all of switches 35200 and 35202, configured to connect/disconnect energy harvester 35100 (one example of a receiver) to transfer capacitor 35300 (one example of a second capacitor); switches 35204 and 35206, configured to connect/disconnect transfer capacitor 35300 and inductor 34140; and switch 34134, configured to connect/disconnect inductor 34140 and storage capacitor 10300 (one example of a first capacitor).

In various embodiments, the circuitry may interconnect the receiver, the first capacitor, and the second capacitor in a manner such that ambient energy received by the receiver may be initially stored in the second capacitor, and is subsequently transferred to and stored in the first capacitor. As previously discussed, the second capacitor may be a transfer capacitor for temporarily storing ambient energy collected in form of electrical energy, and the first capacitor may be the storage capacitor functioning as the main store of the collected ambient energy in a form of electrical energy.

In a given circuit, electrical charges may flow from one portion to another, redistributing themselves in order to equalize the electric potential across the entire circuit. This may detrimentally affect the amount of energy stored in the storage capacitor since the amount of stored energy is not proportional to the amount of charge, and energy is lost when charges are redistributed between capacitors. The additional issue of leakage from the storage capacitor may be mitigated by employing one or more additional circuit elements in between the storage capacitor and the rest of the circuit, such that the additional circuit elements prevent unwanted discharge of energy stored in the storage capacitor. The additional circuit elements may include active and passive elements, such as switches, resistors, capacitors, inductors, and other circuit components.

In some embodiments, the receiver may receive ambient energy, and convert that energy into a usable or storable form. In the context of electric and electronic circuits, the ambient energy may be received from electric and/or magnetic fields, and then converted into electrical energy. The converted energy is first collected in the second capacitor, and then transferred to the first capacitor. The first capacitor, second capacitor, and inductor may be interconnected by a series of switches configured to connect/disconnect these components to and from each other. The use of the second capacitor, connected by switches, as an intermediary between the receiver and the first capacitor, may mitigate the issue of unwanted energy discharge by helping to isolate the first capacitor. In some embodiments, the transfer of energy may be performed through the inductor disposed in between the first and second capacitor, which may improve the energy transfer efficiency between the first and second capacitor. For example, if there is no inductor between the first and second capacitor, the energy from one capacitor will flow to another capacitor until the voltages of the capacitors equalize. This situation results in inefficient energy storage, since the voltage of the first capacitor would be limited by the voltage of the second capacitor, which in turn would limit the amount of energy the first capacitor may store (since, if the voltage of the first capacitor is higher than the second capacitor, energy will flow away from the first capacitor and into the second capacitor to equalize the voltages).

When an inductor is provided, a different energy transferring mechanism may occur. An inductor connected to a capacitor may form a harmonic oscillator, and the energy may flow between the inductor and the capacitor as an oscillation. Taking advantage of the oscillation, switches may be timed to disconnect the inductor and the capacitor at a time when the energy is predominately residing in one element and not in the other, trapping most of the energy in only one element. With this configuration, energy may be continuously transferred from the second capacitor to the first capacitor, even if the first capacitor may have a higher voltage level than the second capacitor.

In a non-limiting embodiment illustrated in FIG. 35, energy harvester 35100 may receive ambient energy transmitted at one of 900 MHz frequency band and 2.4 GHz frequency band, and transform the received ambient energy into electrical energy for storage. During a time period when the ambient energy is being collected, switches 35200 and 35202 may connect energy harvester 35100 to transfer capacitor 35300. When the ambient energy collection period ends, switches 35200 and 35202 may disconnect energy harvester 35100 from transfer capacitor 35300. In some instances, the ambient energy collection period may end when transfer capacitor 35300 has collected a sufficient level of energy (i.e., the capacitor is full). Alternatively or additionally, the collection period may end when the wireless identification tag determines that energy harvester 35100 is not currently collecting energy; when such a determination is made, the wireless identification tag may transfer the energy stored in the transfer capacitor 35300 to the storage capacitor 10300, even if transfer capacitor 35300 is not full.

Switches 35204 and 35206 may connect transfer capacitor 35300 and inductor 34140 during a time period when the ambient energy collected in transfer capacitor 35300 is being transferred for storage. In some instances, the transfer period may occur at the end of the collection period, such as when transfer capacitor 35300 has collected a sufficient level of energy. At the end of the transfer period, switches 35204 and 35206 may disconnect transfer capacitor 35300 from inductor 34140 to prevent energy from flowing back from the transfer capacitor 35300. The end of the transfer period may be based on an LC characteristic of transfer capacitor 35300 and inductor 34140, timed such that most of the energy from transfer capacitor 35300 has flowed to inductor 34140.

Switch 34134 may connect inductor 34140 to storage capacitor 10300 to allow energy from the inductor 34140 to transfer to storage capacitor 10300. Switch 34134 may then be disconnected at a time when most of the energy has flowed from the inductor 34140 to storage capacitor 10300.

According to some embodiments, the wireless identification tag may include at least one circuit 35150 configured to generate control signals 35402, 35406, and 35408 to command the switching operations of switches 35200/35202, 35204/35206, and 34134 respectively. Circuit 35150 may be designed to generate the control signals with specific timing so that ambient energy can be transferred from energy harvester 35100 to transfer capacitor 35300, then to inductor 34140, and then to storage capacitor 10300.

In some embodiments, circuitry may interconnect the first receiver, the second receiver, and the first capacitor in a manner such that the ambient energy received by the first and second receivers at the first and second frequencies is transferred to and stored in the first capacitor. Such circuitry may include any component or group of components between receivers and at least one capacitor that enables received energy to be stored. The circuitry described previously may be modified to incorporate multiple receivers configured to collect different sources of ambient energy. By way of a non-limiting example, FIG. 34 illustrates 900 MHz harvester 9012 and 2.4 GHz harvester 9014 coupled to storage capacitor 10300 to collect ambient energy received in the 900 MHz frequency band and the 2.4 GHz frequency band.

In some embodiments, the wireless identification tag may include a third capacitor for collecting and storing ambient energy, the third capacitor having lower capacitance than the first capacitor, and wherein the inductor may interconnect the first capacitor and the third capacitor. Additionally or alternatively, the circuitry may interconnect the first capacitor, the third capacitor, and the inductor in a manner such that the ambient energy initially stored in the third capacitor is subsequently transferred to and stored in the first capacitor. There may be more than one transfer capacitor disposed between the receiver and the first capacitor. Multiple transfer capacitors may be provided to increase an efficiency of ambient energy collection. In some embodiments the capacitance of each of the second capacitor and third capacitor is less than 1 nF.

In some embodiments, the circuitry may interconnect the receiver, first capacitor, the second capacitor, and the third capacitor in a manner such that ambient energy received by the receiver is initially stored in at least one of the second capacitor or the third capacitor, and is subsequently transferred to and stored in the first capacitor.

In some embodiments, first receiver may be interconnected with the second capacitor to enable the second capacitor to receive the ambient energy at the first frequency from the first receiver; and the second receiver may be interconnected with a third capacitor to enable the third capacitor to receive the ambient energy at the second frequency from the second receiver. For example, one set of transfer capacitors may be configured to collect a first form of ambient energy, and a different set of transfer capacitors may be configured to collect another form of ambient energy. The different sets of transfer capacitors may be coupled to different receivers corresponding to different forms of ambient energy. In some embodiments, the first capacitor may be configured to receive and store energy from the second capacitor and from the third capacitor.

By way of example, as illustrated in FIG. 34, circuitry may include some or all of switches 34124 and 34126 configured to connect 2.4 GHz harvester 9014 (one example of a first receiver) to one of transfer capacitor 34104 and 34106 (e.g., a second capacitor); switches 34120 and 34122 configured to connect 900 MHz harvester 9012 (one example of a second receiver) to one of transfer capacitor 34100 and 34102 (example of a third capacitor); switches 34130 and 34132 configured to connect inductor 34140 to one of transfer capacitor 34100, 34102, 34104, and 34106; and switch 34134 configured to connect/disconnect inductor 34140 to storage capacitor 10300 (one example of a first capacitor). While the harvester 9014 is an example of a receiver, the antenna to which it is connected, 2114, may also separately be referred to as a receiver.

In some embodiments, ambient energy of 900 MHz may be initially collected in one or both of the transfer capacitor 34100 and 34102. For example, transfer capacitor 34100 may collect ambient energy until it is full, and then transfer capacitor 34102 begins to collect ambient energy. Alternatively, transfer capacitor 34100 and 34102 may take turns to collect ambient energy. Operations of transfer capacitors 34104 and 34106 may be substantially similar to that of transfer capacitor 34100 and 34102, and may also take turns to collect ambient energy.

Inductor 34130 may be connected to storage capacitor 10300 via switch 34134. When switches 34130 and 34132 connect inductor 34140 to any one of transfer capacitors 34100-34106, energy stored in these capacitors may be transferred to inductor 34140 via an oscillation as described previously through careful timing of the switches. Similarly, inductor 34140 may subsequently transfer its energy to storage capacitor 10300 via an oscillation.

In various embodiments, the wireless identification tag may include at least one transmitter electrically connected to first capacitor, to enable the energy stored in the first capacitor to power the at least one transmitter. In some embodiments, the transmitter may be electrically connected to the first capacitor, to thereby power the at least one transmitter from energy transferred from the second and third capacitors to the first capacitor.

In some embodiments, the first capacitor may be arranged to store ambient energy received at the first frequency and the second frequency for powering the at least one transmitter.

In a non-limiting example illustrated in FIG. 9, the transmitter may include beacon 2104, which may include beacon controller 9030 and beacon transmitter 9032. Beacon 2104 may be commanded by top level controller 9020, which may output to transmission control interface parameters such as power, timing, frequency and/or transmission data, which may be received by beacon controller 9030. Based on the transmission control parameters, beacon controller 9030 may instruct beacon transmitter 9032 to transmit as commanded. In some embodiments, there may be further provided switch 9034 controlled by beacon controller 9030. Through switch control generated by beacon controller 9030, switch 9034 may alternate between a transmission mode, during which 2.4 GHz antenna 2114 is coupled to beacon transmitter 9032, and a receiving mode, during which 2.4 GHz antenna 2114 is coupled to 2.4 GHz harvester 9014.

In yet another non-limiting example illustrated in FIG. 10, beacon transmitter 9032 may include a PLL 10110, which may be coupled to crystal oscillator 10022 having crystal 10020, and beacon controller 9030; VCO 10112 coupled to PLL 10110; and VGA 10114 coupled to receive inputs from VCO 10112 and beacon controller 9030, and to provide output to 2.4 GHz antenna 2114 through switch 9034. In some embodiments. VCO 10112 may provide modulation of signals to variable gain amplifier (VGA) 10114 based on the output of phase-locked loop (PLL) 10110. In some embodiments, PLL 10110 may provide phase-locking for reference clock from oscillator 10022 to the rest of beacon transmitter 9032 (as illustrated in FIG. 9). In some embodiments, beacon controller 9030 receives a reference clock input from oscillator 10020, and slow clock from real time clock 10024. In turn, beacon controller 9030 may provide a reference clock control to oscillator 1002. In some embodiments, beacon controller 9030 provides frequency control and transmission data to PLL 10110, and provides power control to VGA 10114.

As described above, the transmitter may be configured to operate in a first transmission mode when the energy stored in the first capacitor is above a predetermined energy level, and to operate in a second transmission mode when the energy stored in the first capacitor is equal to or less than the predetermined energy level.

In some embodiments, the wireless identification tag may include at least one circuit configured to control transfer of energy from the second capacitor to the first capacitor. Such a circuit includes any component or group of components that regulate the transfer of energy from the second capacitor to the first capacitor. As discussed previously, for example, transferring energy from the second capacitor to the first capacitor may require active control and regulated timing, which may consume energy. It may be advantageous for a control circuit to have an independent energy supply, apart from the first capacitor or the second capacitor. For example, since the ambient energy collection may require active control of the switches, when the wireless identification tag is low on energy, it may not be able to collect ambient energy due to an inability to power the control circuit. Thus, in some embodiments, for example, the wireless identification tag may include at least one additional capacitor having lower capacitance than the first capacitor, the at least one additional capacitor being configured to power the at least one circuit. The additional capacitor may serve as an energy source for the control circuit, such that even if the energy in the first or the second capacitors are depleted, the additional capacitor may still power the control circuit to enable continued ambient energy collection. The additional capacitor may be electrically connected to the receiver, so that the additional capacitor may collect ambient energy to supply to the control circuit.

Figure 36:
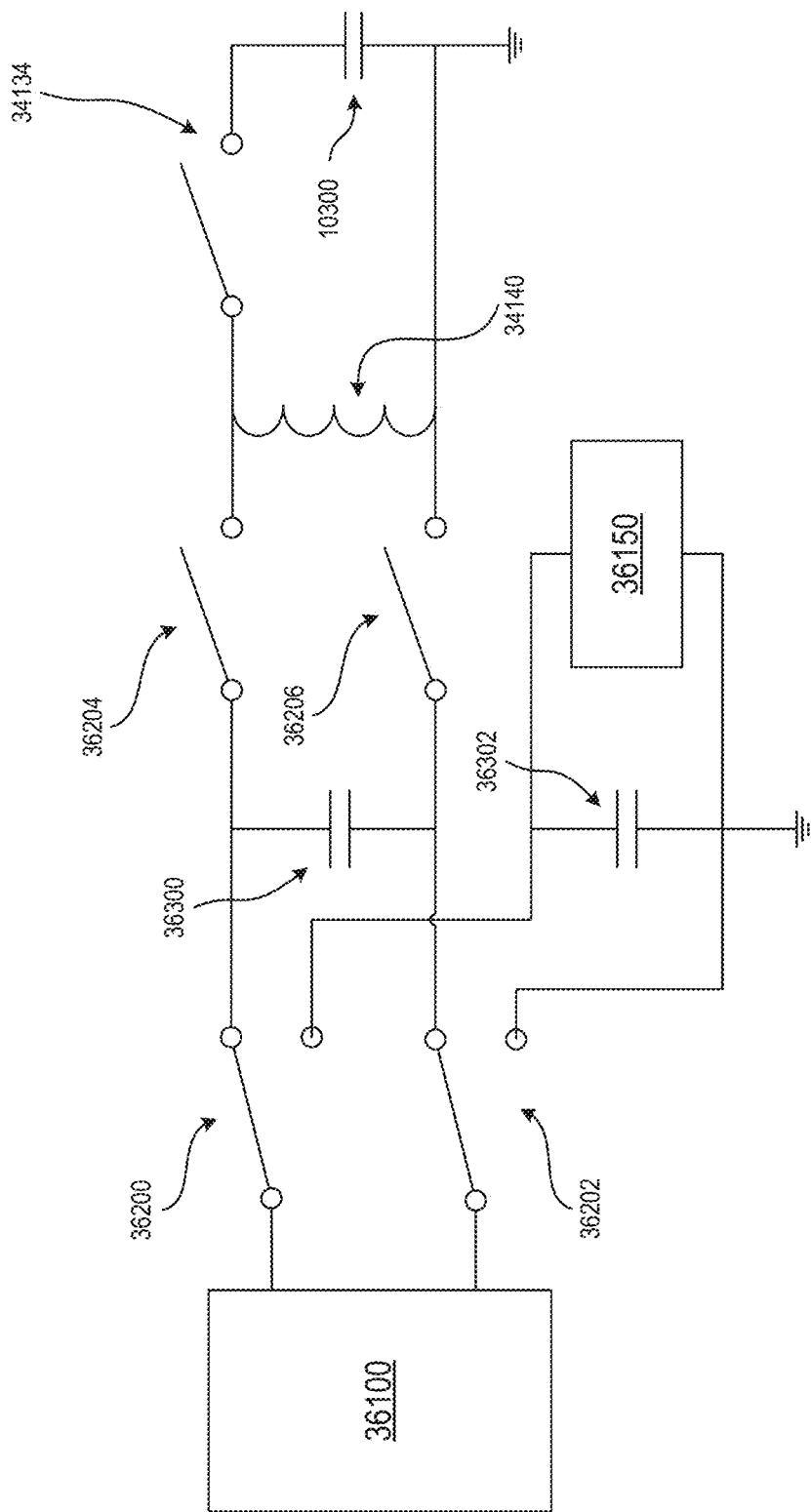
FIG. 36 is a block diagram of a further exemplary system for harvesting and storing ambient energy, consistent with disclosed embodiments.

In some embodiments, the least one circuit may be configured to control transfer of energy from at least one of the second capacitor or the third capacitor to the first capacitor. Such circuitry may include any component or group of components that regulate the transfer of energy from the second or third capacitor to the first capacitor. By way of a non-limiting example, as illustrated in FIG. 36, the at least one circuit may include circuit 36150 connected to control circuit capacitor 36302, which may serve as an additional capacitor. Circuit 36150 may serve as a control for regulating energy transfer from one or more of the transfer capacitor 36300 (e.g., second capacitor) or a third capacitor (not illustrated in FIG. 36) to storage capacitor 10300 (e.g., first capacitor). Control circuit capacitor 36302 may be connected to energy harvester 36100 via switches 36200 and 36202. Energy harvester 36100 may be one of 900 MHz harvester 9012, 2.4 GHz harvester 9014, or different energy harvesting circuit altogether. Ambient energy may be collected and stored in control circuit capacitor 36302, which may be supplied to circuit 36150. In some instances, if control capacitor 36302 exclusively powers circuit 36150, no energy may be required from storage capacitor 10300. Alternatively, storage capacitor 10300 may be used to power circuit 36150 if control circuit capacitor 36302 becomes depleted. In some embodiments, control circuit capacitor 36302 may be omitted entirely, with circuit 36150 being configured for powering by other capacitors, such as storage capacitor 10300.

Circuit 36150 may be programmed to command and control any one of switches 36200, 36202, 36204, 36206, and 34134 in order to collect and store ambient energy for storage in storage capacitor 10300. The manner through which this occurs is described previously with reference to FIG. 34 and FIG. 35.

Disclosed embodiments may include any one of the following bullet-pointed features alone or in combination with one or more other bullet-pointed features, whether implemented as a system and/or method, by at least one processor, and/or stored as executable instructions on non-transitory computer readable media:
- at least one antenna tuned to receive energy transmitted at a first frequency within a frequency band around 900 MHz and at a second frequency within a frequency band around 2.4 GHz
- at least one transmitter, configured to send at least one identification signal
- at least one circuit
- detecting whether energy is received in said first frequency or said second frequency
- causing said at least one transmitter to operate in a first mode to send a first form of identification signal when said first frequency is detected, and to operate in a second mode to cause said at least one transmitter to send a second form of identification signal when said second frequency is detected
- at least one energy storage component electrically connected to said at least one antenna, said at least one energy storage component configured to store said energy received by said at least one antenna
- wherein said at least one energy storage component is configured to store energy received in said first frequency and said second frequency
- wherein said at least one energy storage component is configured to utilize said energy received by said at least one antenna to power said wireless identification tag
- wherein said at least one energy storage component includes at least one capacitor
- wherein said at least one circuit is configured to power said transmitter using energy from said at least one capacitor in order to send said at least one identification signal
- wherein said at least one circuit is configured to cause said at least one transmitter to transmit in said second mode using energy received in at least one of said first frequency or said second frequency
- a first antenna tuned to receive energy transmitted at a frequency within a first frequency range of 900 MHz WW ISM
- a second antenna tuned to receive energy transmitted at a frequency within a second frequency range of 2.4 GHz WW ISM
- wherein said at least one antenna is further tuned to receive energy transmitted in a third frequency range
- detecting whether energy is received in said third frequency range
- causing said at least one transmitter to operate in a third mode to send a third form of identification signal when said third frequency range is detected
- wherein said third frequency range is lower than said first frequency range and said second frequency range
- wherein said at least one transmitter is configured to send said first form of identification signal and said second form of identification signal at a same transmission frequency
- wherein said transmission frequency of said first and second form of identification signals is said second frequency
- wherein said at least one transmitter is configured to send said first form of identification signal and said second form of identification signal at different power levels
- wherein said at least one transmitter is configured to send said second form of identification signal less than ten seconds after said second frequency is detected
- wherein, in said first mode, said at least one transmitter is configured to send said first form of identification signal with a first repetition period
- wherein, in said second mode, said at least one transmitter is configured to send said second form of identification signal with a second repetition period, shorter than said first repetition period
- wherein said first form of identification signal differs from said second form of identification signal in at least one of a repetition period, a frequency channel, a transmission power, or transmitted data associated with said identification signal sent
- wherein at least one of said first form of identification signal or said second form of identification signal includes a unique identifier of said wireless identification tag
- wherein said at least one antenna, said at least one transmitter, and said at least one circuit are provided on a flexible substrate
- a material layer that at least partially encapsulates said wireless tag, said material layer configured for affixation by sewing
- wherein said material layer comprises fabric
- a wireless identification tag with a response time that varies as a function of incoming signal frequency
- detecting whether energy is received in said first frequency or said second frequency
- causing said at least one transmitter to transmit an immediate response when said second frequency is detected, and to transmit a delayed response, having a longer delay compared to said immediate response, when said first frequency is detected
- wherein said immediate response is set to occur less than 10 seconds after said second frequency is detected
- wherein said delayed response is set to occur within a range of about one minute to about one week after said first frequency is detected
- wherein said at least one antenna includes a first antenna tuned to receive energy transmitted at a frequency within a first frequency range of 900 MHz WW ISM, and a second antenna tuned to receive energy transmitted at a frequency within a second frequency range of 2.4 GHz WW ISM
- wherein said at least one circuit is configured to implement a transmission rule that commands said at least one circuit for causing said transmitter to delay sending at least one of said immediate response or said delayed response, even when sufficient energy for transmission of said at least one response is aggregated and stored in an energy storage component
- wherein said at least one circuit is configured to implement said transmission rule to cause said transmitter to send at least one of said immediate response or said delayed response in a predetermined time interval
- wherein said transmission rule defines a time interval between at least one of two consecutive immediate responses, or two consecutive delayed responses
- wherein said transmission rule is configured to randomly select a time interval between two consecutive responses
- wherein said at least one antenna is further tuned to receive energy transmitted at a third frequency
- detecting whether energy is received in said third frequency causing said at least one transmitter to transmit a third response, different from said immediate response and said delayed response, when said third frequency is detected
wherein a signal associated with said third response differs from signals associated with said immediate response and delayed response in at least one of repetition period and a time interval between two consecutive responses
wherein said third frequency is lower than said first frequency and said second frequency
at least one energy storage component electrically connected to said at least one antenna, said at least one energy storage component being configured to store said energy received by said at least one antenna
wherein said at least one energy storage component is configured to utilize said energy received by said at least one antenna to power said wireless identification tag
wherein said at least one energy storage component includes at least one capacitor configured to power said wireless identification tag independently of received power
wherein said at least one circuit is configured to monitor energy stored in said energy storage component, and prevent said at least one transmitter from transmitting said delayed response when said energy stored in said energy storage component is determined to be insufficient to transmit said immediate response when said second frequency is detected
wherein said at least one circuit is configured to monitor energy stored in said energy storage component, and cause, in response to detection of said second frequency, said at least one transmitter to transmit a signal requiring less energy to transmit than an amount of energy required for said immediate response, when said energy stored in said energy storage component is determined to be insufficient to transmit a normal immediate response
monitoring energy stored in said energy storage component, and preventing said at least one transmitter from transmitting said immediate response when said energy stored in said energy storage component is determined to be below a predetermined energy level
wherein a signal associated with said delayed response differs from a signal associated with said immediate response in at least one of a repetition period, a frequency channel, a transmission power, or transmitted data associated with said response sent
wherein at least one of said delayed response or said immediate response includes unique identifier data of said wireless identification tag
wherein said at least one antenna, said at least one transmitter, and said at least one circuit are provided on a flexible substrate
an adhesive layer for affixation to a product
at least one fabric layer that at least partially encapsulates said wireless tag, said at least one fabric layer being configured for affixation by sewing
at least one antenna tuned to receive energy transmitted in at least one of a first EAS gate frequency range of about 7-13 MHz or a second EAS gate frequency range of about 58-60 kHz, and configured to be non-detectable by said EAS gate
at least one transmitter configured to send at least one identification signal
at least one energy storage component, electrically connected to said at least one transmitter, for powering said at least one transmitter
at least one circuit connected to said at least one antenna and configured to detect energy transmitted from said EAS gate in at least one of said first EAS gate frequency range or said second EAS gate frequency range, and in response to detecting said energy transmitted from said EAS gate, cause said at least one transmitter to transmit to a receiver other than said EAS gate, said at least one identification signal transmitted in a frequency outside said first EAS gate frequency range and said second EAS gate frequency range
wherein said frequency outside said first and second EAS gate frequency ranges is within a frequency range of 2.4 GHz WW ISM
wherein said at least one circuit is configured to cause said at least one transmitter to transmit said at least one identification signal less than ten seconds after said energy transmitted from said EAS gate is detected
wherein said at least one energy storage component is configured to store radio frequency energy received by said at least one antenna, said received radio frequency energy being characterized by a frequency outside of said first EAS gate frequency range and outside said second EAS gate frequency range
a first antenna tuned to receive energy transmitted within a frequency range of 900 MHz WW ISM
a second antenna tuned to receive energy transmitted within a frequency range of 2.4 GHz WW ISM
at least one EAS antenna configured to receive said energy transmitted in said at least one EAS gate frequency range
wherein said at least one energy storage component is configured to store said energy received by said first antenna and said second antenna, and power said at least one transmitter with said stored energy
wherein said at least one transmitter is configured to send said identification signal via at least one of a Bluetooth protocol, Bluetooth Low Energy, Wi-Fi, ZigBee, Z-wave, or radio-frequency identification (RFID) protocol
wherein said at least one transmitter is configured to sequentially send a plurality of repetitions of said identification signal in response to detecting said energy transmitted from said EAS gate
wherein said at least one transmitter is configured to dynamically delay each of said plurality of repetitions of said identification signal, to thereby avoid signal collision
wherein said at least one transmitter is configured to randomly delay at least one of said repetitions of said identification signal, to thereby avoid signal collision
wherein said at least one transmitter is further configured to transmit at least one alert signal for causing at least one of an audible alert, a visual alert, or a digital message
wherein said at least one alert signal is a component of said at least one identification signal
wherein said at least one alert signal is separate from said at least one identification signal
association with a specific product to thereby transmit a unique identification signal that differs from identification signals from tags associated with other instances of a same product
wherein said at least one circuit is configured to implement an identification transmission rule for regulating said at least one circuit in a manner causing said at least one transmitter to delay sending said identification signal, even when sufficient transmission power for transmitting said identification signal is aggregated and stored in said energy storage component wherein said at least one circuit is configured to implement said identification transmission rule to cause said transmitter to send said identification signal in a predetermined time interval wherein said at least one circuit is configured to implement said identification transmission rule to define a time interval between transmission of two consecutive identification signals wherein said at least one circuit is configured to implement said identification transmission rule to randomly select a time interval between two consecutive identification signals wherein said non-detectability of said at least one antenna enables said tag to avoid triggering said EAS gate wherein said at least one circuit is configured to conserve energy by activating for a first predetermined length of time and deactivating for a second predetermined length of time, in a repeating manner a wireless identification tag configured to harvest ambient energy and transmit an identification signal intermittently at least one antenna configured to receive ambient energy at least one energy storage component, electrically connected to said at least one antenna, configured to aggregate and store said received ambient energy at least one transmitter electrically connected to said at least one energy storage component, configured to transmit said identification signal at least one circuit connected to said at least one transmitter and configured to implement an identification transmission rule, to cause said transmitter to delay sending said identification signal even when sufficient energy for transmission of said identification signal is aggregated and stored in said energy storage component wherein said at least one circuit is configured to implement said identification transmission rule to cause said transmitter to send said identification signal in a predetermined time interval wherein said at least one circuit is configured to implement said identification transmission rule to define a time interval between transmission of two consecutive identification signals wherein said at least one circuit is configured to implement said identification transmission rule to randomly select a time interval between two consecutive identification signal transmissions wherein said at least one antenna is configured to receive energy transmitted at a frequency within at least one of a first frequency band around 900 MHz or a second frequency band around 2.4 GHz wherein said at least one circuit is configured to cause said transmitter to transmit said identification signal in said second frequency band using energy received in at least one of said first frequency band or said second frequency band wherein said at least one energy storage component is configured to power said wireless identification tag with said stored received ambient energy wherein said at least one energy storage component includes at least one capacitor configured to power said wireless identification tag without a battery wherein said at least one circuit is configured to implement said identification transmission rule when said at least one antenna receives ambient energy of a first predetermined frequency wherein said first predetermined frequency is a frequency of about 900 MHz wherein said at least one circuit is further configured to cause said transmitter to send said identification signal less than ten seconds after said at least one antenna receives ambient energy in a second predetermined frequency wherein said second predetermined frequency is about 2.4 GHz wherein said at least one circuit is further configured to determine that sufficient energy is aggregated and stored when an amount of energy stored in said energy storage component is equal to or greater than a sum of a first amount of energy required for identification signal transmission and a second predetermined amount of reserve energy wherein said predetermined amount of reserve energy includes energy for powering at least one portion of said wireless identification tag, apart from said at least one transmitter, for a predetermined time period wherein said predetermined amount of reserve energy includes a minimum amount of energy for said energy storage component to power said at least one transmitter wherein said predetermined amount of reserve energy includes energy for powering said at least one transmitter to send a predetermined number of transmissions of said identification signal wherein said at least one circuit is configured to monitor energy stored in said energy storage component, and cause said at least one transmitter to transmit an additional identification signal, said additional identification signal requiring less energy to transmit than said delayed identification signal, when said ambient energy stored in said energy storage component is determined to be below a predetermined threshold level wherein said delayed identification signal includes unique identifier data of said wireless identification tag a wireless identification tag configured to harvest ambient energy and transmit an identification signal intermittently at least one transmitter, configured to transmit a first signal to a first receiver in a first frequency, and to transmit a second signal to a second receiver in said first frequency at least one energy storage component, electrically connected to said at least one transmitter, for collecting and storing ambient energy and for powering transmission of said at least one transmitter at least one circuit connected to said at least one transmitter and to said at least one energy storage component, said at least one circuit being configured to monitor energy stored in said energy storage component, and to prevent said at least one transmitter from transmitting said first signal to said first receiver in said first frequency when said energy stored in said energy storage component is insufficient to transmit said second signal to said second receiver in said first frequency wherein said first frequency is within a frequency band of 2.4 GHz WW ISM wherein said at least one energy storage component is configured to store energy received in said first frequency and energy received in a second frequency that is lower than said first frequency, and to power said at least one transmitter using said stored energy wherein said second frequency is within a frequency band of 900 MHz WW ISM wherein said circuit is configured to determine whether to cause said at least one transmitter to operate in a first mode for transmitting said first signal to said first receiver or to operate in a second mode for transmitting said second signal to said second receiver based on said frequency of a signal received by said wireless identification tag wherein said circuit is further configured to cause said at least one transmitter to operate in said first mode when said wireless identification tag receives a signal in at least one of a first frequency band of 900 MHz WW ISM or a second frequency band of 2.4 GHz WW ISM wherein said circuit is further configured to cause said at least one transmitter to operate in said second mode when said wireless identification tag receives a signal in at least one of a first frequency band of about 7-13 MHz or a second frequency band of about 58-60 kHz wherein said at least one transmitter is configured to transmit to said first receiver in a first location different from a location of said second receiver, and wherein said at least one transmitter is further configured to transmit said second signal after a shorter delay than a delay before transmitting said first signal wherein said at least one circuit is configured to determine that insufficient energy is stored in said energy storage component when an amount of energy stored in said energy storage component is less than a sum of a first amount of energy required for transmission of said first signal to said first receiver and a second amount of energy required for transmission of said second signal to said second receiver after said transmission of said first signal to said first receiver wherein said at least one circuit is configured to determine that insufficient energy is stored in said energy storage component when an amount of energy stored in said energy storage component is less than a sum of a first amount of energy required for transmission of said second signal to said second receiver and a second predetermined amount of reserve energy a first minimum amount of energy for powering at least one component of said wireless identification tag, apart from said at least one transmitter, for a predetermined time period a second minimum amount of energy for powering said at least one transmitter to send a predetermined number of transmissions of said first signal a third minimum amount of energy for said energy storage component to power said at least one transmitter after said transmitter sends said predetermined number of transmissions of said first signal wherein said at least one circuit is further configured to detect whether energy is received in a frequency other than said first frequency, and to cause said at least one transmitter to send said second signal to said second receiver less than ten seconds after said energy received in said other frequency is detected wherein said first signal differs from said second signal in at least one of repetition period, a time interval between two consecutive responses, a data encryption mechanism, a transmission power, or data content of said transmission wherein said first signal includes first identification data and said second signal includes second identification data, and at least one of said first identification data or said second identification data includes a unique identifier of said wireless identification tag wherein, when said energy stored in said energy storage component is determined to be below a predetermined threshold level, said at least one circuit is configured to cause said at least one transmitter to transmit an alternative signal to said first receiver with less energy than is required to transmit said first signal to said first receiver wherein said at least one circuit is configured to implement an identification transmission rule for regulating said at least one circuit in a manner causing said at least one transmitter to delay sending said first signal to said first receiver, even when sufficient energy is stored in said energy storage component for transmitting said second signal to said second receiver wherein said at least one circuit is further configured to implement said identification transmission rule to cause said transmitter to send said first signal to said first receiver in a predetermined time interval wherein said at least one circuit is further configured to implement said identification transmission rule to randomly select a time interval between two consecutive transmissions of said first signal to said first receiver wherein said at least one circuit is configured to conserve energy by activating for a first predetermined length of time and deactivating for a second predetermined length of time, in a repeating manner wherein said at least one transmitter, said at least one energy storage component, and said at least one circuit are located on a flexible substrate at least one transmitter configured to transmit a first signal in a first frequency band to a plurality of identification tags, and to thereby cause said plurality of identification tags to transmit second signal in a second frequency band, said second signal indicating whether said first signal was received in said first frequency band a first receiver configured for location proximate to said at least one transmitter to receive transmissions of said second signal from said plurality of identification tags a second receiver configured to receive a third signal from a tag outside a transmission range of said at least one transmitter, wherein said second receiver is located further from said at least one transmitter than said first receiver at least one processor configured to generate a potential fraud alert when said second receiver receives said third signal wherein said first frequency band includes at least one of a first EAS frequency band of about 7-13 MHz or a second EAS frequency band of about 58-60 kHz wherein said second frequency band is a frequency band of 2.4 GHz WW ISM wherein said plurality of identification tags each include an energy storage component configured to store energy transmitted in a frequency outside of said first frequency band and to power a transmitter of said at least one identification tag with said stored energy wherein said plurality of identification tags are further configured to receive a fourth signal outside of said first frequency band and to transmit a fifth signal in said second frequency band in response to receiving said fourth signal wherein said fourth signal is in said second frequency band or in a third frequency band of 900 MHz WW ISM wherein at least one processor is configured such that when said fifth signal is received by said second receiver, said at least one processor is configured to identify a specific identification tag that transmitted said fifth signal and to look up an ID of said identified tag in an inventory stored in at least one data structure wherein said at least one processor is configured to generate said alert when said ID of said identified tag is included in said inventory wherein said second signal differs from said fourth signal in at least one of a repetition period, a power level, a signal encryption mechanism, or data content of said transmitted signal wherein said identification tags are further configured to transmit first identification data with said second signal and to transmit second identification data, different from said first identification data, with said fourth signal wherein said at least one transmitter, said first receiver, and said second receiver are configured for location within a common establishment wherein said at least one processor is configured to forego generating said alert when said second signal is received by said first receiver at said first location wherein said at least one processor is configured to identify said identification tag that transmitted said second signal and looks up an ID of said identified tag in an inventory stored in at least one data structure when said second signal is received by said first receiver wherein said at least one processor is configured to generate said alert when said ID of said identified tag is included in said inventory wherein said at least one processor is configured to update an inventory database when said second signal is received by said first receiver wherein said at least one transmitter includes an EAS antenna configured to transmit and detect signals within said first frequency band, and at least one of said first receiver or said second receiver includes an antenna tuned to receive signals transmitted in said second frequency band wherein said at least one processor is configured to cause an alarm mechanism located in proximity to said second location to produce at least one of a visual notification or an audible notification when said second signal is received by said second receiver wherein said at least one processor is configured to transmit said alert to a remote device when said second signal is received by said second receiver wherein said at least one processor is configured to identify said identification tag that transmitted said second signal, access data associated with said identified tag in a database, and determine whether to generate an alert based upon said accessed data, when said second signal is received by said first receiver a fraud avoidance system for use with wirelessly tagged inventory detecting a signal associated with a transmission in an EAS gate frequency identifying said signal as emanating from a location that does not correspond to an EAS gate location based on said identified emanation location of said signal, determining that a suspected fraudulent event is in progress generating an alert of said suspected fraudulent event wherein said detected signal is in an EAS gate transmission range wherein said detected signal emanates from a wireless tag triggered by a signal in an EAS gate transmission range a wireless identification tag with varying ID transmission timing at least one energy storage component, electrically connected to said at least one transmitter, said at least one energy storage component being configured to collect and store ambient energy and to power transmission of said at least one transmitter at least one circuit configured to cause said at least one transmitter to transmit a sequence of identification signals in non-uniform intervals such that times between identification signal transmissions of three consecutive transmissions vary wherein said at least one circuit is further configured to select said respective durations of said non-uniform intervals based on a predetermined rule wherein said at least one circuit is further configured to randomly select said respective durations of said non-uniform intervals wherein said at least one circuit is further configured to cause said at least one transmitter to transmit said sequence of identification signals in varying frequency channels such that transmission frequencies of said three consecutive transmissions vary wherein said at least one circuit is further configured to randomly select one channel of said varying frequency channels for transmission of each identification signal by said at least one transmitter wherein said at least one transmitter is configured to transmit said identification signals in at least three transmission channels within a predetermined frequency band wherein said predetermined frequency band is a frequency band around 2.4 GHz wherein said at least one circuit is further configured to receive a trigger and cause said at least one transmitter to transmit identification signals in response to said trigger at least one antenna configured to receive said trigger transmitted as energy having a frequency within at least one of a first frequency band around 900 MHz or a second frequency band around 2.4 GHz, and wherein said at least one energy storage component is configured to store said energy received by said at least one antenna operating in a first transmission mode when said at least one antenna receives energy transmitted in said first frequency band operating in a second transmission mode when said at least one antenna receives energy transmitted in said second frequency band, wherein said first transmission mode differs from said second transmission mode in at least one of a repetition period of a transmitted signal, a transmission power level, or data content of said transmission at least one second circuit configured to generate said trigger according to a predetermined timing sequence wherein said at least one second circuit is configured to generate a first trigger according to a first timing sequence and to generate a second trigger according to a second timing sequence that differs from said first timing sequence in at least one of a repetition period or a time interval between two consecutive generated triggers wherein said sequence of identification signals varies based on a characteristic of a product associated with said tag wherein said characteristic of said product includes a unique ID of said product wherein said unique ID of said product is associated with a stock keeping unit (SKU) indicative of at least one of a material, size, color, or style associated with said product wherein said at least one energy storage component includes at least one capacitor configured to power said wireless identification tag without a battery a wireless identification tag with varying identity at least one transmitter configured to transmit a tag ID receiving a first trigger at a first time, and in response to said first trigger, generate in a quasi-random manner a first decipherable ID uniquely identifying said tag, and cause said at least one transmitter to transmit said first decipherable ID receiving a second trigger at a second time after said first time and in response to said second trigger, generate in a quasi-random manner a second decipherable ID different from said first decipherable ID and uniquely identifying said tag, and cause said at least one transmitter to transmit said second decipherable ID wherein at least one of said first decipherable ID or said second decipherable ID is encrypted wherein at least one of said first trigger or said second trigger is a request, received from a requester, to identify said tag wherein said requester is at least one of a computing device or an application executed on a computing device wherein said at least one circuit is configured to transmit, to said requester, said quasi-randomly generated decipherable ID corresponding to at least one of said first trigger or said second trigger receiving a unique ID of said tag receiving a key configured for use with at least one encryption algorithm encrypting said unique ID of said tag using said key and said encryption algorithm to generate at least one of said first decipherable ID or said second decipherable ID with said unique ID of said tag and said key generating at least one of a random number or a pseudo-random number generating at least one of said first decipherable ID or said second decipherable ID using said generated number, said unique ID of said tag, and said key wherein said tag includes memory for storing at least one of said unique ID of said tag or said key wherein said at least one circuit is configured to receive said key wherein said at least one circuit is configured to cause said at least one transmitter to transmit said first decipherable ID to a first receiver and to transmit said second decipherable ID to a second receiver different from said first receiver at least one receiver configured to receive triggers transmitted at a frequency within at least one of a predetermined first frequency band or a predetermined second frequency band wherein said first frequency band is a band around 900 MHz and said second frequency band is a band around 2.4 GHz determining whether said at least one receiver receives a trigger at a frequency within said first frequency band or within said second frequency band causing said at least one transmitter to transmit a first tag ID signal when said trigger is received at a frequency within said first frequency band, and to transmit a second tag ID signal when said trigger is received at a frequency within said second frequency band, wherein said first tag ID signal differs from said second tag ID signal in at least one of repetition period, a time interval between two consecutive responses, a data encryption mechanism, a transmission power, or data content of said transmission at least one energy storage component, electrically connected to said at least one transmitter, for collecting and storing ambient energy received by said at least one receiver and for powering transmission of said at least one transmitter a timing circuit configured to generate at least one of said first trigger or said second trigger according to a predetermined timing sequence wherein said timing circuit is configured to generate said first trigger according to a first timing sequence and to generate said second trigger according to a second timing sequence that differs from said first timing sequence in at least one of a repetition period or a time interval between two consecutive generated triggers a system for providing privacy to downstream owners of electronically tagged goods storing IDs for a plurality of tags including at least a first owner ID and a second owner ID for a particular tag at a time when said first owner of said particular tag is recorded as owning said tag, associating first information of said particular tag with said first owner ID recording a transaction transferring ownership of said particular tag from said first owner to a second owner after said transfer of ownership, associating second information of said particular tag with said second owner ID, and prevent said first owner from accessing said second information wherein at least one of said first information or said second information includes at least one of a location, a transaction history, owner name, manufacturer name, a unique identifier of said tag, or an encryption key associated with said tag wherein said particular tag is attached to a particular item and wherein recording said transferring ownership of said particular tag enables tracking of a change in ownership of said particular item wherein said at least one processor is configured to store a unique tag ID of each tag and to associate said tag ID of said particular tag with said owner ID of said recorded owner of said particular tag wherein said at least one processor is further configured to receive an association between said tag ID of said particular tag and at least one authorized entity associated with said recorded owner of said particular tag wherein said at least one authorized entity is at least one of a computing device or an application executed on a computing device wherein said at least one processor is configured to receive a request to modify a list of said authorized entities associated with said particular tag, to confirm that said request to modify is received from an authorized entity of said particular tag, and to modify said list following confirmation that said request was received from said authorized entity of said particular tag wherein when a transfer of ownership of said particular tag is recorded, said at least one processor is configured to control said particular tag to change at least one parameter of a signal transmitted by said particular tag wherein said at least one parameter includes at least one of a repetition period of said signal transmitted by said particular tag, a time interval between two consecutive signals transmitted by said particular tag, a data encryption mechanism, an encryption key, a signal transmission power, a packet format, or data content of a transmission from said particular tag controlling said particular tag to transmit a first signal using a first encryption key associated with said first owner ID before said transfer of ownership is recorded controlling said particular tag to transmit a second signal using a second encryption key associated with said second owner ID after said transfer of ownership is recorded receiving, from a device associated with said first owner ID, an ownership transfer notification identifying at least said second owner ID and a tag ID of said particular tag recording, in at least one data structure, at least one of an updated association between said tag ID and said first owner ID, an updated association between said tag ID and said second owner ID, inventory information associated with said first owner ID, or inventory information associated with said second owner ID receiving from at least one reader an identification signal transmitted by said particular tag based on said received identification signal, accessing a tag ID associated with said particular tag receiving an association between said second owner ID and said tag ID associated with said particular tag recording, in at least one data structure, at least one of an updated association between said tag ID and said first owner ID, an updated association between said tag ID and said second owner ID, inventory information associated with said first owner ID, or inventory information associated with said second owner ID wherein said at least one processor is configured to permit said first owner to access said first information after said ownership transfer wherein said at least one processor is configured to prevent said first owner from accessing said first information prior to said time when said first owner is recorded as owning said particular tag receiving an association between a particular owner ID and at least one authorized entity associated with said particular owner ID permitting said authorized entity to access information pertaining to at least one of said particular owner ID, a tag associated with said particular owner ID, or an item associated with said particular owner ID wherein said at least one authorized entity is at least one of a computing device or an application executed on a computing device recording a transaction transferring ownership of said particular tag from said second owner to a third owner after said transfer of ownership to said third owner, associating third information of said particular tag with an owner ID of said third owner, and prevent said second owner from accessing said third information wherein said third owner is said first owner, and wherein said at least one processor is further configured to associate said third information of said particular tag with said first owner ID wherein said third owner is different from said first owner, and wherein said at least one processor is further configured to prevent said first owner from accessing said third information wherein after said transfer of ownership to said third owner, said at least one processor is configured to permit said first owner to access said first information and to permit said second owner to access said second information causing simultaneous triggering and sequential reading of a plurality of tags displaying an activatable element on a graphical user interface, said element being configured to activate a 2.4 GHz transmitter upon activation of said element, activating said 2.4 GHz transmitter to cause each of a plurality of tags in a vicinity of said transmitter to send a unique tag ID to a receiver associated with said transmitter reading a first group of said plurality of unique tag IDs during a first time interval, wherein said first group excludes a second group of said plurality of unique tag IDs recording first information associated with said first group after reading said first group, maintaining activation of said 2.4 GHz transmitter during a second time interval, to cause transmission of at least some of said unique tag IDs of said first group along with said unique tag IDs of said second group to said receiver after reading said at least some of said unique tag IDs of said first group along with said unique tag IDs of said second group, recording second information associated with said second group wherein said instructions further comprise displaying at least one of said first information or said second information on said graphical user interface wherein said instructions further comprise maintaining activation of said 2.4 GHz transmitter until said unique tag ID of each tag of said plurality of tags is read wherein each tag of said plurality of tags is associated with a unique tag ID and is configured to encrypt said unique tag ID thereof and send said encrypted tag ID to said receiver continuously activating said 2.4 GHz transmitter to cause each of said tags to continuously send to said transmitter said unique tag IDs sequentially reading each unique tag ID aggregating data associated with each unique tag ID to construct an inventory of products simultaneously activated and sequentially read identifying, from among said at least some of said unique tag IDs of said first group and said unique tag IDs of said second group, unique tag IDs that were read with said first group recording said second information while excluding information associated with said identified tag IDs that were read with said first group wherein said instructions further comprise displaying on said graphical user interface an inventory of information associated with said plurality of tags in said vicinity of said transmitter wherein said inventory of information includes at least one of a tag ID, an ownership history list, an encryption key, an SKU, or a location associated with each of said plurality of tags
wherein said instructions further comprise enabling a user to identify a missing product, and displaying on said graphical user interface an indication that said missing product is in said vicinity of said transmitter
wherein displaying said indication further includes displaying a location of said missing product on said graphical user interface
a device for simultaneously triggering and sequentially reading a plurality of tags
a 2.4 GHz transmitter
a receiver
periodically activating said 2.4 GHz transmitter to cause each of a plurality of tags in a vicinity of said transmitter to send a unique tag ID to said receiver
reading a first group of said plurality of unique tag IDs during a first time interval, wherein said first group excludes a second group of said plurality of unique tag IDs
recording first information associated with said first group
after reading said first group, maintaining activation of said 2.4 GHz transmitter during a second time interval, to cause transmission of at least some of said unique tag IDs of said first group along with said unique tag IDs of said second group to said receiver
after reading said at least some of said unique tag IDs of said first group along with said unique tag IDs of said second group in said second time interval, recording second information associated with said second group
wherein said at least one processor is further configured to activate said 2.4 GHz transmitter at a predetermined time interval
wherein said at least one processor is further configured to randomly select a time interval between two consecutive activations of said 2.4 GHz transmitter
wherein said at least one processor is configured to cause at least one of said first information or said second information to be displayed on a graphical user interface
wherein said at least one processor is configured to update a data structure with at least one of said first information or said second information
wherein said at least one processor is configured to maintain activation of said 2.4 GHz transmitter until said unique tag ID of each tag of said plurality of tags is read
wherein each tag of said plurality of tags is associated with a unique tag ID and is configured to encrypt said unique tag ID thereof and send said encrypted tag ID to said receiver
continuously activating said 2.4 GHz transmitter to cause each of said plurality of tags to continuously send to said transmitter said unique tag IDs
sequentially reading each unique tag ID
aggregating data associated with each unique tag ID to construct an inventory of products simultaneously activated and sequentially read
identifying, from among said at least some of said unique tag IDs of said first group and said unique tag IDs of said second group, unique tag IDs that were read with said first group
recording said second information while excluding information associated with said identified tag IDs that were read with said first group wherein said at least one processor is configured to cause an inventory of information associated with each of said plurality of tags in said vicinity of said transmitter to be displayed on a graphical user interface
wherein said inventory of information includes at least one of a tag ID, an ownership history list, an encryption key, an SKU, or a location associated with each of said plurality of tags
wherein said at least one processor is configured to enable a user to input an identification of a missing product, and cause an indication that said missing product is nearby to be displayed on a graphical user interface
wherein said at least one processor is further configured to cause a location of said missing product to be displayed on said graphical user interface
an appliance for holding electronically tagged products and for recording an association between said tagged products and said appliance,
a housing defining a cavity for retaining said electronically tagged products
an exciter, integrated with said housing, said exciter being configured to trigger tags of said electronically tagged products to cause said tag of each product to transmit a unique tag ID
a receiver for receiving transmission of each unique tag ID
a communicator for outputting indications of identities of electronically tagged products retained in said cavity
wherein said indications outputted by said communicator reflect identities of said electronically tagged products derived from received unique tag IDs
wherein said indications outputted by said communicator include at least one of an inventory report, an inventory change, an inventory history, or a log of a particular tagged product
wherein said exciter is configured to transmit energy at a frequency within at least one of a first frequency band around 900 MHz or a second frequency band around 2.4 GHz
wherein after receiving said energy transmitted from said exciter, said tags of said electronically tagged products are each configured to transmit said unique tag ID thereof for receipt by said receiver in said second frequency band
wherein said exciter is configured to transmit energy to said tags of said electronically tagged products to thereby enable each tag of said tagged products to harvest said energy from said exciter and use said harvested energy for powering each tag
wherein said exciter is configured to receive a trigger command and to trigger said tags of said electronically tagged products in response to receiving said trigger command
wherein said exciter is configured to trigger said tags of said electronically tagged products according to a predetermined timing sequence
wherein said receiver includes an antenna configured to receive said transmission of each unique tag ID at a frequency within a frequency band around 2.4 GHz
wherein said exciter is configured to simultaneously trigger a plurality of tags of said electronically tagged products
wherein said receiver is configured to sequentially read transmissions of said unique tag IDs of said simultaneously-triggered tags receiving, from a requester, a request to identify said electronically tagged products retained in said cavity at a specified time outputting to said requester an indication of said identities of said electronically tagged products retained in said cavity at said specified time receiving, from a requester, a request to locate a particular electronically tagged product outputting to said requester an indication of whether said particular electronically tagged product is retained in said cavity wherein for a particular tag of an electronically tagged product, at least one of said unique tag ID of said particular tag or said indication of said identity of said product associated with said particular tag are encrypted wherein said communicator is configured to send said encrypted tag ID to at least one processor for decryption by said at least one processor wherein said communicator is configured to locally decrypt said at least one unique tag ID wherein said communicator is configured to output information associated with said electronically tagged products, said information including at least one of a period of time said products were retained in said cavity, a period of time since said previous time said products were retained in said cavity, or recommendations associated with said products at least one processor configured to cause information related to each unique tag ID to be stored in memory, and wherein said information includes, for each product associated with each unique tag ID, an indication of at least one of when each product was placed in said cavity, when each product was removed from said cavity, a number of times each product was removed from said cavity, a number of times each product was returned to said cavity, a total amount of elapsed time when said each product was outside said cavity, an amount of elapsed time since each product was within said cavity, an indication of when said each product associated with each tag ID was last in said cavity, or a list of products other than a particular product that were in said cavity at said same time as said particular product at least one processor configured to distinguish multiple instances of a same product based on associated unique tag IDs at least one processor configured to recognize products expected to be in said cavity and to cause said communicator to output a notification if an expected product is missing from said cavity at least one processor configured to recognize products in said cavity that are not expected to be in said cavity, and to cause said communicator to output a notification if a product not expected to be in said cavity is within said cavity a wireless identification tag configured to collect and store ambient energy for use in delayed transmission a receiver for receiving ambient energy a first capacitor for storing said ambient energy a second capacitor for collecting and storing said ambient energy, said second capacitor having lower capacitance than said first capacitor an inductor interconnecting said first capacitor and said second capacitor circuitry interconnecting said receiver, said first capacitor, and said second capacitor in a manner such that ambient energy received by said receiver is initially stored in said second capacitor, and is subsequently transferred to and stored in said first capacitor at least one transmitter electrically connected to first capacitor, to enable said energy stored in said first capacitor to power said at least one transmitter wherein a capacitance of said second capacitor is less than 1 nF wherein said capacitance of said second capacitor is less than 100 pF wherein a capacitance of said first capacitor is at least 10 nF wherein said capacitance of said first capacitor is at least 100 nF a third capacitor for collecting and storing ambient energy, said third capacitor having lower capacitance than said first capacitor, and wherein said inductor interconnects said first capacitor and said third capacitor wherein said circuitry interconnects said first capacitor, said third capacitor, and said inductor in a manner such that said ambient energy initially stored in said third capacitor is subsequently transferred to and stored in said first capacitor a first receiver for receiving ambient energy transmitted at a first frequency within a frequency band around 2.4 GHz a second receiver for receiving ambient energy transmitted at a second frequency within a frequency band around 900 MHz, and wherein said circuitry interconnects said first receiver, said second receiver, and said first capacitor in a manner such that said ambient energy received by said first and second receivers at said first and second frequencies is transferred to and stored in said first capacitor wherein said first capacitor is arranged to store ambient energy received at said first frequency and said second frequency for powering said at least one transmitter wherein said first receiver is interconnected with said second capacitor to enable said second capacitor to receive said ambient energy at said first frequency from said first receiver wherein said second receiver is interconnected with a third capacitor to enable said third capacitor to receive said ambient energy at said second frequency from said second receiver wherein said first capacitor is configured to receive and store energy from said second capacitor and from said third capacitor wherein said at least one transmitter is configured to operate in a first transmission mode when said energy stored in said first capacitor is above a predetermined energy level, and to operate in a second transmission mode when said energy stored in said first capacitor is equal to or less than said predetermined energy level at least one circuit configured to control transfer of energy from said second capacitor to said first capacitor at least one additional capacitor having lower capacitance than said first capacitor, said at least one additional capacitor configured to power said at least one circuit a wireless identification tag configured to collect and store ambient energy for use in delayed transmission a receiver for receiving ambient energy a first capacitor for collecting and storing said ambient energy a second capacitor for collecting and storing said ambient energy, said second capacitor having lower capacitance than said first capacitor a third capacitor for collecting and storing said ambient energy, said third capacitor having lower capacitance than said first capacitor circuitry interconnecting said receiver, said first capacitor, said second capacitor, and said third capacitor in a manner such that ambient energy received by said receiver is initially stored in at least one of said second capacitor or said third capacitor, and is subsequently transferred to and stored in said first capacitor a transmitter electrically connected to first capacitor, to thereby power said at least one transmitter from energy transferred from said second and third capacitors to said first capacitor an inductor interconnecting said first capacitor with said second capacitor and said third capacitor wherein a capacitance of each of said second capacitor and third capacitor is less than 1 nF wherein a capacitance of said first capacitor is at least 10 nF a first receiver for receiving ambient energy transmitted at a first frequency within a frequency band around 2.4 GHz a second receiver for receiving ambient energy transmitted at a second frequency within a frequency band around 900 MHz, wherein said circuitry interconnects said first receiver, said second receiver, and said first capacitor in a manner enabling said ambient energy received by said first and second receivers at said first frequency and second frequency to be transferred to and stored in said first capacitor wherein said first receiver is interconnected with said second capacitor to enable said second capacitor to receive said ambient energy at said first frequency from said first receiver wherein said second receiver is interconnected with said third capacitor to enable said third capacitor to receive said ambient energy at said second frequency from said second receiver at least one circuit configured to control transfer of energy from at least one of said second capacitor or said third capacitor to said first capacitor at least one additional capacitor having lower capacitance than said first capacitor, said at least one additional capacitor configured to power said at least one circuit a system for providing access to information associated with electronically tagged goods storing tag IDs of a plurality of tags receiving a pairing between at least one particular tag ID and a product ID storing information associated with said at least one particular tag ID and said product ID receiving a pairing between said at least one particular tag ID and at least one authorized entity associated with said at least one particular tag ID, wherein said at least one authorized entity is associated with at least one of a current owner of a product corresponding to said product ID, a seller of said product, a manufacturer of said product, or a user of said product receiving, from a requester, a query to identify at least one of said product ID, said information associated with said at least one particular tag ID, said information associated with said product ID, or said at least one authorized entity, said query including an encrypted tag ID of said particular tag decrypting said encrypted tag ID, to thereby look up said decrypted tag ID of said particular tag determining if said requester is said at least one authorized entity associated with said decrypted tag ID of said particular tag fulfilling said query, if said requester is said at least one authorized entity denying said query if said requester is not said at least one authorized entity retrieving requested information from at least one data structure, said requested information including at least one of said stored information associated with said at least one particular tag ID or said stored information associated with said product ID outputting said requested information to said requester wherein denying said query includes outputting a notification that said requester is not authorized to access information designated by said query wherein said plurality of tags are configured to wirelessly receive and store ambient energy, and to power transmission of signals using said stored ambient energy wherein said encrypted tag ID received from said requester is encrypted with at least one encryption key associated with said particular tag, and wherein said at least one processor is configured to retrieve at least one encryption algorithm and said at least one encryption key, and to decrypt said encrypted tag ID using said at least one encryption algorithm and said at least one encryption key receiving at least one change in an owner ID of said particular tag from a first owner ID to a second owner ID in response to said at least one change in said owner ID, correspondingly changing said encryption key of said particular tag to an updated encryption key that is associated with said second owner ID removing said first owner ID from a list of authorized entities associated with said at least one particular tag ID wherein said at least one authorized entity is at least one of a computing device or an application executed on a computing device wherein said information associated with each of said plurality of tags includes a list of authorized entities associated with each tag ID wherein said at least one processor is configured to receive a query to modify said list of authorized entities of a particular tag ID, and if said query is received from an authorized entity of said particular tag ID, perform said requested modification of said list wherein when said list of authorized entities of said particular tag ID is modified, said at least one processor is configured to control said tag associated with said particular tag ID to change at least one parameter of a signal transmitted by said tag wherein said at least one parameter includes at least one of a repetition period of said signal transmitted by said tag, a time interval between two consecutive signals transmitted by said tag, a data encryption mechanism, an encryption key, a signal transmission power, a packet format, or data content of a transmission from said tag a system for providing privacy to owners of electronically tagged goods storing tag IDs of a plurality of tags and a pairing between each tag ID and at least one owner ID receiving, for each owner ID, a pairing between said owner ID and at least one authorized entity enabled to receive data of said one or more tags associated with said owner ID receiving, from a requester, a query for information pertaining to a particular tag of said plurality of tags looking up said at least one owner ID associated with said particular tag determining if said requester is said at least one authorized entity of said at least one owner ID associated with said particular tag if said requester is not said at least one authorized entity, denying said query if said requester is said at least one authorized entity, permitting said requester to access said requested information pertaining to said particular tag accessing at least one encryption key of each tag ID accessing said at least one encryption key associated with said particular tag decrypting, using an encryption algorithm and said at least one encryption key, an encrypted tag ID received with said query from said requester determining if said requester is said at least one authorized entity based on said decrypted tag ID receiving an updated owner ID associated with said particular tag in response to receiving said updated owner ID, correspondingly changing said at least one encryption key associated with said particular tag to an updated encryption key that is associated with said updated owner ID removing said previous owner ID from said at least one authorized entity enabled to receive said data of said particular tag wherein said at least one owner ID of each tag ID is associated with at least one of a current owner of a product associated with said tag ID, a seller of said product, a manufacturer of said product, or a user of said product wherein said plurality of tags are configured to wirelessly receive and store ambient energy, and to power transmission of signals using said stored ambient energy wherein said particular tag is configured to transmit said tag ID thereof when said tag ID is encrypted according to at least one encryption key, and wherein said at least one processor is configured to receive said at least one encryption key and decrypt said tag ID transmitted by said particular tag with said at least one encryption key wherein said at least one authorized entity is at least one of a computing device or an application executed on a computing device wherein said at least one processor is configured to store and access a list of authorized entities associated with each tag wherein said at least one processor is configured to receive a query to modify said list of authorized entities of said particular tag, and if said query is received from an authorized entity of said particular tag, perform said requested modification of said list wherein said at least one processor is configured to control said particular tag to change at least one signal transmission parameter when said list of authorized entities of said particular tag is modified wherein said at least one signal transmission parameter of said particular tag includes at least one of a repetition period of a signal transmitted by said tag, a time interval between two consecutive signals transmitted by said tag, a data encryption mechanism, an encryption key, a signal transmission power, a packet format, or data content of a transmission from said tag a system for protecting against distribution of counterfeit products storing tag IDs of a plurality of electronic tags, wherein at least one specific electronic tag is associated with a specific product storing at least one identity of a first entity, said first entity being associated with at least one of a seller of said specific product, a manufacturer of said specific product, a current owner of said specific product, or a prior owner of said specific product receiving, on behalf of a prospective subsequent custodian of said specific product, an encrypted tag ID associated with said specific product receiving, on behalf of said prospective subsequent custodian, a query associated with said at least one identity decrypting said encrypted tag ID to identify said specific product associated with said specific electronic tag using information associated with said specific electronic tag to access an ownership history for said specific product checking if said at least one identity identified in said query corresponds to an entity in said ownership history causing a transmission of an authenticity indication to said prospective subsequent custodian if said at least one identity identified in said query corresponds to an entity in said ownership history, causing a transmission of a non-authentic indication to said prospective subsequent custodian if said at least one identity identified in said query does not correspond to an entity in said ownership history wherein said at least one processor is configured to cause transmission of said authenticity indication if said at least one identity identified in said query corresponds to a current owner of said specific product in said ownership history wherein said prospective subsequent custodian is associated with a prospective purchaser of said specific product wherein said at least one processor is configured to prevent said prospective subsequent custodian from accessing data about said specific product, said data including at least one of a product location, a transaction history, an owner name, a manufacturer name, said decrypted tag ID of said specific electronic tag, or an encryption key associated with said specific electronic tag wherein said at least one processor is configured to store an ownership history for each of said plurality of products in at least one data structure recording a transaction transferring ownership of said tag ID associated with said specific product from said first entity to said prospective subsequent custodian updating said ownership history of said product in said at least one data structure wherein updating said ownership history of said product includes storing an association between at least one identity of said prospective subsequent custodian, and said tag ID associated with said product wherein said at least one processor is further configured to store, in said at least one data structure, at least one of an inventory of said plurality of electronic tags, said tag IDs of said plurality of electronic tags, or a product ID associated with each tag ID wherein said at least one processor is further configured to store, in said at least one data structure, at least two encryption keys associated with said tag ID of said specific product, wherein said at least two encryption keys include a first encryption key associated with said at least one identity and a second encryption key associated with said prospective subsequent custodian determining whether said prospective subsequent custodian is authorized to make said query if said prospective subsequent custodian is authorized to make said query, proceeding with decrypting said encrypted tag ID to access said ownership history if said prospective subsequent custodian is not authorized to make said query, causing transmission of a non-authorization indication for said prospective subsequent custodian wherein said at least one processor is further configured to request from said first entity an authorization for said prospective subsequent custodian to make said query receiving an association between said first entity and at least one entity authorized to make said query determining if said prospective subsequent custodian is said at least one authorized entity receiving, from at least one entity in said ownership history, verification that said at least one identity identified in said query is a second entity in said ownership history updating said ownership history to include said at least one identity identified in said query wherein said at least one processor is further configured to cause transmission of an authenticity indication for said prospective subsequent custodian based on said updated ownership history wherein said specific electronic tag is associated with a unique tag ID and is configured to encrypt said unique tag ID for transmission to at least one of said at least one processor or a processing device of said prospective subsequent custodian wherein said at least one processor is further configured to send a notification to at least one entity in said ownership history when a query regarding said tag ID associated with said product is received wherein said at least one processor is further configured to send a notification to at least one entity in said ownership history when a non-authentic indication is sent regarding said tag ID associated with said product a system for detecting misplaced items in an establishment receiving from at least one reader in said establishment, identification signals of identification tags read by said at least one reader determining current locations of said identification tags based on said received identification signals recording in at least one data structure said current locations of said identification tags accessing in said at least one data structure a designated location in said establishment for each of said identification tags determining, by comparing said current locations of said identification tags with said designated locations of said identification tags, a particular identification tag with a current location that differs from said designated location of said particular identification tag generating a notification signal when said current location of said particular identification tag does not match said designated location of said particular identification tag wherein said identification tags are configured to receive and store ambient energy, and to power transmission of said identification signals using said stored ambient energy wherein said identification tags are configured to transmit said identification signals according to a predetermined timing sequence wherein at least one identification tag is configured to operate in a first transmission mode when said at least one identification tag receives energy in a first frequency, and to operate in a second transmission mode when said at least one identification tag receives energy in a second frequency that is higher than said first frequency, wherein said first transmission mode differs from said second transmission mode in at least one of a repetition period of a transmitted signal, a transmission power level, or data content of said transmission wherein said at least one reader includes a plurality of readers configured to receive said identification signals, and wherein said at least one processor is configured to access position data of said plurality of readers wherein said at least one processor is configured to identify said locations of said identification tags based on said position data of said plurality of readers and power levels of said identification signals received by said plurality of readers wherein said at least one reader includes at least one of a handheld scanner or a fixed scanner configured to automatically read signals transmitted by said identification tags wherein said at least one processor is further configured to determine that a specific identification tag is associated with a specific item being sold, and update said at least one data structure to remove said specific identification tag from an inventory associated with said establishment wherein said at least one reader is configured to receive gate signals from said identification tags when said identification tags are in at least one predetermined location wherein said at least one processor is configured to determine that said specific item is being sold when a specified reader receives said gate signal from said identification tag associated with said specific item wherein said at least one processor is further configured to modify said data structure to store a unique tag identifier and at least one item attribute for each of said identification tags in said establishment, said at least one item attribute for each identification tag corresponding to at least one of a size, a color, or a style of said item associated with said identification tag wherein generating said notification signal includes sending a signal to cause a user device to output at least one of an audible indicator or a visible indicator of said current location associated with said particular identification tag wherein generating said notification signal includes sending a signal to cause a user device to display, on a graphical user interface of said user device, said current location associated with said particular identification tag, and wherein displaying said current location includes at least one of displaying an indication of said current location on a map, displaying directions to said current location, or displaying a name associated with said current location wherein said at least one processor is further configured to modify said data structure to change said designated location of said particular identification tag to said current location associated with said particular identification tag a system for reporting a location of items in an establishment receiving from at least one reader in said establishment, identification signals of identification tags read by said at least one reader determining current locations of said identification tags based on said received identification signals recording in at least one data structure said current locations of said identification tags receiving a query for a location of a particular item in said establishment identifying said location of said particular item based on an association between said particular item and a particular identification tag and said current location of said particular identification tag displaying, on a graphical user interface, said location of said particular item to a user, wherein displaying said location includes at least one of displaying an indication of said current location of said particular identification tag on a map, displaying directions to said current location of said particular identification tag, or displaying a name associated with said current location of said particular identification tag wherein said identification tags are configured to receive and store ambient energy, and to power transmission of said identification signals using said stored ambient energy wherein at least one identification tag is configured to operate in a first transmission mode when said at least one identification tag receives energy in a first frequency, and to operate in a second transmission mode when said at least one identification tag receives energy in a second frequency that is higher than said first frequency, wherein said first transmission mode differs from said second transmission mode in at least one of a repetition period of a transmitted signal, a transmission power level, or data content of said transmission wherein said at least one reader includes a plurality of readers configured to receive said identification signals, and wherein said at least one processor is configured to access position data of said plurality of readers wherein said at least one processor is configured to identify said locations of said identification tags based on said position data of said plurality of readers and power levels of said identification signals received by said plurality of readers receive a query for an inventory of said plurality of items in said establishment identifying said plurality of items in said establishment based on associations between said plurality of items and said identification tags, and said current locations of said identification tags stored in said data structure displaying, on a graphical user interface, an inventory indication of said identified items in said establishment wherein said at least one reader includes at least one of a handheld scanner or a fixed scanner configured to automatically read signals transmitted by said identification tags wherein said at least one processor is further configured to determine that a specific identification tag is associated with a specific item being sold, and update said at least one data structure to remove said specific identification tag from an inventory associated with said establishment wherein said at least one reader is configured to receive gate signals from said identification tags when said identification tags are in at least one predetermined location wherein said at least one processor is configured to determine that said specific item is being sold when a specified reader receives said gate signal from said identification tag associated with said specific item Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and, accordingly, all suitable modifications and equivalents may be resorted to, falling within the scope of the disclosure.

Computer programs based on the written description and methods of this specification are within the skill of a software developer. The various functions, scripts, programs, or modules may be created using a variety of programming techniques. For example, programs, scripts, functions, program sections or program modules may be designed in or by means of languages, including JAVASCRIPT, C, C++, JAVA, PHP, PYTHON, RUBY, PERL, BASH, or other programming or scripting languages. One or more of such software sections or modules may be integrated into a computer system, non-transitory computer readable media, or existing communications software. The programs, modules, or code may also be implemented or replicated as firmware or circuit logic.

Moreover, while illustrative embodiments have been described herein, the scope may include any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. An appliance for holding electronically tagged products and for recording an association between the tagged products and the appliance, the appliance comprising:
   a housing defining a cavity configured to retain the electronically tagged products;
   an exciter, integrated with the housing, the exciter being configured to trigger tags of the electronically tagged products to cause the tag of each product to transmit a unique tag ID;
   a receiver for receiving transmission of each unique tag ID; and
   a communicator for outputting indications of identities of electronically tagged products retained in the cavity, and
   at least one processor configured to distinguish multiple instances of a same product based on associated unique tag IDs.

2. The appliance of claim 1, wherein the indications outputted by the communicator reflect identities of the electronically tagged products derived from received unique tag IDs.

3. The appliance of claim 1, wherein the indications outputted by the communicator include at least one of an inventory report, an inventory change, an inventory history, or a log of a particular tagged product.

4. The appliance of claim 1, wherein the exciter is configured to transmit energy at a frequency within at least one of a first frequency band around 900 MHz or a second frequency band around 2.4 GHz, wherein after receiving the energy transmitted from the exciter, the tags of the electronically tagged products are each configured to transmit the unique tag ID thereof for receipt by the receiver in the second frequency band, wherein after receiving the energy transmitted from the exciter, the tags of the electronically tagged products are each configured to transmit the unique tag ID thereof for receipt by the receiver in the second frequency band, and wherein the exciter is configured to transmit energy to the tags of the electronically tagged products to thereby enable each tag of the tagged products to harvest the energy from the exciter and use the harvested energy for powering each tag.

5. The appliance of claim 1, wherein the exciter is configured to receive a trigger command and to trigger the tags of the electronically tagged products in response to receiving the trigger command.

6. The appliance of claim 1, wherein the exciter is configured to trigger the tags of the electronically tagged products according to a predetermined timing sequence.

7. The appliance of claim 1, wherein the receiver includes an antenna configured to receive the transmission of each unique tag ID at a frequency within a frequency band around 2.4 GHz.

8. The appliance of claim 1, wherein the communicator is further configured to:
   receive, from a requester, a request to identify the electronically tagged products retained in the cavity at a specified time; and
   output to the requester an indication of the identities of the electronically tagged products retained in the cavity at the specified time.

9. The appliance of claim 1, wherein the communicator is further configured to:
   receive, from a requester, a request to locate a particular electronically tagged product; and
   output to the requester an indication of whether the particular electronically tagged product is retained in the cavity.

10. The appliance of claim 1, wherein for a particular tag of an electronically tagged product, at least one of the unique tag ID of the particular tag or the indication of the identity of the product associated with the particular tag are encrypted, wherein the communicator is configured to send the encrypted tag ID to the at least one processor for decryption by the at least one processor, and wherein the communicator is configured to locally decrypt the at least one unique tag ID.

11. The appliance of claim 1, wherein the communicator is configured to output information associated with the electronically tagged products, the information including at least one of a period of time the products were retained in the cavity, a period of time since the previous time the products were retained in the cavity, or recommendations associated with the products.

12. The appliance of claim 1, wherein the at least one processor is further configured to cause information related to each unique tag ID to be stored in memory, and wherein the information includes, for each product associated with each unique tag ID, an indication of at least one of:
   when each product was placed in the cavity, when each product was removed from the cavity, a number of times each product was removed from the cavity, a number of times each product was returned to the cavity, a total amount of elapsed time when the each product was outside the cavity, an amount of elapsed time since each product was within the cavity, an indication of when the each product associated with each tag ID was last in the cavity, or a list of products other than a particular product that were in the cavity at the same time as the particular product.

13. The appliance of claim 1, wherein the at least one processor is further configured to recognize products expected to be in the cavity and to cause the communicator to output a notification if an expected product is missing from the cavity.

14. The appliance of claim 1, wherein the at least one processor is further configured to recognize products in the cavity that are not expected to be in the cavity, and to cause the communicator to output a notification if a product not expected to be in the cavity is within the cavity.

15. An appliance for holding electronically tagged products and for recording an association between the tagged products and the appliance, the appliance comprising:
   a housing defining a cavity configured to retain the electronically tagged products;
   an exciter, integrated with the housing, the exciter being configured to trigger tags of the electronically tagged products to cause the tag of each product to transmit a unique tag ID;
   a receiver for receiving transmission of each unique tag ID; and
   a communicator for outputting indications of identities of electronically tagged products retained in the cavity, wherein the exciter is configured to simultaneously trigger a plurality of tags of the electronically tagged products, and wherein the receiver is configured to sequentially read transmissions of the unique tag IDs of the simultaneously-triggered tags.

16. The appliance of claim 15, wherein the indications outputted by the communicator reflect identities of the electronically tagged products derived from received unique tag IDs.

17. The appliance of claim 15, wherein the indications outputted by the communicator include at least one of an inventory report, an inventory change, an inventory history, or a log of a particular tagged product.

18. The appliance of claim 15, wherein the exciter is configured to transmit energy at a frequency within at least one of a first frequency band around 900 MHz or a second frequency band around 2.4 GHz, wherein after receiving the energy transmitted from the exciter, the tags of the electronically tagged products are each configured to transmit the unique tag ID thereof for receipt by the receiver in the second frequency band, and wherein the exciter is configured to transmit energy to the tags of the electronically tagged products to thereby enable each tag of the tagged products to harvest the energy from the exciter and use the harvested energy for powering each tag.

19. The appliance of claim 15, wherein the exciter is configured to receive a trigger command and to trigger the tags of the electronically tagged products in response to receiving the trigger command.

20. The appliance of claim 15, wherein the exciter is configured to trigger the tags of the electronically tagged products according to a predetermined timing sequence.

21. The appliance of claim 15, wherein the receiver includes an antenna configured to receive the transmission of each unique tag ID at a frequency within a frequency band around 2.4 GHz.

22. The appliance of claim 15, wherein the communicator is further configured to:
receive, from a requester, a request to identify the electronically tagged products retained in the cavity at a specified time; and
output to the requester an indication of the identities of the electronically tagged products retained in the cavity at the specified time.

23. The appliance of claim 15, wherein the communicator is further configured to:
receive, from a requester, a request to locate a particular electronically tagged product; and
output to the requester an indication of whether the particular electronically tagged product is retained in the cavity.

24. The appliance of claim 15, wherein for a particular tag of an electronically tagged product, at least one of the unique tag ID of the particular tag or the indication of the identity of the product associated with the particular tag are encrypted, wherein the communicator is configured to send the encrypted tag ID to at least one processor for decryption by the at least one processor, and wherein the communicator is configured to locally decrypt the at least one unique tag ID.

25. The appliance of claim 15, wherein the communicator is configured to output information associated with the electronically tagged products, the information including at least one of a period of time the products were retained in the cavity, a period of time since the previous time the products were retained in the cavity, or recommendations associated with the products.

* * * * *